US012608320B1

(12) United States Patent　　(10) Patent No.: US 12,608,320 B1
Beyer et al.　　(45) Date of Patent: Apr. 21, 2026

(54) APPLICATION PROGRAMMING INTERFACE TO ALLOCATE MEMORY FOR SHARED VIRTUAL MEMORY

(71) Applicant: NVIDIA Corporation, Santa Clara, CA (US)

(72) Inventors: James Christopher Beyer, Marshall, MN (US); Paul J. Sidenblad, Cupertino, CA (US); Vyas Venkataraman, Sharon, MA (US); Chetan Gokhale, Santa Clara, CA (US); Cory Perry, San Jose, CA (US); Ying Liang, Palo Alto, CA (US); Harold Carter Edwards, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/713,021

(22) Filed: Apr. 4, 2022

(51) Int. Cl.
　　*G06F 12/00*　　(2006.01)
　　*G06F 9/38*　　(2018.01)
　　*G06F 9/455*　　(2018.01)
　　*G06F 12/084*　　(2016.01)
　　*G06F 12/1009*　　(2016.01)

(52) U.S. Cl.
　　CPC ........ *G06F 12/1009* (2013.01); *G06F 9/3877* (2013.01); *G06F 9/45558* (2013.01); *G06F 12/084* (2013.01); *G06F 2009/45583* (2013.01)

(58) Field of Classification Search
　　None
　　See application file for complete search history.

(56) References Cited

U.S. PATENT DOCUMENTS

| | | | |
|---|---|---|---|
| 5,914,730 | A | 6/1999 | Santos et al. |
| 8,402,229 | B1 | 3/2013 | Wilt et al. |
| 8,776,050 | B2 | 7/2014 | Plouffe et al. |
| 9,678,775 | B1 | 6/2017 | Grover et al. |
| 11,288,194 | B2 | 3/2022 | Johns et al. |
| 2005/0034049 | A1 | 2/2005 | Nemawarkar et al. |
| 2005/0190190 | A1 | 9/2005 | Diard et al. |
| 2008/0247409 | A1 | 10/2008 | Choudhury et al. |
| 2008/0301683 | A1 | 12/2008 | Archer et al. |
| 2009/0128574 | A1 | 5/2009 | Fujii et al. |
| 2010/0049821 | A1 | 2/2010 | Oved |
| 2011/0153957 | A1 | 6/2011 | Gao et al. |
| 2012/0210095 | A1 | 8/2012 | Nellans et al. |
| 2012/0222052 | A1 | 8/2012 | Magenheimer et al. |
| 2013/0024875 | A1 | 1/2013 | Wang et al. |
| 2017/0262567 | A1 | 9/2017 | Vassiliev |

(Continued)

OTHER PUBLICATIONS

"OpenCL(TM) 2.0 Shared Virtual Memory Overview" Sep. 10, 2014. Retrieved from https://www.intel.com/content/www/us/en/developer/articles/technical/opencl-20-shared-virtual-memory-overview.html (Year: 2014).*

(Continued)

*Primary Examiner* — Daniel D Tsui

(74) *Attorney, Agent, or Firm* — Davis Wright Tremaine LLP

(57)　　　ABSTRACT

Apparatuses, systems, and techniques to facilitate memory management. In at least one embodiment, an application programming interface is performed to cause physical memory corresponding to shared virtual memory to be designated for use by a plurality of processors.

41 Claims, 58 Drawing Sheets

(56) References Cited

U.S. PATENT DOCUMENTS

| | | | |
|---|---|---|---|
| 2018/0285174 | A1 | 10/2018 | Che |
| 2018/0300931 | A1 | 10/2018 | Vembu et al. |
| 2018/0308202 | A1 | 10/2018 | Appu et al. |
| 2019/0243780 | A1* | 8/2019 | Gopal ................. G06F 12/0811 |
| 2019/0354291 | A1 | 11/2019 | Stabrawa et al. |
| 2020/0192820 | A1 | 6/2020 | Nair et al. |
| 2020/0364088 | A1 | 11/2020 | Ashwathnarayan et al. |
| 2020/0409732 | A1 | 12/2020 | Kovacevic |
| 2021/0036877 | A1 | 2/2021 | Klenk et al. |
| 2021/0037107 | A1 | 2/2021 | Klenk et al. |
| 2021/0067173 | A1 | 3/2021 | Miele |
| 2021/0081849 | A1 | 3/2021 | Mezaael |
| 2022/0342710 | A1 | 10/2022 | Vishnuswaroop Ramesh et al. |
| 2023/0080480 | A1* | 3/2023 | Kayi ........................ G06N 3/04 |
| | | | 718/104 |
| 2023/0107660 | A1* | 4/2023 | Rushing .............. G06F 12/1027 |
| | | | 711/118 |
| 2024/0345990 | A1 | 10/2024 | Striramassarma et al. |

OTHER PUBLICATIONS

Grappa, "Scaling Data-intensive Applications on Commodity Clusters," retrieved from http://grappa.io/, 2014, 4 pages.
IEEE, "IEEE Standard 754-2008 (Revision of IEEE Standard 754-1985): IEEE Standard for Floating-Point Arithmetic," Aug. 29, 2008, 70 pages.
MPI Project, "MPI_Win_create_dynamic(3) man page (version 3.1.6)," retrieved from https://www.open-mpi.org/doc/v3.1/man3/MPI_Win_create_dynamic.3.php, Mar. 20, 2020, 2 pages.
U.S. Appl. No. 17/712,991, filed Apr. 4, 2022.
U.S. Appl. No. 17/712,997, filed Apr. 4, 2022.
U.S. Appl. No. 17/713,054, filed Apr. 4, 2022.
Howes et al., "The OpenCI Specification," Kronos OpenCL Working Group, retrieved from <https://registry.khronos.org/OpenCL/specs/opencl-2.0.pdf,> 2015, 288 pages.

* cited by examiner

CLUSTER

NODE

| MEMORY 224 | MEMORY 228 | MEMORY 232 |

PROCESSOR 222    PROCESSOR 226    • • •    PROCESSOR 230

SWITCH                                    SWITCH

SOFTWARE STACK                            SOFTWARE STACK

DRIVER 210                                DRIVER 218

MEMORY MANAGER 212                        MEMORY MANAGER 220

208                                       216

206                                       214

• • •

204

NODE 234          • • •          NODE 236

202

400

500

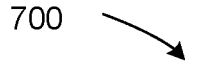
700
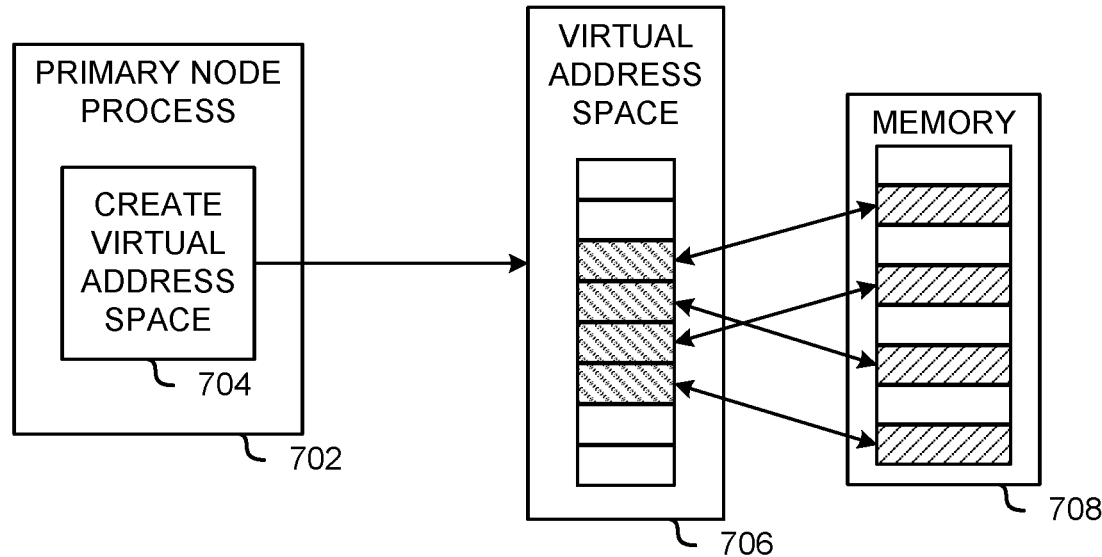
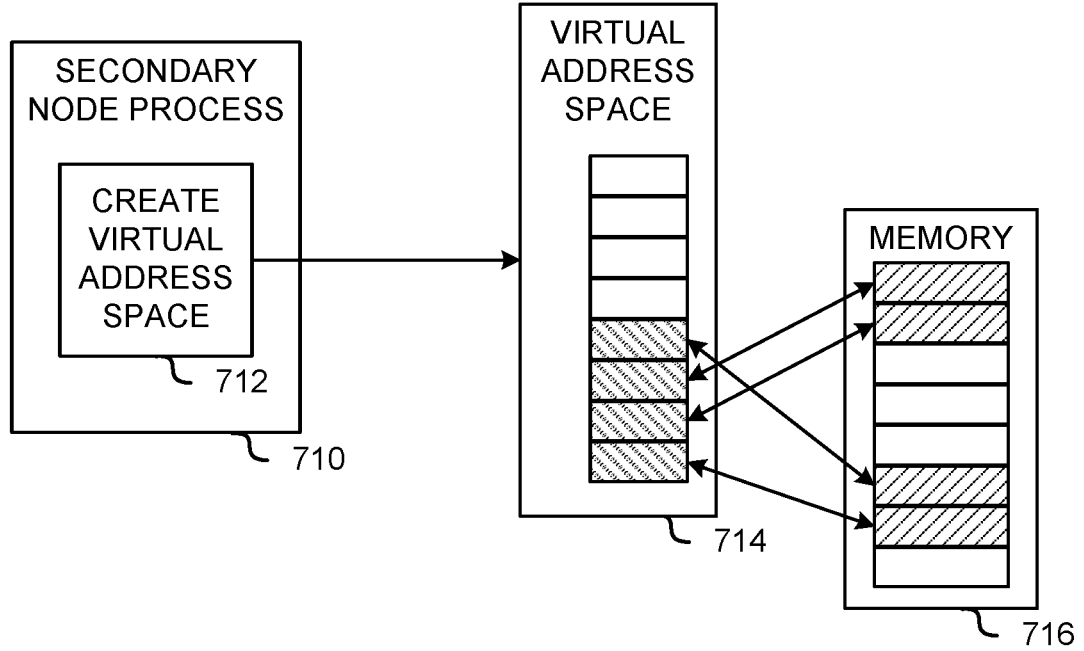
FIG. 7

800

| PRIMARY NODE PROCESS |
| --- |
| MAP SHARED MEMORY 804 |
| 802 |

SHARED MEMORY MAP

806

VIRTUAL ADDRESS SPACE

808

MEMORY

810

| SECONDARY NODE PROCESS |
| --- |
| MAP SHARED MEMORY 814 |
| 812 |

SHARED MEMORY MAP

816

VIRTUAL ADDRESS SPACE

818

MEMORY

820

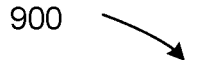
900
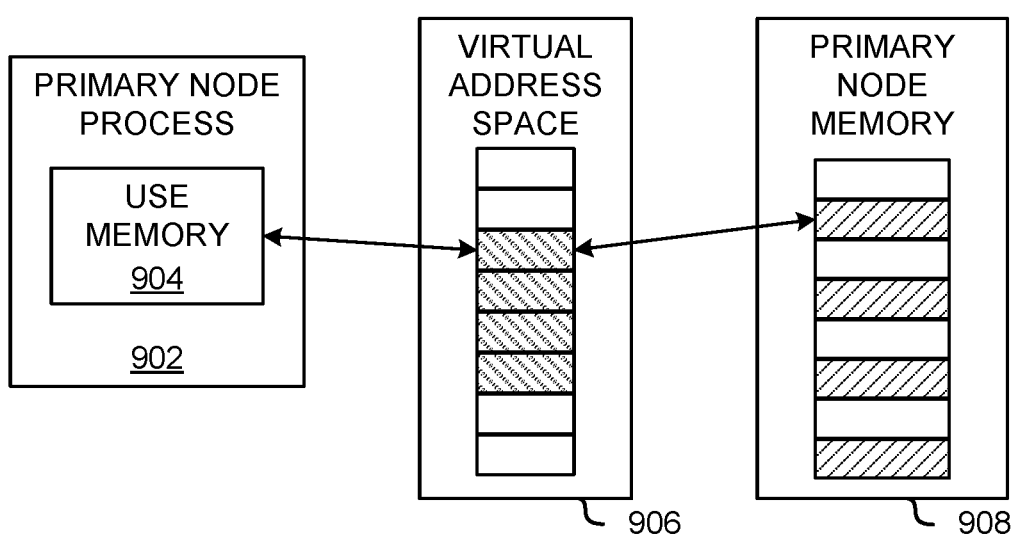
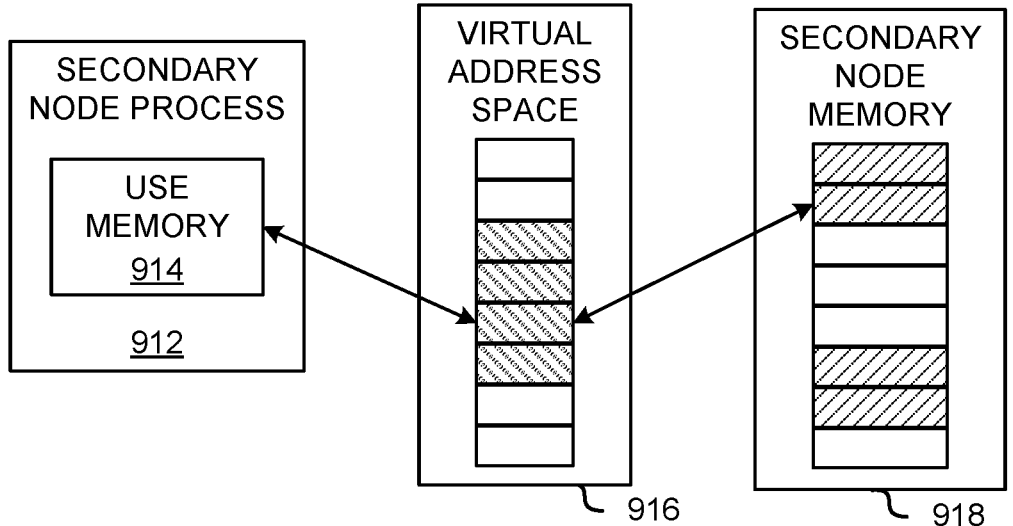
FIG. 9

1000

1100

Figure 12:
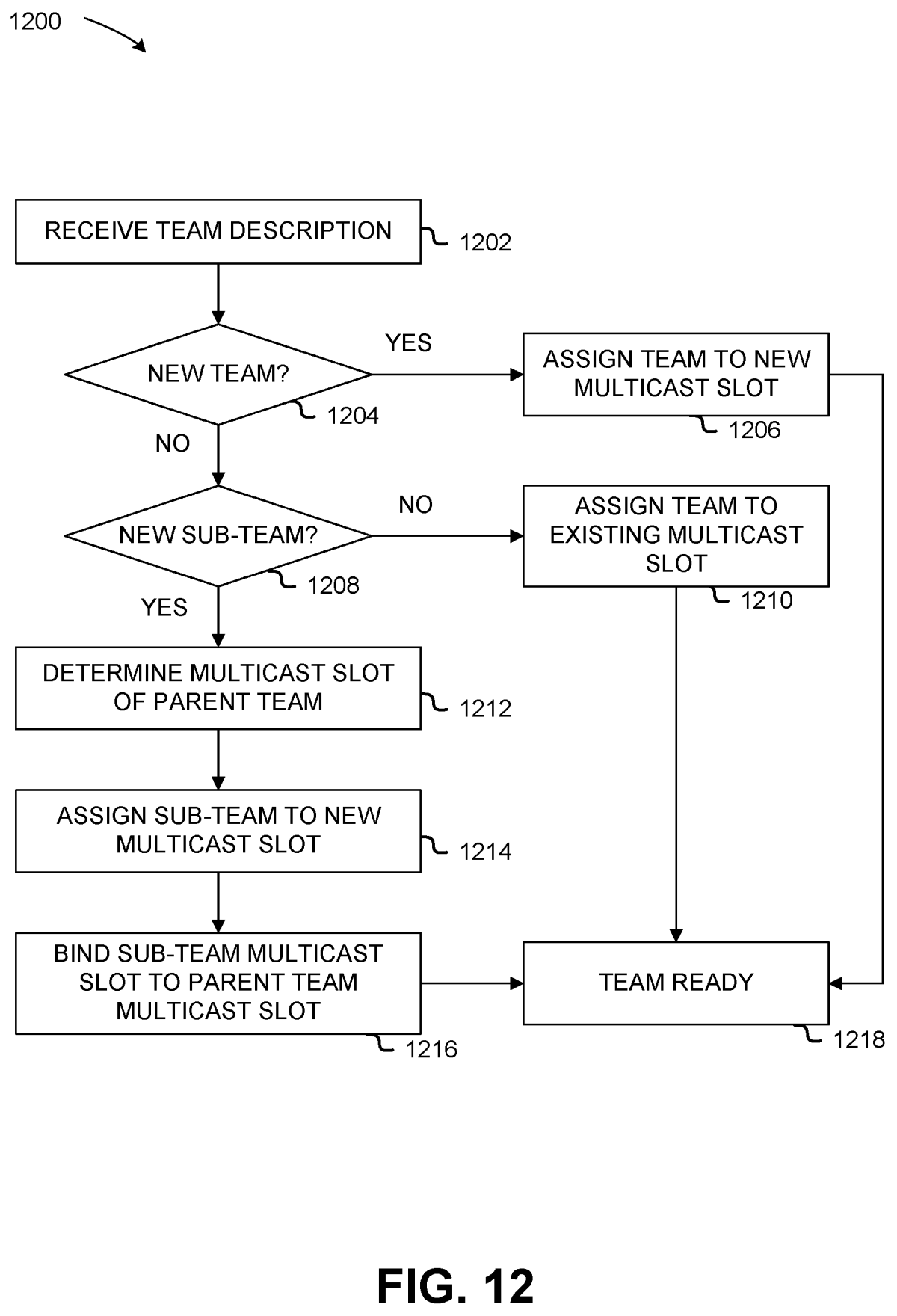

1200

RECEIVE TEAM DESCRIPTION — 1202

NEW TEAM? — 1204

YES → ASSIGN TEAM TO NEW MULTICAST SLOT — 1206

NO

NEW SUB-TEAM? — 1208

NO → ASSIGN TEAM TO EXISTING MULTICAST SLOT — 1210

YES

DETERMINE MULTICAST SLOT OF PARENT TEAM — 1212

ASSIGN SUB-TEAM TO NEW MULTICAST SLOT — 1214

BIND SUB-TEAM MULTICAST SLOT TO PARENT TEAM MULTICAST SLOT — 1216

TEAM READY — 1218

PROCESS
1402

VIRTUAL
ADDRESS
1406

VIRTUAL
ADDRESS
1410

PHYSICAL
ADDRESS
1408

MEMORY     1404

SWITCH

MEMORY
MANAGER

MAP
1416

1414

1412

VIRTUAL
ADDRESS
1422

PHYSICAL
ADDRESS
1424

MEMORY     1420

PROCESS
1418

1500

| PROCESS | 1502 |

SWITCH

MEMORY MANAGER

1504  MEMORY

VIRTUAL ADDRESS 1506

VIRTUAL ADDRESS 1510

SHARED VIRTUAL ADDRESS 1526

PHYSICAL ADDRESS 1508

MAP 1516

SHARED MAP 1530

1520  MEMORY

VIRTUAL ADDRESS 1522

SHARED VIRTUAL ADDRESS 1528

PHYSICAL ADDRESS 1524

1514

1512

| PROCESS | 1518 |

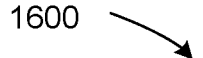
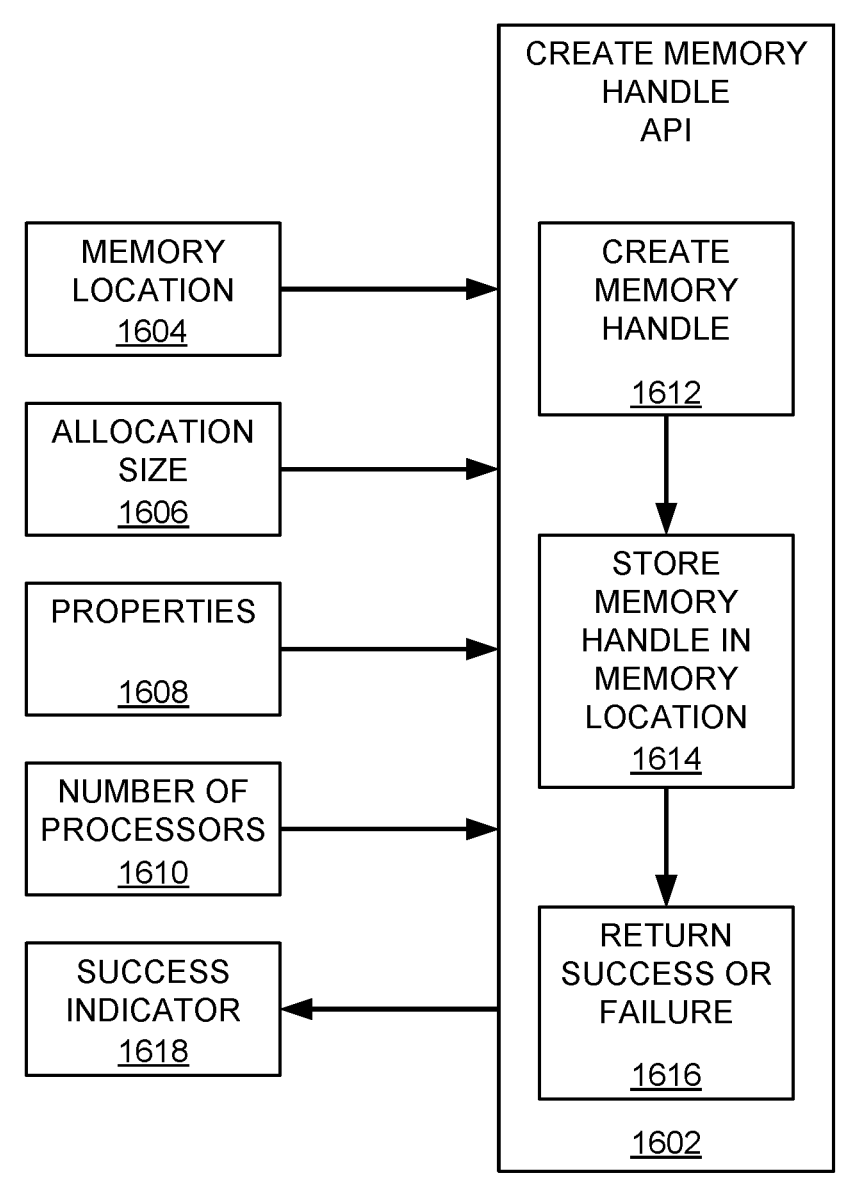
FIG. 16

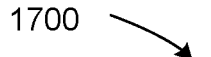
1700
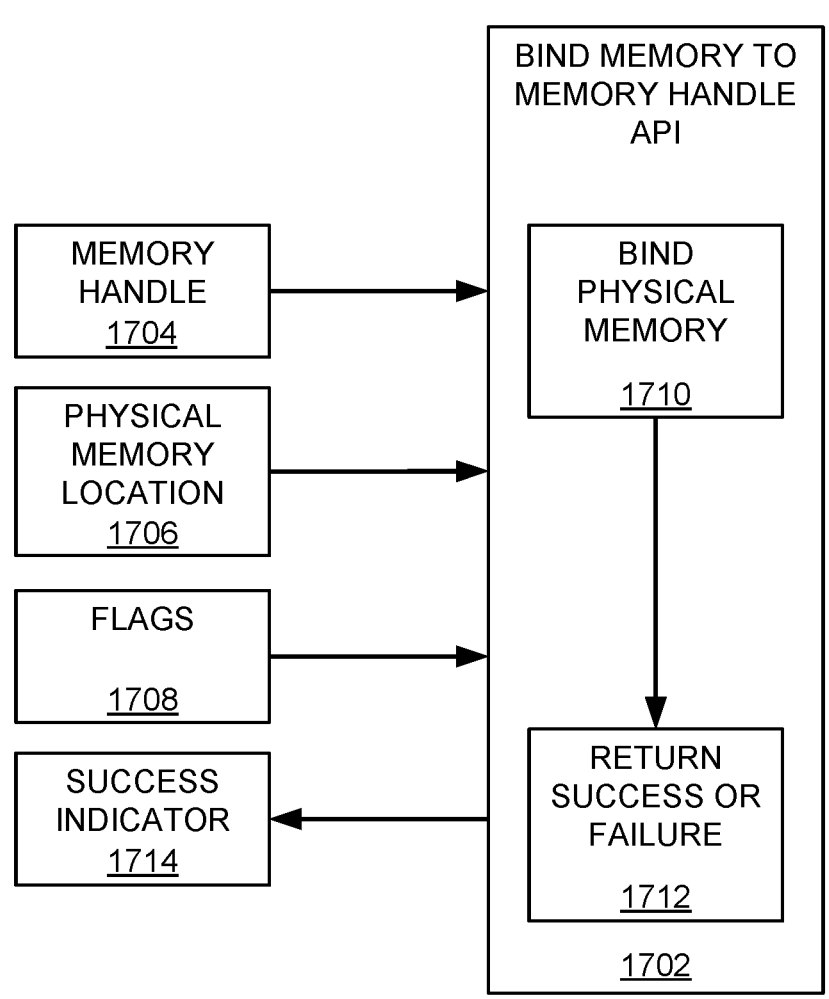
FIG. 17

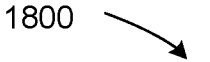
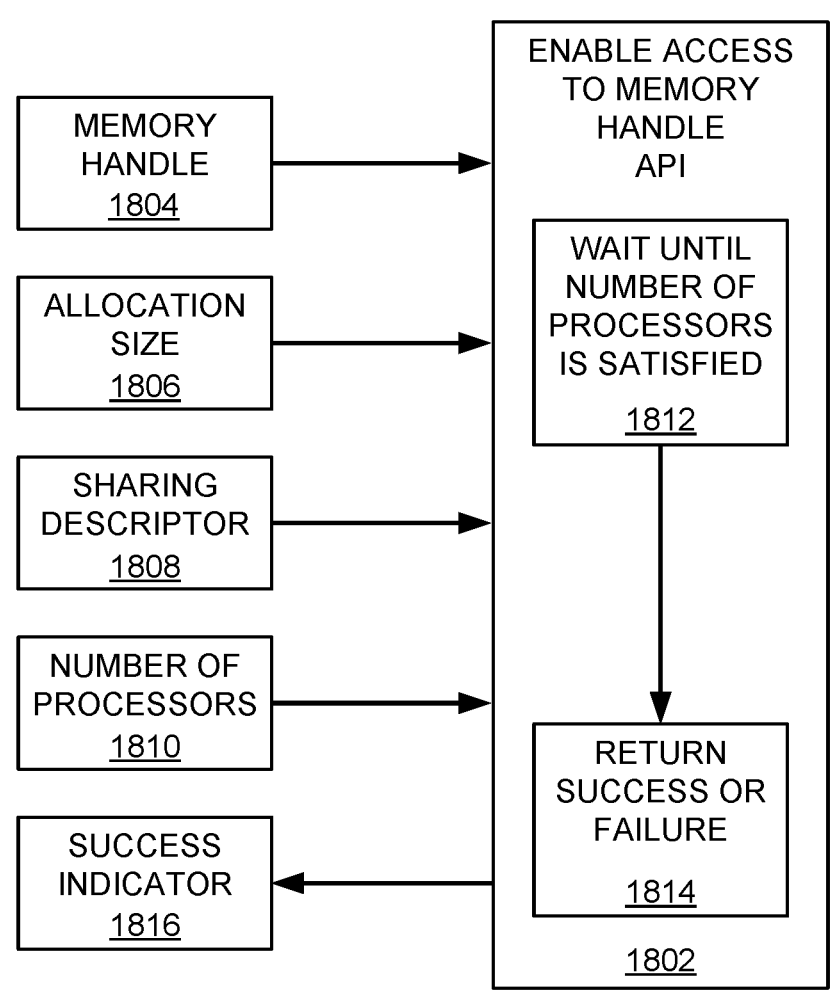
FIG. 18

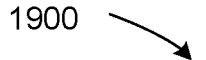
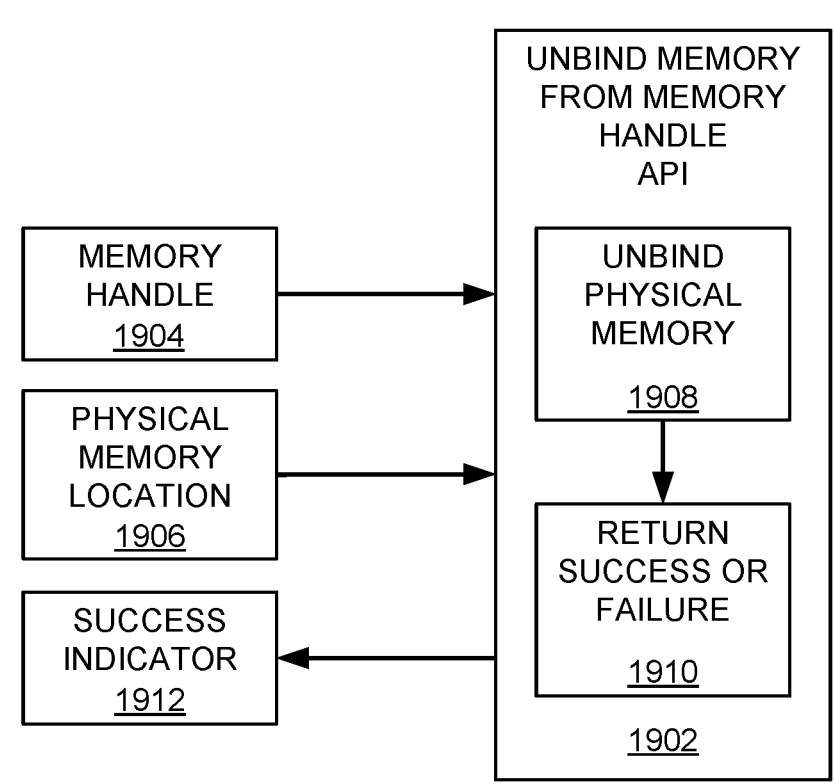
FIG. 19

2000

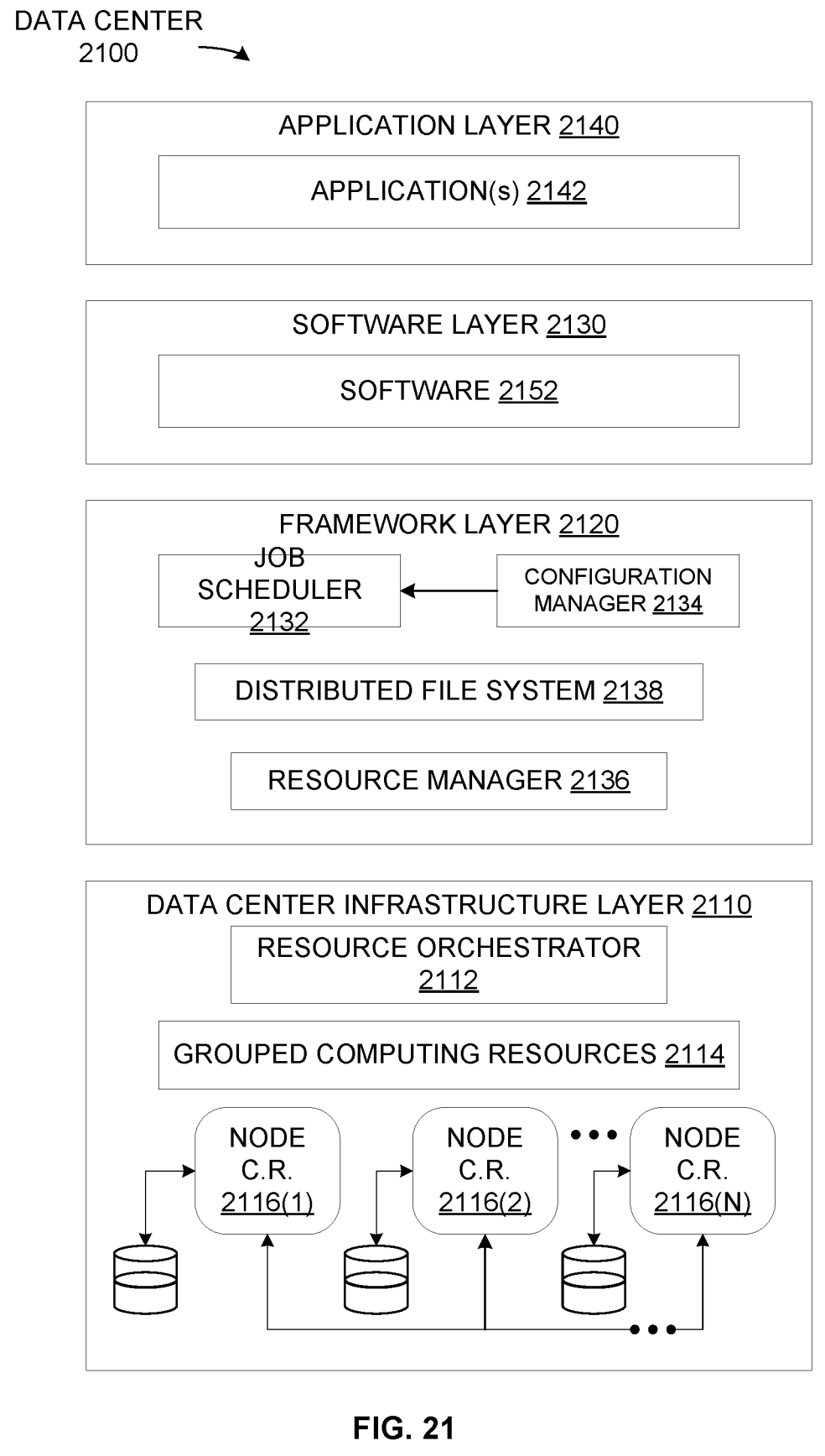

DATA CENTER
2100

APPLICATION LAYER 2140

APPLICATION(s) 2142

SOFTWARE LAYER 2130

SOFTWARE 2152

FRAMEWORK LAYER 2120

JOB
SCHEDULER
2132

CONFIGURATION
MANAGER 2134

DISTRIBUTED FILE SYSTEM 2138

RESOURCE MANAGER 2136

DATA CENTER INFRASTRUCTURE LAYER 2110

RESOURCE ORCHESTRATOR
2112

GROUPED COMPUTING RESOURCES 2114

NODE
C.R.
2116(1)

NODE
C.R.
2116(2)

• • •

NODE
C.R.
2116(N)

FIG. 21

INTEGRATED
CIRCUIT
2500

APPLICATION
PROCESSOR(S)
2505

GRAPHICS
PROCESSOR
2510

IMAGE
PROCESSOR
2515

VIDEO
PROCESSOR
2520

USB
2525

UART
2530

SPI/
SDIO
2535

$I^2S/I^2C$
2540

DISPLAY
2545

SECURITY
ENGINE
2570

MEMORY
2565

FLASH
2560

MIPI
2555

HDMI
2550

2600

3010

GRAPHICS PROCESSOR
3040

INTER-CORE TASK MANAGER
(e.g., THREAD DISPATCHER)
3045

SHADER CORE 3055A

SHADER CORE 3055C

SHADER CORE 3055E

- - -

SHADER CORE 3055N-1

SHADER CORE 3055B

SHADER CORE 3055D

SHADER CORE 3055F

- - -

SHADER CORE 3055N

TILING UNIT
3058

MMU
3020A

MMU
3020B

CACHE
3025A

CACHE
3025B

INTERCONNECT
3030A

INTERCONNECT
3030B

GRAPHICS CORE
3100

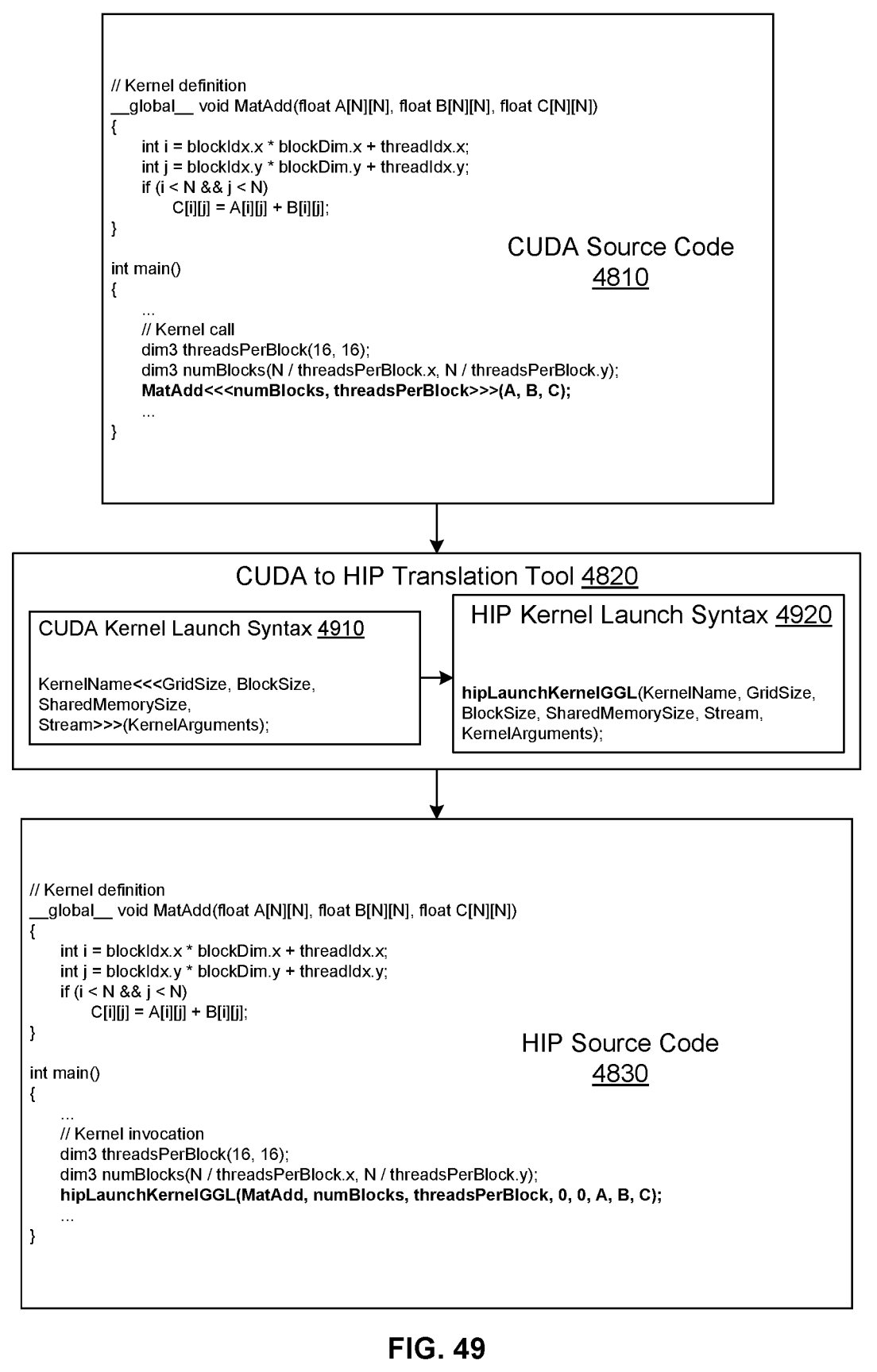

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
4810

CUDA to HIP Translation Tool 4820

CUDA Kernel Launch Syntax 4910

KernelName<<<GridSize, BlockSize,
SharedMemorySize,
Stream>>>(KernelArguments);

HIP Kernel Launch Syntax 4920 hipLaunchKernelGGL(KernelName, GridSize,
BlockSize, SharedMemorySize, Stream,
KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
4830

FIG. 49

APPLICATION PROGRAMMING INTERFACE TO ALLOCATE MEMORY FOR SHARED VIRTUAL MEMORY

CROSS-REFERENCE TO RELATED APPLICATIONS

This application incorporates by reference for all purposes the full disclosures of co-pending U.S. patent application Ser. No. 17/712,991, filed concurrently herewith, entitled "APPLICATION PROGRAMMING INTERFACE TO ALLOCATE SHARED VIRTUAL MEMORY," co-pending U.S. patent application Ser. No. 17/712,997, filed concurrently herewith, entitled "APPLICATION PROGRAMMING INTERFACE TO BIND MEMORY TO SHARED VIRTUAL MEMORY," and co-pending U.S. patent application Ser. No. 17/713,054, filed concurrently herewith, entitled "APPLICATION PROGRAMMING INTERFACE TO DEALLOCATE SHARED VIRTUAL MEMORY."

FIELD

At least one embodiment pertains to processing resources used to execute one or more CUDA programs. For example, at least one embodiment pertains to processing resources used to execute one or more CUDA programs that share virtual memory between processors, designate physical memory for shared virtual memory, allocate physical memory for shared virtual memory, enable access to shared virtual memory, undesignate physical memory associated with shared virtual memory, and deallocate physical memory associated with shared virtual memory.

BACKGROUND

Performing computational operations can use significant memory, time, or computing resources. For example, a graphics processing unit (GPU) cluster can have several nodes (e.g., servers) where each node has several GPUs. Often, a GPU can only directly access its own memory or can only access memory from other GPUs on the same node. In such cases, if a GPU needs to send memory contents to other GPUs on other nodes, an expensive operation must be performed to copy memory between one or more GPUs. This can be complicated for programmers in addition to being an inefficient use of resources. An amount of memory, time, or computing resources used to perform computation operations can be improved by sharing memory between processors using virtual memory.

BRIEF DESCRIPTION OF THE DRAWINGS

FIG. 7 illustrates an example computer system where virtual addresses are created for memory allocated for shared virtual memory, in accordance with at least one embodiment;

FIG. 9 illustrates an example computer system where processors access virtual memory, in accordance with at least one embodiment;

FIG. 12 illustrates an example process for determining sharing for processor memory shared between processors, in accordance with at least one embodiment;

FIG. 16 illustrates an example application programming interface (API) to cause shared virtual memory to be allocated for use by a plurality of processors, in accordance with at least one embodiment;

FIG. 17 illustrates an example application programming interface (API) to cause physical memory corresponding to shared virtual memory to be designated for use by a plurality of processors, in accordance with at least one embodiment;

FIG. 18 illustrates an example application programming interface (API) to enable access to shared virtual memory by a plurality of process, in accordance with at least one embodiment;

FIG. 19 illustrates an example application programming interface (API) to cause physical memory corresponding to shared virtual memory to be undesignated for use by a plurality of processors, in accordance with at least one embodiment;

FIG. 21 illustrates an exemplary data center, in accordance with at least one embodiment;

FIG. 49 illustrates an exemplary kernel translated by CUDA-to-HIP translation tool of FIG. 48C, in accordance with at least one embodiment;

DETAILED DESCRIPTION

Figure 1:
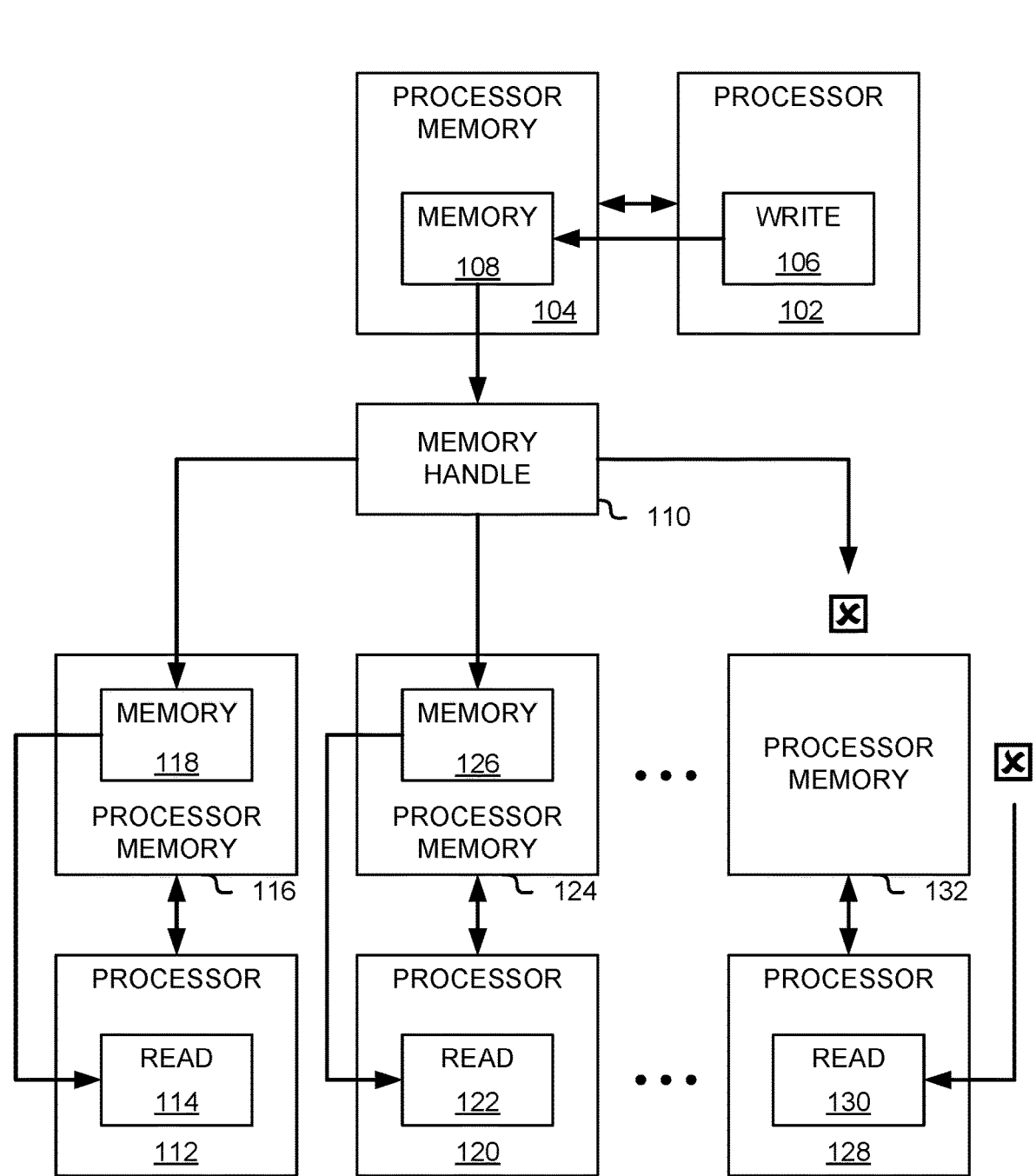
FIG. 1 illustrates an example computer system where processor memory is shared between processors, in accordance with at least one embodiment.

FIG. 1 illustrates an example computer system 100 where processor memory is shared between processors, in accordance with at least one embodiment. In at least one embodiment, a processor 102 has associated processor memory 104. In at least one embodiment, processor memory 104 that is associated with processor 102 is memory that is attached to and/or directly accessible by processor 102. In at least one embodiment, a processor 112 has associated processor memory 116. In at least one embodiment, a processor 120 has associated processor memory 124. In at least one embodiment, a processor 128 has associated processor memory 132. In at least one embodiment, one or more of processor 102, processor 112, processor 126, and/or processor 132 is a single-core processor, a graphics processor, a parallel processor, a general purpose graphics processor, and/or some other processor such as those described herein in connection with FIGS. 21 to 52. In at least one embodiment, one or more additional processors, not shown, are connected to and/or have access to one or more of processor memory 104, processor memory 116, processor memory 124, and/or processor memory 132. In at least one embodiment, memory such as processor memory 104, processor memory 116, processor memory 124, and/or processor memory 132 is referred to as system memory.

In at least one embodiment, processor 102 performs an instruction to write 106 data to memory 108, located in processor memory 104. In at least one embodiment, memory 108 is a memory location of processor memory 104. In at least one embodiment, not shown in FIG. 1, processor 102 performs an instruction to read data from memory 108. In at least one embodiment, not shown in FIG. 1, processor 102 performs some other instruction associated with memory 108 such as those described herein.

In at least one embodiment, memory 108 has an associated memory handle 110, as described herein. In at least one embodiment, memory handle 110 is managed by a memory manager such as memory manager 212 and/or memory manager 220, described herein at least in connection with FIG. 2. In at least one embodiment, memory handle 110 is associated with a switch such as switch 206 and/or switch 214, described herein at least in connection with FIG. 2. In at least one embodiment, memory handle 110 is a location in a shared memory map such as those described herein. In at least one embodiment, memory handle 110 is a location in a virtual address space such as those described herein.

In at least one embodiment, memory handle 110 is associated with one or more other memory locations associated with one or more other processors. In at least one embodiment, memory handle 110 is associated with memory 118. In at least one embodiment, memory 118 is located in processor memory 116. In at least one embodiment, memory 118 is a memory location of processor memory 116. In at least one embodiment, processor memory 116 is associated with processor 112. In at least one embodiment, processor 112 is a processor on a compute node that also includes processor 102. In at least one embodiment, processor 112 is a processor on a compute node that is different than a compute node that includes processor 102. In at least one embodiment, processor 112 is a processor on a compute node that is on a compute cluster that includes a compute node that includes processor 102. In at least one embodiment, when processor 102 performs an instruction to write 106 data to memory 108, memory handle 110 is used to provide data to memory 118. In at least one embodiment, when processor 112 performs an instruction to read 114 from memory 118, contents of memory 118 are identical to contents of memory 108.

In at least one embodiment, memory handle 110 is associated with memory 118. In at least one embodiment, memory 126 is located in processor memory 124. In at least one embodiment, memory 126 is a memory location of processor memory 124. In at least one embodiment, processor memory 124 is associated with processor 120. In at least one embodiment, processor 120 is a processor on a compute node that also includes processor 102. In at least one embodiment, processor 120 is a processor on a compute node that also includes processor 112. In at least one embodiment, processor 120 is a processor on a compute node that is different than a compute node that includes processor 102. In at least one embodiment, processor 120 is a processor on a compute node that is different than a compute node that includes processor 112. In at least one embodiment, processor 120 is a processor on a compute node that is on a compute cluster that includes a compute node that includes processor 102. In at least one embodiment, processor 120 is a processor on a compute node that is on a compute cluster that includes a compute node that includes processor 112. In at least one embodiment, when processor 102 performs an instruction to write 106 data to memory 108, memory handle 110 is used to provide data to memory 126. In at least one embodiment, when processor 120 performs an instruction to read 122 from memory 126, contents of memory 126 are identical to contents of memory 108.

In at least one embodiment, memory handle 110 is not associated with memory in processor memory 132. In at least one embodiment, processor memory 132 is associated with processor 128. In at least one embodiment, processor 128 is a processor on a compute node that also includes processor 102. In at least one embodiment, processor 128 is a processor on a compute node that also includes processor 112. In at least one embodiment, processor 128 is a processor on a compute node that also includes processor 120. In at least one embodiment, processor 128 is a processor on a compute node that is different than a compute node that includes processor 102. In at least one embodiment, processor 128 is a processor on a compute node that is different than a compute node that includes processor 112. In at least one embodiment, processor 128 is a processor on a compute node that is different than a compute node that includes processor 120. In at least one embodiment, processor 128 is a processor on a compute node that is on a compute cluster that includes a compute node that includes processor 102. In at least one embodiment, processor 128 is a processor on a compute node that is on a compute cluster that includes a compute node that includes processor 112. In at least one embodiment, processor 128 is a processor on a compute node that is on a compute cluster that includes a compute node that includes processor 120. In at least one embodiment, when memory handle 110 is not associated with memory in processor memory 132 and when processor 102 performs an instruction to write 106 data to memory 108, memory handle 110 is not used to provide data to memory in processor memory 132.

In at least one embodiment, a processor such as those described herein includes one or more circuits to perform an API to cause shared virtual memory to be allocated for use by a plurality of processors. In at least one embodiment, a processor such as those described herein includes one or more circuits to perform an API to cause to cause physical memory corresponding to shared virtual memory to be designated for use by a plurality of processors. In at least one embodiment, a processor such as those described herein includes one or more circuits to perform an API to enable access to shared virtual memory by a plurality of processors. In at least one embodiment, a processor such as those described herein includes one or more circuits to perform an API to cause physical memory corresponding to shared virtual memory to be undesignated for use by a plurality of processors.

In at least one embodiment, a processor such as those described herein includes one or more circuits to perform an API to identify a virtual memory address to which a processor can write data to cause one or more other processors to store data in physical memory. In at least one embodiment, a processor such as those described herein includes one or more circuits to perform an API to cause a set of other processors to allocate physical memory to a shared virtual memory address. In at least one embodiment, a processor such as those described herein includes one or more circuits to perform an API to cause a set of other processors to designate physical memory to a shared virtual memory address so that, for example, previously allocated physical memory may be designated to a shared virtual memory address. In at least one embodiment, a processor such as those described herein includes one or more circuits to perform an API to allow one or more other processors to use a virtual memory address to which a processor can write data, to cause one or more other processors to store data in physical memory. In at least one embodiment, a processor such as those described herein includes one or more circuits to perform an API to cause an identifier of a virtual memory address to be invalidated, wherein writing data to a virtual memory address causes one or more other processors to store data in physical memory.

In at least one embodiment, a processor such as those described herein includes one or more circuits to perform one or more APIs to enable GPUs write to memory of multiple other GPUs in a cluster, using a multicast memory handle such as those described herein. In at least one embodiment, a multicast memory handle enables a memory manager on a cluster to propagate memory updates from one GPU to one or more other GPUs in a cluster without prior knowledge of which nodes will be receiving memory updates. In at least one embodiment, a node may enable access to a multicast memory handle so that, when a GPU writes to a multicast memory location, updates are sent to other nodes using an enabled multicast memory handle. In at least one embodiment, a process is to create a multicast memory handle using a first API such as create memory handle API 1602, as described herein at least in connection with FIG. 16. In at least one embodiment, a process is to enable a GPU to bind a multicast memory handle to backing memory using a second API such as bind memory to memory handle API 1702, as described herein at least in connection with FIG. 17. In at least one embodiment, a process is to enable access to a multicast memory handle once all GPUs have bound backing memory using a third API such as enable access to memory handle API 1802, as described herein at least in connection with FIG. 18. In at least one embodiment, a process is to unbind nodes from a multicast memory handle using a fourth API such as unbind memory from memory handle API 1902, as described herein at least in connection with FIG. 19.

In at least one embodiment, a multicast memory handle and/or associated multicast memory operations such as those described herein are to be used to provide operations such as write operations to a plurality of systems. In at least one embodiment, for example, a multicast memory handle may be used for broadcasting write operations to multiple processors in a multiple processor system such as those described herein. In at least one embodiment, a multiple processor system is referred to as a multiple target system. In at least one embodiment, a multicast memory handle is used for broadcasting write operations in a multiple target system so that, for example, a write operation is received at a first location in an address space and then replicated to a produce a plurality of write operations to a plurality of other locations in an address space. In at least one embodiment, a multicast memory handle when a write operation is received at a first location in an address space and then replicated to a produce a plurality of write operations to a plurality of other locations in an address space, additional write operations may be generated to an additional plurality of other locations in an address space.

In at least one embodiment, a first API such as create memory handle API 1602 is to create a multicast memory handle to be shared with other GPUs in a cluster. In at least one embodiment, a multicast memory handle is a memory handle in a shared virtual address space, managed by memory managers on nodes of a cluster. In at least one embodiment, a multicast memory handle created by a first API such as create memory handle API 1602 is unbacked by physical memory when created. In at least one embodiment, a first API such as create memory handle API 1602 is to receive inputs such as a size of an allocation that a multicast memory handle will represent, a set of properties of a multicast memory handle, a number of GPUs to provide backing memory for a multicast memory handle, and a memory location which may be used to return a multicast memory handle. In at least one embodiment, a first API such as create memory handle API 1602 is to return a created multicast memory handle in a received memory location. In at least one embodiment, a first API such as create memory handle API 1602 is to return a status indicating success or failure. In at least one embodiment, a first API such as create memory handle API 1602 is to cause a fabric manager such as those described herein, running on a GPU, to communicate a multicast memory handle to other GPUs in a cluster so that other GPUs in a cluster can designate a same shared virtual memory address for a multicast memory handle.

In at least one embodiment, a second API such as bind memory to memory handle API 1702 is to create a binding from a multicast memory handle to physical memory of a GPU. In at least one embodiment, a binding enables a node to read from and write to a multicast memory handle. In at least one embodiment, GPUs in a multicast group or multicast team are required to create backing memory before a multicast memory handle can be used. In at least one embodiment, a second API such as bind memory to memory handle API 1702 receives a multicast memory handle (which may be created using a first API such as create memory handle API 1602), a physical memory location, and a set of flags. In at least one embodiment, a second API such as bind memory to memory handle API 1702 returns a status indicating success or failure. In at least one embodiment, performing a second API such as bind memory to memory handle API 1702 causes GPUs in a cluster to allocate physical memory to back a multicast memory handle, using systems and methods such as those described herein. In at least one embodiment, performing a second API such as bind memory to memory handle API 1702 causes GPUs in a cluster to designate physical memory such as previously allocated physical memory to back a multicast memory handle, using systems and methods such as those described herein.

In at least one embodiment, a third API such as enable access to memory handle API 1802 is to enable access to a multicast memory handle. In at least one embodiment, a third API such as enable access to memory handle API 1802 may not be successfully performed until a number of nodes that have access to a multicast memory handle have bound physical memory to a multicast memory handle using, for example, bind memory to memory handle API 1702. In at least one embodiment, a third API such as enable access to memory handle API 1802 receives a multicast memory handle, a size of allocation, a descriptor used to share a multicast memory handle, and a number of GPUs that will provide backing memory. In at least one embodiment, a third API such as enable access to memory handle API 1802 returns a status indicating success or failure. In at least one embodiment, performing a third API such as enable access to memory handle API 1802 causes GPUs that have allocated physical memory to back a multicast memory handle to designate a multicast memory handle as usable.

In at least one embodiment, a fourth API such as unbind memory from memory handle API 1902 is to release a binding between a multicast memory handle and a physical memory of a GPU. In at least one embodiment, a fourth API such as unbind memory from memory handle API 1902 disables access to a multicast handle by a GPU. In at least one embodiment, a fourth API such as unbind memory from memory handle API 1902 receives a multicast memory handle and a backing memory location as described herein. In at least one embodiment, a fourth API such as unbind memory from memory handle API 1902 returns a status indicating success or failure. In at least one embodiment, performing a fourth API such as unbind memory from memory handle API 1902 causes physical memory associated with a shared memory handle to be undesignated. In at least one embodiment, performing a fourth API such as unbind memory from memory handle API 1902 undoes operations performed by a first API such as create memory handle API 1602, a second API such as bind memory to memory handle API 1702, and/or a third API such as enable access to memory handle API 1802, so that allocated and/or designated virtual and physical memory addresses may be used for other purposes. In at least one embodiment, a fourth API such as unbind memory from memory handle API 1902 implements operations that do not presuppose cooperation between a plurality of processes and/or a plurality of processors. In at least one embodiment, a fourth API such as unbind memory from memory handle API 1902 implements undesignated operations without presupposing that processes and/or processors communicate with each other. In at least one embodiment, performing a fourth API such as unbind memory from memory handle API 1902 enables undesignate operations to be performed asynchronously and independently (non-collectively).

Figure 2:
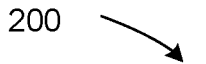
FIG. 2 illustrates an example computer system where processor memory is shared between nodes of a compute cluster, in accordance with at least one embodiment.

FIG. 2 illustrates an example computer system 200 where processor memory is shared between nodes of a compute cluster, in accordance with at least one embodiment. In at least one embodiment, a compute cluster 202 includes one or more nodes such as those described herein. In at least one embodiment, compute cluster 202 includes a node 204. In at least one embodiment, node 204 includes one or more switches. In at least one embodiment, node 204 includes a switch 206. In at least one embodiment, switch 206 is a hardware device that manages connections between processors, processor memory, and/or other nodes. In at least one embodiment, switch 206 is software that manages connections between processors, processor memory, and/or other nodes. In at least one embodiment, switch 206 is a virtual device that emulates hardware that manages connections between processors, processor memory, and/or other nodes. In at least one embodiment, switch 206 is a device that implements software that manages connections between processors, processor memory, and/or other nodes.

In at least one embodiment, node 204 includes one or more other switches such as switch 214. In at least one embodiment, switch 214 is a hardware device comprising circuitry to manage connections between processors, processor memory, and/or other nodes. In at least one embodiment, switch 214 is hardware configured by software to manage connections between processors, processor memory, and/or other nodes. In at least one embodiment, switch 214 is a virtual device that emulates hardware that manages connections between processors, processor memory, and/or other nodes. In at least one embodiment, switch 214 is a device that implements software that manages connections between processors, processor memory, and/or other nodes.

In at least one embodiment, switch 206 includes a software stack 208. In at least one embodiment, software stack 208 implements one or more software systems to enable switch 206 to manage connections between processors, processor memory, and/or other nodes. In at least one embodiment, not shown in FIG. 2, software stack 208 has one or more memory space designations such as kernel space, unprivileged user space, privileged user space, as described herein. In at least one embodiment, software stack 208 includes one or more drivers such as driver 210. In at least one embodiment, driver 210 is a kernel driver, as described herein. In at least one embodiment, driver 210 is a runtime driver, as described herein.

In at least one embodiment, software stack 208 includes one or more memory managers such as memory manager 212. In at least one embodiment, memory manager 212 is used to share processor memory using systems and methods such as those described herein. In at least one embodiment, memory manager 212 executes on a computer system processor such as one or more processors described herein in connection with FIGS. 21 to 52. In at least one embodiment, a processor that is used to execute memory manager 212 has access to memory including, but not limited to, processor memory 104, processor memory 116, processor memory 124, and/or processor memory 132 as described herein at least in connection with FIG. 1, using systems and methods such as those described herein. In at least one embodiment, a processor that is used to execute memory manager 212 has access to memory including, but not limited to, memory 224, memory 228, and/or memory 232. In at least one embodiment, a processor that is used to execute memory manager 212 has access to memory on one or more other nodes (such as node 234 and/or node 236) of cluster 202. In at least one embodiment, a memory manager such as memory manager 212 may be referred to as a fabric manager. In at least one embodiment, a memory manager is implemented as a combination of memory manager 212 and driver 210. In at least one embodiment, a combination of memory manager 212 and driver 210 may be referred to as a fabric manager.

In at least one embodiment, switch 214 includes a software stack 216. In at least one embodiment, software stack 216 implements one or more software systems to enable switch 214 to manage connections between processors, processor memory, and/or other nodes. In at least one embodiment, not shown in FIG. 2, software stack 216 has one or more memory space designations such as kernel space, unprivileged user space, privileged user space, as described herein. In at least one embodiment, software stack 216 includes one or more drivers such as driver 218. In at least one embodiment, driver 218 is a kernel driver, as described herein. In at least one embodiment, driver 218 is a runtime driver, as described herein.

In at least one embodiment, software stack 216 includes one or more memory managers such as memory manager 220. In at least one embodiment, memory manager 220 is used to share processor memory using systems and methods such as those described herein. In at least one embodiment, memory manager 220 executes on a computer system processor such as one or more processors described herein in connection with FIGS. 21 to 52. In at least one embodiment, a processor that is used to execute memory manager 220 has access to memory including, but not limited to, processor memory 104, processor memory 116, processor memory 124, and/or processor memory 132 as described herein at least in connection with FIG. 1, using systems and methods such as those described herein. In at least one embodiment, a processor that is used to execute memory manager 220 has access to memory including, but not limited to, memory 224, memory 228, and/or memory 232. In at least one embodiment, a processor that is used to execute memory manager 220 has access to memory on one or more other nodes (such as node 234 and/or node 236) of cluster 202. In at least one embodiment, a memory manager such as memory manager 220 may be referred to as a fabric manager. In at least one embodiment, a memory manager is implemented as a combination of memory manager 220 and driver 218. In at least one embodiment, a combination of memory manager 220 and driver 218 may be referred to as a fabric manager.

In at least one embodiment, node 204 includes one or more processors such as processor 222, processor 226, and/or processor 230. In at least one embodiment, processor 222 is a processor such as processor 102, processor 112, processor 120, and/or processor 128, as described herein at least in connection with FIG. 1. In at least one embodiment, processor 222 has access to memory 224, processor 226 has access to memory 228, and processor 230 has access to memory 232. In at least one embodiment, memory 224, memory 228, and memory 232 are memory such as processor memory 104, processor memory 116, processor memory 124, and/or processor memory 132, as described herein at least in connection with FIG. 1.

In at least one embodiment, switch 206 is connected to processor 222, processor 226, and/or processor 230 using systems and methods such as those described herein. In at least one embodiment, switch 206 has access to memory 224 (using processor 222), memory 228 (using processor 226) and/or to memory 232 (using processor 230). In at least one embodiment, switch 206 may be connected to one or more other processors and/or may have access to other memory, not illustrated in FIG. 2.

In at least one embodiment, switch 214 is connected to processor 222, processor 226, and/or processor 230 using systems and methods such as those described herein and switch 206 has access to memory 224 (using processor 222), memory 228 (using processor 226) and/or to memory 232 (using processor 230). In at least one embodiment, switch 214 may also be connected to one or more other processors and/or may have access to other memory, not illustrated in FIG. 2.

In at least one embodiment, switch 206 is connected to one or more other nodes such as node 234 and/or node 236. In at least one embodiment, not illustrated in FIG. 2, node 234 and/or node 236 include one or more switches, processors, and memory, as described herein. In at least one embodiment, a switch of node 234 may use switch 206 of node 204 to access memory of node 204 such as memory 224, memory 228, and/or memory 232, using systems and methods such as those described herein. In at least one embodiment, a switch of node 236 may use switch 206 of node 204 to access memory of node 204 such as memory 224, memory 228, and/or memory 232, using systems and methods such as those described herein. In at least one embodiment, switch 214 is also connected to one or more other nodes such as node 234 and/or node 236. In at least one embodiment, a switch of node 234 may use switch 214 of node 204 to access memory of node 204 such as memory 224, memory 228, and/or memory 232, using systems and methods such as those described herein. In at least one embodiment, a switch of node 236 may use switch 214 of node 204 to access memory of node 204 such as memory 224, memory 228, and/or memory 232, using systems and methods such as those described herein. In at least one embodiment, not illustrated in FIG. 2, a switch of node 234 may use a switch of node 236 to access memory of node 236 and/or a switch of node 236 may use a switch of node 234 to access memory of node 234, using systems and methods such as those described herein.

Figure 3:
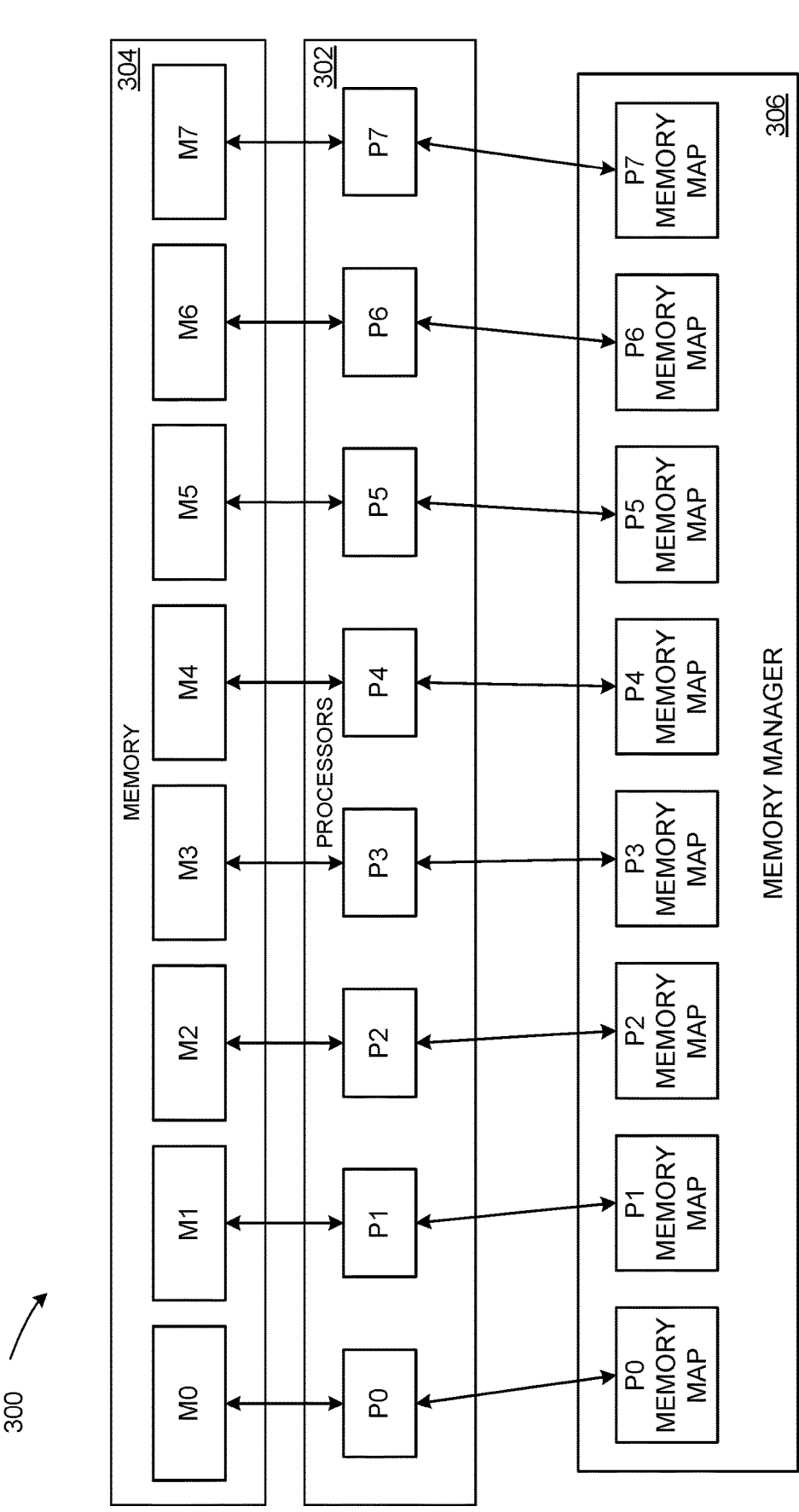
FIG. 3 illustrates an example computer system where a switch of a compute cluster node accesses memory of processors of a compute cluster node, in accordance with at least one embodiment.

FIG. 3 illustrates an example computer system 300 where a switch of a compute cluster node accesses memory of processors of a compute cluster node, in accordance with at least one embodiment. In at least one embodiment, as illustrated in FIG. 3, a single node is illustrated for clarity. In at least one embodiment, not illustrated in FIG. 3, a switch hosts a memory manager 306. In at least one embodiment, a switch is a switch such as switch 206 and/or switch 214 described herein at least in connection with FIG. 2. In at least one embodiment, a switch is linked to processors of processors 302 processors of processors 302 has access to corresponding memory of memory 304. In at least one embodiment, for example, a switch has access to processor P0 of processors 302 and processor P0 of processors 302 has access to corresponding memory M0 of memory 304.

In at least one embodiment, a memory manager 306 manages one or more memory maps that map memory 304 of processors 302 to a virtual memory space, as described herein. In at least one embodiment, memory manager 306 is a memory manager such as memory manager 212 and/or memory manager 220 described herein at least in connection with FIG. 2. In at least one embodiment, memory manager 306 manages a P0 memory map of memory M0 that is associated with processor P0, memory manager 306 manages a P1 memory map of memory M1 that is associated with processor P1, etc. In at least one embodiment, if each of memory 304 is, for example, 80 GB, memory manager 306 has access to 340 GB of memory in memory 304, as described herein.

Figure 4:
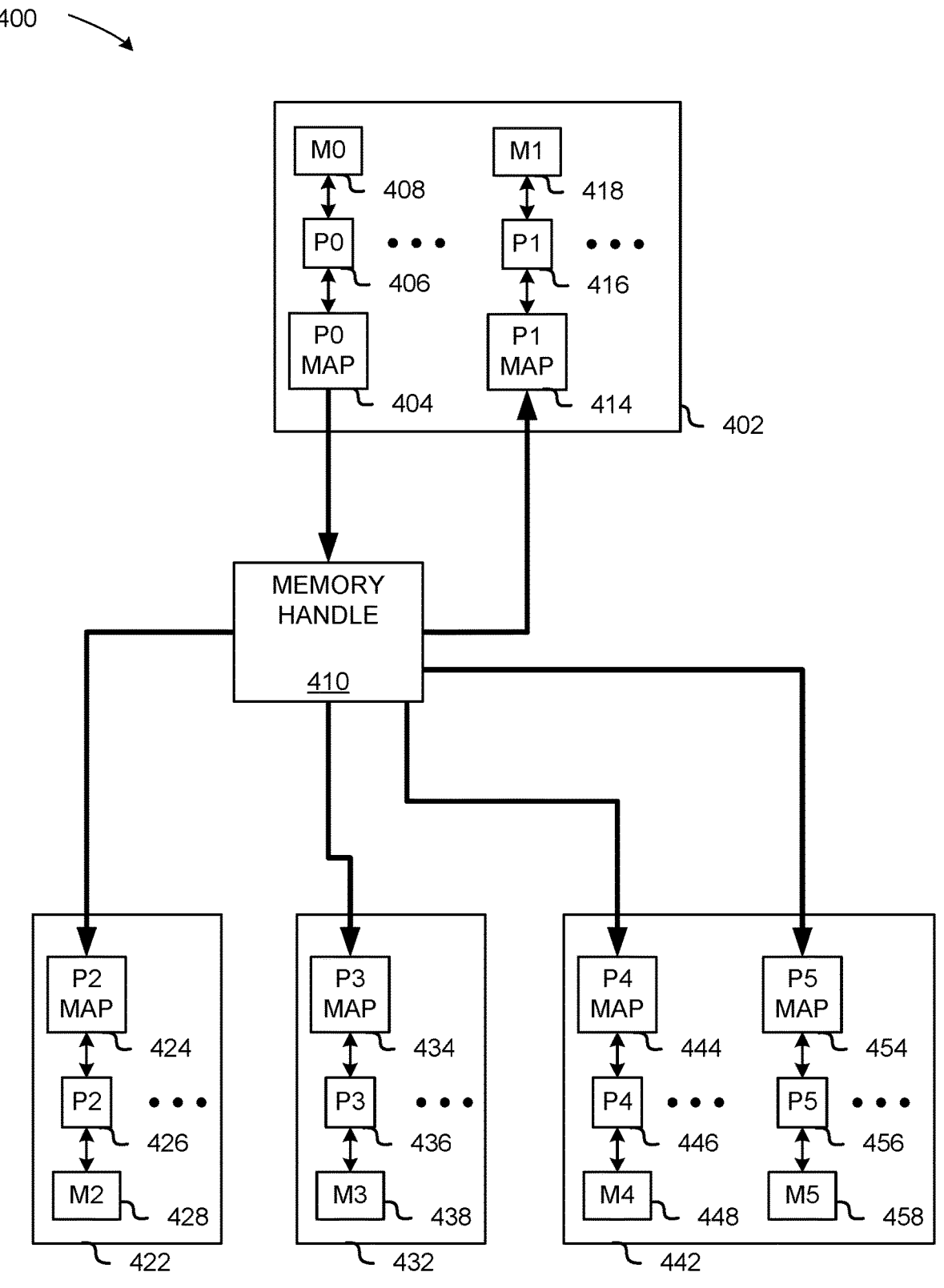
FIG. 4 illustrates an example computer system where processor memory is shared between processors using a memory handle, in accordance with at least one embodiment.

FIG. 4 illustrates an example computer system 400 where processor memory is shared between processors using a memory handle, in accordance with at least one embodiment. In at least one embodiment, a processor P0 406 of a node 402 of a compute cluster has memory M0 408, as described herein. In at least one embodiment, processor P0 406 of node 402 of a compute cluster has a memory map P0 MAP 404, as described herein. In at least one embodiment, processor P0 406 uses a memory handle 410 to provide multicast memory updates to one or more other processors in a compute cluster using systems and methods such as those described herein. In at least one embodiment, memory handle is a memory handle such as memory handle 110, described herein at least in connection with FIG. 1.

In at least one embodiment, a processor P1 416 of node 402 has memory M1 418, as described herein. In at least one embodiment, processor P1 416 has a memory map P1 MAP 414, as described herein. In at least one embodiment, processor P1 416 uses memory handle 410 to receive multicast memory updates from processor P0 406 using systems and methods such as those described herein. In at least one embodiment, not shown in FIG. 4, processor P1 416 uses memory handle 410 to, for example, provide multicast memory updates to one or more other processors such as those described herein.

In at least one embodiment, a processor P2 426 of a node 422 has memory M2 428, as described herein. In at least one embodiment, processor P2 426 has a memory map P2 MAP 424, as described herein. In at least one embodiment, processor P2 426 uses memory handle 410 to receive multicast memory updates from processor P0 406 using systems and methods such as those described herein. In at least one embodiment, not shown in FIG. 4, processor P2 426 uses memory handle 410 to, for example, provide multicast memory updates to one or more other processors such as those described herein.

In at least one embodiment, a processor P3 436 of a node 432 has memory M3 438, as described herein. In at least one embodiment, processor P3 436 has a memory map P3 MAP 434, as described herein. In at least one embodiment, processor P3 436 uses memory handle 410 to receive multicast memory updates from processor P0 406 using systems and methods such as those described herein. In at least one embodiment, not shown in FIG. 4, processor P3 436 uses memory handle 410 to, for example, provide multicast memory updates to one or more other processors such as those described herein.

In at least one embodiment, a processor P4 446 of a node 442 has memory M4 448, as described herein. In at least one embodiment, processor P4 446 has a memory map P4 MAP 444, as described herein. In at least one embodiment, processor P4 446 uses memory handle 410 to receive multicast memory updates from processor P0 406 using systems and methods such as those described herein. In at least one embodiment, not shown in FIG. 4, processor P4 446 uses memory handle 410 to, for example, provide multicast memory updates to one or more other processors such as those described herein.

In at least one embodiment, a processor P5 456 of node 452 has memory M5 458, as described herein. In at least one embodiment, processor P5 456 has a memory map P5 MAP 454, as described herein. In at least one embodiment, processor P5 456 uses memory handle 410 to receive multicast memory updates from processor P0 406 using systems and methods such as those described herein. In at least one embodiment, not shown in FIG. 4, processor P5 456 uses memory handle 410 to, for example, provide multicast memory updates to one or more other processors such as those described herein.

Figure 5:
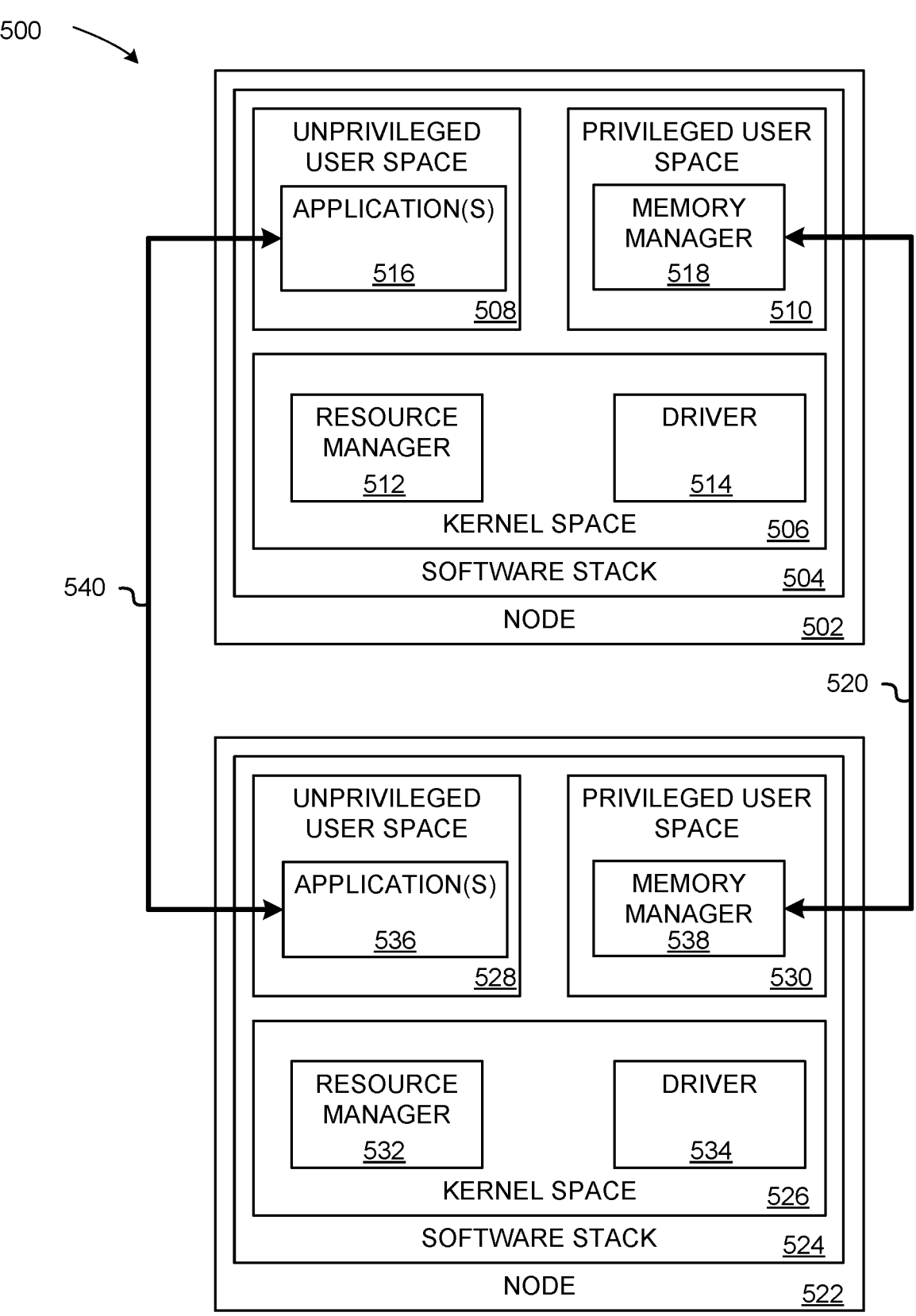
FIG. 5 illustrates an example computer system where nodes of a compute cluster communicate using links, in accordance with at least one embodiment.

FIG. 5 illustrates an example computer system 500 where nodes of a compute cluster communicate using links, in accordance with at least one embodiment. In at least one embodiment, a node 502 implements a software stack 504 using systems and methods such as those described herein. In at least one embodiment, node 502 is a node such as node 204, described herein at least in connection with FIG. 2. In at least one embodiment, software stack 504 is a software stack such as software stack 206 and/or software stack 216, described herein at least in connection with FIG. 2. In at least one embodiment, a switch (not illustrated in FIG. 5) implements software stack 504, using systems and methods such as those described herein. In at least one embodiment, a node 522 also implements a software stack 524, as described herein.

In at least one embodiment, software stack 504 and/or software stack 524 include one or more memory spaces. In at least one embodiment, software stack 504 includes kernel space 506, which may be reserved for use by drivers such as driver 514 (which is a driver such as driver 210 and/or driver 218, described herein at least in connection with FIG. 2), a resource manager 512, and/or other such kernel-level software entities. In at least one embodiment, software stack 504 includes a privileged user space 510, which may be reserved for use by memory manager 518 and/or other such privileged, but non-kernel, software entities. In at least one embodiment, memory manager 518 is a memory manager such as memory manager 212 and/or memory manager 220, described herein at least in connection with FIG. 2. In at least one embodiment, software stack 504 includes an unprivileged user space 508, which may be reserved for use by one or more applications 516, which may use resources associated with node 502 to execute as well as resources associated with other nodes connected to node 502 (including, but not limited to, node 522) to execute as described herein.

In at least one embodiment, software stack 524 includes kernel space 526, unprivileged user space 528, and/or privileged user space 530. In at least one embodiment, kernel space 526 includes resource manager 532, driver 534, and/or other such kernel-level software entities as described herein. In at least one embodiment, privileged user space 530 includes memory manager 538 and/or other such privileged, but non-kernel, software entities as described herein. In at least one embodiment, unprivileged user space 528 includes one or more applications 536, which may use resources associated with node 522 to execute as well as resources associated with other nodes connected to node 522 (including, but not limited to, node 502) to execute as described herein.

In at least one embodiment, memory manager 518 is connected 520 to memory manager 538 using one or more links as described herein. In at least one embodiment, one or more applications 516 use memory manager 518 to obtain resources from node 522 and/or other nodes of a cluster, as described herein. In at least one embodiment, resource manager 512 uses memory manager 518 to obtain resources from node 522 and/or other nodes of a cluster, as described herein. In at least one embodiment, one or more applications 536 uses memory manager 538 to obtain resources from node 502 and/or other nodes of a cluster, as described herein. In at least one embodiment, resource manager 512 uses memory manager 518 to obtain resources from node 522 and/or other nodes of a cluster, as described herein. In at least one embodiment, for example, an application of applications 516 may use memory manager 518 to obtain memory resources from node 522, using systems and methods such as those described herein.

In at least one embodiment, a user may establish one or more links 540 between applications such as applications 516 and/or applications 536. In at least one embodiment, one or more links 540 between applications may be used to perform additional communications between nodes such as node 502 and/or node 522.

Figure 6:
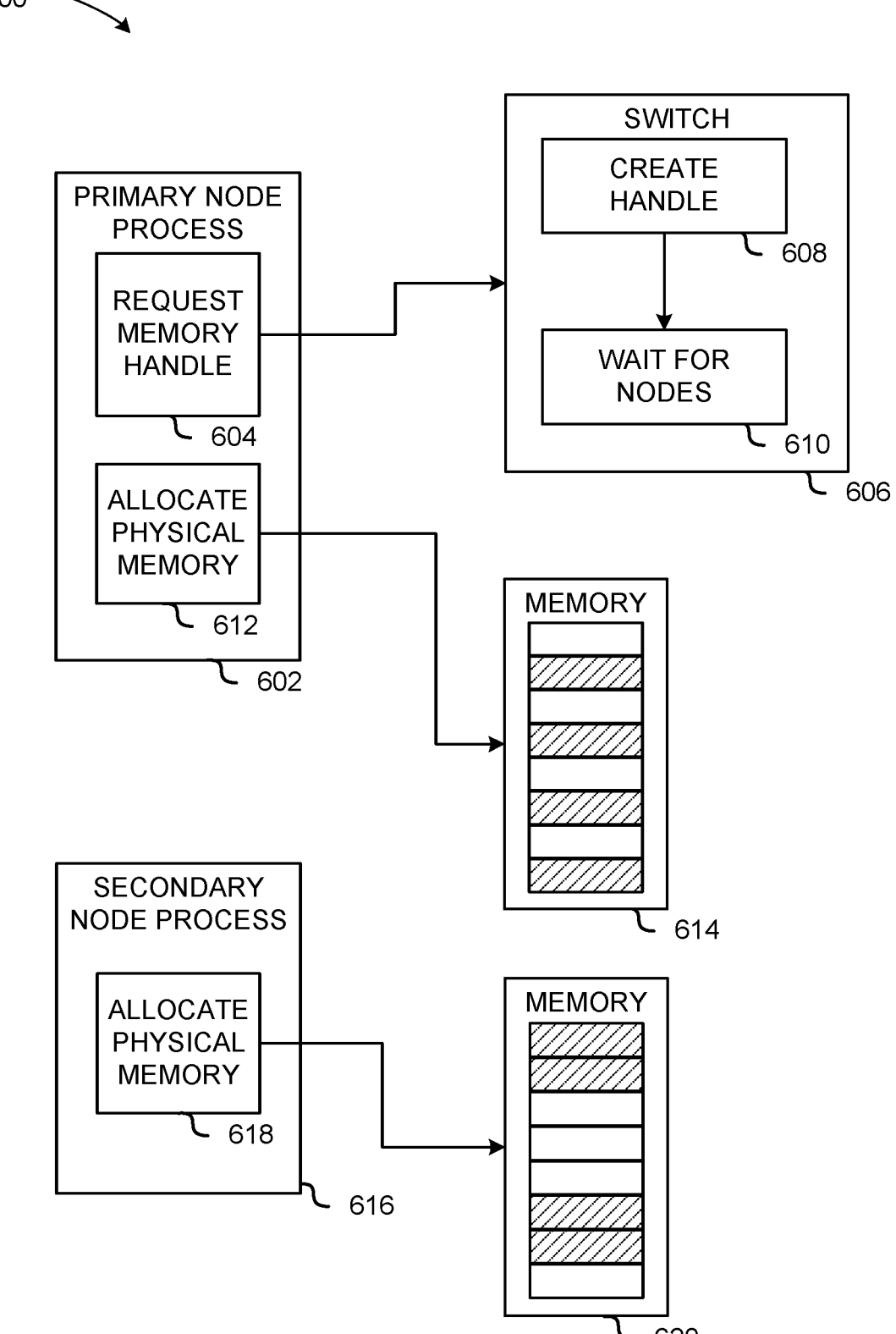
FIG. 6 illustrates an example computer system where memory is allocated for shared virtual memory, in accordance with at least one embodiment.

FIG. 6 illustrates an example computer system 600 where memory is allocated for shared virtual memory, in accordance with at least one embodiment. In at least one embodiment, primary node process 602 performs an API to cause shared virtual memory to be designated for use by a plurality of processors, using systems and methods such as those described herein. In at least one embodiment, a primary node process 602 performs an API to request a memory handle 604. In at least one embodiment, primary node process 602 executes on a processor such as processor 102, as described herein at least in connection with FIG. 1. In at least one embodiment, primary node process 602 executes on a processor of a node of a compute cluster, such as those described herein.

In at least one embodiment, a switch 606 receives API to request a shared memory handle 604 from processor 602. In at least one embodiment, switch 606 is a switch of a node of a compute cluster, such as those described herein. In at least one embodiment, in response to API to request a shared memory handle 604 from processor 602, switch 606 performs a command to create a memory handle 608. In at least one embodiment, not shown in FIG. 6, in response to API to request a shared memory handle 604 from processor 602, switch 606 sends an indication of success or failure of performance of a command to cause a memory handle to be created, as described herein. In at least one embodiment, after switch 606 performs command to cause a memory handle to be created 608, switch 606 waits for nodes to create backing memory 610, as described herein.

In at least one embodiment, primary node process 602 performs an API to allocate physical memory 612. In at least one embodiment, note shown in FIG. 6, primary node process 602 performs an API to designate previously allocated physical memory for use by a plurality of processors. In at least one embodiment, primary node process 602 performs API to allocate physical memory 612 that will be associated with a memory handle, as described herein. In at least one embodiment, primary node process 602 performs an API to cause physical memory corresponding to shared virtual memory to be designated for use by a plurality of processors including, but not limited to, processors of a compute cluster as described herein. In at least one embodiment, when primary node process 602 performs API to allocate physical memory 612, memory 614 is associated with primary node process 602 using systems and methods such as those described herein. In at least one embodiment, memory 614 is physical memory corresponding to shared virtual memory to be designated for use by a plurality of processors, as described herein. In at least one embodiment, API to allocate physical memory 612 may be described as an API to cause physical memory to be designated for use by a plurality of processors.

In at least one embodiment, a secondary node process 616 performs an API to allocate physical memory 618. In at least one embodiment, secondary node process 616 executes on a processor such as processor 102, as described herein at least in connection with FIG. 1. In at least one embodiment, secondary node process 616 executes on a processor of a node of a compute cluster, such as those described herein. In at least one embodiment, secondary node process 616 executes on a processor that is identical to a processor that primary node process 602 executes on. In at least one embodiment, secondary node process 616 executes on a processor that is different from a processor that primary node process 602 executes on. In at least one embodiment, primary node process 602 is performed by a processor such as processor 102, described herein at least in connection with FIG. 1. In at least one embodiment, secondary node process 616 is performed by a processor such as processor 102, described herein at least in connection with FIG. 1.

In at least one embodiment, secondary node process 616 performs API to allocate physical memory 618 that will be associated with a memory handle, as described herein. In at least one embodiment, secondary node process 616 performs an API to cause physical memory corresponding to shared virtual memory to be designated for use by a plurality of processors including, but not limited to, processors of a compute cluster as described herein. In at least one embodiment, when secondary node process 616 performs API to allocate physical memory 618, memory 620 is associated with secondary node process 616 using systems and methods such as those described herein. In at least one embodiment, memory 620 is physical memory corresponding to shared virtual memory to be designated for use by a plurality of processors, as described herein. In at least one embodiment, API to allocate physical memory 618 may be described as an API to cause physical memory to be designated for use by a plurality of processors.

FIG. 7 illustrates an example computer system 700 where virtual addresses are created that correspond to memory allocated designated for shared virtual memory, in accordance with at least one embodiment. In at least one embodiment, a primary node process 702 is a primary node process such as primary node process 602, described herein at least in connection with FIG. 6. In at least one embodiment, primary node process 702 performs an API to create a virtual address space 704. In at least one embodiment, primary node process 702 performs API to create a virtual address space 704 after primary node process 702 performs an API such as API to request a memory handle 604, as described herein at least in connection with FIG. 6. In at least one embodiment, primary node process 702 performs API to create a virtual address space 704 when primary node process 702 performs an API such as API to request a memory handle 604, as described herein at least in connection with FIG. 6. In at least one embodiment, primary node process 702 performs API to create a virtual address space 704 as part of an API such as API to request a memory handle 604, as described herein at least in connection with FIG. 6. In at least one embodiment, primary node process 702 executes on a processor such as processor 102, as described herein at least in connection with FIG. 1. In at least one embodiment, primary node process 702 executes on a processor of a node of a compute cluster, such as those described herein.

In at least one embodiment, when primary node process 702 performs API to create a virtual address space 704, a virtual address space 706 is allocated for use by primary node process 702. In at least one embodiment, virtual address space 706 corresponds to physical memory such as memory 708. In at least one embodiment, memory 708 is memory such as memory 614, described herein at least in connection with FIG. 6. In at least one embodiment, virtual address space 706 has an associated memory page size. In at least one embodiment, an associated memory page size of virtual address space 706 is identical to a memory page size of memory 708 so that, for example, if a memory page size of memory 708 is 64 MB, a memory page size of virtual address space 706 is also 64 MB. In at least one embodiment, an associated memory page size of virtual address space 706 is different from a memory page size of memory 708 so that, for example, if a memory page size of memory 708 is 64 MB, a memory page size of virtual address space 706 is 2 GB. In at least one embodiment, a memory page size of virtual address space 706 is variable, with different memory page sizes being used in different situations, depending on one or more factors including, but not limited to, uses of virtual address space 706, functionality of primary node process, uses of memory 708, and/or other such factors.

In at least one embodiment, a secondary node process 710 is a secondary node process such as secondary node process 616, described herein at least in connection with FIG. 6. In at least one embodiment, secondary node process 710 performs an API to create a virtual address space 712. In at least one embodiment, secondary node process 710 performs API to create a virtual address space 712 after primary node process 702 performs an API such as API to request a memory handle 604, as described herein at least in connection with FIG. 6. In at least one embodiment, secondary node process 710 performs API to create a virtual address space 712 when primary node process 702 performs an API such as API to request a memory handle 604, as described herein at least in connection with FIG. 6. In at least one embodiment, secondary node process 710 performs API to create a virtual address space 712 as part of an API such as API to request a memory handle 604, as described herein at least in connection with FIG. 6.

In at least one embodiment, secondary node process 710 executes on a processor such as processor 102, as described herein at least in connection with FIG. 1. In at least one embodiment, secondary node process 710 executes on a processor of a node of a compute cluster, such as those described herein. In at least one embodiment, secondary node process 710 executes on a processor that is identical to a processor that primary node process 702 executes on. In at least one embodiment, secondary node process 710 executes on a processor that is different from a processor that primary node process 702 executes on. In at least one embodiment, primary node process 702 is performed by a processor such as processor 102, described herein at least in connection with FIG. 1. In at least one embodiment, secondary node process 710 is performed by a processor such as processor 102, described herein at least in connection with FIG. 1.

In at least one embodiment, not illustrated in FIG. 7, secondary node process 710 performs API to create a virtual address space 712 after secondary node process 710 performs an API such as API to request a memory handle 604, as described herein at least in connection with FIG. 6. In at least one embodiment, secondary node process 710 performs API to create a virtual address space 712 when secondary node process 710 performs an API such as API to request a memory handle 604, as described herein at least in connection with FIG. 6. In at least one embodiment, secondary node process 710 performs API to create a virtual address space 712 as part of an API to request a memory handle such as API to request a memory handle 604, as described herein at least in connection with FIG. 6.

In at least one embodiment, when secondary node process 710 performs API to create a virtual address space 712, a virtual address space 714 is allocated for use by secondary node process 710. In at least one embodiment, virtual address space 714 corresponds to memory such as memory 716. In at least one embodiment, memory 716 is memory such as memory 620, described herein at least in connection with FIG. 6. In at least one embodiment, virtual address space 714 has an associated memory page size. In at least one embodiment, an associated memory page size of virtual address space 714 is identical to a memory page size of memory 716 so that, for example, if a memory page size of memory 716 is 64 MB, a memory page size of virtual address space 714 is also 64 MB. In at least one embodiment, an associated memory page size of virtual address space 714 is different from a memory page size of memory 716 so that, for example, if a memory page size of memory 716 is 64 MB, a memory page size of virtual address space 714 is 2 GB. In at least one embodiment, a memory page size of virtual address space 714 is variable, with different memory page sizes being used in different situations, depending on one or more factors such as those described herein.

Figure 8:
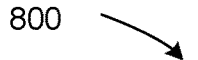
FIG. 8 illustrates an example computer system where a shared memory map is created for shared virtual memory, in accordance with at least one embodiment.

FIG. 8 illustrates an example computer system 800 where a shared memory map is created for shared virtual memory, in accordance with at least one embodiment. In at least one embodiment, primary node process 802 performs an API to map shared memory 804. In at least one embodiment, primary node process 802 is a primary node process such as primary node process 702, described herein at least in connection with FIG. 7. In at least one embodiment, primary node process 802 performs API to map shared memory 804 after primary node process performs an API such as API to create virtual address space 704, as described herein at least in connection with FIG. 7. In at least one embodiment, primary node process 802 performs API to map shared memory 804 when primary node process 802 performs an API such as API to create virtual address space 704, as described herein at least in connection with FIG. 7. In at least one embodiment, primary node process 802 performs API to map shared memory 804 as part of an API such as API to create virtual address space 704, as described herein at least in connection with FIG. 7. In at least one embodiment, primary node process 802 executes on a processor such as processor 102, as described herein at least in connection with FIG. 1. In at least one embodiment, primary node process 802 executes on a processor of a node of a compute cluster, such as those described herein.

In at least one embodiment, when primary node process 802 performs API to map shared memory 804, a shared memory map 806 is created. In at least one embodiment, shared memory map 806 is created for use by primary node process 802. In at least one embodiment, locations in shared memory map 806 are mapped to locations in a virtual address space 808. In at least one embodiment, virtual address space 808 is a virtual address space such as virtual address space 706, described herein at least in connection with FIG. 7. In at least one embodiment, locations in virtual address space 808 correspond to locations in memory 810. In at least one embodiment, memory 810 is memory such as memory 708, described herein at least in connection with FIG. 7. In at least one embodiment, as described herein, virtual address space 808 has an associated memory page size and memory 810 also has an associated memory page size, as described herein. In at least one embodiment, memory page sizes of virtual address space 808 and memory 810 may be identical, or may be different, also as described herein. In at least one embodiment, shared memory map 806 also has an associated memory page size that may be identical to or different from, associated memory page sizes of virtual address space 808 and/or memory 810. In at least one embodiment, page sizes of, for example, shared memory map 806, virtual address space 808, and/or memory 810 provide performance enhancement when a processor such as processor 102, described herein at least in connection with FIG. 1, accesses memory for use by primary node process 802.

In at least one embodiment, secondary node process 812 performs an API to map shared memory 814. In at least one embodiment, secondary node process 812 is a secondary node process such as secondary node process 710, described herein at least in connection with FIG. 7. In at least one embodiment, secondary node process 812 performs API to map shared memory 814 after primary node process performs an API such as API to create virtual address space 704, as described herein at least in connection with FIG. 7. In at least one embodiment, secondary node process 812 performs API to map shared memory 814 when primary node process 802 performs an API such as API to create virtual address space 704, as described herein at least in connection with FIG. 7. In at least one embodiment, secondary node process 812 performs API to map shared memory 814 as part of an API such as API to create virtual address space 704, as described herein at least in connection with FIG. 7.

In at least one embodiment, secondary node process 812 executes on a processor such as processor 102, as described herein at least in connection with FIG. 1. In at least one embodiment, secondary node process 812 executes on a processor of a node of a compute cluster, such as those described herein. In at least one embodiment, secondary node process 812 executes on a processor that identical to a processor that primary node process 802 executes on. In at least one embodiment, secondary node process executes on a processor that is different from a processor that primary node process 802 executes on. In at least one embodiment, primary node process 802 is performed by a processor such as processor 102, described herein at least in connection with FIG. 1. In at least one embodiment, secondary node process 812 is performed by a processor such as processor 102, described herein at least in connection with FIG. 1.

In at least one embodiment, not illustrated in FIG. 8, secondary node process 812 performs API to map shared memory 814 after secondary node process 812 performs an API such as API to create virtual address space 712, as described herein at least in connection with FIG. 7. In at least one embodiment, secondary node process 812 performs API to map shared memory 814 when secondary node process 812 performs an API such as API to create virtual address space 712, as described herein at least in connection with FIG. 7. In at least one embodiment, secondary node process 812 performs API to map shared memory 814 as part of an API such as API to create virtual address space 712, as described herein at least in connection with FIG. 7.

In at least one embodiment, when secondary node process 812 performs API to map shared memory 814, a shared memory map 816 is created. In at least one embodiment, shared memory map 816 is created for use by secondary node process 812. In at least one embodiment, locations in shared memory map 816 are mapped to locations in a virtual address space 818. In at least one embodiment, virtual address space 818 is a virtual address space such as virtual address space 714, described herein at least in connection with FIG. 7. In at least one embodiment, locations in virtual address space 818 correspond to locations in memory 820. In at least one embodiment, memory 820 is memory such as memory 716, described herein at least in connection with FIG. 7. In at least one embodiment, as described herein, virtual address space 818 has an associated memory page size and memory 820 also has an associated memory page size, as described herein. In at least one embodiment, memory page sizes of virtual address space 818 and memory 820 may be identical, or may be different, also as described herein. In at least one embodiment, shared memory map 816 also has an associated memory page size that may be identical to or different from, associated memory page sizes of virtual address space 818 and/or memory 820. In at least one embodiment, page sizes of, for example, shared memory map 816, virtual address space 818, and/or memory 820 provide performance enhancement when a processor such as processor 102, described herein at least in connection with FIG. 1, accesses memory for use by primary node process 802.

In at least one embodiment, shared memory map 806 and shared memory map 816 are identical. In at least one embodiment, shared memory map 806 and/or shared memory map 816 may be a shared memory map that is shared between a plurality of processes such as primary node process 802 and/or primary node process 812. In at least one embodiment, not illustrated in FIG. 8, an additional mapping between shared memory map 806 and shared memory map 816 may be created to enable mapping between memory locations in shared memory map 806 and shared memory map 816. In at least one embodiment, shared memory map 806 and/or shared memory map 816 enable a process such as primary node process 802 to access memory associated with another process such as memory 820 using virtual address space 818, using systems and methods such as those described herein. In at least one embodiment, shared memory map 806 and/or shared memory map 816 enable a process such as primary node process 802 to access memory on another processor when for example, secondary node process 812 and primary node process 802 execute on and/or are performed by different processors, as described herein.

FIG. 9 illustrates an example computer system 900 where processors access virtual memory, in accordance with at least one embodiment. In at least one embodiment, a primary node process 902 performs an API that uses memory 904, using systems and methods such as those described herein. In at least one embodiment, primary node process 902 is a primary node process such as primary node process 802, described herein at least in connection with FIG. 8. In at least one embodiment, primary node process 902 uses memory 904 by accessing memory locations in a virtual address space 906. In at least one embodiment, virtual address space 906 is a virtual address space such as virtual address space 808, described herein at least in connection with FIG. 8. In at least one embodiment, locations in virtual address space 906 correspond to memory locations in primary node memory 908. In at least one embodiment, primary node memory 908 is memory associated with primary node process 902. In at least one embodiment, primary node memory 908 is memory such as memory 810, described herein at least in connection with FIG. 8.

In at least one embodiment, a secondary node process 912 performs an API that uses memory 914, using systems and methods such as those described herein. In at least one embodiment, secondary node process 912 is a secondary node process such as secondary node process 812, described herein at least in connection with FIG. 8. In at least one embodiment, secondary node process 912 uses memory 914 by accessing memory locations in a virtual address space 916. In at least one embodiment, virtual address space 916 is a virtual address space such as virtual address space 818, described herein at least in connection with FIG. 8. In at least one embodiment, locations in virtual address space 916 correspond to memory locations in secondary node memory 918. In at least one embodiment, secondary node memory 918 is memory associated with secondary node process 912. In at least one embodiment, secondary node memory 918 is memory such as memory 820, described herein at least in connection with FIG. 8.

Figure 10:
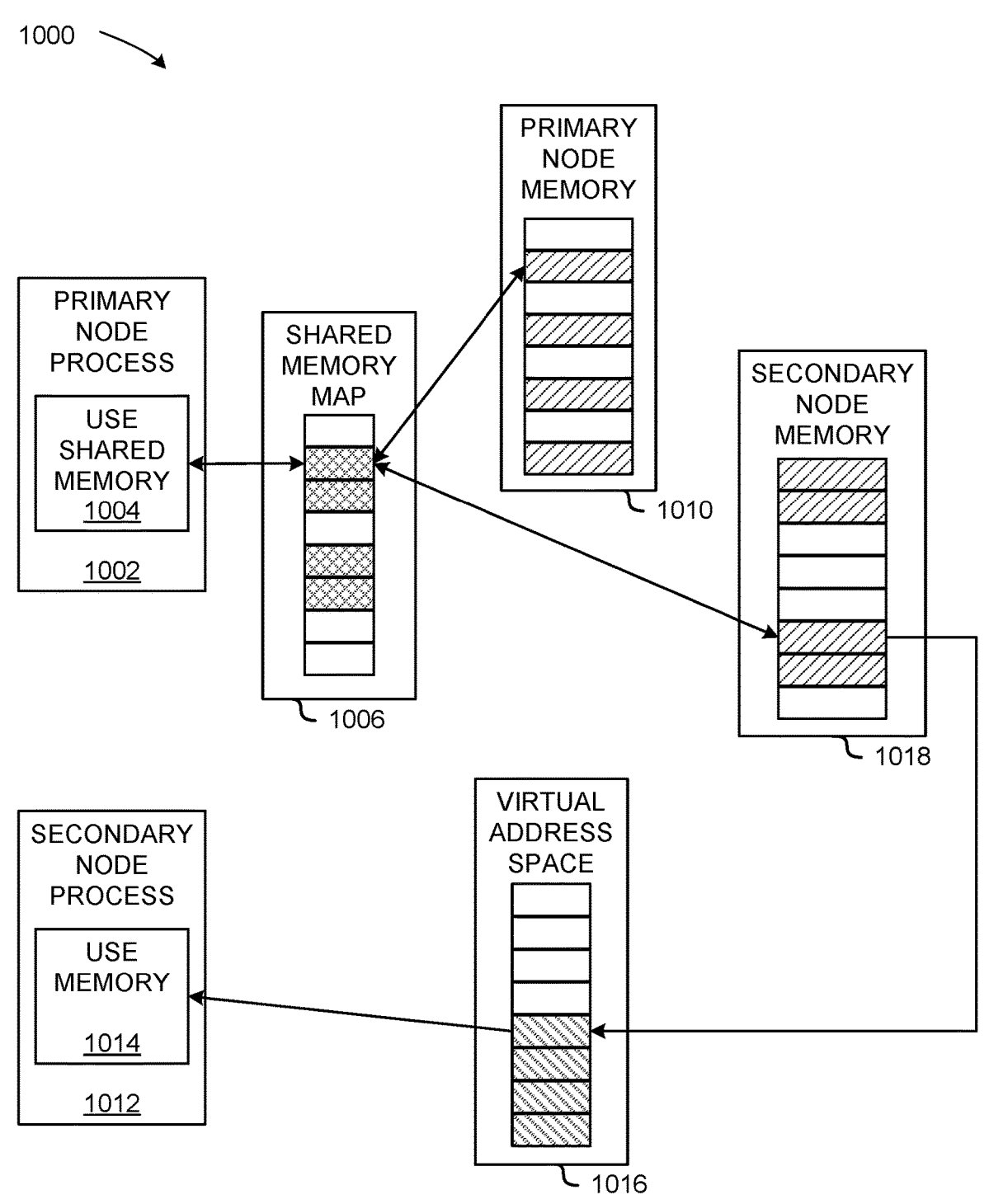
FIG. 10 illustrates an example computer system where processors access shared virtual memory, in accordance with at least one embodiment.

FIG. 10 illustrates an example computer system 1000 where processors access shared virtual memory, in accordance with at least one embodiment. In at least one embodiment, a primary node process 1002 performs an API that uses shared memory 1004. In at least one embodiment, primary node process 902 is a primary node process such as primary node process 902, described herein at least in connection with FIG. 9. In at least one embodiment, primary node process 1002 uses shared memory 1004 by accessing memory locations in a shared memory map 1006. In at least one embodiment, shared memory map 1006 is a shared memory map such as shared memory map 806 and/or shared memory map 816, described herein at least in connection with FIG. 8.

In at least one embodiment, when primary node process 1002 performs an API that uses shared memory 1004, one or more memory locations are used. In at least one embodiment, for example, if primary node process 1002 performs an API that uses shared memory 1004 to store a value, a memory location in primary node memory 1010 (which is primary node memory such as primary node memory 908, described herein at least in connection with FIG. 9) that corresponds to a location in shared memory map 1006 may be used to store a value and a memory location in secondary node memory 1018 (which is secondary node memory such as secondary node memory 918, described herein at least in connection with FIG. 9) that corresponds to a location in shared memory map 1006 may also be used to store a value. In at least one embodiment, one or more memory locations in memory associated with one or more processors of a compute cluster are used when a process such as primary node process 1002 uses shared memory 1004 to, for example, store a value. In at least one embodiment, not shown in FIG. 10, primary node process 1002 performs an API to use shared memory 1004 using a shared memory map such as shared memory map 1006 and a shared memory map such as shared memory map 1006 uses one or more virtual address spaces such as those described herein to access memory associated with one or more processors of a compute cluster, as described herein.

In at least one embodiment, a secondary node process 1012 performs an API that uses memory 1014. In at least one embodiment, secondary node process 1012 is a secondary node process such as secondary node process 912, as described herein at least in connection with FIG. 9. In at least one embodiment, for example, secondary node process 1012 may perform an API that uses memory 1014 to read a stored value from memory. In at least one embodiment, when secondary node process 1012 performs an API that uses memory 1014 to read a stored value, secondary node process 1012 may read a stored value from secondary node memory 1018 (which is secondary node memory such as secondary node memory 918, described herein at least in connection with FIG. 9). In at least one embodiment, secondary node process 1012 may read a stored value from secondary node memory 1018 using a virtual address space 1016 (which is a virtual address space such as virtual address space 916, as described herein at least in connection with FIG. 9).

In at least one embodiment, when primary node process 1002 performs an API to use shared memory 1004 to, for example, store a value in secondary node memory 1018, a value may be stored in a memory location that is used by secondary node process 1012 to read a stored value. In at least one embodiment, primary node process 1002 and secondary node process 1012 execute on processors of a compute cluster, as described herein. In at least one embodiment, primary node process 1002 and secondary node process 1012 execute on different processors of a compute cluster and primary node memory 1010 and secondary node memory 1018 are on different processors of a compute cluster.

Figure 11:
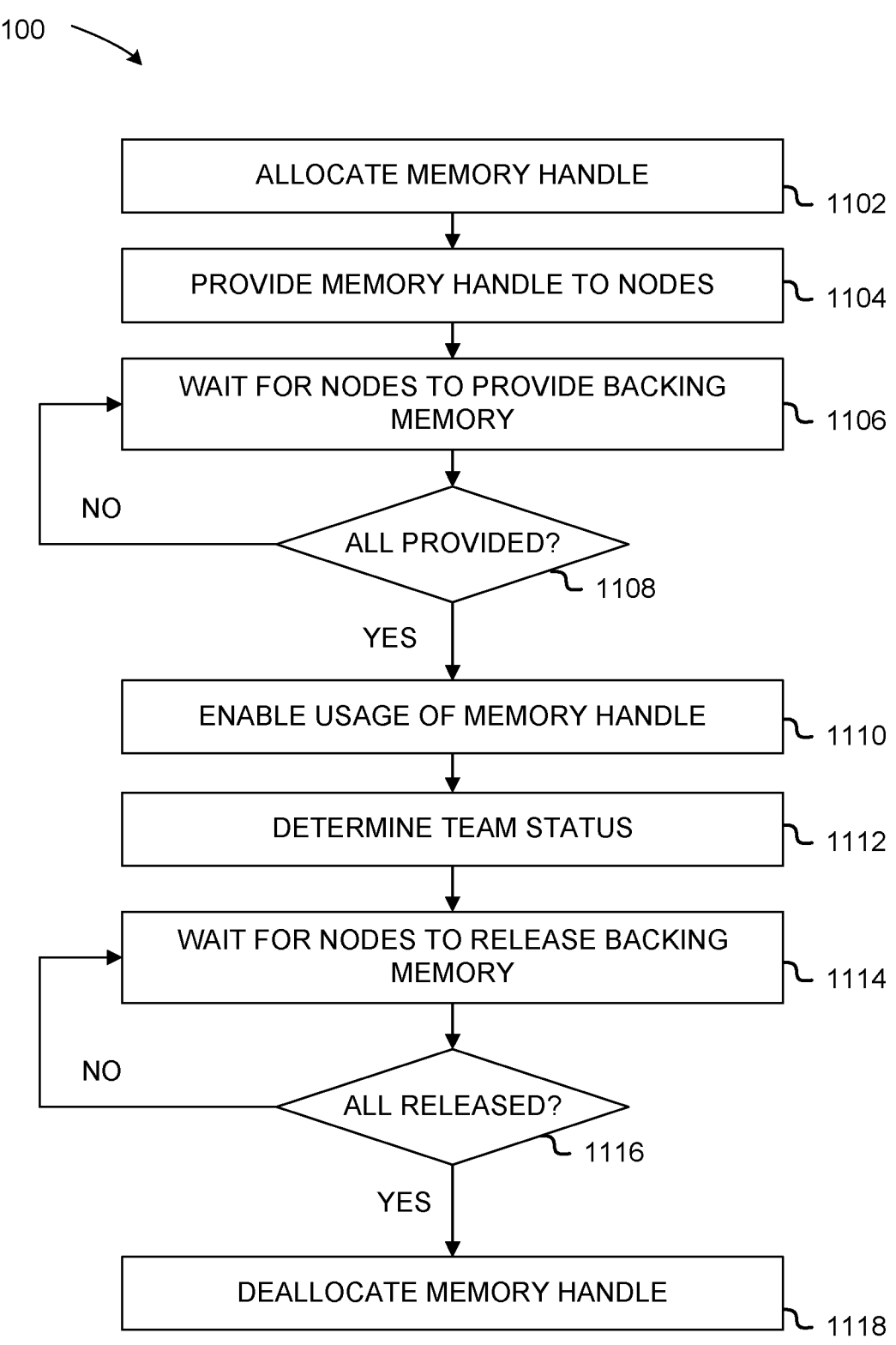
FIG. 11 illustrates an example process for sharing processor memory between processors, in accordance with at least one embodiment.

FIG. 11 illustrates an example process 1100 for sharing processor memory between processors, in accordance with at least one embodiment. In at least one embodiment, a processor such as processor 102, processor 112, processor 120, and/or processor 128 (described herein at least in connection with FIG. 1), executes instructions to perform example process 1100. In at least one embodiment, a processor such as one or more processors described herein in connection with FIGS. 21 to 52 executes instructions to perform example process 1100. In at least one embodiment, a memory manager such as memory manager 212 and/or memory manager 220, described herein at least in connection with FIG. 2 executes instructions to perform example process 1100.

In at least one embodiment, at step 1102 of example process 1100, a memory handle is allocated (or generated) using systems and methods such as those described herein. In at least one embodiment, after step 1102, example process 1100 advances to step 1104.

In at least one embodiment, at step 1104 of example process 1100, a memory handle allocated at step 1102 is provided to one or more nodes. In at least one embodiment, for example, a memory handle allocated at step 1102 is provided to a plurality of nodes of a compute cluster. In at least one embodiment, a memory handle allocated at step 1102 is provided to a plurality of nodes based, at least in part, on nodes being identified as members of a same process group. In at least one embodiment, node being identified as members of a same process group are described as nodes being on a team. In at least one embodiment, for example, a first node may perform an API to allocate a memory handle and may provide an allocated memory handle to a plurality of other nodes that are members of a team. In at least one embodiment, nodes that are members of a team may also be members of a sub-team. In at least one embodiment, for example, a process executing on node zero may allocate a memory handle and provide it to nodes one through ten. In such an embodiment, nodes zero through ten may be considered as a team. In at least one embodiment, nodes zero through four may also be considered as a first sub-team while nodes five through ten may be considered as a second sub-team. In at least one embodiment, membership in a node team is defined by those nodes which have access to a memory handle. In at least one embodiment, In at least one embodiment, after step 1104, example process 1100 advances to step 1106.

In at least one embodiment, at step 1106 of example process 1100, example process 1100 may wait for all nodes that were provided with a memory handle at step 1104 (also referred to as all nodes on a team) to provide a physical memory location that will correspond to a memory handle, using systems and methods such as those described herein. In at least one embodiment, after step 1106, example process 1100 advances to step 1108.

In at least one embodiment, at step 1108 of example process 1100, it is determined whether all nodes that were provided with a memory handle at step 1104 have provided physical memory location that will correspond to a memory location allocated at step 1102. In at least one embodiment, at step 1108, if it is determined that all nodes that were provided with a memory handle have not provided physical memory ("NO" branch), example process 1100 continues at step 1106 to wait for all nodes. In at least one embodiment, at step 1108, if it is determined that all nodes that were provided with a memory handle have provided physical memory ("YES" branch), example process 1100 advances to step 1110. In at least one embodiment, not shown in FIG. 11, example process 1100 may terminate before all nodes that were provided with a memory handle have provided physical memory when, for example, an amount of time has elapsed. In at least one embodiment, not shown in FIG. 11, example process 1100 may advance to step 1110 before all nodes that were provided with a memory handle have provided physical memory ("YES" branch) when, for example, a predetermined number of nodes that were provided with a memory handle have provided physical memory such as, for example, more than 90% of nodes that were provided with a memory handle have provided physical memory.

In at least one embodiment, at step 1110 of example process 1100, a memory handle allocated at step 1102 with backing physical memory allocated or designated for all nodes is enabled for use by nodes of a team. In at least one embodiment, after step 1110, example process 1100 advances to step 1112.

In at least one embodiment, at step 1112 of example process 1100, determines team status to, for example, determine whether nodes are able to use a memory handle and/or to determine when nodes are finishing using a memory handle. In at least one embodiment, after step 1112, example process 1100 advances to step 1114.

In at least one embodiment, at step 1114 of example process 1100, example process waits for nodes to release backing memory. In at least one embodiment, at step 1114, when a node releases backing memory, it may be considered an indication that a node that releases backing memory will not continue to use a memory handle such as a memory handle allocated at step 1102. In at least one embodiment, after step 1114, example process 1100 advances to step 1116.

In at least one embodiment, at step 1116 of example process 1100, it is determined whether all nodes that provided backing memory have released backing memory. In at least one embodiment, at step 1116, if it is determined that all nodes that provided backing memory have not released backing memory ("NO" branch), example process 1100 continues at step 1114 to wait for nodes to release backing memory. In at least one embodiment, at step 1116, if it is determined that all nodes that provided backing memory have released backing memory ("YES" branch), example process 1100 advances to step 1118.

In at least one embodiment, at step 1118 of example process 1100, a memory handle allocated at step 1102 is deallocated. In at least one embodiment, after step 1118, example process 1100 terminates. In at least one embodiment, one processor may execute step 1118. In at least one embodiment, a plurality of processors may execute step 1118 so that a memory handle allocated at step 1102 is not deallocated until all processors have executed step 1118. In at least one embodiment, not shown in FIG. 11, after step 1118, example process 1100 continues at step 1102 to allocate a new memory handle.

In at least one embodiment, operations of example process 1100 illustrated in FIG. 11 are performed in a different order than illustrated in FIG. 11. In at least one embodiment, operations of example process 1100 illustrated in FIG. 11 are performed simultaneously (or in parallel). In at least one embodiment, operations of example process 1100 illustrated in FIG. 11 are performed by a plurality of threads executing on a processor such as one or more processors described herein in connection with FIGS. 21 to 52.

FIG. 12 illustrates an example process 1200 for determining sharing for processor memory shared between processors, in accordance with at least one embodiment. In at least one embodiment, a processor such as processor 102, processor 112, processor 120, and/or processor 128 (described herein at least in connection with FIG. 1), executes instructions to perform example process 1200. In at least one embodiment, a processor such as one or more processors described herein in connection with FIGS. 21 to 52 executes instructions to perform example process 1200. In at least one embodiment, a memory manager such as memory manager 212 and/or memory manager 220, described herein at least in connection with FIG. 2 executes instructions to perform example process 1200.

In at least one embodiment, at step 1202 of example process 1200, a team description is received. In at least one embodiment, a team description includes a list of processes that may use a shared memory handle, using systems and methods such as those described herein. In at least one embodiment, a team description includes a list of processors that may use a shared memory handle. In at least one embodiment, processes and/or processors of a team are processes and/or processors of a compute cluster such as those described herein. In at least one embodiment, after step 1202, example process 1200 advances to step 1204.

In at least one embodiment, at step 1204 of example process 1200, it is determined whether a team description received at step 1202 is for a new team. In at least one embodiment, at step 1204, if it is determined that a team description is for a new team ("YES" branch), example process 1200 advances to step 1206. In at least one embodiment, at step 1204, if it is determined that a team description is not for a new team ("NO" branch), example process 1200 advances to step 1208.

In at least one embodiment, at step 1206 of example process 1200, a new multicast slot is created and assigned to a new team. In at least one embodiment, a multicast slot is an identifier that is used to identify a team. In at least one embodiment, a multicast slot is an identifier provided to one or more drivers such as those described herein. In at least one embodiment, after step 1206, example process 1200 advances to step 1218. In at least one embodiment, not shown in FIG. 12, if a new multicast slot cannot be created, example process 1200 may terminate. In at least one embodiment, if a new multicast slot cannot be created, example process 1200 may send an error to a calling process (such as, for example, primary node process 602 described herein at least in connection with FIG. 6) using systems and methods such as those described herein.

In at least one embodiment, at step 1208 of example process 1200, it is determined whether a team description received at step 1202 is for a new sub-team. In at least one embodiment, for example, a team may include processes on nodes zero through ten, as described herein and a sub-team may include processes on nodes zero through four. In at least one embodiment, at step 1208, if it is determined that a team description received at step 1202 is not for a new sub-team ("NO" branch), example process 1200 advances to step 1210. In at least one embodiment, at step 1208, if it is determined that a team description received at step 1202 is for a new sub-team ("YES" branch), example process 1200 advances to step 1212. In at least one embodiment, not shown in FIG. 12, if an existing multicast slot cannot be found, example process 1200 may terminate. In at least one embodiment, if an existing multicast slot cannot be found, example process 1200 may send an error to a calling process (such as, for example, primary node process 602 described herein at least in connection with FIG. 6) using systems and methods such as those described herein.

In at least one embodiment, at step 1210 of example process 1200, a team description received at step 1202 is assigned to an existing multicast slot when it is determined that a team description is not for a new team (at step 1204) and is also not for a new sub-team (at step 1208). In at least one embodiment, after step 1210, example process 1200 advances to step 1218. In at least one embodiment, not shown in FIG. 12, if it is determined that a team description is not for a new team (at step 1204) and is also not for a new sub-team (at step 1208), example process 1200 may terminate rather than assigning a team description received at step 1202 to an existing multicast slot. In at least one embodiment, for example, if no existing multicast slot that corresponds to a team description received at step 1202 exists, example process 1200 may terminate. In at least one embodiment, if no existing multicast slot that corresponds to a team description received at step 1202 exists, example process 1200 may send an error to a calling process (such as, for example, primary node process 602 described herein at least in connection with FIG. 6) using systems and methods such as those described herein.

In at least one embodiment, at step 1212 of example process 1200, if it is determined at step 1208 that a team description is for a new sub-team, a multicast slot for a parent team is determined. In at least one embodiment, for example, a sub-team that includes nodes zero through five may be a sub-team of a team that includes nodes zero through ten and a multicast slot corresponding to a team of nodes zero through ten is determined at step 1212. In at least one embodiment, after step 1212, example process 1200 advances to step 1214. In at least one embodiment, not shown in FIG. 12, if a multicast slot for a parent team is not determined, example process 1200 may terminate. In at least one embodiment, if a multicast slot for a parent team is not determined, example process 1200 may send an error to a calling process (such as, for example, primary node process 602 described herein at least in connection with FIG. 6) using systems and methods such as those described herein.

In at least one embodiment, at step 1214 of example process 1200, a new multicast slot is assigned to a new sub-team. In at least one embodiment, nodes zero through ten may be assigned to a first multicast slot, as described herein and nodes zero through five may be a new sub-team. In such an embodiment, nodes zero through five may be assigned to a second multicast slot in addition to being assigned to a first multicast slot. In at least one embodiment, In at least one embodiment, after step 1214, example process 1200 advances to step 1216.

In at least one embodiment, at step 1216 of example process 1200, a multicast slot for a sub-team is bound to a multicast slot of a parent team so that, for example, a multicast slot assigned to a sub-team of nodes zero through five is bout to a multicast slot of a team of nodes zero through ten. In at least one embodiment, after step 1216, example process 1200 advances to step 1218. In at least one embodiment, not shown in FIG. 12, if a multicast slot for a sub-team cannot be bound to a multicast slot of a parent team, example process 1200 may terminate. In at least one embodiment, if a multicast slot for a sub-team cannot be bound to a multicast slot of a parent team, example process 1200 may send an error to a calling process (such as, for example, primary node process 602 described herein at least in connection with FIG. 6) using systems and methods such as those described herein.

In at least one embodiment, at step 1218 of example process 1200, an indication that a team corresponding to a team description received at step 1202 is ready is provided. In at least one embodiment, an indication that a team corresponding to a team description received at step 1202 is ready is provided to a calling process such, for example, primary node process 602 described herein at least in connection with FIG. 6. In at least one embodiment, after step 1218, example process 1200 terminates. In at least one embodiment, not shown in FIG. 12, after step 1218, example process 1200 continues at step 1202 to receive a new team description.

In at least one embodiment, operations of example process 1200 illustrated in FIG. 12 are performed in a different order than illustrated in FIG. 12. In at least one embodiment, operations of example process 1200 illustrated in FIG. 12 are performed simultaneously (or in parallel). In at least one embodiment, operations of example process 1200 illustrated in FIG. 12 are performed by a plurality of threads executing on a processor such as one or more processors described herein in connection with FIGS. 21 to 52.

Figure 13:
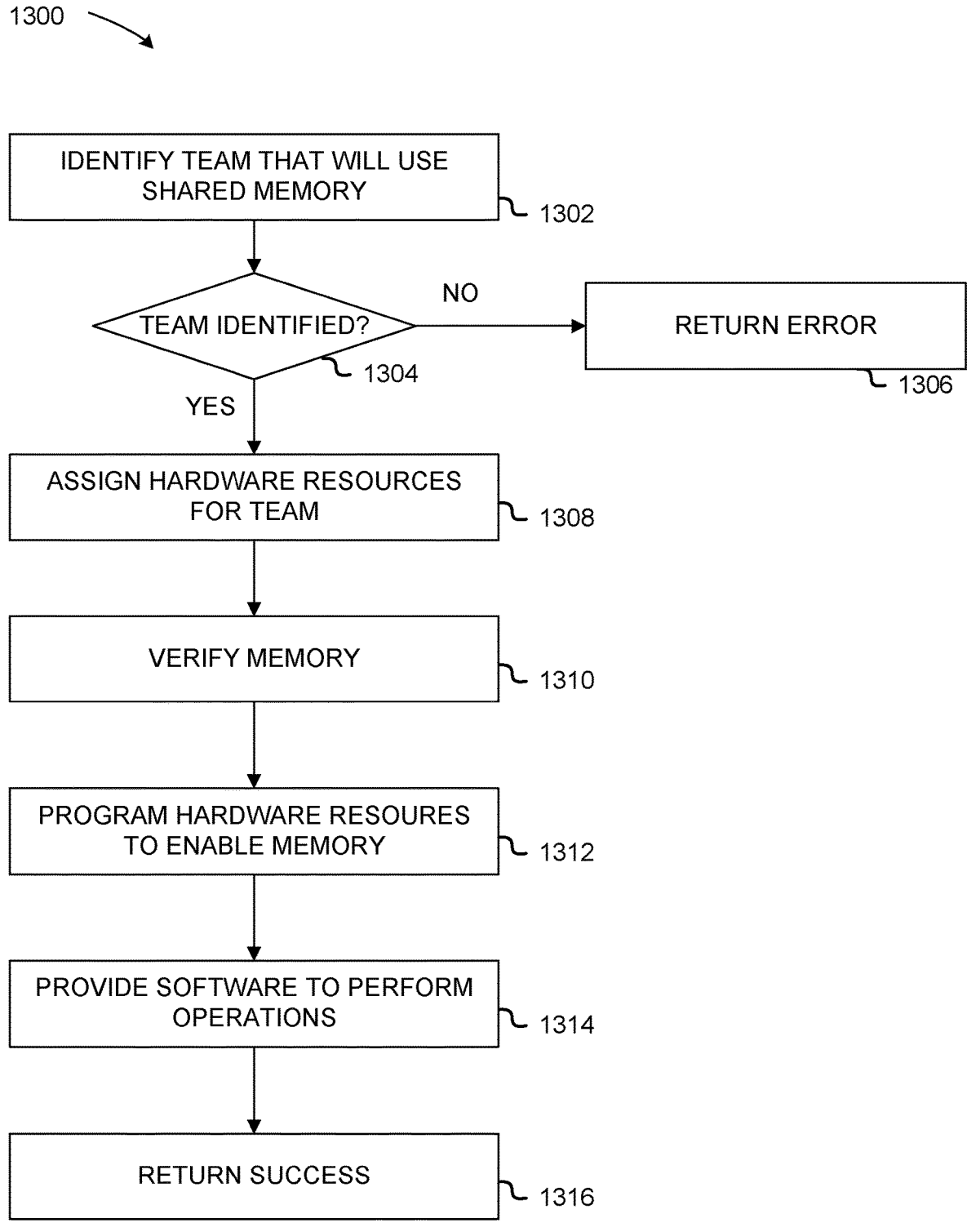
FIG. 13 illustrates an example process for providing resources for processor memory shared between processors, in accordance with at least one embodiment.

FIG. 13 illustrates an example process 1300 for providing resources for processor memory shared between processors, in accordance with at least one embodiment. In at least one embodiment, a processor such as processor 102, processor 112, processor 120, and/or processor 128 (described herein at least in connection with FIG. 1), executes instructions to perform example process 1300. In at least one embodiment, a processor such as one or more processors described herein in connection with FIGS. 21 to 52 executes instructions to perform example process 1300. In at least one embodiment, a memory manager such as memory manager 212 and/or memory manager 220, described herein at least in connection with FIG. 2 executes instructions to perform example process 1300.

In at least one embodiment, at step 1302 of example process 1300, a team that will use shared memory is identified, using systems and methods such as those described herein. In at least one embodiment, a team that will use shared memory is referred to as a team that will use multicast memory. In at least one embodiment, after step 1302, example process 1300 advances to step 1304.

In at least one embodiment, at step 1304 of example process 1300, it is determined whether a team that will use shared memory has been identified. In at least one embodiment, at step 1304, if it is determined that a team that will use shared memory has not been identified ("NO" branch), example process 1300 advances to step 1306. In at least one embodiment, at step 1304, if it is determined that a team that will use shared memory has been identified ("YES" branch), example process 1300 advances to step 1308.

In at least one embodiment, at step 1306 of example process 1300, an error is returned to a calling process such as primary node process 602, described herein at least in connection with FIG. 6, using systems and methods such as those described herein. In at least one embodiment, after step 1306, example process 1300 terminates.

In at least one embodiment, at step 1308 of example process 1300, hardware resources such as memory, processors, multicast slots, and/or other such resources are assigned to processes and/or processors of a team, as described herein. In at least one embodiment, for example, a process of team is provided with memory, a virtual address space, a shared memory map, one or more multicast slots, and/or other such resources. In at least one embodiment, after step 1308, example process 1300 advances to step 1310.

In at least one embodiment, at step 1310 of example process 1300, memory resources and/or other hardware resources are verified to ensure a process of a team may access shared memory. In at least one embodiment, after step 1310, example process 1300 advances to step 1312. In at least one embodiment, not shown in FIG. 13, if memory cannot be verified at step 1310, example process 1300 may continue at step 1306, as described above.

In at least one embodiment, at step 1312 of example process 1300, hardware resources assigned to processes of a team are programmed to enable and use shared memory, as described herein. In at least one embodiment, after step 1312, example process 1300 advances to step 1314.

In at least one embodiment, at step 1314 of example process 1300, software to perform shared memory operations is provided to a process of a team. In at least one embodiment, shared memory operations include store operations, load operations, load with reduction operations, atomic operations, atomic reduction operations, and/or other such operations. In at least one embodiment, after step 1314, example process 1300 advances to step 1316.

In at least one embodiment, a store operation is an operation that stores one or more values in a shared memory location. In at least one embodiment, a store operation may be referred to as a write operation. In at least one embodiment, for multicast memory, a store operation is executed by broadcasting a value to all associated physical memory locations, as described herein.

In at least one embodiment, a load operation is an operation that loads one or more values from a shared memory location. In at least one embodiment, a load operation may be referred to as a read operation. In at least one embodiment, for a multicast address, a load operation may designate a primary node and read from physical memory of a designated primary node.

In at least one embodiment, a load with reduction operation is an operation that loads one or more values from a shared memory location that corresponds to a plurality of physical memory locations such as a multicast address. In at least one embodiment, a load with reduction operation first reads values from a plurality of locations and then performs a "reduction" operation that combines and/or unifies values from a plurality of locations to a single set of one or more values. In at least one embodiment, a load with reduction operation may be referred to as an "ldgmc" operation.

In at least one embodiment, an atomic operation is an operation that combines one or more read/modify/write operations using a shared memory location into a single operation. In at least one embodiment, for a multicast address, a read (or load) portion of an atomic operation may designate a primary node and read from physical memory of a designated primary node.

In at least one embodiment, an atomic reduction operation is an operation that combines one or more read/modify/write operations using a shared memory location into a single operation. In at least one embodiment, for a multicast address, a read (or load) portion of an atomic reduction operation first reads values from a plurality of locations and then performs a "reduction" operation that combines and/or unifies values from a plurality of locations to a single set of one or more values. In at least one embodiment, read operations are not enabled for an atomic reduction operation so that no "reduction" operation is required. In such an embodiment, an atomic reduction operation is an operation that combines one or more modify/write operations using a shared memory location into a single operation In at least one embodiment, at step 1316 of example process 1300, an indication of success of example process 1300 is provided. In at least one embodiment, an indication of success of example process 1300 is provided to a calling process such as primary node process 602, described herein at least in connection with FIG. 6, using systems and methods such as those described herein. In at least one embodiment, after step 1316, example process 1300 terminates. In at least one embodiment, not shown in FIG. 13, after step 1316, example process 1300 continues at step 1302 to identify a new team.

In at least one embodiment, operations of example process 1300 illustrated in FIG. 13 are performed in a different order than illustrated in FIG. 13. In at least one embodiment, operations of example process 1300 illustrated in FIG. 131 are performed simultaneously (or in parallel). In at least one embodiment, operations of example process 1300 illustrated in FIG. 13 are performed by a plurality of threads executing on a processor such as one or more processors described herein in connection with FIGS. 21 to 52.

Figure 14:
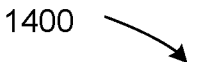
FIG. 14 illustrates an example computer system where memory is shared between processors, in accordance with at least one embodiment.

FIG. 14 illustrates an example computer system 1400 where memory is shared between processors, in accordance with at least one embodiment. In at least one embodiment, a process 1402 accesses memory 1404 using systems and methods such as those described herein. In at least one embodiment, process 1402 uses virtual address 1406 to access memory at physical address 1408 so that, for example, virtual address 1406 is a location in a virtual address space such as virtual address spaces described herein and physical address 1408 is a location in physical memory such as memory described herein. In at least one embodiment, memory corresponding to physical address 1408 is memory on a processor that is used to perform process 1402.

In at least one embodiment, process 1402 uses virtual address 1410. In at least one embodiment, virtual address 1410 is not a location that is used to access memory on a processor that is used to perform process 1402. In at least one embodiment, virtual address 1410 is a location that is used to access memory at physical address 1424, which is memory on a different processor than a processor that is used to perform process 1402. In at least one embodiment, a memory manager 1414 executing on switch 1412 provides a memory map 1416 that enables process 1402 to use virtual address 1410 to access memory at physical address 1424, using systems and methods such as those described herein.

In at least one embodiment, a process 1418 accesses memory 1420 using systems and methods such as those described herein. In at least one embodiment, process 1418 uses virtual address 1422 to access memory at physical address 1424 as memory described herein. In at least one embodiment, memory corresponding to physical address 1424 is memory on a processor that is used to perform process 1418.

In at least one embodiment, when process 1402 uses virtual address 1410 to, for example, store a value, that value is stored at a location in memory 1420 at physical address 1424. In at least one embodiment, process 1418 can use virtual address 1422 to read a value stored by process 1402 at physical address 1424 using systems and methods such as those described herein. In at least one embodiment, memory that operates as described in FIG. 14 is referred to as unicast memory.

Figure 15:
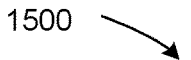
FIG. 15 illustrates an example computer system where multicast memory is shared between processors, in accordance with at least one embodiment.

FIG. 15 illustrates an example computer system 1500 where multicast memory is shared between processors, in accordance with at least one embodiment. In at least one embodiment, a process 1502 accesses memory 1504 using systems and methods such as those described herein. In at least one embodiment, process 1502 uses virtual address 1506 to access memory at physical address 1508 so that, for example, virtual address 1506 is a location in a virtual address space such as virtual address spaces described herein and physical address 1508 is a location in physical memory such as memory described herein. In at least one embodiment, memory corresponding to physical address 1508 is memory on a processor that is used to perform process 1502.

In at least one embodiment, process 1502 uses virtual address 1510. In at least one embodiment, virtual address 1510 is not a location that is used to access memory on a processor that is used to perform process 1502. In at least one embodiment, virtual address 1510 is a location that is used to access memory at physical address 1524, which is memory on a different processor than a processor that is used to perform process 1502. In at least one embodiment, a memory manager 1514 executing on switch 1512 provides a memory map 1516 that enables process 1502 to use virtual address 1510 to access memory at physical address 1524, using systems and methods such as those described herein.

In at least one embodiment, a process 1518 accesses memory 1520 using systems and methods such as those described herein. In at least one embodiment, process 1518 uses virtual address 1522 to access memory at physical address 1524 as memory described herein. In at least one embodiment, memory corresponding to physical address 1524 is memory on a processor that is used to perform process 1518.

In at least one embodiment, when process 1502 uses virtual address 1510 to, for example, store a value, that value is stored at a location in memory 1520 at physical address 1524. In at least one embodiment, process 1518 can use virtual address 1522 to read a value stored by process 1502 at physical address 1524 using systems and methods such as those described herein.

In at least one embodiment, process 1502 uses a shared virtual address 1526 that is a location in a shared memory map 1530. In at least one embodiment, shared virtual address 1526 in shared memory map 1530 corresponds to physical address 1508 in memory 1504. In at least one embodiment, shared virtual address 1526 in shared memory map 1530 also corresponds to physical address 1524 in memory 1520. In at least one embodiment, process 1518 uses a shared virtual address 1528 that is a location in a shared memory map 1530. In at least one embodiment, shared virtual address 1528 in shared memory map 1530 is identical to shared virtual address 1526. In at least one embodiment, shared virtual address 1528 in shared memory map 1530 corresponds to physical address 1508 in memory 1504. In at least one embodiment, shared virtual address 1526 in shared memory map 1530 also corresponds to physical address 1524 in memory 1520.

In at least one embodiment, if process 1502 uses shared virtual address 1526 to, for example, store a value, that value is stored in physical address 1508 and is also stored in physical address 1524. In at least one embodiment, if process 1518 uses shared virtual address 1528 to, for example, store a value, that value is stored in physical address 1508 and is also stored in physical address 1524. In at least one embodiment, process 1502 may also use virtual address 1506 to access memory at physical address 1508 and process 1518 may also use virtual address 1522 to access memory at physical address 1524. In at least one embodiment, memory that operates as described in FIG. 15 is referred to as multicast memory.

FIG. 16 illustrates an example application programming interface (API) 1600 to cause shared virtual memory to be allocated for use by a plurality of processors, in accordance with at least one embodiment. In at least one embodiment, a create memory handle API 1602 is an API to cause shared virtual memory to be allocated for use by a plurality of processors, using systems and methods such as those described herein. In at least one embodiment, create memory handle API 1602 receives one or more parameters including, but not limited to, a memory location 1604, an allocation size 1606, a set of properties 1608, and/or a number of processors 1610. In at least one embodiment, create memory handle API 1602 returns a success indicator 1618 to a calling process as described herein.

In at least one embodiment, memory location 1604 is a location in memory associated with a calling process such as primary node process 602 that may be used to return a memory handle created by create memory handle API 1602. In at least one embodiment, memory location is not specified and, in such an embodiment, a memory handle may be returned to a calling process using some other method such as, for example, a return value.

In at least one embodiment, allocation size 1606 is a size of memory to be associated with a memory handle created by create memory handle API 1602. In at least one embodiment, for example, allocation size 1606 may be used to specify that memory associated with a memory handle created by create memory handle API 1602 should include at least 1 GB of memory. In at least one embodiment, allocation size 1606 is specified in units such as bytes, kilobytes, megabytes, gigabytes, etc. In at least one embodiment, allocation size 1606 is specified in units such as a number of memory pages. In at least one embodiment, allocation size 1606 is not specified and, in such an embodiment, a default size may be used by create memory handle API 1602.

In at least one embodiment, properties 1608 includes one or more properties use to specify one or more parameters of a memory handle created by create memory handle API 1602 and/or memory associated with a memory handle created by create memory handle API 1602. In at least one embodiment, for example, properties 1608 may specify that a memory handle created by create memory handle API 1602 is read-only, or is to be created in a specified location, or is for memory of a certain type. In at least one embodiment, properties 1608 are not specified and, in such an embodiment, a default set of properties may be used by create memory handle API 1602.

In at least one embodiment, number of processors 1610 is a number of processors that will be associated with a memory handle created by create memory handle API 1602. In at least one embodiment, for example, number of processors 1610 is an indication that eight processors will be given access to a memory handle created by create memory handle API 1602. In at least one embodiment, not shown in FIG. 16, a number of processes (which may be different from number of processors 1610) is provided to create memory handle API 1602. In at least one embodiment, number of processors 1610 is not specified and, in such an embodiment, a default number of processors may be used by create memory handle API 1602.

In at least one embodiment, create memory handle API 1602 executes one or more commands to create a memory handle 1612 and to store a created memory handle in a memory location 1614 specified by memory location 1604 using systems and methods such as those described herein. In at least one embodiment, create memory handle API 1602 than returns an indication of success or failure 1616 using success indicator 1618. In at least one embodiment, if create memory handle API 1602 is able to create a memory handle 1612 and store a created memory handle in a memory location 1614, create memory handle API 1602 returns an indication of success using success indicator 1618. In at least one embodiment, if create memory handle API 1602 is not able to create a memory handle 1612 and/or is not able to store a created memory handle in a memory location 1614, create memory handle API 1602 returns an indication of failure using success indicator 1618. In at least one embodiment, success indicator 1618 is returned to a calling process such as primary node process 602, described herein at least in connection with FIG. 6. In at least one embodiment, success indicator 1618 is returned to a calling process using an integer value, or using a Boolean value, or using an enumerated value, or using a flag, or using a signal, or using a semaphore, or using an event, or using a combination of these and/or other such return value types.

FIG. 17 illustrates an example application programming interface (API) 1700 to cause physical memory corresponding to shared virtual memory to be designated for use by a plurality of processors, in accordance with at least one embodiment. In at least one embodiment, a bind memory to memory handle API 1702 is an API to cause physical memory corresponding to shared virtual memory to be designated for use by a plurality of processors, using systems and methods such as those described herein. In at least one embodiment, bind memory to memory handle API 1702 receives one or more parameters including, but not limited to, a memory handle 1704, a physical memory location 1706, and/or a set of flags 1708. In at least one embodiment, bind memory to memory handle API 1702 returns a success indicator 1714 to a calling process as described herein.

In at least one embodiment, memory handle 1704 is a memory handle created by, for example, create memory handle API 1602, described herein at least in connection with FIG. 16. In at least one embodiment, physical memory location 1706 is a memory location in physical memory that will be bound to memory handle 1704. In at least one embodiment, physical memory 1706 is memory that includes at least as much memory as allocation size 1606, described herein at least in connection with FIG. 16. In at least one embodiment, for example, if allocation size 1606 specifies 1 GB, physical memory location 1706 includes at least 1 GB of memory that may be bound to memory handle 1704 by bind memory to memory handle API 1702.

In at least one embodiment, flags 1708 specifies one or more flags that specify one or more parameters of memory at physical memory location 1706 and/or specify one or more parameters of how memory at physical memory location 1706 will be bound to memory handle 1704 by bind memory to memory handle API 1702. In at least one embodiment, flags 1708 are not specified and, in such an embodiment, a default set of flags may be used by bind memory to memory handle API 1702.

In at least one embodiment, bind memory to memory handle API 1702 executes one or more commands to bind physical memory 1710 at physical memory location 1706 to memory handle 1704 using systems and methods such as those described herein. In at least one embodiment, bind memory to memory handle API 1702 then returns an indication of success or failure 1712 using success indicator 1714. In at least one embodiment, if bind memory to memory handle API 1702 is able to bind physical memory 1710 at physical memory location 1706 to memory handle 1704, bind memory to memory handle API 1702 returns an indication of success using success indicator 1714. In at least one embodiment, if bind memory to memory handle API 1702 is not able to bind physical memory 1710 at physical memory location 1706 to memory handle 1704, bind memory to memory handle API 1702 returns an indication of failure using success indicator 1714. In at least one embodiment, success indicator 1714 is returned to a calling process such as primary node process 602, described herein at least in connection with FIG. 6. In at least one embodiment, success indicator 1714 is returned to a calling process using an integer value, or using a Boolean value, or using an enumerated value, or using a flag, or using a signal, or using a semaphore, or using an event, or using a combination of these and/or other such return value types.

FIG. 18 illustrates an example application programming interface (API) 1800 to enable access to shared virtual memory by a plurality of process, in accordance with at least one embodiment. In at least one embodiment, an enable access to memory handle API 1802 is an API to enable access to shared virtual memory by a plurality of processors, using systems and methods such as those described herein. In at least one embodiment, enable access to memory handle API 1802 receives one or more parameters including, but not limited to, a memory handle 1804, an allocation size 1806, a sharing descriptor 1808, and/or a number of processors 1810. In at least one embodiment, enable access to memory handle API 1802 returns a success indicator 1816 to a calling process as described herein.

In at least one embodiment, memory handle 1804 is a memory handle created by, for example, create memory handle API 1602, described herein at least in connection with FIG. 16. In at least one embodiment, allocation size 1806 is an allocation size such as allocation size 1606, described herein at least in connection with FIG. 16. In at least one embodiment, sharing descriptor 1808 is a data structure that allows processes to access memory associated with memory handle 1804 to access shared virtual memory. In at least one embodiment, sharing descriptor 1808 is a data structure that includes a shared memory handle so that a shared memory handle can be shared between processors and/or processes using systems and methods such as those described herein. In at least one embodiment, number of processors 1810 is a number of processors that are associated with a memory handle created by, for example, create memory handle API 1602, as described herein at least in connection with FIG. 16. In at least one embodiment, number of processors 1810 is a number of processors that completed binding using, for example, bind memory to memory handle API 1702 described herein at least in connection with FIG. 16.

In at least one embodiment, not shown in FIG. 18, enable access to memory handle API 1802 receives one or more additional parameters and/or of flags that specify how a memory handle such as memory handle 1804 will be enabled. In at least one embodiment, when one or more additional parameters and/or flags that specify how memory handle 1804 will be enabled, a default set of parameters and/or flags may be used by enable access to memory handle API 1802 to specify how memory handle 1804 will be enabled.

In at least one embodiment, enable access to memory handle API 1802 executes one or more commands to wait until number of processors is satisfied 1812. In at least one embodiment, enable access to memory handle API 1802 executes one or more commands to wait until number of processors is satisfied 1812 by, for example, executing a first command to determine how many processors have enabled access to memory handle 1804 by providing backing physical memory using bind memory to memory handle API 1702, as described herein at least in connection with FIG. 17. In at least one embodiment, enable access to memory handle API 1802 executes one or more commands to wait until number of processors is satisfied 1812 by, for example, executing a second command to determine if a number of processors that have enabled access to memory handle 1804 is at least equal to a number of processors 1810. In at least one embodiment, if enable access to memory handle API 1802 determines that a number of processors that have enabled access to memory handle 1804 is not at least equal to a number of processors 1810, enable access to memory handle API 1802 continues to wait until number of processors is satisfied 1812. In at least one embodiment, not shown in FIG. 18, if enable access to memory handle API 1802 determines that a number of processors that have enabled access to memory handle 1804 is not at least equal to a number of processors 1810, after an amount of time has elapsed, enable access to memory handle API 1802 may return an indication of failure at return success or failure 1814, using success indicator 1816.

In at least one embodiment, if enable access to memory handle API 1802 determines that a number of processors that have enabled access to memory handle 1804 is at least equal to a number of processors 1810, enable access to memory handle API 1802 returns an indication of success at return success or failure 1814, using success indicator 1816. In at least one embodiment, enable access to memory handle API 1802 returns success indicator 1816 to a calling process such as primary node process 602 described herein at least in connection with FIG. 6 and/or to a calling process such as secondary node process 616, also described herein at least in connection with FIG. 6. In at least one embodiment, success indicator 1816 is returned to a calling process using an integer value, or using a Boolean value, or using an enumerated value, or using a flag, or using a signal, or using a semaphore, or using an event, or using a combination of these and/or other such return value types.

FIG. 19 illustrates an example application programming interface (API) 1900 to cause physical memory corresponding to shared virtual memory to be undesignated for use by a plurality of processors, in accordance with at least one embodiment. In at least one embodiment, an unbind memory from memory handle API 1902 is an API to cause physical memory corresponding to shared virtual memory to be undesignated for use by a plurality of processors. In at least one embodiment, unbind memory from memory handle API 1902 receives one or more parameters including, but not limited to, a memory handle 1904 and/or a physical memory location 1906. In at least one embodiment, unbind memory from memory handle API 1902 returns a success indicator 1912 to a calling process as described herein.

In at least one embodiment, memory handle 1904 is a memory handle created by, for example, create memory handle API 1602, described herein at least in connection with FIG. 16. In at least one embodiment, physical memory location is a physical memory location bound to a memory handle such as memory handle 1904, using bind memory to memory handle API 1702, as described herein at least in connection with FIG. 17.

In at least one embodiment, not shown in FIG. 19, unbind memory from memory handle API 1902 receives one or more additional parameters and/or of flags that specify how physical memory at a physical memory location such as physical memory location 1906 will be unbound from a memory handle such as memory handle 1904. In at least one embodiment, when one or more additional parameters and/or flags that specify how memory at physical memory location 1906 will be unbound from memory handle 1904, a default set of parameters and/or flags may be used by unbind memory from memory handle API 1902 to specify how memory at physical memory location 1906 will be unbound from memory handle 1904.

In at least one embodiment, unbind memory from memory handle API 1902 executes one or more commands to unbind memory 1908 at physical memory location 1906 from memory handle 1904. In at least one embodiment, not shown in FIG. 19, unbind memory from memory handle API 1902 executes one or more commands to determine whether all processors that bound physical memory to memory handle 1904 using, for example, bind memory to memory handle API 1702 have performed unbind memory from memory handle API 1902. In at least one embodiment, if all processors that bound physical memory to memory handle 1904 have performed unbind memory from memory handle API 1902, one or more commands may be executed to release allocated resources associated with memory handle 1904. In at least one embodiment, for example, unbind memory from memory handle API 1902 may determine whether all processors that bound physical memory to memory handle 1904 have performed unbind memory from memory handle API 1902 based, at least in part, on a reference count of processors that have access to memory handle 1904. In at least one embodiment, for example, unbind memory from memory handle API 1902 may determine whether all processors that bound physical memory to memory handle 1904 have performed unbind memory from memory handle API 1902 based, at least in part, on a number of processors such as number of processors 1610, described herein at least in connection with FIG. 16.

In at least one embodiment, when unbind memory from memory handle API 1902 completes one or more commands to unbind memory 1908 at physical memory location 1906 from memory handle 1904, unbind memory from memory handle API 1902 returns an indication of success at return success or failure 1910, using success indicator 1912. In at least one embodiment, if unbind memory from memory handle API 1902 is able to unbind memory 1908 at physical memory location 1906 from memory handle 1904, unbind memory from memory handle API 1902 returns an indication of success using success indicator 1912. In at least one embodiment, if unbind memory from memory handle API 1902 is not able to unbind memory 1908 at physical memory location 1906 from memory handle 1904, unbind memory from memory handle API 1902 returns an indication of failure using success indicator 1912.

In at least one embodiment unbind memory from memory handle API 1902 returns success indicator 1912 to a calling process such as primary node process 602 described herein at least in connection with FIG. 6 and/or to a calling process such as secondary node process 616, also described herein at least in connection with FIG. 6. In at least one embodiment, success indicator 1912 is returned to a calling process using an integer value, or using a Boolean value, or using an enumerated value, or using a flag, or using a signal, or using a semaphore, or using an event, or using a combination of these and/or other such return value types.

Figure 20:
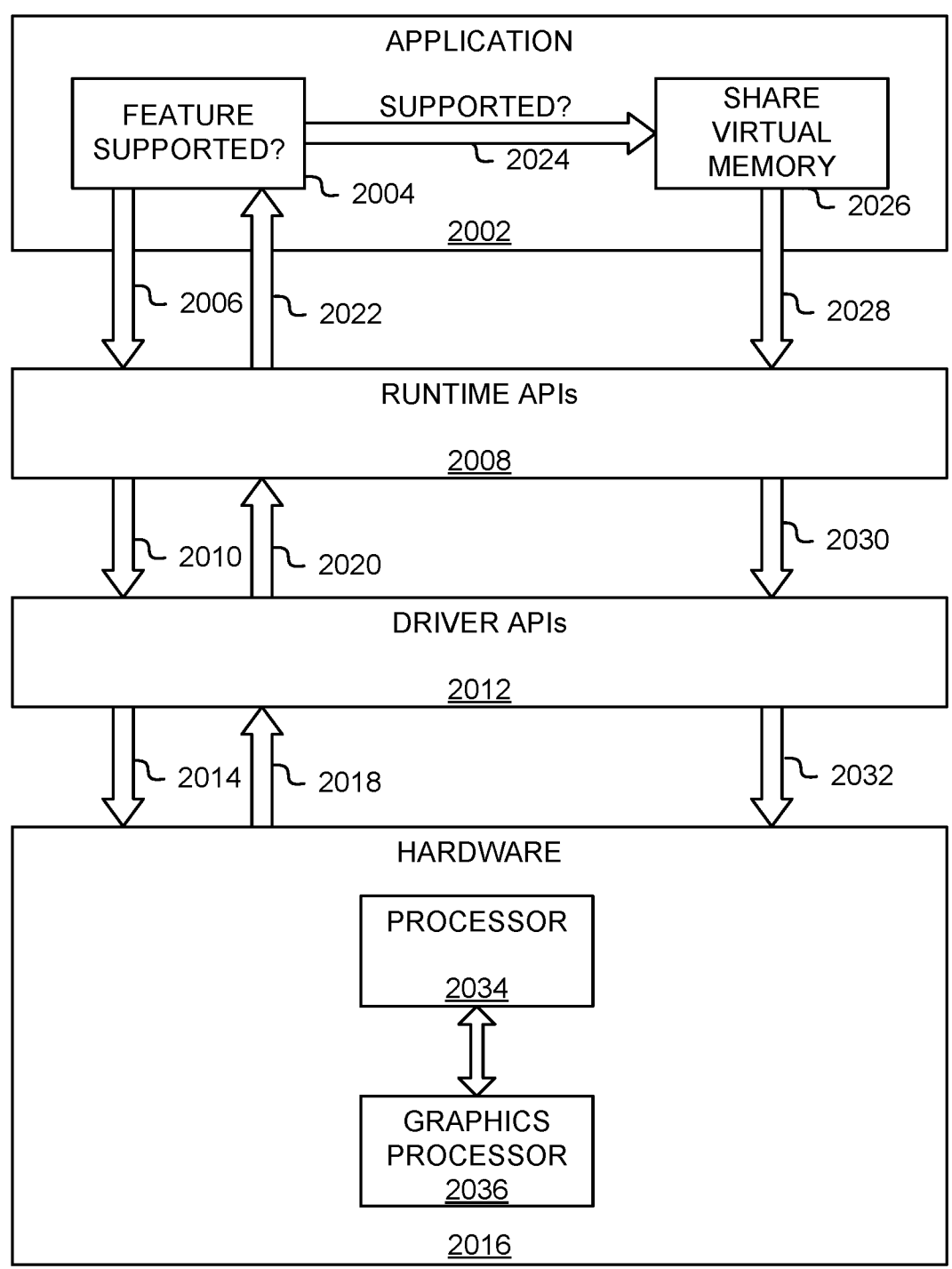
FIG. 20 illustrates an example software stack where application processing interface calls to are processed, in accordance with at least one embodiment.

FIG. 20 illustrates an example software stack 2000 where application processing interface calls to are processed, in accordance with at least one embodiment. In at least one embodiment, example software stack 2000 is at least a part of a software stack such as software stack 208 and/or software stack 216, described herein at least in connection with FIG. 2. In at least one embodiment, an application 2002 executes a command to determine if a feature 2004 is supported. In at least one embodiment, an application 2002 executes a command to determine if feature 2004 to share virtual memory is supported. In at least one embodiment, application 2002 executes a command to determine if feature 2004 to perform an API to cause shared virtual memory to be allocated for use by a plurality of processors, is supported. In at least one embodiment, application 2002 executes a command to determine if feature 2004 to perform an API to cause physical memory corresponding to shared virtual memory to be designated for use by a plurality of processors, is supported. In at least one embodiment, application 2002 executes a command to determine if feature 2004 to perform an API to enable access to shared virtual memory by a plurality of processors, is supported. In at least one embodiment, application 2002 executes a command to determine if feature 2004 to perform an API to cause physical memory corresponding to shared virtual memory to be undesignated for use by a plurality of processors.

In at least one embodiment, application 2002 uses 2006 one or more runtime APIs 2008 to determine if feature 2004 is supported. In at least one embodiment, runtime APIs 2008 use 2010 one or more driver APIs 2012 to determine if feature 2004 is supported. In at least one embodiment, not shown in FIG. 20, application 2002 uses one or more driver APIs 2012 to determine if feature 2004 is supported. In at least one embodiment, driver APIs 2012 query 2014 computer system hardware 2016 to determine if feature 2004 is supported.

In at least one embodiment, computer system hardware 2016 determines if feature 2004 is supported by a processor 2034, by querying a set of capabilities associated with processor 2034. In at least one embodiment, computer system hardware 2016 determines if a feature 2004 is supported by processor 2034, using an operating system of processor 2034. In at least one embodiment, computer system hardware 2016 determines if feature is supported by a graphics processor 2036 by querying a set of capabilities associated with graphics processor 2036. In at least one embodiment, computer system hardware 2016 determines if feature 2004 is supported by graphics processor 2036 using an operating system of processor 2034. In at least one embodiment, computer system hardware 2016 determines if feature 2004 is supported by graphics processor 2036, using an operating system of graphics processor 2036.

In at least one embodiment, after computer system hardware 2016 determines whether feature 2004 to cause data to be accessed from one or more first shared physical memory locations based, at least in part, on one or more virtual addresses corresponding to one or more second shared physical memory locations, is supported, computer system hardware 2016 returns 2018 a determination result using driver APIs 2012, which may return 2020 a determination result using runtime APIs 2008, which may return 2022 a determination result to application 2002. In at least one embodiment, if application 2002 receives a determination result that indicates that feature 2004 is supported 2024, application 2002 shares virtual memory 2026 using systems and methods such as those described herein. In at least one embodiment, application 2002 shares virtual memory 2026 using 2028 runtime APIs 2008. In at least one embodiment, runtime APIs 2008 shares virtual memory 2026 using 2030 driver APIs 2012. In at least one embodiment, not shown in FIG. 20, application 2002 shares virtual memory 2026 using 2030 driver APIs 2012. In at least one embodiment, driver APIs 2012 shares virtual memory 2026 using 2032 computer system hardware 2016.

In the following description, numerous specific details are set forth to provide a more thorough understanding of at least one embodiment. However, it will be apparent to one skilled in the art that the inventive concepts may be practiced without one or more of these specific details.

Data Center

FIG. 21 illustrates an exemplary data center 2100, in accordance with at least one embodiment. In at least one embodiment, data center 2100 includes, without limitation, a data center infrastructure layer 2110, a framework layer 2120, a software layer 2130 and an application layer 2140.

In at least one embodiment, as shown in FIG. 21, data center infrastructure layer 2110 may include a resource orchestrator 2112, grouped computing resources 2114, and node computing resources ("node C.R.s") 2116(1)-2116(N), where "N" represents any whole, positive integer. In at least one embodiment, node C.R.s 2116(1)-2116(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 2116(1)-2116(N) may be a server having one or more of above-mentioned computing resources.

In at least one embodiment, grouped computing resources 2114 may include separate groupings of node C.R.s housed within one or more racks (not shown), or many racks housed in data centers at various geographical locations (also not shown). Separate groupings of node C.R.s within grouped computing resources 2114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 2112 may configure or otherwise control one or more node C.R.s 2116(1)-2116(N) and/or grouped computing resources 2114. In at least one embodiment, resource orchestrator 2112 may include a software design infrastructure ("SDI") management entity for data center 2100. In at least one embodiment, resource orchestrator 2112 may include hardware, software or some combination thereof.

In at least one embodiment, as shown in FIG. 21, framework layer 2120 includes, without limitation, a job scheduler 2132, a configuration manager 2134, a resource manager

2136 and a distributed file system 2138. In at least one embodiment, framework layer 2120 may include a framework to support software 2152 of software layer 2130 and/or one or more application(s) 2142 of application layer 2140. In at least one embodiment, software 2152 or application(s) 2142 may respectively include web-based service software or applications, such as those provided by Amazon Web Services, Google Cloud and Microsoft Azure. In at least one embodiment, framework layer 2120 may be, but is not limited to, a type of free and open-source software web application framework such as Apache Spark™ (hereinafter "Spark") that may utilize distributed file system 2138 for large-scale data processing (e.g., "big data"). In at least one embodiment, job scheduler 2132 may include a Spark driver to facilitate scheduling of workloads supported by various layers of data center 2100. In at least one embodiment, configuration manager 2134 may be capable of configuring different layers such as software layer 2130 and framework layer 2120, including Spark and distributed file system 2138 for supporting large-scale data processing. In at least one embodiment, resource manager 2136 may be capable of managing clustered or grouped computing resources mapped to or allocated for support of distributed file system 2138 and job scheduler 2132. In at least one embodiment, clustered or grouped computing resources may include grouped computing resource 2114 at data center infrastructure layer 2110. In at least one embodiment, resource manager 2136 may coordinate with resource orchestrator 2112 to manage these mapped or allocated computing resources.

In at least one embodiment, software 2152 included in software layer 2130 may include software used by at least portions of node C.R.s 2116(1)-2116(N), grouped computing resources 2114, and/or distributed file system 2138 of framework layer 2120. One or more types of software may include, but are not limited to, Internet web page search software, e-mail virus scan software, database software, and streaming video content software.

In at least one embodiment, application(s) 2142 included in application layer 2140 may include one or more types of applications used by at least portions of node C.R.s 2116(1)-2116(N), grouped computing resources 2114, and/or distributed file system 2138 of framework layer 2120. In at least one or more types of applications may include, without limitation, CUDA applications.

In at least one embodiment, any of configuration manager 2134, resource manager 2136, and resource orchestrator 2112 may implement any number and type of self-modifying actions based on any amount and type of data acquired in any technically feasible fashion. In at least one embodiment, self-modifying actions may relieve a data center operator of data center 2100 from making possibly bad configuration decisions and possibly avoiding underutilized and/or poor performing portions of a data center.

In at least one embodiment, at least one component shown or described with respect to FIG. 21 is used to implement techniques and/or functions described in connection with FIGS. 1-20. In at least one embodiment, at least one of grouped computing resources 2114 and node C.R. 2116(1-N) is used to perform an API to cause shared virtual memory to be allocated for use by a plurality of processors. In at least one embodiment, at least one of grouped computing resources 2114 and node C.R. 2116(1-N) is used to perform an API to cause physical memory corresponding to shared virtual memory to be designated for use by a plurality of processors. In at least one embodiment, at least one of grouped computing resources 2114 and node C.R. 2116(1-

N) is used to perform an API to enable access to shared virtual memory by a plurality of processors. In at least one embodiment, at least one of grouped computing resources 2114 and node C.R. 2116(1-N) is used to perform an API to cause physical memory corresponding to shared virtual memory to be undesignated for use by a plurality of processors. In at least one embodiment, at least one of grouped computing resources 2114 and node C.R. 2116(1-N) is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Computer-Based Systems

The following figures set forth, without limitation, exemplary computer-based systems that can be used to implement at least one embodiment.

Figure 22:
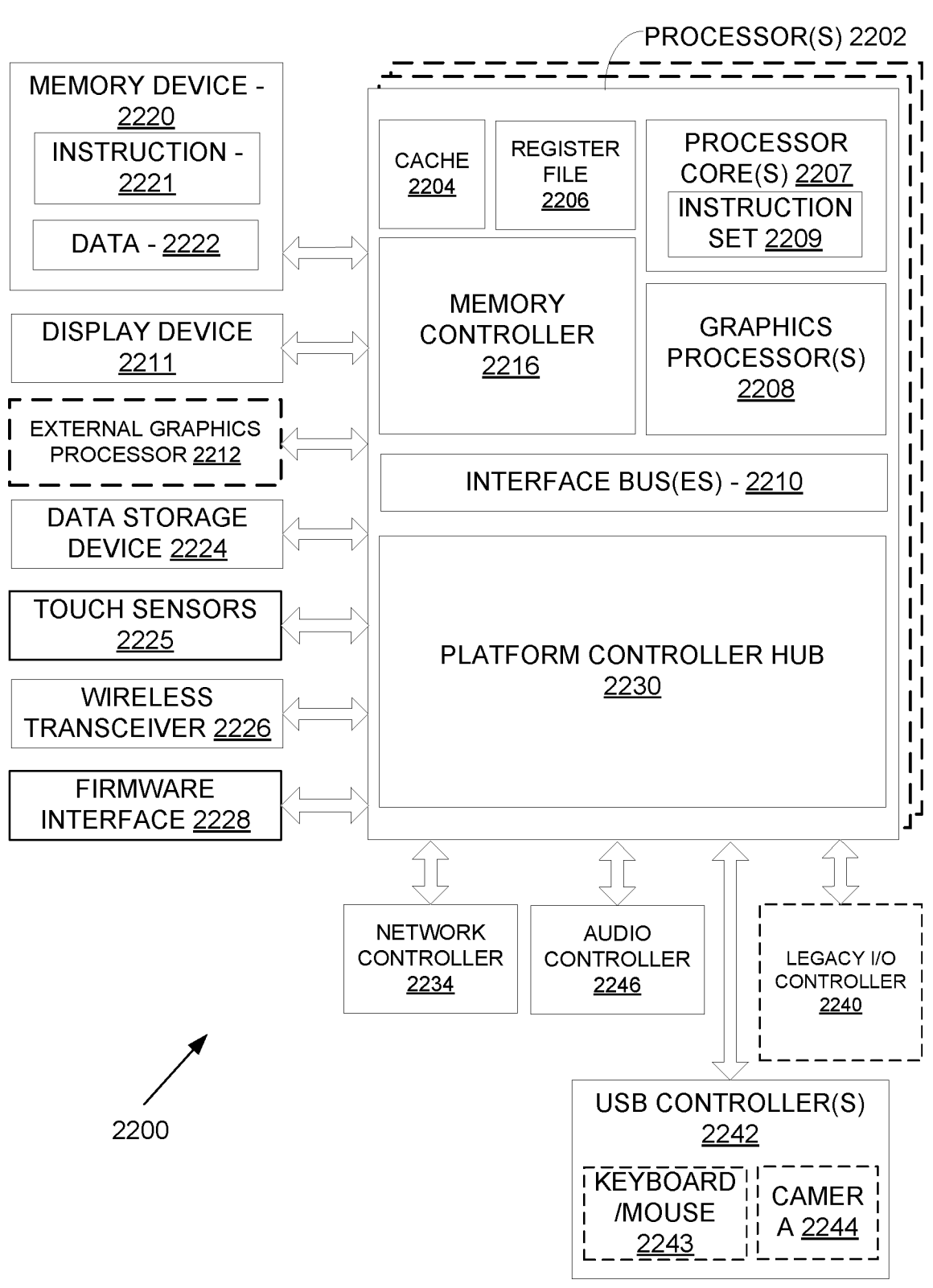
FIG. 22 illustrates a processing system, in accordance with at least one embodiment.

FIG. 22 illustrates a processing system 2200, in accordance with at least one embodiment. In at least one embodiment, processing system 2200 includes one or more processors 2202 and one or more graphics processors 2208, and may be a single processor desktop system, a multiprocessor workstation system, or a server system having a large number of processors 2202 or processor cores 2207. In at least one embodiment, processing system 2200 is a processing platform incorporated within a system-on-a-chip ("SoC") integrated circuit for use in mobile, handheld, or embedded devices.

In at least one embodiment, processing system 2200 can include, or be incorporated within a server-based gaming platform, a game console, a media console, a mobile gaming console, a handheld game console, or an online game console. In at least one embodiment, processing system 2200 is a mobile phone, smart phone, tablet computing device or mobile Internet device. In at least one embodiment, processing system 2200 can also include, couple with, or be integrated within a wearable device, such as a smart watch wearable device, smart eyewear device, augmented reality device, or virtual reality device. In at least one embodiment, processing system 2200 is a television or set top box device having one or more processors 2202 and a graphical interface generated by one or more graphics processors 2208.

In at least one embodiment, one or more processors 2202 each include one or more processor cores 2207 to process instructions which, when executed, perform operations for system and user software. In at least one embodiment, each of one or more processor cores 2207 is configured to process a specific instruction set 2209. In at least one embodiment, instruction set 2209 may facilitate Complex Instruction Set Computing ("CISC"), Reduced Instruction Set Computing ("RISC"), or computing via a Very Long Instruction Word ("VLIW"). In at least one embodiment, processor cores 2207 may each process a different instruction set 2209, which may include instructions to facilitate emulation of other instruction sets. In at least one embodiment, processor core 2207 may also include other processing devices, such as a digital signal processor ("DSP").

In at least one embodiment, processor 2202 includes cache memory ('cache') 2204. In at least one embodiment, processor 2202 can have a single internal cache or multiple levels of internal cache. In at least one embodiment, cache memory is shared among various components of processor 2202. In at least one embodiment, processor 2202 also uses an external cache (e.g., a Level 3 ("L3") cache or Last Level Cache ("LLC")) (not shown), which may be shared among processor cores 2207 using known cache coherency techniques. In at least one embodiment, register file 2206 is additionally included in processor 2202 which may include different types of registers for storing different types of data (e.g., integer registers, floating point registers, status registers, and an instruction pointer register). In at least one embodiment, register file 2206 may include general-purpose registers or other registers.

In at least one embodiment, one or more processor(s) 2202 are coupled with one or more interface bus(es) 2210 to transmit communication signals such as address, data, or control signals between processor 2202 and other components in processing system 2200. In at least one embodiment interface bus 2210, in one embodiment, can be a processor bus, such as a version of a Direct Media Interface ("DMI") bus. In at least one embodiment, interface bus 2210 is not limited to a DMI bus, and may include one or more Peripheral Component Interconnect buses (e.g., "PCI," PCI Express ("PCIe")), memory buses, or other types of interface buses. In at least one embodiment processor(s) 2202 include an integrated memory controller 2216 and a platform controller hub 2230. In at least one embodiment, memory controller 2216 facilitates communication between a memory device and other components of processing system 2200, while platform controller hub ("PCH") 2230 provides connections to Input/Output ("I/O") devices via a local I/O bus.

In at least one embodiment, memory device 2220 can be a dynamic random access memory ("DRAM") device, a static random access memory ("SRAM") device, flash memory device, phase-change memory device, or some other memory device having suitable performance to serve as processor memory. In at least one embodiment memory device 2220 can operate as system memory for processing system 2200, to store data 2222 and instructions 2221 for use when one or more processors 2202 executes an application or process. In at least one embodiment, memory controller 2216 also couples with an optional external graphics processor 2212, which may communicate with one or more graphics processors 2208 in processors 2202 to perform graphics and media operations. In at least one embodiment, a display device 2211 can connect to processor(s) 2202. In at least one embodiment display device 2211 can include one or more of an internal display device, as in a mobile electronic device or a laptop device or an external display device attached via a display interface (e.g., DisplayPort, etc.). In at least one embodiment, display device 2211 can include a head mounted display ("HMD") such as a stereoscopic display device for use in virtual reality ("VR") applications or augmented reality ("AR") applications.

In at least one embodiment, platform controller hub 2230 enables peripherals to connect to memory device 2220 and processor 2202 via a high-speed I/O bus. In at least one embodiment, I/O peripherals include, but are not limited to, an audio controller 2246, a network controller 2234, a firmware interface 2228, a wireless transceiver 2226, touch sensors 2225, a data storage device 2224 (e.g., hard disk drive, flash memory, etc.). In at least one embodiment, data storage device 2224 can connect via a storage interface (e.g., SATA) or via a peripheral bus, such as PCI, or PCIe. In at least one embodiment, touch sensors 2225 can include touch screen sensors, pressure sensors, or fingerprint sensors. In at least one embodiment, wireless transceiver 2226 can be a Wi-Fi transceiver, a Bluetooth transceiver, or a mobile network transceiver such as a 3G, 4G, or Long Term Evolution ("LTE") transceiver. In at least one embodiment, firmware interface 2228 enables communication with system firmware, and can be, for example, a unified extensible firmware interface ("UEFI"). In at least one embodiment, network controller 2234 can enable a network connection to a wired network. In at least one embodiment, a high-performance network controller (not shown) couples with interface bus 2210. In at least one embodiment, audio controller 2246 is a multi-channel high definition audio controller. In at least one embodiment, processing system 2200 includes an optional legacy I/O controller 2240 for coupling legacy (e.g., Personal System 2 ("PS/2")) devices to processing system 2200. In at least one embodiment, platform controller hub 2230 can also connect to one or more Universal Serial Bus ("USB") controllers 2242 connect input devices, such as keyboard and mouse 2243 combinations, a camera 2244, or other USB input devices.

In at least one embodiment, an instance of memory controller 2216 and platform controller hub 2230 may be integrated into a discreet external graphics processor, such as external graphics processor 2212. In at least one embodiment, platform controller hub 2230 and/or memory controller 2216 may be external to one or more processor(s) 2202. For example, in at least one embodiment, processing system 2200 can include an external memory controller 2216 and platform controller hub 2230, which may be configured as a memory controller hub and peripheral controller hub within a system chipset that is in communication with processor(s) 2202.

In at least one embodiment, at least one component shown or described with respect to FIG. 22 is used to implement techniques and/or functions described in connection with FIGS. 1-20. In at least one embodiment, at least one of processor(s) 2202 or external graphics processor 2212 is used to perform an API to cause shared virtual memory to be allocated for use by a plurality of processors. In at least one embodiment, at least one of processor(s) 2202 or external graphics processor 2212 is used to perform an API to cause physical memory corresponding to shared virtual memory to be designated for use by a plurality of processors. In at least one embodiment, at least one of processor(s) 2202 or external graphics processor 2212 is used to perform an API to enable access to shared virtual memory by a plurality of processors. In at least one embodiment, at least one of processor(s) 2202 or external graphics processor 2212 is used to perform an API to cause physical memory corresponding to shared virtual memory to be undesignated for use by a plurality of processors. In at least one embodiment, at least one of processor(s) 2202 or external graphics processor 2212 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system

1500, example API 1600, example API 1700, example API 1800, example API 1900, and/or example software stack 2000.

Figure 23:
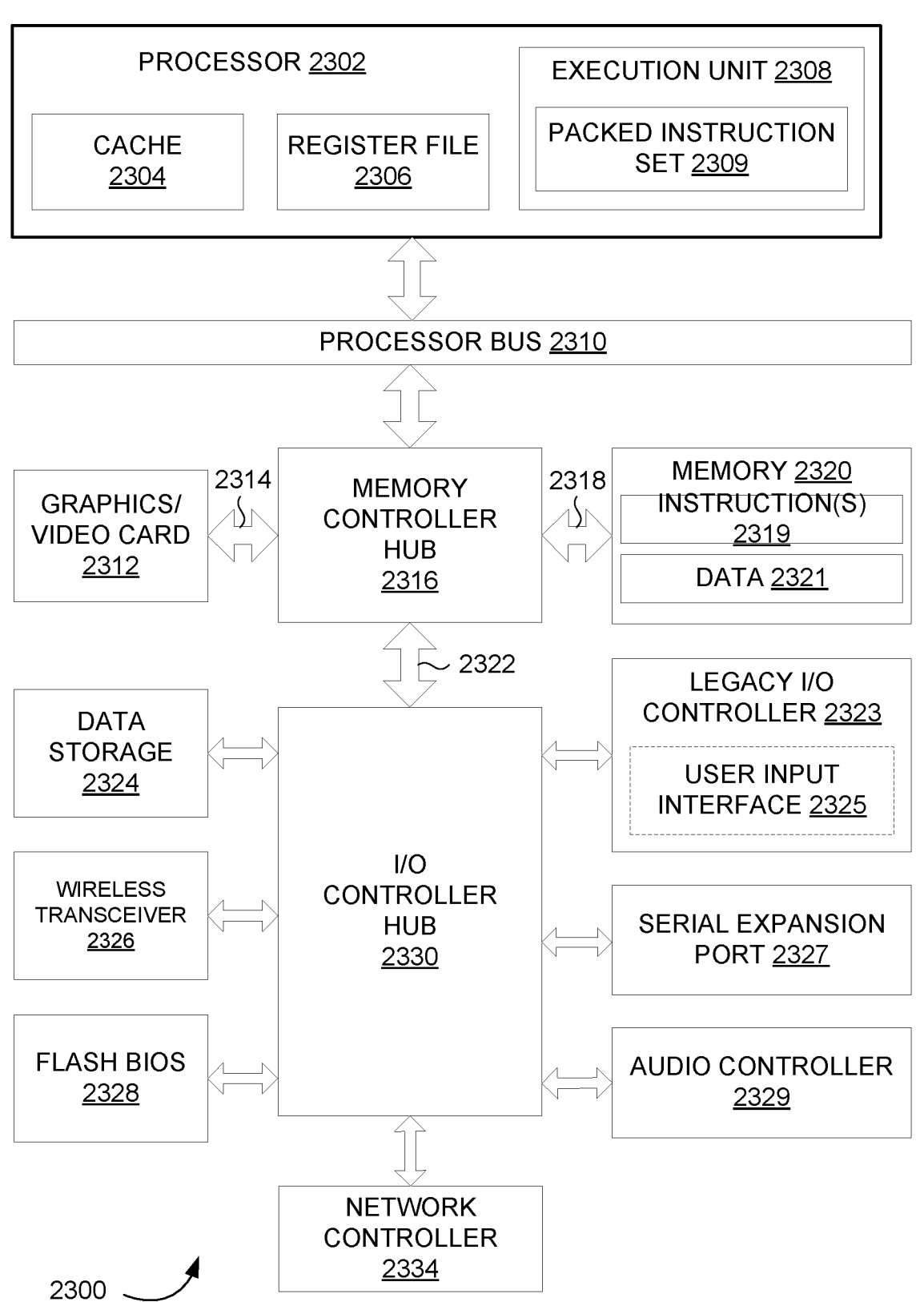
FIG. 23 illustrates a computer system, in accordance with at least one embodiment.

FIG. 23 illustrates a computer system 2300, in accordance with at least one embodiment. In at least one embodiment, computer system 2300 may be a system with interconnected devices and components, an SOC, or some combination. In at least on embodiment, computer system 2300 is formed with a processor 2302 that may include execution units to execute an instruction. In at least one embodiment, computer system 2300 may include, without limitation, a component, such as processor 2302 to employ execution units including logic to perform algorithms for processing data. In at least one embodiment, computer system 2300 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2300 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 2300 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), an SoC, network computers ("NetPCs"), set-top boxes, network hubs, wide area network ("WAN") switches, or any other system that may perform one or more instructions.

In at least one embodiment, computer system 2300 may include, without limitation, processor 2302 that may include, without limitation, one or more execution units 2308 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 2300 is a single processor desktop or server system. In at least one embodiment, computer system 2300 may be a multiprocessor system. In at least one embodiment, processor 2302 may include, without limitation, a CISC microprocessor, a RISC microprocessor, a VLIW microprocessor, a processor implementing a combination of instruction sets, or any other processor device, such as a digital signal processor, for example. In at least one embodiment, processor 2302 may be coupled to a processor bus 2310 that may transmit data signals between processor 2302 and other components in computer system 2300.

In at least one embodiment, processor 2302 may include, without limitation, a Level 1 ("L1") internal cache memory ("cache") 2304. In at least one embodiment, processor 2302 may have a single internal cache or multiple levels of internal cache. In at least one embodiment, cache memory may reside external to processor 2302. In at least one embodiment, processor 2302 may also include a combination of both internal and external caches. In at least one embodiment, a register file 2306 may store different types of data in various registers including, without limitation, integer registers, floating point registers, status registers, and instruction pointer register.

In at least one embodiment, execution unit 2308, including, without limitation, logic to perform integer and floating point operations, also resides in processor 2302. Processor 2302 may also include a microcode ("ucode") read only memory ("ROM") that stores microcode for certain macro instructions. In at least one embodiment, execution unit 2308 may include logic to handle a packed instruction set 2309. In at least one embodiment, by including packed instruction set 2309 in an instruction set of a general-purpose processor 2302, along with associated circuitry to execute instructions, operations used by many multimedia applications may be performed using packed data in a general-purpose processor 2302. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 2308 may also be used in microcontrollers, embedded processors, graphics devices, DSPs, and other types of logic circuits. In at least one embodiment, computer system 2300 may include, without limitation, a memory 2320. In at least one embodiment, memory 2320 may be implemented as a DRAM device, an SRAM device, flash memory device, or other memory device. Memory 2320 may store instruction(s) 2319 and/or data 2321 represented by data signals that may be executed by processor 2302.

In at least one embodiment, a system logic chip may be coupled to processor bus 2310 and memory 2320. In at least one embodiment, the system logic chip may include, without limitation, a memory controller hub ("MCH") 2316, and processor 2302 may communicate with MCH 2316 via processor bus 2310. In at least one embodiment, MCH 2316 may provide a high bandwidth memory path 2318 to memory 2320 for instruction and data storage and for storage of graphics commands, data and textures. In at least one embodiment, MCH 2316 may direct data signals between processor 2302, memory 2320, and other components in computer system 2300 and to bridge data signals between processor bus 2310, memory 2320, and a system I/O 2322. In at least one embodiment, system logic chip may provide a graphics port for coupling to a graphics controller. In at least one embodiment, MCH 2316 may be coupled to memory 2320 through high bandwidth memory path 2318 and graphics/video card 2312 may be coupled to MCH 2316 through an Accelerated Graphics Port ("AGP") interconnect 2314.

In at least one embodiment, computer system 2300 may use system I/O 2322 that is a proprietary hub interface bus to couple MCH 2316 to I/O controller hub ("ICH") 2330. In at least one embodiment, ICH 2330 may provide direct connections to some I/O devices via a local I/O bus. In at least one embodiment, local I/O bus may include, without limitation, a high-speed I/O bus for connecting peripherals to memory 2320, a chipset, and processor 2302. Examples may include, without limitation, an audio controller 2329, a firmware hub ("flash BIOS") 2328, a wireless transceiver 2326, a data storage 2324, a legacy I/O controller 2323 containing a user input interface 2325 and a keyboard interface, a serial expansion port 2327, such as a USB, and a network controller 2334. Data storage 2324 may comprise a hard disk drive, a floppy disk drive, a CD-ROM device, a flash memory device, or other mass storage device.

In at least one embodiment, FIG. 23 illustrates a system, which includes interconnected hardware devices or "chips." In at least one embodiment, FIG. 23 may illustrate an exemplary SoC. In at least one embodiment, devices illustrated in FIG. 23 may be interconnected with proprietary interconnects, standardized interconnects (e.g., PCIe), or some combination thereof. In at least one embodiment, one or more components of system 2300 are interconnected using compute express link ("CXL") interconnects.

In at least one embodiment, at least one component shown or described with respect to FIG. 23 is used to implement techniques and/or functions described in connection with FIGS. 1-20. In at least one embodiment, processor 2302 is used to perform an API to cause shared virtual memory to be allocated for use by a plurality of processors. In at least one embodiment, processor 2302 is used to perform an API to cause physical memory corresponding to shared virtual memory to be designated for use by a plurality of processors. In at least one embodiment, processor 2302 is used to perform an API to enable access to shared virtual memory by a plurality of processors. In at least one embodiment, processor 2302 is used to perform an API to cause physical memory corresponding to shared virtual memory to be undesignated for use by a plurality of processors. In at least one embodiment, processor 2302 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 24:
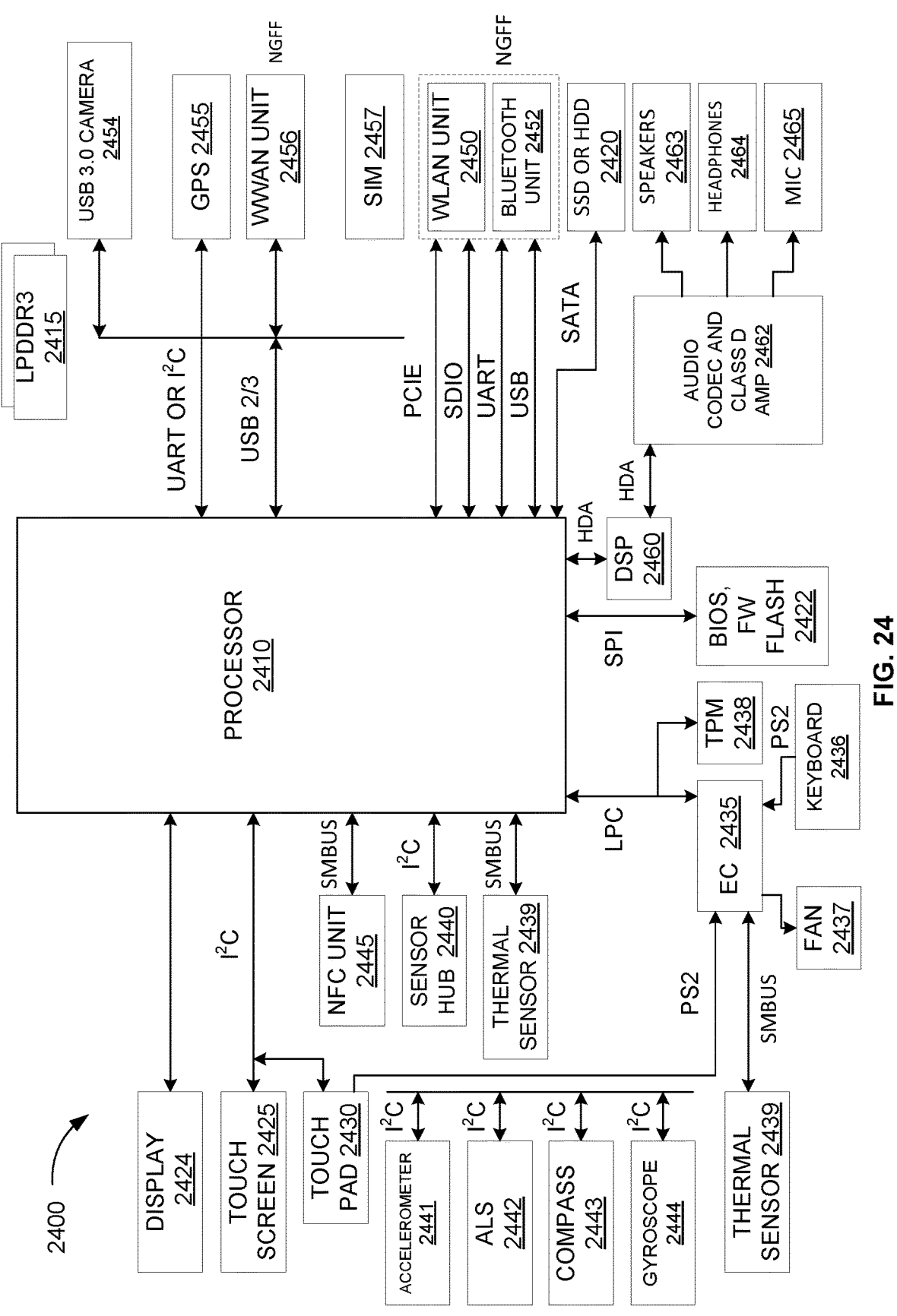
FIG. 24 illustrates a system, in accordance with at least one embodiment.

FIG. 24 illustrates a system 2400, in accordance with at least one embodiment. In at least one embodiment, system 2400 is an electronic device that utilizes a processor 2410. In at least one embodiment, system 2400 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 2400 may include, without limitation, processor 2410 communicatively coupled to any suitable number or kind of components, peripherals, modules, or devices. In at least one embodiment, processor 2410 is coupled using a bus or interface, such as an I2C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 24 illustrates a system which includes interconnected hardware devices or "chips." In at least one embodiment, FIG. 24 may illustrate an exemplary SoC. In at least one embodiment, devices illustrated in FIG. 24 may be interconnected with proprietary interconnects, standardized interconnects (e.g., PCIe) or some combination thereof. In at least one embodiment, one or more components of FIG. 24 are interconnected using CXL interconnects.

In at least one embodiment, FIG. 24 may include a display 2424, a touch screen 2425, a touch pad 2430, a Near Field Communications unit ("NFC") 2445, a sensor hub 2440, a thermal sensor 2446, an Express Chipset ("EC") 2435, a Trusted Platform Module ("TPM") 2438, BIOS/firmware/ flash memory ("BIOS, FW Flash") 2422, a DSP 2460, a Solid State Disk ("SSD") or Hard Disk Drive ("HDD") 2420, a wireless local area network unit ("WLAN") 2450, a Bluetooth unit 2452, a Wireless Wide Area Network unit ("WWAN") 2456, a Global Positioning System ("GPS") 2455, a camera ("USB 3.0 camera") 2454 such as a USB 3.0 camera, or a Low Power Double Data Rate ("LPDDR") memory unit ("LPDDR3") 2415 implemented in, for example, LPDDR3 standard. These components may each be implemented in any suitable manner.

In at least one embodiment, other components may be communicatively coupled to processor 2410 through components discussed above. In at least one embodiment, an accelerometer 2441, an Ambient Light Sensor ("ALS") 2442, a compass 2443, and a gyroscope 2444 may be communicatively coupled to sensor hub 2440. In at least one embodiment, a thermal sensor 2439, a fan 2437, a keyboard 2436, and a touch pad 2430 may be communicatively coupled to EC 2435. In at least one embodiment, a speaker 2463, a headphones 2464, and a microphone ("mic") 2465 may be communicatively coupled to an audio unit ("audio codec and class d amp") 2462, which may in turn be communicatively coupled to DSP 2460. In at least one embodiment, audio unit 2462 may include, for example and without limitation, an audio coder/decoder ("codec") and a class D amplifier. In at least one embodiment, a SIM card ("SIM") 2457 may be communicatively coupled to WWAN unit 2456. In at least one embodiment, components such as WLAN unit 2450 and Bluetooth unit 2452, as well as WWAN unit 2456 may be implemented in a Next Generation Form Factor ("NGFF").

In at least one embodiment, at least one component shown or described with respect to FIG. 24 is used to implement techniques and/or functions described in connection with FIGS. 1-20. In at least one embodiment, processor 2410 is used to perform an API to cause shared virtual memory to be allocated for use by a plurality of processors. In at least one embodiment, processor 2410 is used to perform an API to cause physical memory corresponding to shared virtual memory to be designated for use by a plurality of processors. In at least one embodiment, processor 2410 is used to perform an API to enable access to shared virtual memory by a plurality of processors. In at least one embodiment, processor 2410 is used to perform an API to cause physical memory corresponding to shared virtual memory to be undesignated for use by a plurality of processors. In at least one embodiment, processor 2410 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 25:
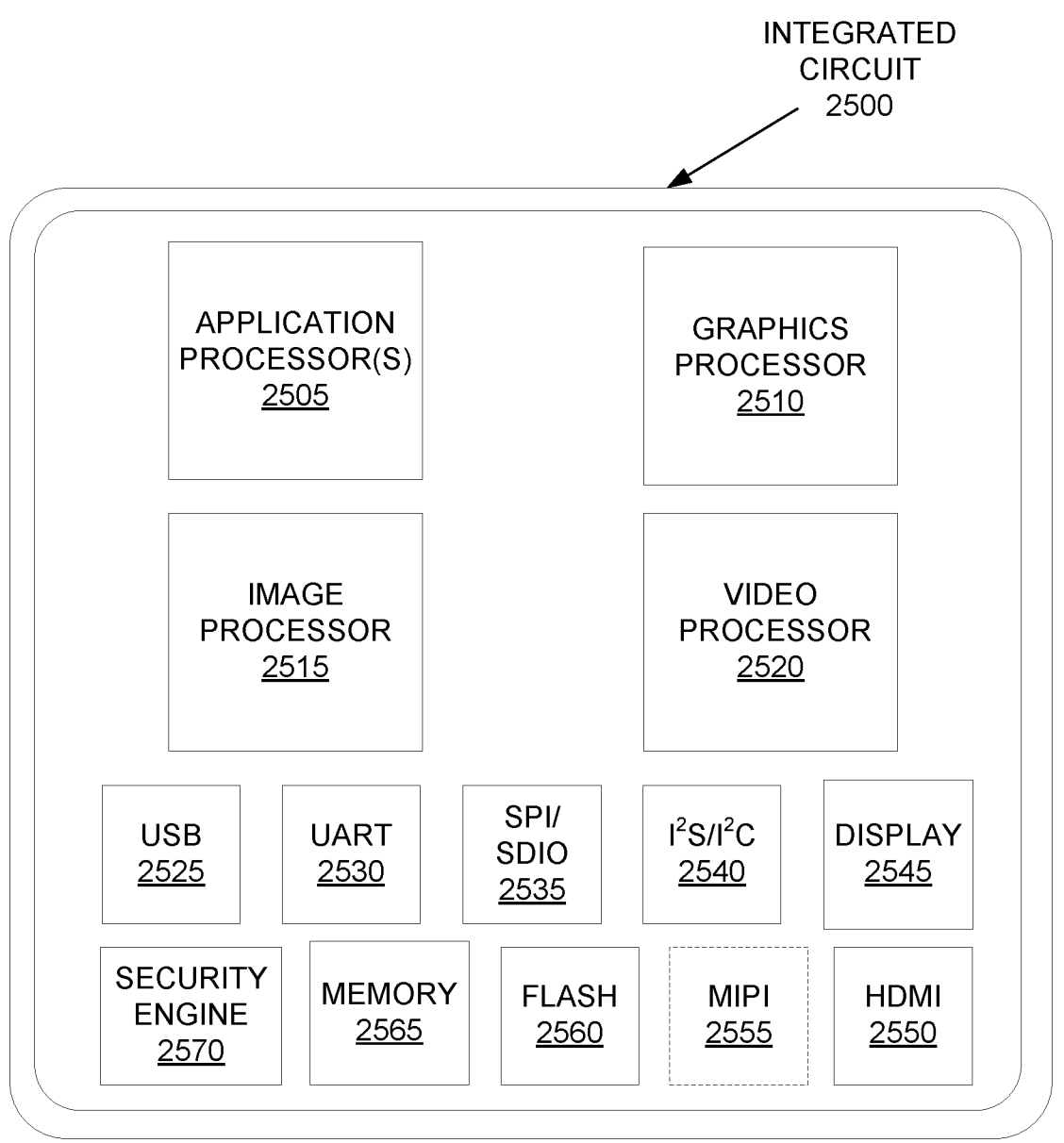
FIG. 25 illustrates an exemplary integrated circuit, in accordance with at least one embodiment.

FIG. 25 illustrates an exemplary integrated circuit 2500, in accordance with at least one embodiment. In at least one embodiment, exemplary integrated circuit 2500 is an SoC that may be fabricated using one or more IP cores. In at least one embodiment, integrated circuit 2500 includes one or more application processor(s) 2505 (e.g., CPUs, DPUs), at least one graphics processor 2510, and may additionally include an image processor 2515 and/or a video processor 2520, any of which may be a modular IP core. In at least one embodiment, integrated circuit 2500 includes peripheral or bus logic including a USB controller 2525, a UART controller 2530, an SPI/SDIO controller 2535, and an I²S/I²C controller 2540. In at least one embodiment, integrated circuit 2500 can include a display device 2545 coupled to one or more of a high-definition multimedia interface ("HDMI") controller 2550 and a mobile industry processor interface ("MIPI") display interface 2555. In at least one embodiment, storage may be provided by a flash memory subsystem 2560 including flash memory and a flash memory controller. In at least one embodiment, a memory interface may be provided via a memory controller 2565 for access to SDRAM or SRAM memory devices. In at least one embodiment, some integrated circuits additionally include an embedded security engine 2570.

In at least one embodiment, at least one component shown or described with respect to FIG. 25 is used to implement techniques and/or functions described in connection with FIGS. 1-20. In at least one embodiment, at least one of application processor 2505, graphics processor 2510, image processor 2515, or video processor 2520 is used to perform an API to cause shared virtual memory to be allocated for use by a plurality of processors. In at least one embodiment, at least one of application processor 2505, graphics processor 2510, image processor 2515, or video processor 2520 is used to perform an API to cause physical memory corresponding to shared virtual memory to be designated for use by a plurality of processors. In at least one embodiment, at least one of application processor 2505, graphics processor 2510, image processor 2515, or video processor 2520 is used to perform an API to enable access to shared virtual memory by a plurality of processors. In at least one embodiment, at least one of application processor 2505, graphics processor 2510, image processor 2515, or video processor 2520 is used to perform an API to cause physical memory corresponding to shared virtual memory to be undesignated for use by a plurality of processors. In at least one embodiment, at least one of application processor 2505, graphics processor 2510, image processor 2515, or video processor 2520 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 26:
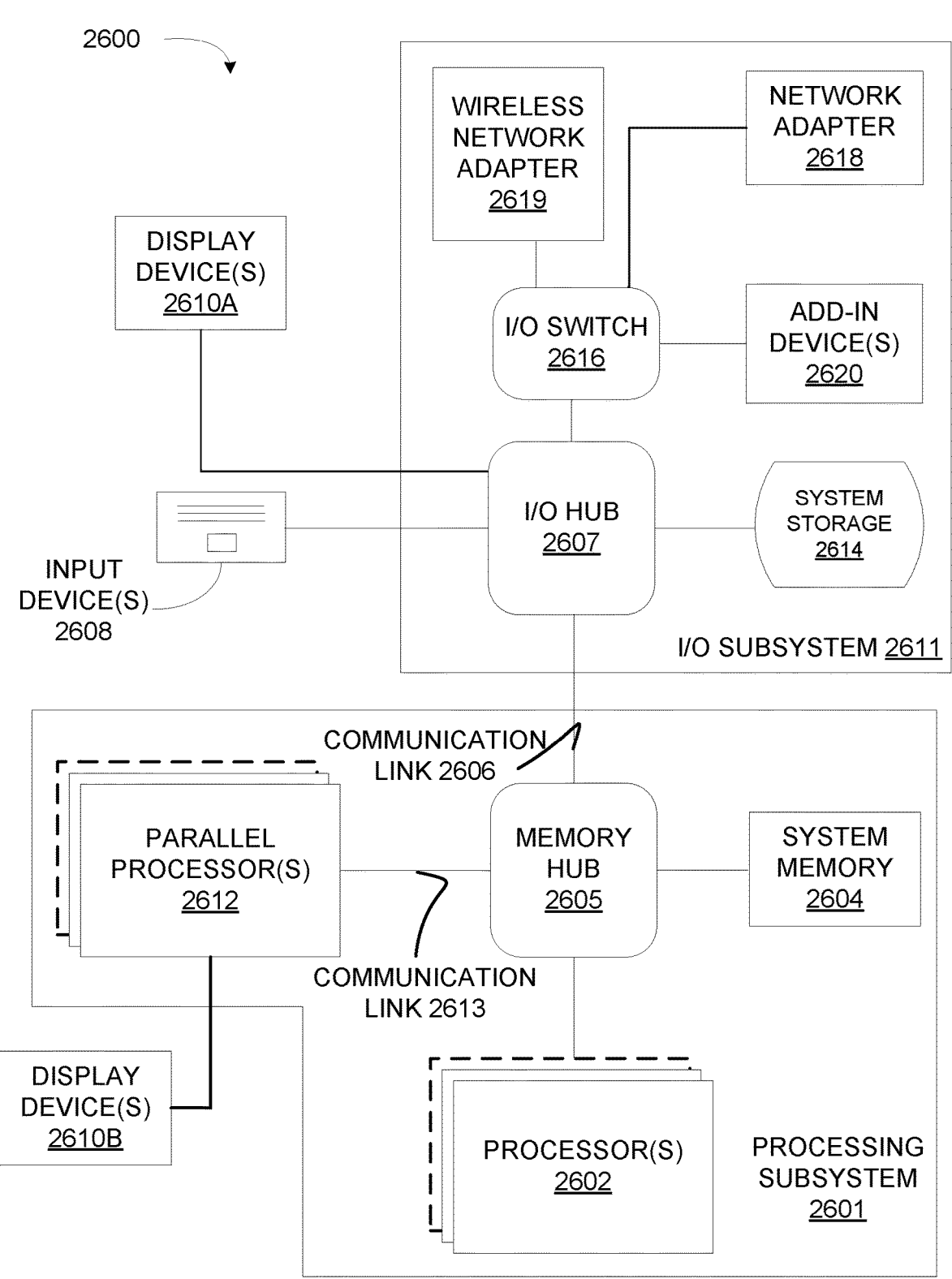
FIG. 26 illustrates a computing system, according to at least one embodiment.

FIG. 26 illustrates a computing system 2600, according to at least one embodiment; In at least one embodiment, computing system 2600 includes a processing subsystem 2601 having one or more processor(s) 2602 and a system memory 2604 communicating via an interconnection path that may include a memory hub 2605. In at least one embodiment, memory hub 2605 may be a separate component within a chipset component or may be integrated within one or more processor(s) 2602. In at least one embodiment, memory hub 2605 couples with an I/O subsystem 2611 via a communication link 2606. In at least one embodiment, I/O subsystem 2611 includes an I/O hub 2607 that can enable computing system 2600 to receive input from one or more input device(s) 2608. In at least one embodiment, I/O hub 2607 can enable a display controller, which may be included in one or more processor(s) 2602, to provide outputs to one or more display device(s) 2610A. In at least one embodiment, one or more display device(s) 2610A coupled with I/O hub 2607 can include a local, internal, or embedded display device.

In at least one embodiment, processing subsystem 2601 includes one or more parallel processor(s) 2612 coupled to memory hub 2605 via a bus or other communication link 2613. In at least one embodiment, communication link 2613 may be one of any number of standards based communication link technologies or protocols, such as, but not limited to PCIe, or may be a vendor specific communications interface or communications fabric. In at least one embodiment, one or more parallel processor(s) 2612 form a computationally focused parallel or vector processing system that can include a large number of processing cores and/or processing clusters, such as a many integrated core processor. In at least one embodiment, one or more parallel processor(s) 2612 form a graphics processing subsystem that can output pixels to one of one or more display device(s) 2610A coupled via I/O Hub 2607. In at least one embodiment, one or more parallel processor(s) 2612 can also include a display controller and display interface (not shown) to enable a direct connection to one or more display device(s) 2610B.

In at least one embodiment, a system storage unit 2614 can connect to I/O hub 2607 to provide a storage mechanism for computing system 2600. In at least one embodiment, an I/O switch 2616 can be used to provide an interface mechanism to enable connections between I/O hub 2607 and other components, such as a network adapter 2618 and/or wireless network adapter 2619 that may be integrated into a platform, and various other devices that can be added via one or more add-in device(s) 2620. In at least one embodiment, network adapter 2618 can be an Ethernet adapter or another wired network adapter. In at least one embodiment, wireless network adapter 2619 can include one or more of a Wi-Fi, Bluetooth, NFC, or other network device that includes one or more wireless radios.

In at least one embodiment, computing system 2600 can include other components not explicitly shown, including USB or other port connections, optical storage drives, video capture devices, and the like, that may also be connected to I/O hub 2607. In at least one embodiment, communication paths interconnecting various components in FIG. 26 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2612 incorporate circuitry optimized for graphics and video processing, including, for example, video output circuitry, and constitutes a graphics processing unit ("GPU"). In at least one embodiment, one or more parallel processor(s) 2612 incorporate circuitry optimized for general purpose processing. In at least embodiment, components of computing system 2600 may be integrated with one or more other system elements on a single integrated circuit. For example, in at least one embodiment, one or more parallel processor(s) 2612, memory hub 2605, processor(s) 2602, and I/O hub 2607 can be integrated into an SoC integrated circuit. In at least one embodiment, components of computing system 2600 can be integrated into a single package to form a system in package ("SIP") configuration.

In at least one embodiment, at least a portion of the components of computing system 2600 can be integrated into a multi-chip module ("MCM"), which can be interconnected with other multi-chip modules into a modular computing system. In at least one embodiment, I/O subsystem 2611 and display devices 2610B are omitted from computing system 2600.

In at least one embodiment, at least one component shown or described with respect to FIG. 26 is used to implement techniques and/or functions described in connection with FIGS. 1-20. In at least one embodiment, at least one of processor(s) 2602 or parallel processor(s) 2612 is used to perform an API to cause shared virtual memory to be allocated for use by a plurality of processors. In at least one embodiment, at least one of processor(s) 2602 or parallel processor(s) 2612 is used to perform an API to cause physical memory corresponding to shared virtual memory to be designated for use by a plurality of processors. In at least one embodiment, at least one of processor(s) 2602 or parallel processor(s) 2612 is used to perform an API to enable access to shared virtual memory by a plurality of processors. In at least one embodiment, at least one of processor(s) 2602 or parallel processor(s) 2612 is used to perform an API to cause physical memory corresponding to shared virtual memory to be undesignated for use by a plurality of processors. In at least one embodiment, at least one of processor(s) 2602 or parallel processor(s) 2612 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Processing Systems

The following figures set forth, without limitation, exemplary processing systems that can be used to implement at least one embodiment.

Figure 27:
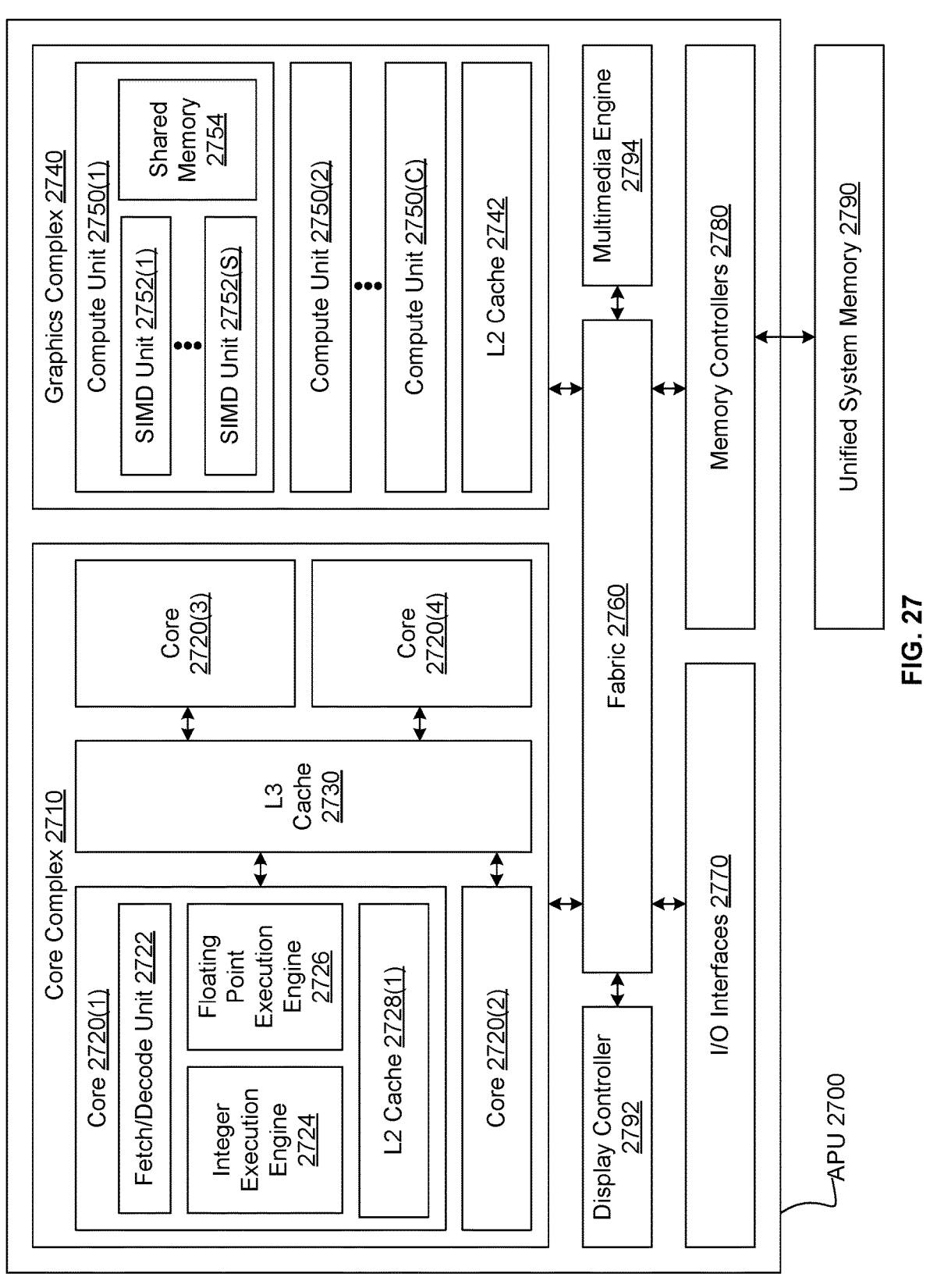
FIG. 27 illustrates an APU, in accordance with at least one embodiment.

FIG. 27 illustrates an accelerated processing unit ("APU") 2700, in accordance with at least one embodiment. In at least one embodiment, APU 2700 is developed by AMD Corporation of Santa Clara, CA. In at least one embodiment, APU 2700 can be configured to execute an application program, such as a CUDA program. In at least one embodiment, APU 2700 includes, without limitation, a core complex 2710, a graphics complex 2740, fabric 2760, I/O interfaces 2770, memory controllers 2780, a display controller 2792, and a multimedia engine 2794. In at least one embodiment, APU 2700 may include, without limitation, any number of core complexes 2710, any number of graphics complexes 2750, any number of display controllers 2792, and any number of multimedia engines 2794 in any combination. For explanatory purposes, multiple instances of like objects are denoted herein with reference numbers identifying the object and parenthetical numbers identifying the instance where needed.

In at least one embodiment, core complex 2710 is a CPU, graphics complex 2740 is a GPU, and APU 2700 is a processing unit that integrates, without limitation, 2710 and 2740 onto a single chip. In at least one embodiment, some tasks may be assigned to core complex 2710 and other tasks may be assigned to graphics complex 2740. In at least one embodiment, core complex 2710 is configured to execute main control software associated with APU 2700, such as an operating system. In at least one embodiment, core complex 2710 is the master processor of APU 2700, controlling and coordinating operations of other processors. In at least one embodiment, core complex 2710 issues commands that control the operation of graphics complex 2740. In at least one embodiment, core complex 2710 can be configured to execute host executable code derived from CUDA source code, and graphics complex 2740 can be configured to execute device executable code derived from CUDA source code.

In at least one embodiment, core complex 2710 includes, without limitation, cores 2720(1)-2720(4) and an L3 cache 2730. In at least one embodiment, core complex 2710 may include, without limitation, any number of cores 2720 and any number and type of caches in any combination. In at least one embodiment, cores 2720 are configured to execute instructions of a particular instruction set architecture ("ISA"). In at least one embodiment, each core 2720 is a CPU core.

In at least one embodiment, each core 2720 includes, without limitation, a fetch/decode unit 2722, an integer execution engine 2724, a floating point execution engine 2726, and an L2 cache 2728. In at least one embodiment, fetch/decode unit 2722 fetches instructions, decodes such instructions, generates micro-operations, and dispatches separate micro-instructions to integer execution engine 2724 and floating point execution engine 2726. In at least one embodiment, fetch/decode unit 2722 can concurrently dispatch one micro-instruction to integer execution engine 2724 and another micro-instruction to floating point execution engine 2726. In at least one embodiment, integer execution engine 2724 executes, without limitation, integer and memory operations. In at least one embodiment, floating point engine 2726 executes, without limitation, floating point and vector operations. In at least one embodiment, fetch-decode unit 2722 dispatches micro-instructions to a single execution engine that replaces both integer execution engine 2724 and floating point execution engine 2726.

In at least one embodiment, each core **2720(*i*), where i is an integer representing a particular instance of core 2720, may access L2 cache 2728(*i*) included in core 2720(*i*). In at least one embodiment, each core 2720 included in core complex 2710(*j*), where j is an integer representing a particular instance of core complex 2710, is connected to other cores 2720 included in core complex 2710(*j*) via L3 cache 2730(*j*) included in core complex 2710(*j*). In at least one embodiment, cores 2720 included in core complex 2710(*j*), where j is an integer representing a particular instance of core complex 2710, can access all of L3 cache 2730(*j*) included in core complex 2710(*j*). In at least one embodiment, L3 cache 2730** may include, without limitation, any number of slices.

In at least one embodiment, graphics complex 2740 can be configured to perform compute operations in a highly-parallel fashion. In at least one embodiment, graphics complex 2740 is configured to execute graphics pipeline operations such as draw commands, pixel operations, geometric computations, and other operations associated with rendering an image to a display. In at least one embodiment, graphics complex 2740 is configured to execute operations unrelated to graphics. In at least one embodiment, graphics complex 2740 is configured to execute both operations related to graphics and operations unrelated to graphics.

In at least one embodiment, graphics complex 2740 includes, without limitation, any number of compute units

2750 and an L2 cache 2742. In at least one embodiment, compute units 2750 share L2 cache 2742. In at least one embodiment, L2 cache 2742 is partitioned. In at least one embodiment, graphics complex 2740 includes, without limitation, any number of compute units 2750 and any number (including zero) and type of caches. In at least one embodiment, graphics complex 2740 includes, without limitation, any amount of dedicated graphics hardware.

In at least one embodiment, each compute unit 2750 includes, without limitation, any number of SIMD units 2752 and a shared memory 2754. In at least one embodiment, each SIMD unit 2752 implements a SIMD architecture and is configured to perform operations in parallel. In at least one embodiment, each compute unit 2750 may execute any number of thread blocks, but each thread block executes on a single compute unit 2750. In at least one embodiment, a thread block includes, without limitation, any number of threads of execution. In at least one embodiment, a work-group is a thread block. In at least one embodiment, each SIMD unit 2752 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2754.

In at least one embodiment, fabric 2760 is a system interconnect that facilitates data and control transmissions across core complex 2710, graphics complex 2740, I/O interfaces 2770, memory controllers 2780, display controller 2792, and multimedia engine 2794. In at least one embodiment, APU 2700 may include, without limitation, any amount and type of system interconnect in addition to or instead of fabric 2760 that facilitates data and control transmissions across any number and type of directly or indirectly linked components that may be internal or external to APU 2700. In at least one embodiment, I/O interfaces 2770 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2770 In at least one embodiment, peripheral devices that are coupled to I/O interfaces 2770 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 2794 includes, without limitation, any amount and type of circuitry that is related to multimedia, such as a video decoder, a video encoder, an image signal processor, etc. In at least one embodiment, memory controllers 2780 facilitate data transfers between APU 2700 and a unified system memory 2790. In at least one embodiment, core complex 2710 and graphics complex 2740 share unified system memory 2790.

In at least one embodiment, APU 2700 implements a memory subsystem that includes, without limitation, any amount and type of memory controllers 2780 and memory devices (e.g., shared memory 2754) that may be dedicated to one component or shared among multiple components. In at least one embodiment, APU 2700 implements a cache subsystem that includes, without limitation, one or more cache memories (e.g., L2 caches 2828, L3 cache 2730, and L2 cache 2742) that may each be private to or shared between any number of components (e.g., cores 2720, core complex 2710, SIMD units 2752, compute units 2750, and graphics complex 2740).

In at least one embodiment, at least one component shown or described with respect to FIG. 27 is used to implement techniques and/or functions described in connection with FIGS. 1-20. In at least one embodiment, at least one element of core complex 2710 or graphics complex 2740 is used to perform an API to cause shared virtual memory to be allocated for use by a plurality of processors. In at least one embodiment, at least one element of core complex 2710 or graphics complex 2740 is used to perform an API to cause physical memory corresponding to shared virtual memory to be designated for use by a plurality of processors. In at least one embodiment, at least one element of core complex 2710 or graphics complex 2740 is used to perform an API to enable access to shared virtual memory by a plurality of processors. In at least one embodiment, at least one element of core complex 2710 or graphics complex 2740 is used to perform an API to cause physical memory corresponding to shared virtual memory to be undesignated for use by a plurality of processors. In at least one embodiment, at least one element of core complex 2710 or graphics complex 2740 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 28:
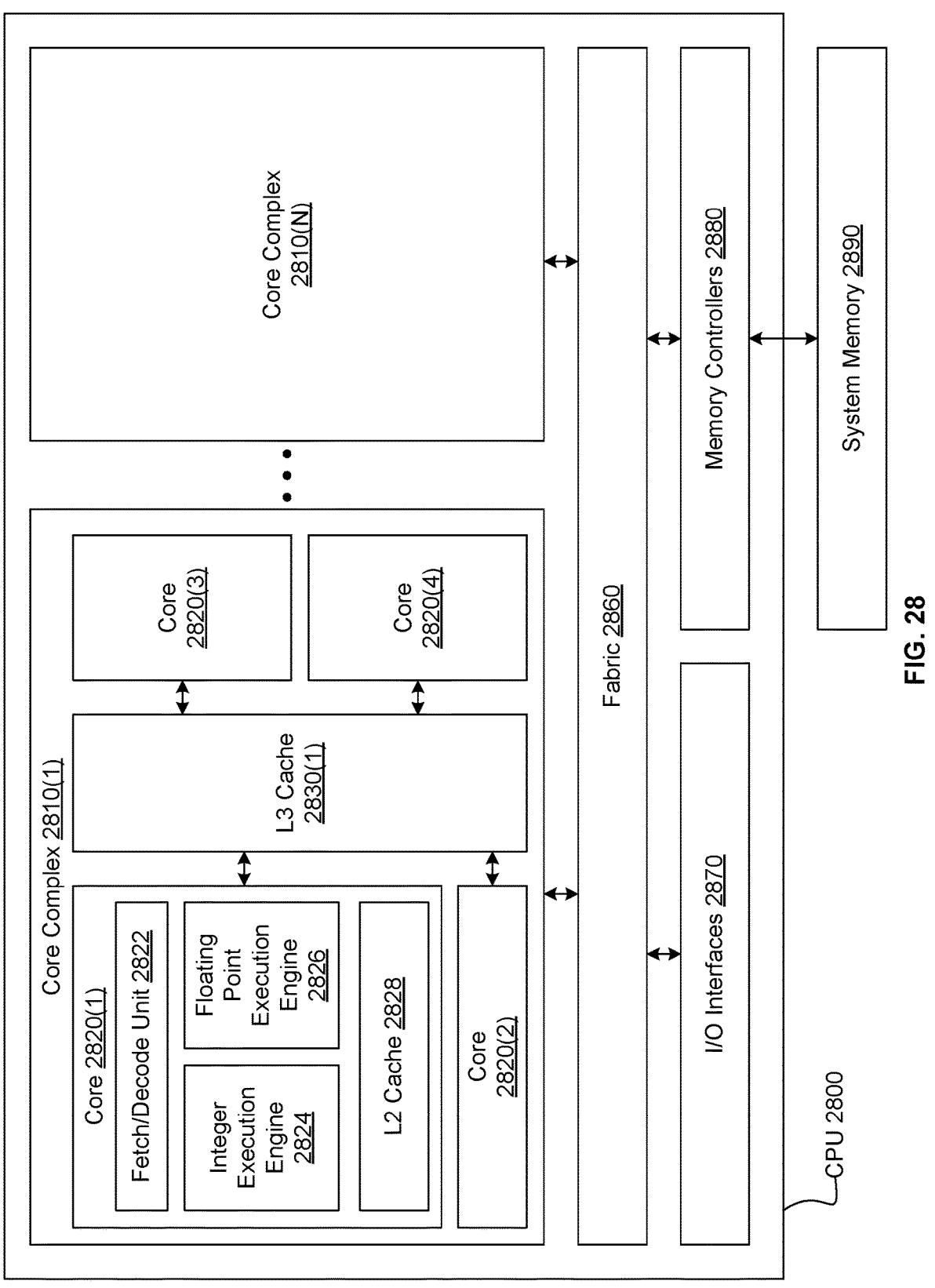
FIG. 28 illustrates a CPU, in accordance with at least one embodiment.

FIG. 28 illustrates a CPU 2800, in accordance with at least one embodiment. In at least one embodiment, CPU 2800 is developed by AMD Corporation of Santa Clara, CA. In at least one embodiment, CPU 2800 can be configured to execute an application program. In at least one embodiment, CPU 2800 is configured to execute main control software, such as an operating system. In at least one embodiment, CPU 2800 issues commands that control the operation of an external GPU (not shown). In at least one embodiment, CPU 2800 can be configured to execute host executable code derived from CUDA source code, and an external GPU can be configured to execute device executable code derived from such CUDA source code. In at least one embodiment, CPU 2800 includes, without limitation, any number of core complexes 2810, fabric 2860, I/O interfaces 2870, and memory controllers 2880.

In at least one embodiment, core complex 2810 includes, without limitation, cores 2820(1)-2820(4) and an L3 cache 2830. In at least one embodiment, core complex 2810 may include, without limitation, any number of cores 2820 and any number and type of caches in any combination. In at least one embodiment, cores 2820 are configured to execute instructions of a particular ISA. In at least one embodiment, each core 2820 is a CPU core.

In at least one embodiment, each core 2820 includes, without limitation, a fetch/decode unit 2822, an integer execution engine 2824, a floating point execution engine 2826, and an L2 cache 2828. In at least one embodiment, fetch/decode unit 2822 fetches instructions, decodes such instructions, generates micro-operations, and dispatches separate micro-instructions to integer execution engine 2824 and floating point execution engine 2826. In at least one embodiment, fetch/decode unit 2822 can concurrently dispatch one micro-instruction to integer execution engine 2824 and another micro-instruction to floating point execution engine 2826. In at least one embodiment, integer execution engine 2824 executes, without limitation, integer and memory operations. In at least one embodiment, floating point engine 2826 executes, without limitation, floating point and vector operations. In at least one embodiment, fetch-decode unit 2822 dispatches micro-instructions to a single execution engine that replaces both integer execution engine 2824 and floating point execution engine 2826.

In at least one embodiment, each core 2820($i$), where i is an integer representing a particular instance of core 2820, may access L2 cache 2828($i$) included in core 2820($i$). In at least one embodiment, each core 2820 included in core complex 2810($j$), where j is an integer representing a particular instance of core complex 2810, is connected to other cores 2820 in core complex 2810($j$) via L3 cache 2830($j$) included in core complex 2810($j$). In at least one embodiment, cores 2820 included in core complex 2810($j$), where j is an integer representing a particular instance of core complex 2810, can access all of L3 cache 2830($j$) included in core complex 2810($j$). In at least one embodiment, L3 cache 2830 may include, without limitation, any number of slices.

In at least one embodiment, fabric 2860 is a system interconnect that facilitates data and control transmissions across core complexes 2810(1)-2810(N) (where N is an integer greater than zero), I/O interfaces 2870, and memory controllers 2880. In at least one embodiment, CPU 2800 may include, without limitation, any amount and type of system interconnect in addition to or instead of fabric 2860 that facilitates data and control transmissions across any number and type of directly or indirectly linked components that may be internal or external to CPU 2800. In at least one embodiment, I/O interfaces 2870 are representative of any number and type of I/O interfaces (e.g., PCI, PCI-X, PCIe, GBE, USB, etc.). In at least one embodiment, various types of peripheral devices are coupled to I/O interfaces 2870 In at least one embodiment, peripheral devices that are coupled to I/O interfaces 2870 may include, without limitation, displays, keyboards, mice, printers, scanners, joysticks or other types of game controllers, media recording devices, external storage devices, network interface cards, and so forth.

In at least one embodiment, memory controllers 2880 facilitate data transfers between CPU 2800 and a system memory 2890. In at least one embodiment, core complex 2810 and graphics complex 2840 share system memory 2890. In at least one embodiment, CPU 2800 implements a memory subsystem that includes, without limitation, any amount and type of memory controllers 2880 and memory devices that may be dedicated to one component or shared among multiple components. In at least one embodiment, CPU 2800 implements a cache subsystem that includes, without limitation, one or more cache memories (e.g., L2 caches 2828 and L3 caches 2830) that may each be private to or shared between any number of components (e.g., cores 2820 and core complexes 2810).

In at least one embodiment, at least one component shown or described with respect to FIG. 28 is used to implement techniques and/or functions described in connection with FIGS. 1-20. In at least one embodiment, at least one element of core complex 2810(1)-2810(*n*) is used to perform an API to cause shared virtual memory to be allocated for use by a plurality of processors. In at least one embodiment, at least one element of core complex 2810(1)-2810(*n*) is used to perform an API to cause physical memory corresponding to shared virtual memory to be designated for use by a plurality of processors. In at least one embodiment, at least one element of core complex 2810(1)-2810(*n*) is used to perform an API to enable access to shared virtual memory by a plurality of processors. In at least one embodiment, at least one element of core complex 2810(1)-2810(*n*) is used to perform an API to cause physical memory corresponding to shared virtual memory to be undesignated for use by a plurality of processors. In at least one embodiment, at least one element of core complex 2810(1)-2810(*n*) is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 29:
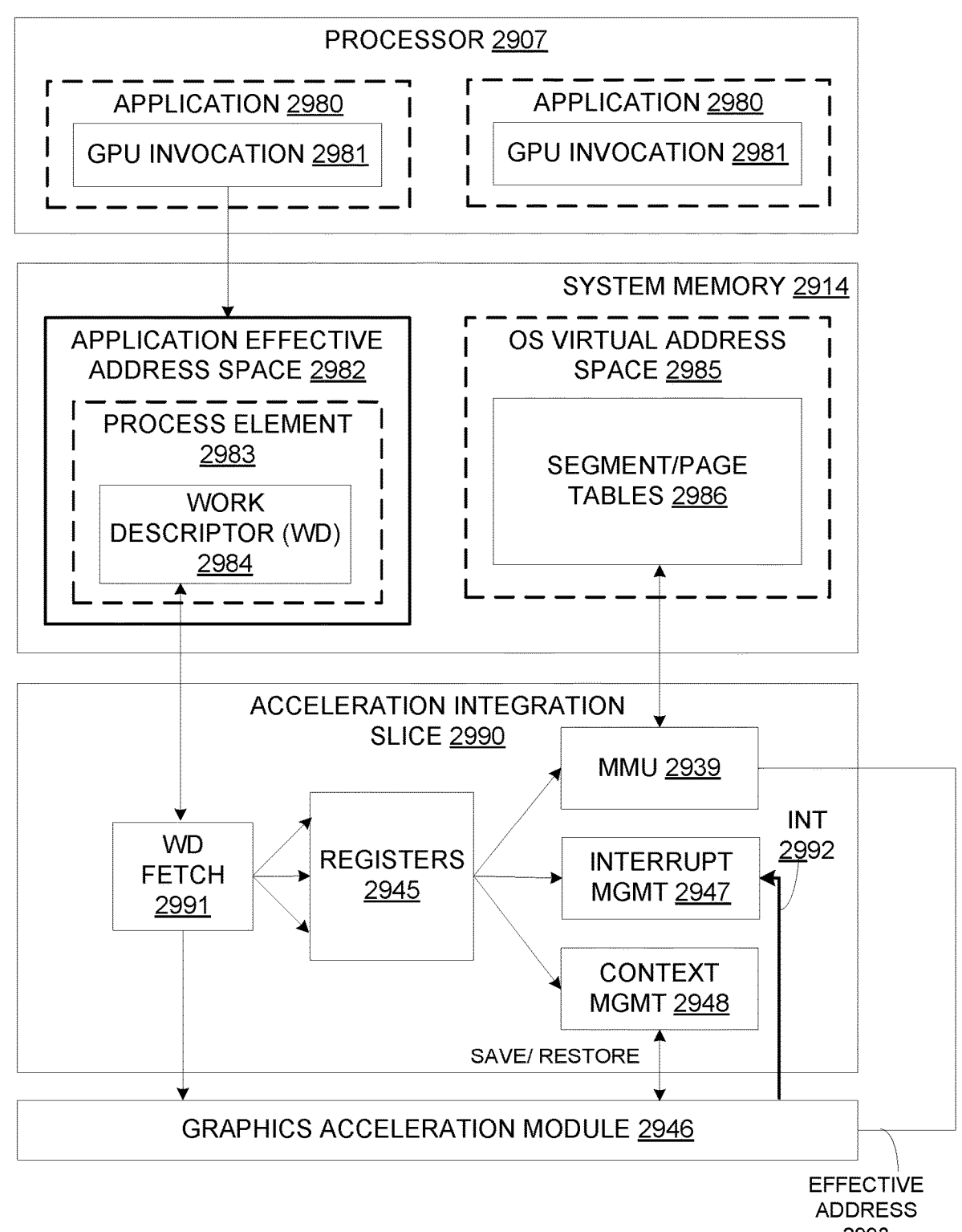
FIG. 29 illustrates an exemplary accelerator integration slice, in accordance with at least one embodiment.

FIG. 29 illustrates an exemplary accelerator integration slice 2990, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2982 within system memory 2914 stores process elements 2983. In one embodiment, process elements 2983 are stored in response to GPU invocations 2981 from applications 2980 executed on processor 2907. A process element 2983 contains process state for corresponding application 2980. A work descriptor ("WD") 2984 contained in process element 2983 can be a single job requested by an application or may contain a pointer to a queue of jobs. In at least one embodiment, WD 2984 is a pointer to a job request queue in application effective address space 2982.

Graphics acceleration module 2946 and/or individual graphics processing engines can be shared by all or a subset of processes in a system. In at least one embodiment, an infrastructure for setting up process state and sending WD 2984 to graphics acceleration module 2946 to start a job in a virtualized environment may be included.

In at least one embodiment, a dedicated-process programming model is implementation-specific. In this model, a single process owns graphics acceleration module 2946 or an individual graphics processing engine. Because graphics acceleration module 2946 is owned by a single process, a hypervisor initializes an accelerator integration circuit for an owning partition and an operating system initializes accelerator integration circuit for an owning process when graphics acceleration module 2946 is assigned.

In operation, a WD fetch unit 2991 in accelerator integration slice 2990 fetches next WD 2984 which includes an indication of work to be done by one or more graphics processing engines of graphics acceleration module 2946. Data from WD 2984 may be stored in registers 2945 and used by a memory management unit ("MMU") 2939, interrupt management circuit 2947 and/or context management circuit 2948 as illustrated. For example, one embodiment of MMU 2939 includes segment/page walk circuitry for accessing segment/page tables 2986 within OS virtual address space 2985. Interrupt management circuit 2947 may process interrupt events ("INT") 2992 received from graphics acceleration module 2946. When performing graphics operations, an effective address 2993 generated by a graphics processing engine is translated to a real address by MMU 2939.

In one embodiment, a same set of registers 2945 are duplicated for each graphics processing engine and/or graphics acceleration module 2946 and may be initialized by a hypervisor or operating system. Each of these duplicated registers may be included in accelerator integration slice 2990. Exemplary registers that may be initialized by a hypervisor are shown in Table 1.

TABLE 1

| Hypervisor Initialized Registers |
| --- |
| 1 Slice Control Register |
| 2 Real Address (RA) Scheduled Processes Area Pointer |
| 3 Authority Mask Override Register |
| 4 Interrupt Vector Table Entry Offset |
| 5 Interrupt Vector Table Entry Limit |
| 6 State Register |
| 7 Logical Partition ID |
| 8 Real address (RA) Hypervisor Accelerator Utilization Record Pointer |
| 9 Storage Description Register |

Exemplary registers that may be initialized by an operating system are shown in Table 2.

TABLE 2

| Operating System Initialized Registers |
| --- |
| 1 Process and Thread Identification |
| 2 Effective Address (EA) Context Save/Restore Pointer |
| 3 Virtual Address (VA) Accelerator Utilization Record Pointer |
| 4 Virtual Address (VA) Storage Segment Table Pointer |
| 5 Authority Mask |
| 6 Work descriptor |

In one embodiment, each WD 2984 is specific to a particular graphics acceleration module 2946 and/or a particular graphics processing engine. It contains all information required by a graphics processing engine to do work or it can be a pointer to a memory location where an application has set up a command queue of work to be completed.

In at least one embodiment, at least one component shown or described with respect to FIG. 29 is used to implement techniques and/or functions described in connection with FIGS. 1-20. In at least one embodiment, processor 2907 is used to perform an API to cause shared virtual memory to be allocated for use by a plurality of processors. In at least one embodiment, processor 2907 is used to perform an API to cause physical memory corresponding to shared virtual memory to be designated for use by a plurality of processors. In at least one embodiment, processor 2907 is used to perform an API to enable access to shared virtual memory by a plurality of processors. In at least one embodiment, processor 2907 is used to perform an API to cause physical memory corresponding to shared virtual memory to be undesignated for use by a plurality of processors. In at least one embodiment, processor 2907 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 30A:
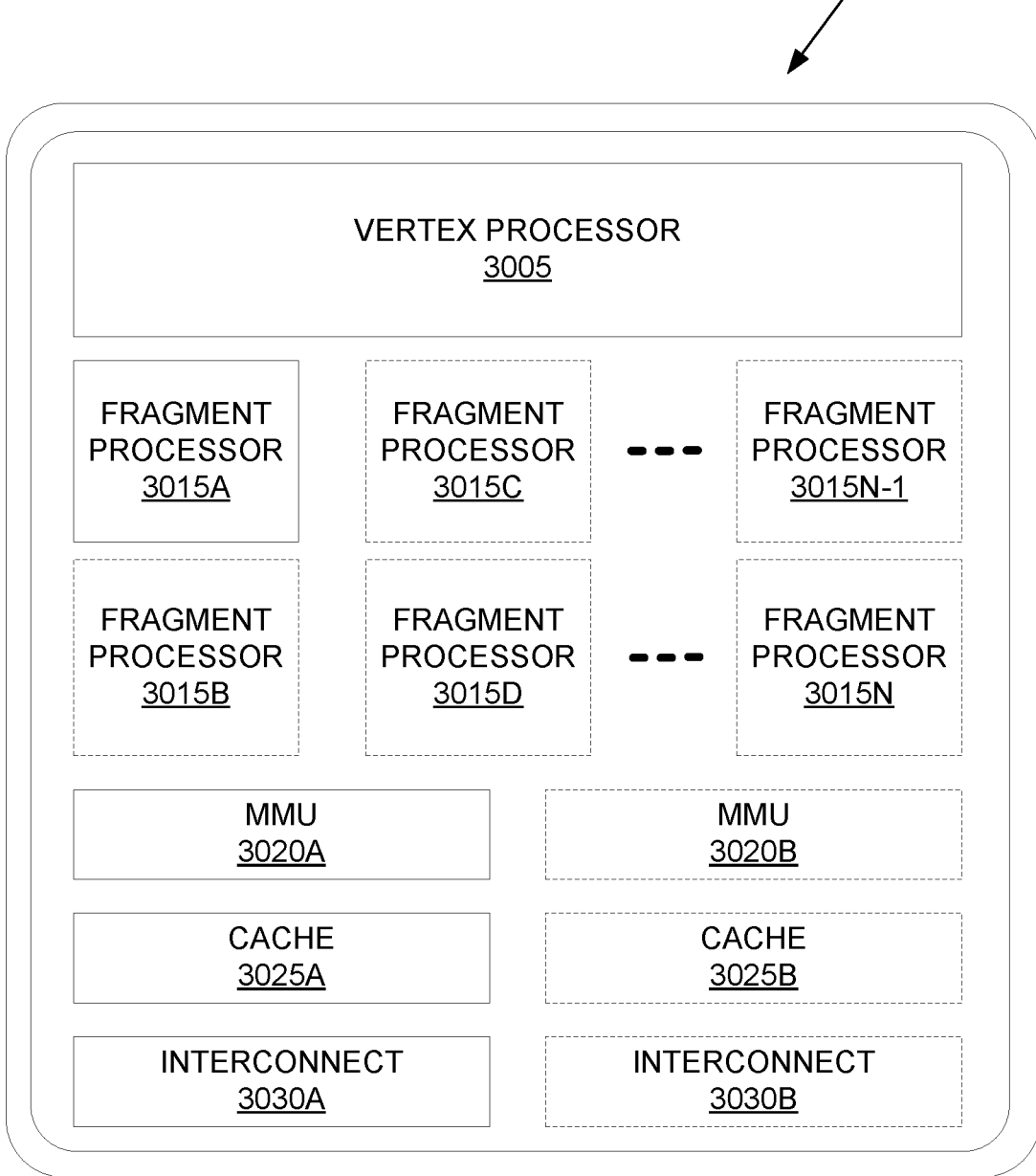
FIGS. 30A-30B illustrate exemplary graphics processors, in accordance with at least one embodiment.
Figure 30B:
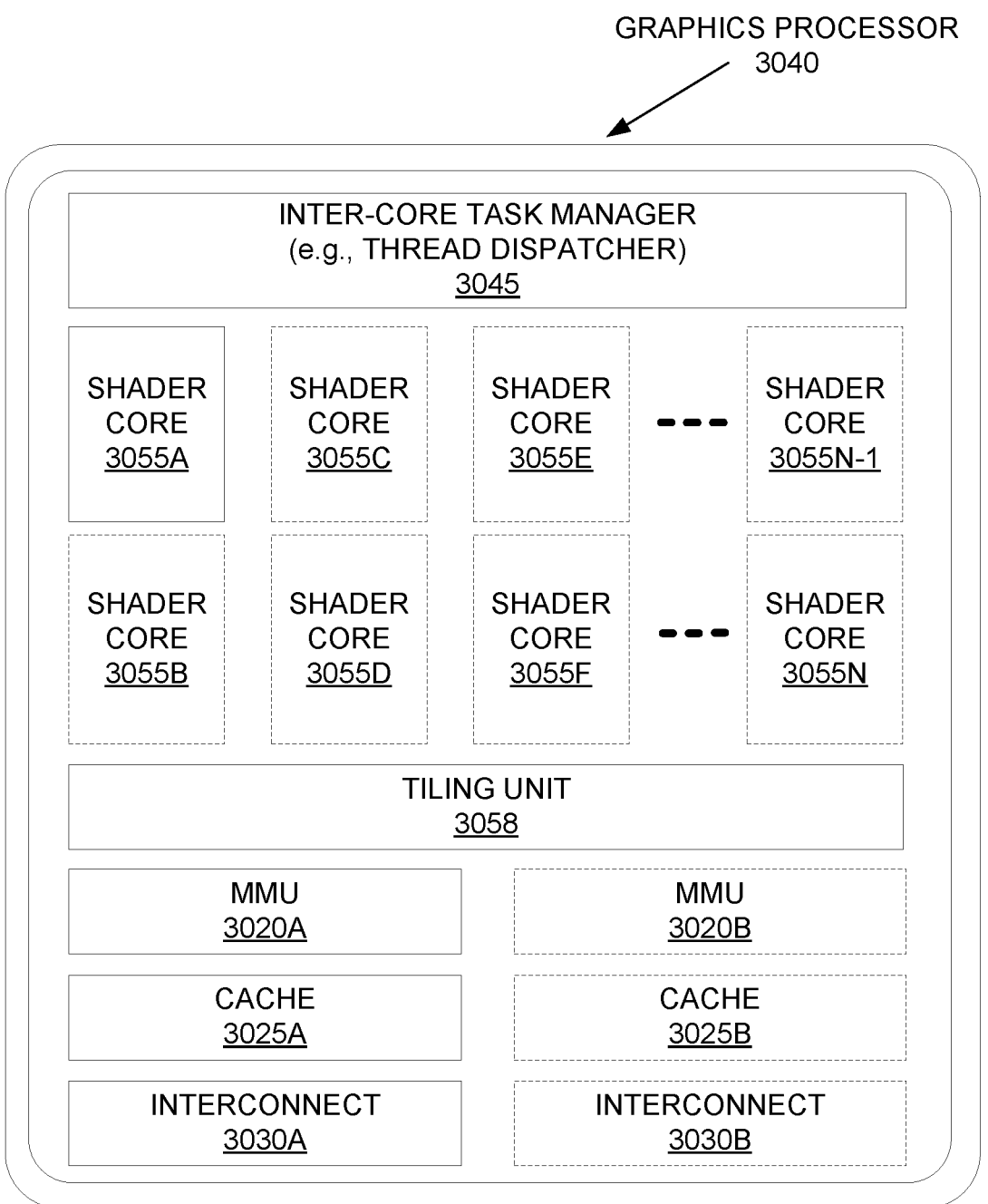

FIGS. 30A-30B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 30A illustrates an exemplary graphics processor 3010 of an SoC integrated circuit that may be fabricated using one or more IP cores, in accordance with at least one embodiment. FIG. 30B illustrates an additional exemplary graphics processor 3040 of an SoC integrated circuit that may be fabricated using one or more IP cores, in accordance with at least one embodiment. In at least one embodiment, graphics processor 3010 of FIG. 30A is a low power graphics processor core. In at least one embodiment, graphics processor 3040 of FIG. 30B is a higher performance graphics processor core. In at least one embodiment, each of graphics processors 3010, 3040 can be variants of graphics processor 2510 of FIG. 25.

In at least one embodiment, graphics processor 3010 includes a vertex processor 3005 and one or more fragment processor(s) 3015A-3015N (e.g., 3015A, 3015B, 3015C, 3015D, through 3015N-1, and 3015N). In at least one embodiment, graphics processor 3010 can execute different shader programs via separate logic, such that vertex processor 3005 is optimized to execute operations for vertex shader programs, while one or more fragment processor(s) 3015A-3015N execute fragment (e.g., pixel) shading operations for fragment or pixel shader programs. In at least one embodiment, vertex processor 3005 performs a vertex processing stage of a 3D graphics pipeline and generates primitives and vertex data. In at least one embodiment, fragment processor(s) 3015A-3015N use primitive and vertex data generated by vertex processor 3005 to produce a framebuffer that is displayed on a display device. In at least one embodiment, fragment processor(s) 3015A-3015N are optimized to execute fragment shader programs as provided for in an OpenGL API, which may be used to perform similar operations as a pixel shader program as provided for in a Direct 3D API.

In at least one embodiment, graphics processor 3010 additionally includes one or more MMU(s) 3020A-3020B, cache(s) 3025A-3025B, and circuit interconnect(s) 3030A-3030B. In at least one embodiment, one or more MMU(s) 3020A-3020B provide for virtual to physical address mapping for graphics processor 3010, including for vertex processor 3005 and/or fragment processor(s) 3015A-3015N, which may reference vertex or image/texture data stored in memory, in addition to vertex or image/texture data stored in one or more cache(s) 3025A-3025B. In at least one embodiment, one or more MMU(s) 3020A-3020B may be synchronized with other MMUs within a system, including one or more MMUs associated with one or more application processor(s) 2505, image processors 2515, and/or video processors 2520 of FIG. 25, such that each processor 2505-2520 can participate in a shared or unified virtual memory system. In at least one embodiment, one or more circuit interconnect(s) 3030A-3030B enable graphics processor 3010 to interface with other IP cores within an SoC, either via an internal bus of the SoC or via a direct connection.

In at least one embodiment, graphics processor 3040 includes one or more MMU(s) 3020A-3020B, caches 3025A-3025B, and circuit interconnects 3030A-3030B of graphics processor 3010 of FIG. 30A. In at least one embodiment, graphics processor 3040 includes one or more shader core(s) 3055A-3055N (e.g., 3055A, 3055B, 3055C, 3055D, 3055E, 3055F, through 3055N-1, and 3055N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3040 includes an inter-core task manager 3045, which acts as a thread dispatcher to dispatch execution threads to one or more shader cores 3055A-3055N and a tiling unit 3058 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIG. 30A and FIG. 30B is used to implement techniques and/or functions described in connection with FIGS. 1-20. In at least one embodiment, at least one of graphics processor 3010 or graphics processor 3040 is used to perform an API to cause shared virtual memory to be allocated for use by a plurality of processors. In at least one embodiment, at least one of graphics processor 3010 or graphics processor 3040 is used to perform an API to cause physical memory corresponding to shared virtual memory to be designated for use by a plurality of processors. In at least one embodiment, at least one of graphics processor 3010 or graphics processor 3040 is used to perform an API to enable access to shared virtual memory by a plurality of processors. In at least one embodiment, at least one of graphics processor 3010 or graphics processor 3040 is used to perform an API to cause physical memory corresponding to shared virtual memory to be undesignated for use by a plurality of processors. In at least one embodiment, at least one of graphics processor 3010 or graphics processor 3040 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 31A:
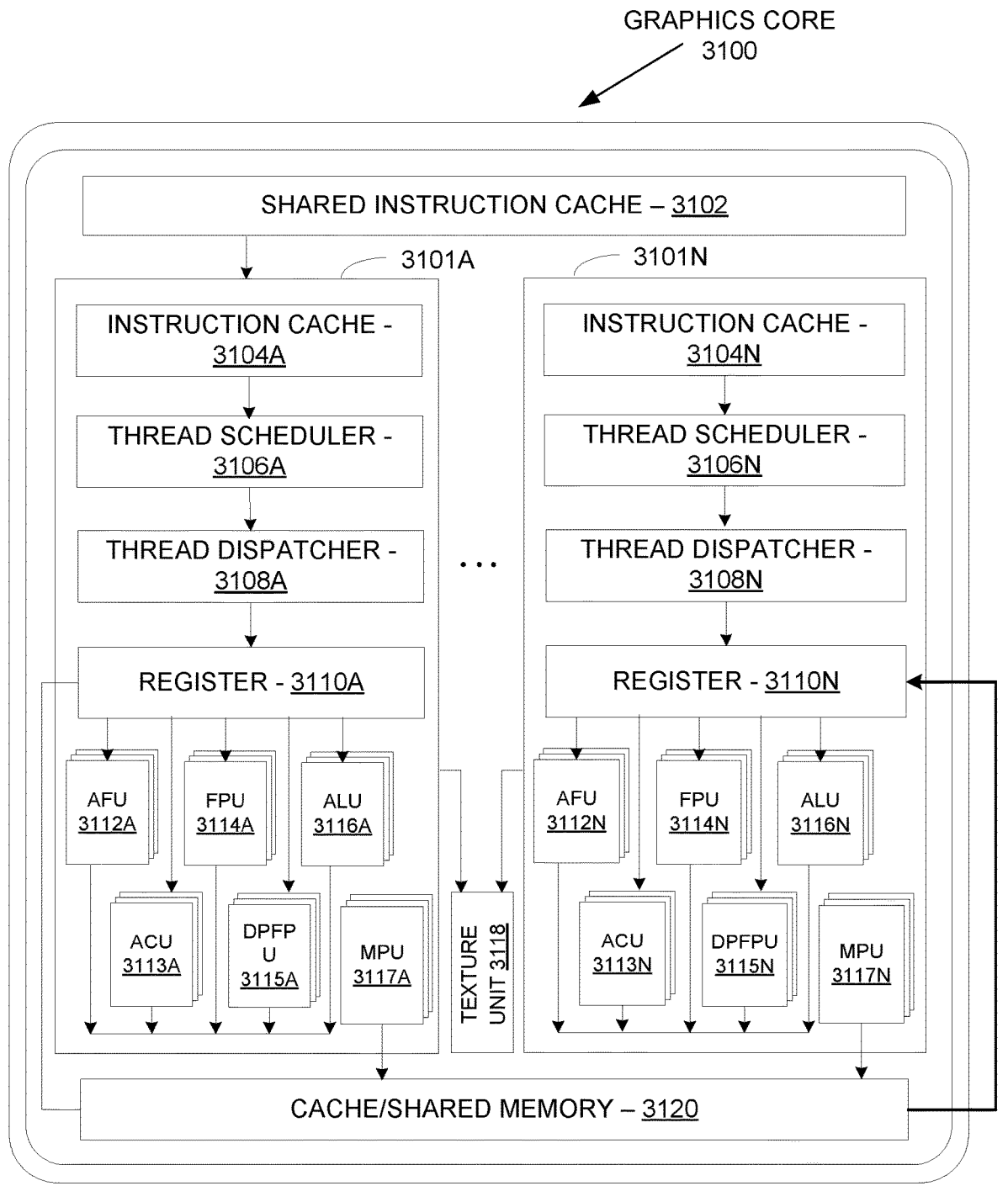
FIG. 31A illustrates a graphics core, in accordance with at least one embodiment.

FIG. 31A illustrates a graphics core 3100, in accordance with at least one embodiment. In at least one embodiment, graphics core 3100 may be included within graphics processor 2510 of FIG. 25. In at least one embodiment, graphics core 3100 may be a unified shader core 3055A-3055N as in FIG. 30B. In at least one embodiment, graphics core 3100 includes a shared instruction cache 3102, a texture unit 3118, and a cache/shared memory 3120 that are common to execution resources within graphics core 3100. In at least one embodiment, graphics core 3100 can include multiple slices 3101A-3101N or partition for each core, and a graphics processor can include multiple instances of graphics core 3100. Slices 3101A-3101N can include support logic including a local instruction cache 3104A-3104N, a thread scheduler 3106A-3106N, a thread dispatcher 3108A-3108N, and a set of registers 3110A-3110N. In at least one embodiment, slices 3101A-3101N can include a set of additional function units ("AFUs") 3112A-3112N, floating-point units ("FPUs") 3114A-3114N, integer arithmetic logic units ("ALUs") 3116-3116N, address computational units ("ACUs") 3113A-3113N, double-precision floating-point units ("DPFPUs") 3115A-3115N, and matrix processing units ("MPUs") 3117A-3117N.

In at least one embodiment, FPUs 3114A-3114N can perform single-precision (32-bit) and half-precision (16-bit) floating point operations, while DPFPUs 3115A-3115N perform double precision (64-bit) floating point operations. In at least one embodiment, ALUs 3116A-3116N can perform variable precision integer operations at 8-bit, 16-bit, and 32-bit precision, and can be configured for mixed precision operations. In at least one embodiment, MPUs 3117A-3117N can also be configured for mixed precision matrix operations, including half-precision floating point and 8-bit integer operations. In at least one embodiment, MPUs 3117-3117N can perform a variety of matrix operations to accelerate CUDA programs, including enabling support for accelerated general matrix to matrix multiplication ("GEMM"). In at least one embodiment, AFUs 3112A-3112N can perform additional logic operations not supported by floating-point or integer units, including trigonometric operations (e.g., Sine, Cosine, etc.).

In at least one embodiment, at least one component shown or described with respect to FIG. 31A is used to implement techniques and/or functions described in connection with FIGS. 1-20. In at least one embodiment, graphics core 3100 is used to perform an API to cause shared virtual memory to be allocated for use by a plurality of processors. In at least one embodiment, graphics core 3100 is used to perform an API to cause physical memory corresponding to shared virtual memory to be designated for use by a plurality of processors. In at least one embodiment, graphics core 3100 is used to perform an API to enable access to shared virtual memory by a plurality of processors. In at least one embodiment, graphics core 3100 is used to perform an API to cause physical memory corresponding to shared virtual memory to be undesignated for use by a plurality of processors. In at least one embodiment, graphics core 3100 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 31B:
FIG. 31B illustrates a GPGPU, in accordance with at least one embodiment.

FIG. 31B illustrates a general-purpose graphics processing unit ("GPGPU") 3130, in accordance with at least one embodiment. In at least one embodiment, GPGPU 3130 is highly-parallel and suitable for deployment on a multi-chip module. In at least one embodiment, GPGPU 3130 can be configured to enable highly-parallel compute operations to be performed by an array of GPUs. In at least one embodiment, GPGPU 3130 can be linked directly to other instances of GPGPU 3130 to create a multi-GPU cluster to improve execution time for CUDA programs. In at least one embodiment, GPGPU 3130 includes a host interface 3132 to enable a connection with a host processor. In at least one embodiment, host interface 3132 is a PCIe interface. In at least one embodiment, host interface 3132 can be a vendor specific communications interface or communications fabric. In at least one embodiment, GPGPU 3130 receives commands from a host processor and uses a global scheduler 3134 to distribute execution threads associated with those commands to a set of compute clusters 3136A-3136H. In at least one embodiment, compute clusters 3136A-3136H share a cache memory 3138. In at least one embodiment, cache memory 3138 can serve as a higher-level cache for cache memories within compute clusters 3136A-3136H.

In at least one embodiment, GPGPU 3130 includes memory 3144A-3144B coupled with compute clusters 3136A-3136H via a set of memory controllers 3142A-3142B. In at least one embodiment, memory 3144A-3144B can include various types of memory devices including DRAM or graphics random access memory, such as synchronous graphics random access memory ("SGRAM"), including graphics double data rate ("GDDR") memory.

In at least one embodiment, compute clusters 3136A-3136H each include a set of graphics cores, such as graphics core 3100 of FIG. 31A, which can include multiple types of integer and floating point logic units that can perform computational operations at a range of precisions including suited for computations associated with CUDA programs. For example, in at least one embodiment, at least a subset of floating point units in each of compute clusters 3136A-3136H can be configured to perform 16-bit or 32-bit floating point operations, while a different subset of floating point units can be configured to perform 64-bit floating point operations.

In at least one embodiment, multiple instances of GPGPU 3130 can be configured to operate as a compute cluster. Compute clusters 3136A-3136H may implement any technically feasible communication techniques for synchronization and data exchange. In at least one embodiment, multiple instances of GPGPU 3130 communicate over host interface 3132. In at least one embodiment, GPGPU 3130 includes an I/O hub 3139 that couples GPGPU 3130 with a GPU link 3140 that enables a direct connection to other instances of GPGPU 3130. In at least one embodiment, GPU link 3140 is coupled to a dedicated GPU-to-GPU bridge that enables communication and synchronization between multiple instances of GPGPU 3130. In at least one embodiment GPU link 3140 couples with a high speed interconnect to transmit and receive data to other GPGPUs 3130 or parallel processors. In at least one embodiment, multiple instances of GPGPU 3130 are located in separate data processing systems and communicate via a network device that is accessible via host interface 3132. In at least one embodiment GPU link 3140 can be configured to enable a connection to a host processor in addition to or as an alternative to host interface 3132. In at least one embodiment, GPGPU 3130 can be configured to execute a CUDA program.

In at least one embodiment, at least one component shown or described with respect to FIG. 31B is used to implement techniques and/or functions described in connection with FIGS. 1-20. In at least one embodiment, GPGPU 3130 is used to perform an API to cause shared virtual memory to be allocated for use by a plurality of processors. In at least one embodiment, GPGPU 3130 is used to perform an API to cause physical memory corresponding to shared virtual memory to be designated for use by a plurality of processors. In at least one embodiment, GPGPU 3130 is used to perform an API to enable access to shared virtual memory by a plurality of processors. In at least one embodiment, GPGPU 3130 is used to perform an API to cause physical memory corresponding to shared virtual memory to be undesignated for use by a plurality of processors. In at least one embodiment, GPGPU 3130 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 32A:
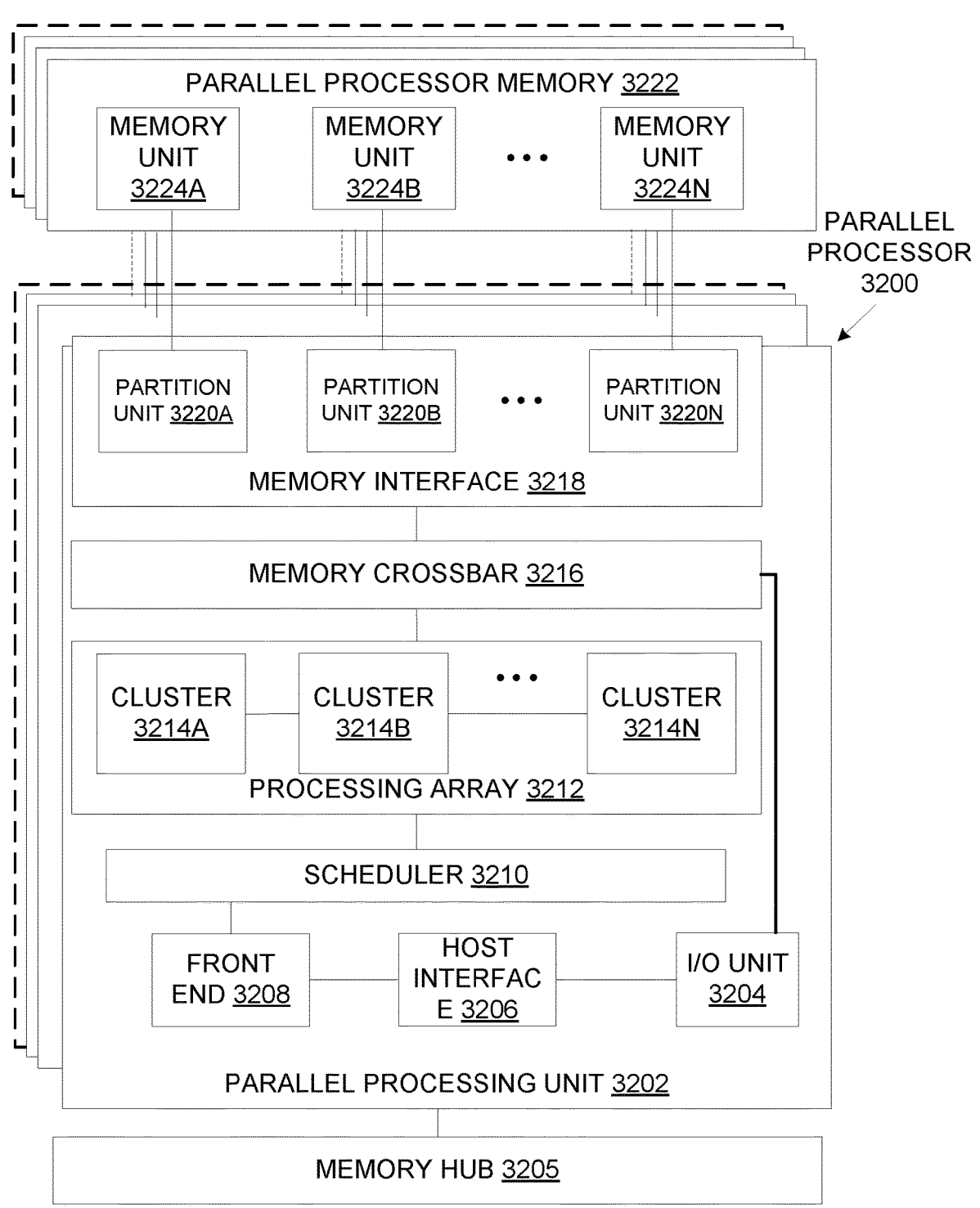
FIG. 32A illustrates a parallel processor, in accordance with at least one embodiment.

FIG. 32A illustrates a parallel processor 3200, in accordance with at least one embodiment. In at least one embodiment, various components of parallel processor 3200 may be implemented using one or more integrated circuit devices, such as programmable processors, application specific integrated circuits ("ASICs"), or FPGAs.

In at least one embodiment, parallel processor 3200 includes a parallel processing unit 3202. In at least one embodiment, parallel processing unit 3202 includes an I/O unit 3204 that enables communication with other devices, including other instances of parallel processing unit 3202. In at least one embodiment, I/O unit 3204 may be directly connected to other devices. In at least one embodiment, I/O unit 3204 connects with other devices via use of a hub or switch interface, such as memory hub 3205. In at least one embodiment, connections between memory hub 3205 and I/O unit 3204 form a communication link. In at least one embodiment, I/O unit 3204 connects with a host interface 3206 and a memory crossbar 3216, where host interface 3206 receives commands directed to performing processing operations and memory crossbar 3216 receives commands directed to performing memory operations.

In at least one embodiment, when host interface 3206 receives a command buffer via I/O unit 3204, host interface 3206 can direct work operations to perform those commands to a front end 3208. In at least one embodiment, front end 3208 couples with a scheduler 3210, which is configured to distribute commands or other work items to a processing array 3212. In at least one embodiment, scheduler 3210 ensures that processing array 3212 is properly configured and in a valid state before tasks are distributed to processing array 3212. In at least one embodiment, scheduler 3210 is implemented via firmware logic executing on a microcontroller. In at least one embodiment, microcontroller implemented scheduler 3210 is configurable to perform complex scheduling and work distribution operations at coarse and fine granularity, enabling rapid preemption and context switching of threads executing on processing array 3212. In at least one embodiment, host software can prove workloads for scheduling on processing array 3212 via one of multiple graphics processing doorbells. In at least one embodiment, workloads can then be automatically distributed across processing array 3212 by scheduler 3210 logic within a microcontroller including scheduler 3210.

In at least one embodiment, processing array 3212 can include up to "N" clusters (e.g., cluster 3214A, cluster 3214B, through cluster 3214N). In at least one embodiment, each cluster 3214A-3214N of processing array 3212 can execute a large number of concurrent threads. In at least one embodiment, scheduler 3210 can allocate work to clusters 3214A-3214N of processing array 3212 using various scheduling and/or work distribution algorithms, which may vary depending on the workload arising for each type of program or computation. In at least one embodiment, scheduling can be handled dynamically by scheduler 3210, or can be assisted in part by compiler logic during compilation of program logic configured for execution by processing array 3212. In at least one embodiment, different clusters 3214A-3214N of processing array 3212 can be allocated for processing different types of programs or for performing different types of computations.

In at least one embodiment, processing array 3212 can be configured to perform various types of parallel processing operations. In at least one embodiment, processing array 3212 is configured to perform general-purpose parallel compute operations. For example, in at least one embodiment, processing array 3212 can include logic to execute processing tasks including filtering of video and/or audio data, performing modeling operations, including physics operations, and performing data transformations.

In at least one embodiment, processing array 3212 is configured to perform parallel graphics processing operations. In at least one embodiment, processing array 3212 can include additional logic to support execution of such graphics processing operations, including, but not limited to texture sampling logic to perform texture operations, as well as tessellation logic and other vertex processing logic. In at least one embodiment, processing array 3212 can be configured to execute graphics processing related shader programs such as, but not limited to vertex shaders, tessellation shaders, geometry shaders, and pixel shaders. In at least one embodiment, parallel processing unit 3202 can transfer data from system memory via I/O unit 3204 for processing. In at least one embodiment, during processing, transferred data can be stored to on-chip memory (e.g., a parallel processor memory 3222) during processing, then written back to system memory.

In at least one embodiment, when parallel processing unit 3202 is used to perform graphics processing, scheduler 3210 can be configured to divide a processing workload into approximately equal sized tasks, to better enable distribution of graphics processing operations to multiple clusters 3214A-3214N of processing array 3212. In at least one embodiment, portions of processing array 3212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3214A-3214N may be stored in buffers to allow intermediate data to be transmitted between clusters 3214A-3214N for further processing.

In at least one embodiment, processing array 3212 can receive processing tasks to be executed via scheduler 3210, which receives commands defining processing tasks from front end 3208. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3210 may be configured to fetch indices corresponding to tasks or may receive indices from front end 3208. In at least one embodiment, front end 3208 can be configured to ensure processing array 3212 is configured to a valid state before a workload specified by incoming command buffers (e.g., batch-buffers, push buffers, etc.) is initiated.

In at least one embodiment, each of one or more instances of parallel processing unit 3202 can couple with parallel processor memory 3222. In at least one embodiment, parallel processor memory 3222 can be accessed via memory crossbar 3216, which can receive memory requests from processing array 3212 as well as I/O unit 3204. In at least one embodiment, memory crossbar 3216 can access parallel processor memory 3222 via a memory interface 3218. In at least one embodiment, memory interface 3218 can include multiple partition units (e.g., a partition unit 3220A, partition unit 3220B, through partition unit 3220N) that can each couple to a portion (e.g., memory unit) of parallel processor memory 3222. In at least one embodiment, a number of partition units 3220A-3220N is configured to be equal to a number of memory units, such that a first partition unit 3220A has a corresponding first memory unit 3224A, a second partition unit 3220B has a corresponding memory unit 3224B, and an Nth partition unit 3220N has a corresponding Nth memory unit 3224N. In at least one embodiment, a number of partition units 3220A-3220N may not be equal to a number of memory devices.

In at least one embodiment, memory units 3224A-3224N can include various types of memory devices, including DRAM or graphics random access memory, such as SGRAM, including GDDR memory. In at least one embodiment, memory units 3224A-3224N may also include 3D stacked memory, including but not limited to high bandwidth memory ("HBM"). In at least one embodiment, render targets, such as frame buffers or texture maps may be stored across memory units 3224A-3224N, allowing partition units 3220A-3220N to write portions of each render target in parallel to efficiently use available bandwidth of parallel processor memory 3222. In at least one embodiment, a local instance of parallel processor memory 3222 may be excluded in favor of a unified memory design that utilizes system memory in conjunction with local cache memory.

In at least one embodiment, any one of clusters 3214A-3214N of processing array 3212 can process data that will be written to any of memory units 3224A-3224N within parallel processor memory 3222. In at least one embodiment, memory crossbar 3216 can be configured to transfer an output of each cluster 3214A-3214N to any partition unit 3220A-3220N or to another cluster 3214A-3214N, which can perform additional processing operations on an output. In at least one embodiment, each cluster 3214A-3214N can communicate with memory interface 3218 through memory crossbar 3216 to read from or write to various external memory devices. In at least one embodiment, memory crossbar 3216 has a connection to memory interface 3218 to communicate with I/O unit 3204, as well as a connection to a local instance of parallel processor memory 3222, enabling processing units within different clusters 3214A-3214N to communicate with system memory or other memory that is not local to parallel processing unit 3202. In at least one embodiment, memory crossbar 3216 can use virtual channels to separate traffic streams between clusters 3214A-3214N and partition units 3220A-3220N.

In at least one embodiment, multiple instances of parallel processing unit 3202 can be provided on a single add-in card, or multiple add-in cards can be interconnected. In at least one embodiment, different instances of parallel processing unit 3202 can be configured to inter-operate even if different instances have different numbers of processing cores, different amounts of local parallel processor memory, and/or other configuration differences. For example, in at least one embodiment, some instances of parallel processing unit 3202 can include higher precision floating point units relative to other instances. In at least one embodiment, systems incorporating one or more instances of parallel processing unit 3202 or parallel processor 3200 can be implemented in a variety of configurations and form factors, including but not limited to desktop, laptop, or handheld personal computers, servers, workstations, game consoles, and/or embedded systems.

In at least one embodiment, at least one component shown or described with respect to FIG. 32A is used to implement techniques and/or functions described in connection with FIGS. 1-20. In at least one embodiment, parallel processor 3200 is used to perform an API to cause shared virtual memory to be allocated for use by a plurality of processors. In at least one embodiment, parallel processor 3200 is used to perform an API to cause physical memory corresponding to shared virtual memory to be designated for use by a plurality of processors. In at least one embodiment, parallel processor 3200 is used to perform an API to enable access to shared virtual memory by a plurality of processors. In at least one embodiment, parallel processor 3200 is used to perform an API to cause physical memory corresponding to shared virtual memory to be undesignated for use by a plurality of processors. In at least one embodiment, parallel processor 3200 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 32B:
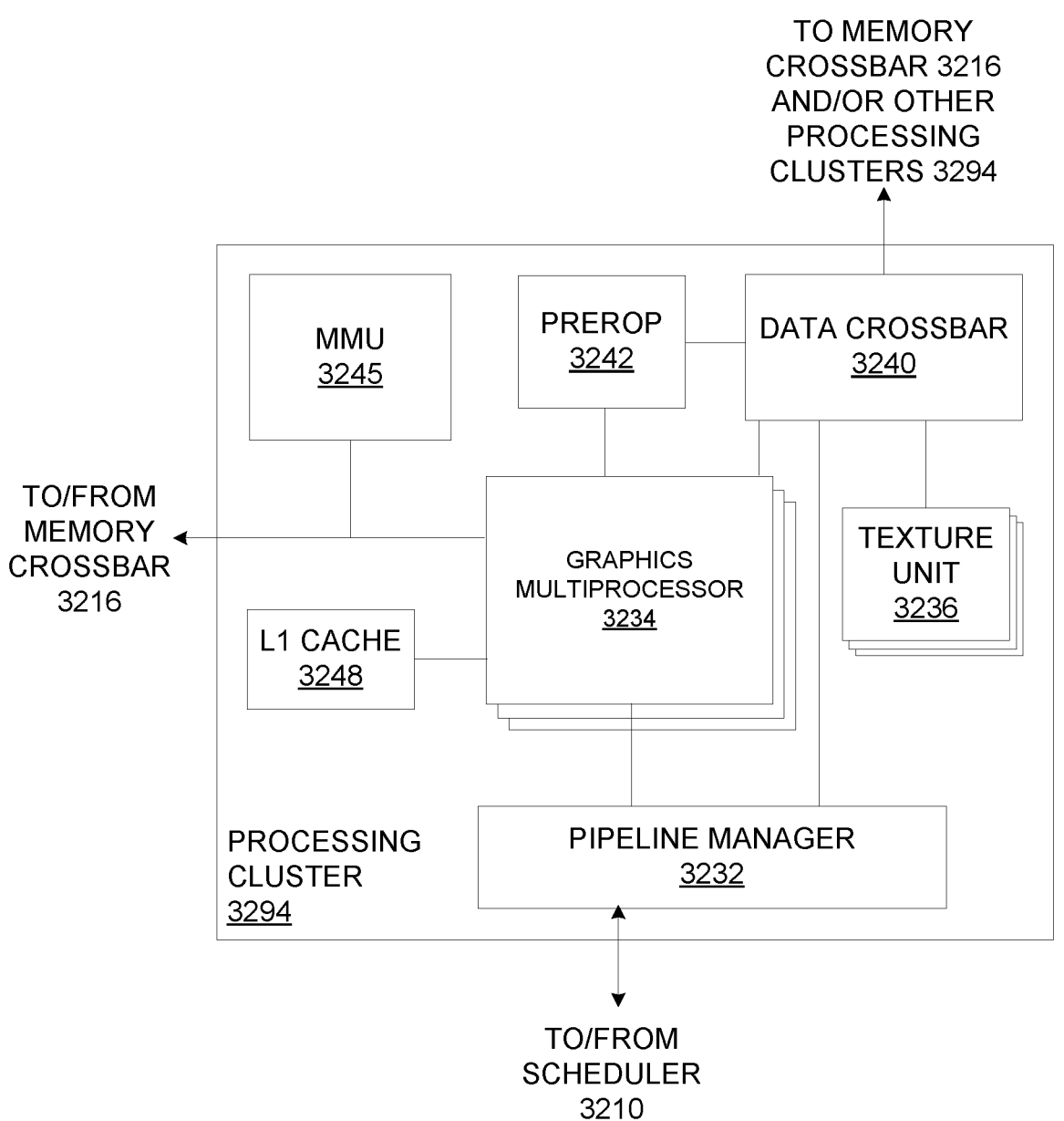
FIG. 32B illustrates a processing cluster, in accordance with at least one embodiment.

FIG. 32B illustrates a processing cluster 3294, in accordance with at least one embodiment. In at least one embodiment, processing cluster 3294 is included within a parallel processing unit. In at least one embodiment, processing cluster 3294 is one of processing clusters 3214A-3214N of FIG. 32. In at least one embodiment, processing cluster 3294 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3294.

In at least one embodiment, operation of processing cluster 3294 can be controlled via a pipeline manager 3232 that distributes processing tasks to SIMT parallel processors. In at least one embodiment, pipeline manager 3232 receives instructions from scheduler 3210 of FIG. 32 and manages execution of those instructions via a graphics multiprocessor 3234 and/or a texture unit 3236. In at least one embodiment, graphics multiprocessor 3234 is an exemplary instance of a SIMT parallel processor. However, in at least one embodiment, various types of SIMT parallel processors of differing architectures may be included within processing cluster 3294. In at least one embodiment, one or more instances of graphics multiprocessor 3234 can be included within processing cluster 3294. In at least one embodiment, graphics multiprocessor 3234 can process data and a data crossbar 3240 can be used to distribute processed data to one of multiple possible destinations, including other shader units. In at least one embodiment, pipeline manager 3232 can facilitate distribution of processed data by specifying destinations for processed data to be distributed via data crossbar 3240.

In at least one embodiment, each graphics multiprocessor 3234 within processing cluster 3294 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3294 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3234. In at least one embodiment, a thread group may include fewer threads than a number of processing engines within graphics multiprocessor 3234. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 3234. In at least one embodiment, when a thread group includes more threads than the number of processing engines within graphics multiprocessor 3234, processing can be performed over consecutive clock cycles. In at least one embodiment, multiple thread groups can be executed concurrently on graphics multiprocessor 3234.

In at least one embodiment, graphics multiprocessor 3234 includes an internal cache memory to perform load and store operations. In at least one embodiment, graphics multiprocessor 3234 can forego an internal cache and use a cache memory (e.g., L1 cache 3248) within processing cluster 3294. In at least one embodiment, each graphics multiprocessor 3234 also has access to Level 2 ("L2") caches within partition units (e.g., partition units 3220A-3220N of FIG. 32A) that are shared among all processing clusters 3294 and may be used to transfer data between threads. In at least one embodiment, graphics multiprocessor 3234 may also access off-chip global memory, which can include one or more of local parallel processor memory and/or system memory. In at least one embodiment, any memory external to parallel processing unit 3202 may be used as global memory. In at least one embodiment, processing cluster 3294 includes multiple instances of graphics multiprocessor 3234 that can share common instructions and data, which may be stored in L1 cache 3248.

In at least one embodiment, each processing cluster 3294 may include an MMU 3245 that is configured to map virtual addresses into physical addresses. In at least one embodiment, one or more instances of MMU 3245 may reside within memory interface 3218 of FIG. 32. In at least one embodiment, MMU 3245 includes a set of page table entries ("PTEs") used to map a virtual address to a physical address of a tile and optionally a cache line index. In at least one embodiment, MMU 3245 may include address translation lookaside buffers ("TLBs") or caches that may reside within graphics multiprocessor 3234 or L1 cache 3248 or processing cluster 3294. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3294 may be configured such that each graphics multiprocessor 3234 is coupled to a texture unit 3236 for performing texture mapping operations, e.g., determining texture sample positions, reading texture data, and filtering texture data. In at least one embodiment, texture data is read from an internal texture L1 cache (not shown) or from an L1 cache within graphics multiprocessor 3234 and is fetched from an L2 cache, local parallel processor memory, or system memory, as needed. In at least one embodiment, each graphics multiprocessor 3234 outputs a processed task to data crossbar 3240 to provide the processed task to another processing cluster 3294 for further processing or to store the processed task in an L2 cache, a local parallel processor memory, or a system memory via memory crossbar 3216. In at least one embodiment, a pre-raster operations unit ("preROP") 3242 is configured to receive data from graphics multiprocessor 3234, direct data to ROP units, which may be located with partition units as described herein (e.g., partition units 3220A-3220N of FIG. 32). In at least one embodiment, PreROP 3242 can perform optimizations for color blending, organize pixel color data, and perform address translations.

In at least one embodiment, at least one component shown or described with respect to FIG. 32B is used to implement techniques and/or functions described in connection with FIGS. 1-20. In at least one embodiment, graphics multiprocessor 3234 is used to perform an API to cause shared virtual memory to be allocated for use by a plurality of processors. In at least one embodiment, graphics multiprocessor 3234 is used to perform an API to cause physical memory corresponding to shared virtual memory to be designated for use by a plurality of processors. In at least one embodiment, graphics multiprocessor 3234 is used to perform an API to enable access to shared virtual memory by a plurality of processors. In at least one embodiment, graphics multiprocessor 3234 is used to perform an API to cause physical memory corresponding to shared virtual memory to be undesignated for use by a plurality of processors. In at least one embodiment, graphics multiprocessor 3234 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 32C:
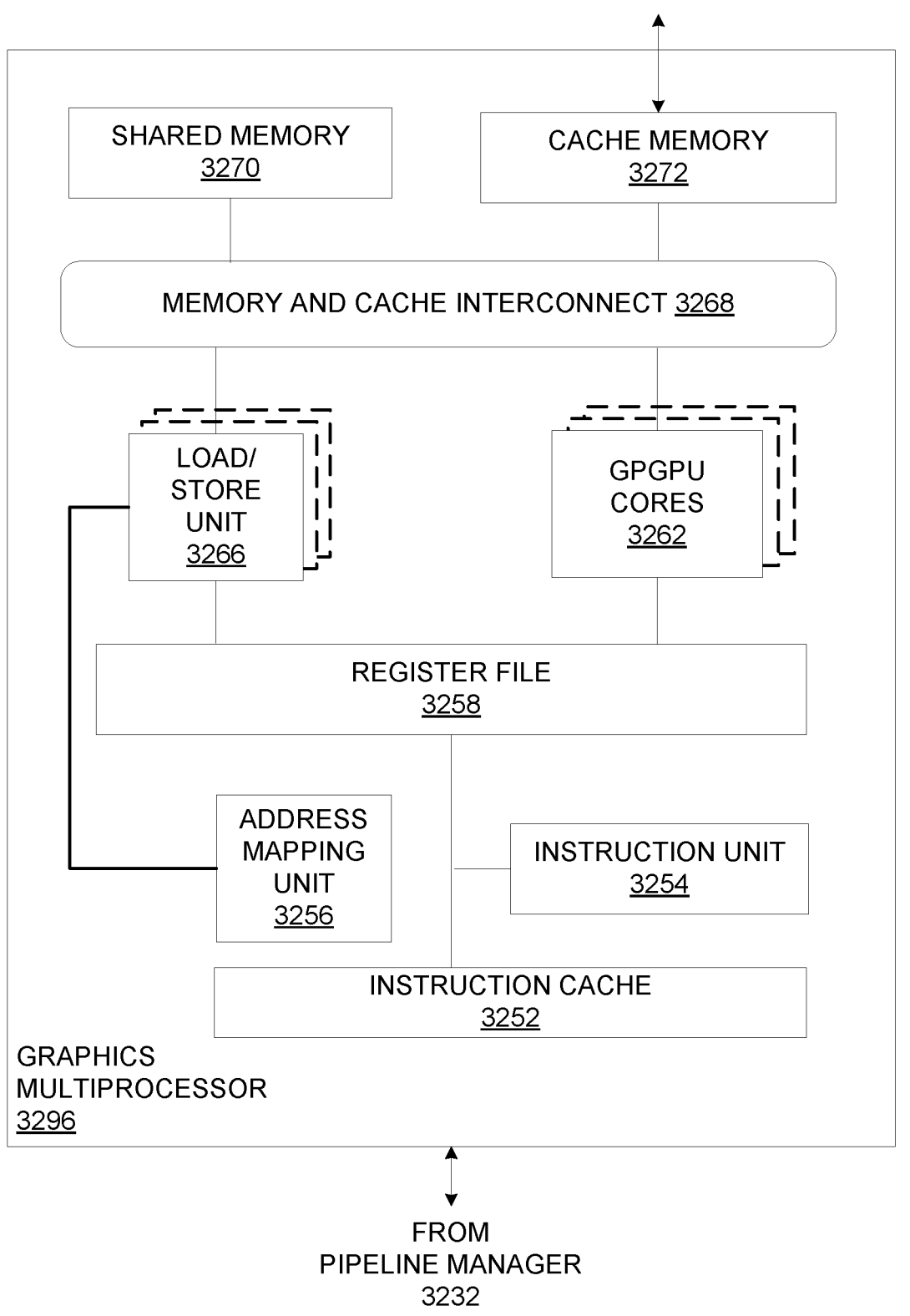
FIG. 32C illustrates a graphics multiprocessor, in accordance with at least one embodiment.

FIG. 32C illustrates a graphics multiprocessor 3296, in accordance with at least one embodiment. In at least one embodiment, graphics multiprocessor 3296 is graphics multiprocessor 3234 of FIG. 32B. In at least one embodiment, graphics multiprocessor 3296 couples with pipeline manager 3232 of processing cluster 3294. In at least one embodiment, graphics multiprocessor 3296 has an execution pipeline including but not limited to an instruction cache 3252, an instruction unit 3254, an address mapping unit 3256, a register file 3258, one or more GPGPU cores 3262, and one or more LSUs 3266. GPGPU cores 3262 and LSUs 3266 are coupled with cache memory 3272 and shared memory 3270 via a memory and cache interconnect 3268.

In at least one embodiment, instruction cache 3252 receives a stream of instructions to execute from pipeline manager 3232. In at least one embodiment, instructions are cached in instruction cache 3252 and dispatched for execution by instruction unit 3254. In at least one embodiment, instruction unit 3254 can dispatch instructions as thread groups (e.g., warps), with each thread of a thread group assigned to a different execution unit within GPGPU core 3262. In at least one embodiment, an instruction can access any of a local, shared, or global address space by specifying an address within a unified address space. In at least one embodiment, address mapping unit 3256 can be used to translate addresses in a unified address space into a distinct memory address that can be accessed by LSUs 3266.

In at least one embodiment, register file 3258 provides a set of registers for functional units of graphics multiprocessor 3296. In at least one embodiment, register file 3258 provides temporary storage for operands connected to data paths of functional units (e.g., GPGPU cores 3262, LSUs 3266) of graphics multiprocessor 3296. In at least one embodiment, register file 3258 is divided between each of functional units such that each functional unit is allocated a dedicated portion of register file 3258. In at least one embodiment, register file 3258 is divided between different thread groups being executed by graphics multiprocessor 3296.

In at least one embodiment, GPGPU cores 3262 can each include FPUs and/or integer ALUs that are used to execute instructions of graphics multiprocessor 3296. GPGPU cores 3262 can be similar in architecture or can differ in architecture. In at least one embodiment, a first portion of GPGPU cores 3262 include a single precision FPU and an integer ALU while a second portion of GPGPU cores 3262 include a double precision FPU. In at least one embodiment, FPUs can implement IEEE 754-2008 standard for floating point arithmetic or enable variable precision floating point arithmetic. In at least one embodiment, graphics multiprocessor 3296 can additionally include one or more fixed function or special function units to perform specific functions such as copy rectangle or pixel blending operations. In at least one embodiment one or more of GPGPU cores 3262 can also include fixed or special function logic.

In at least one embodiment, GPGPU cores 3262 include SIMD logic capable of performing a single instruction on multiple sets of data. In at least one embodiment GPGPU cores 3262 can physically execute SIMD4, SIMD8, and SIMD16 instructions and logically execute SIMD1, SIMD2, and SIMD32 instructions. In at least one embodiment, SIMD instructions for GPGPU cores 3262 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3268 is an interconnect network that connects each functional unit of graphics multiprocessor 3296 to register file 3258 and to shared memory 3270. In at least one embodiment, memory and cache interconnect 3268 is a crossbar interconnect that allows LSU 3266 to implement load and store operations between shared memory 3270 and register file 3258. In at least one embodiment, register file 3258 can operate at a same frequency as GPGPU cores 3262, thus data transfer between GPGPU cores 3262 and register file 3258 is very low latency. In at least one embodiment, shared memory 3270 can be used to enable communication between threads that execute on functional units within graphics multiprocessor 3296. In at least one embodiment, cache memory 3272 can be used as a data cache for example, to cache texture data communicated between functional units and texture unit 3236. In at least one embodiment, shared memory 3270 can also be used as a program managed cached. In at least one embodiment, threads executing on GPGPU cores 3262 can programmatically store data within shared memory in addition to automatically cached data that is stored within cache memory 3272.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

In at least one embodiment, at least one component shown or described with respect to FIG. 32C is used to implement techniques and/or functions described in connection with FIGS. 1-20. In at least one embodiment, graphics multiprocessor 3296 is used to perform an API to cause shared virtual memory to be allocated for use by a plurality of processors. In at least one embodiment, graphics multiprocessor 3296 is used to perform an API to cause physical memory corresponding to shared virtual memory to be designated for use by a plurality of processors. In at least one embodiment, graphics multiprocessor 3296 is used to perform an API to enable access to shared virtual memory by a plurality of processors. In at least one embodiment, graphics multiprocessor 3296 is used to perform an API to cause physical memory corresponding to shared virtual memory to be undesignated for use by a plurality of processors. In at least one embodiment, graphics multiprocessor 3296 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 33:
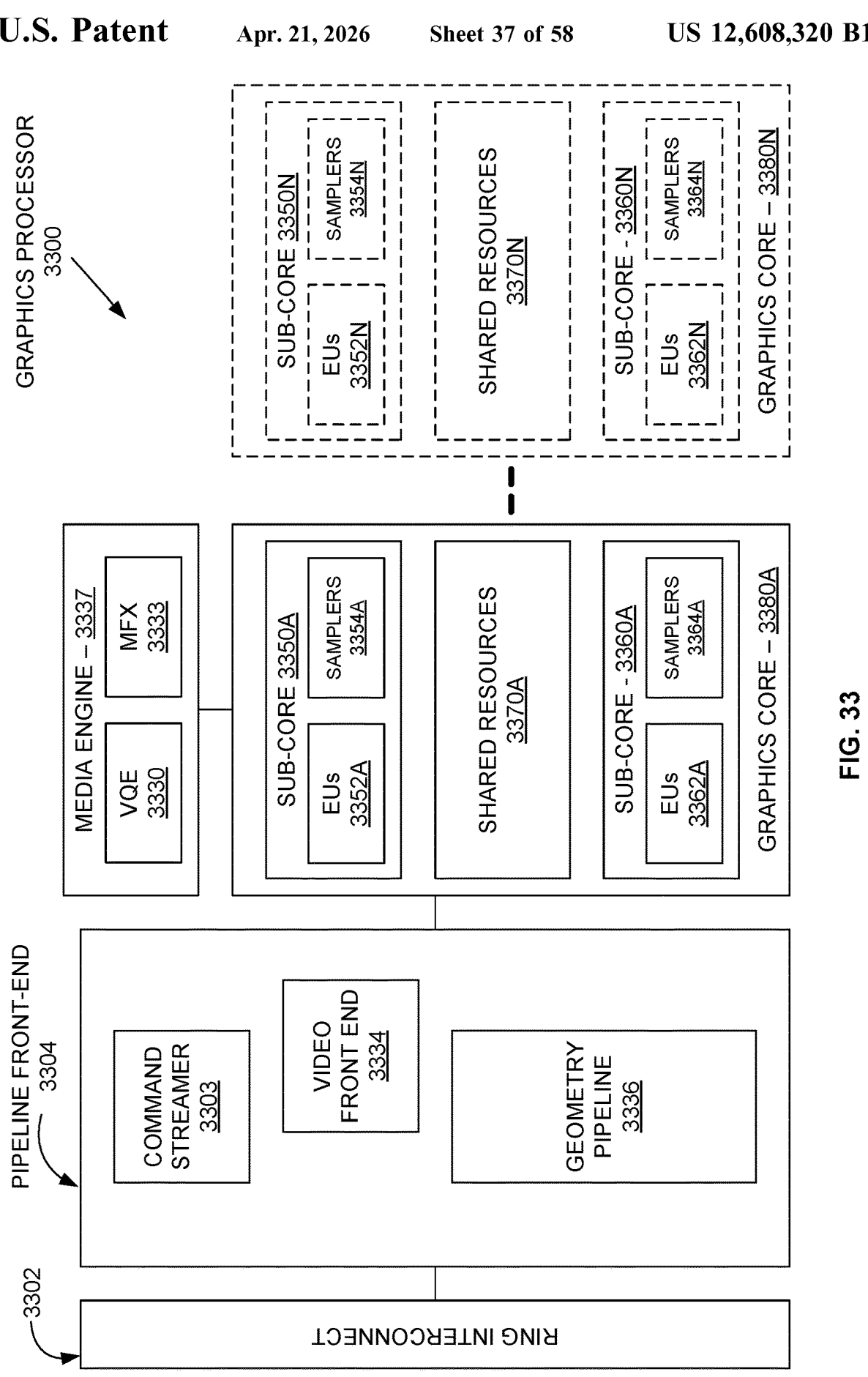
FIG. 33 illustrates a graphics processor, in accordance with at least one embodiment.

FIG. 33 illustrates a graphics processor 3300, in accordance with at least one embodiment. In at least one embodiment, graphics processor 3300 includes a ring interconnect 3302, a pipeline front-end 3304, a media engine 3337, and graphics cores 3380A-3380N. In at least one embodiment, ring interconnect 3302 couples graphics processor 3300 to other processing units, including other graphics processors or one or more general-purpose processor cores. In at least one embodiment, graphics processor 3300 is one of many processors integrated within a multi-core processing system.

In at least one embodiment, graphics processor 3300 receives batches of commands via ring interconnect 3302. In at least one embodiment, incoming commands are interpreted by a command streamer 3303 in pipeline front-end 3304. In at least one embodiment, graphics processor 3300 includes scalable execution logic to perform 3D geometry processing and media processing via graphics core(s) 3380A-3380N. In at least one embodiment, for 3D geometry processing commands, command streamer 3303 supplies commands to geometry pipeline 3336. In at least one embodiment, for at least some media processing commands, command streamer 3303 supplies commands to a video front end 3334, which couples with a media engine 3337. In at least one embodiment, media engine 3337 includes a Video Quality Engine ("VQE") 3330 for video and image post-processing and a multi-format encode/decode ("MFX") engine 3333 to provide hardware-accelerated media data encode and decode. In at least one embodiment, geometry pipeline 3336 and media engine 3337 each generate execution threads for thread execution resources provided by at least one graphics core 3380A.

In at least one embodiment, graphics processor 3300 includes scalable thread execution resources featuring modular graphics cores 3380A-3380N (sometimes referred to as core slices), each having multiple sub-cores 3350A-550N, 3360A-3360N (sometimes referred to as core sub-slices). In at least one embodiment, graphics processor 3300 can have any number of graphics cores 3380A through 3380N. In at least one embodiment, graphics processor 3300 includes a graphics core 3380A having at least a first sub-core 3350A and a second sub-core 3360A. In at least one embodiment, graphics processor 3300 is a low power processor with a single sub-core (e.g., sub-core 3350A). In at least one embodiment, graphics processor 3300 includes multiple graphics cores 3380A-3380N, each including a set of first sub-cores 3350A-3350N and a set of second sub-cores 3360A-3360N. In at least one embodiment, each sub-core in first sub-cores 3350A-3350N includes at least a first set of execution units ("EUs") 3352A-3352N and media/texture samplers 3354A-3354N. In at least one embodiment, each sub-core in second sub-cores 3360A-3360N includes at least a second set of execution units 3362A-3362N and samplers 3364A-3364N. In at least one embodiment, each sub-core 3350A-3350N, 3360A-3360N shares a set of shared resources 3370A-3370N. In at least one embodiment, shared resources 3370 include shared cache memory and pixel operation logic.

In at least one embodiment, at least one component shown or described with respect to FIG. 33 is used to implement techniques and/or functions described in connection with FIGS. 1-20. In at least one embodiment, graphics processor 3300 is used to perform an API to cause shared virtual memory to be allocated for use by a plurality of processors. In at least one embodiment, graphics processor 3300 is used to perform an API to cause physical memory corresponding to shared virtual memory to be designated for use by a plurality of processors. In at least one embodiment, graphics processor 3300 is used to perform an API to enable access to shared virtual memory by a plurality of processors. In at least one embodiment, graphics processor 3300 is used to perform an API to cause physical memory corresponding to shared virtual memory to be undesignated for use by a plurality of processors. In at least one embodiment, graphics processor 3300 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 34:
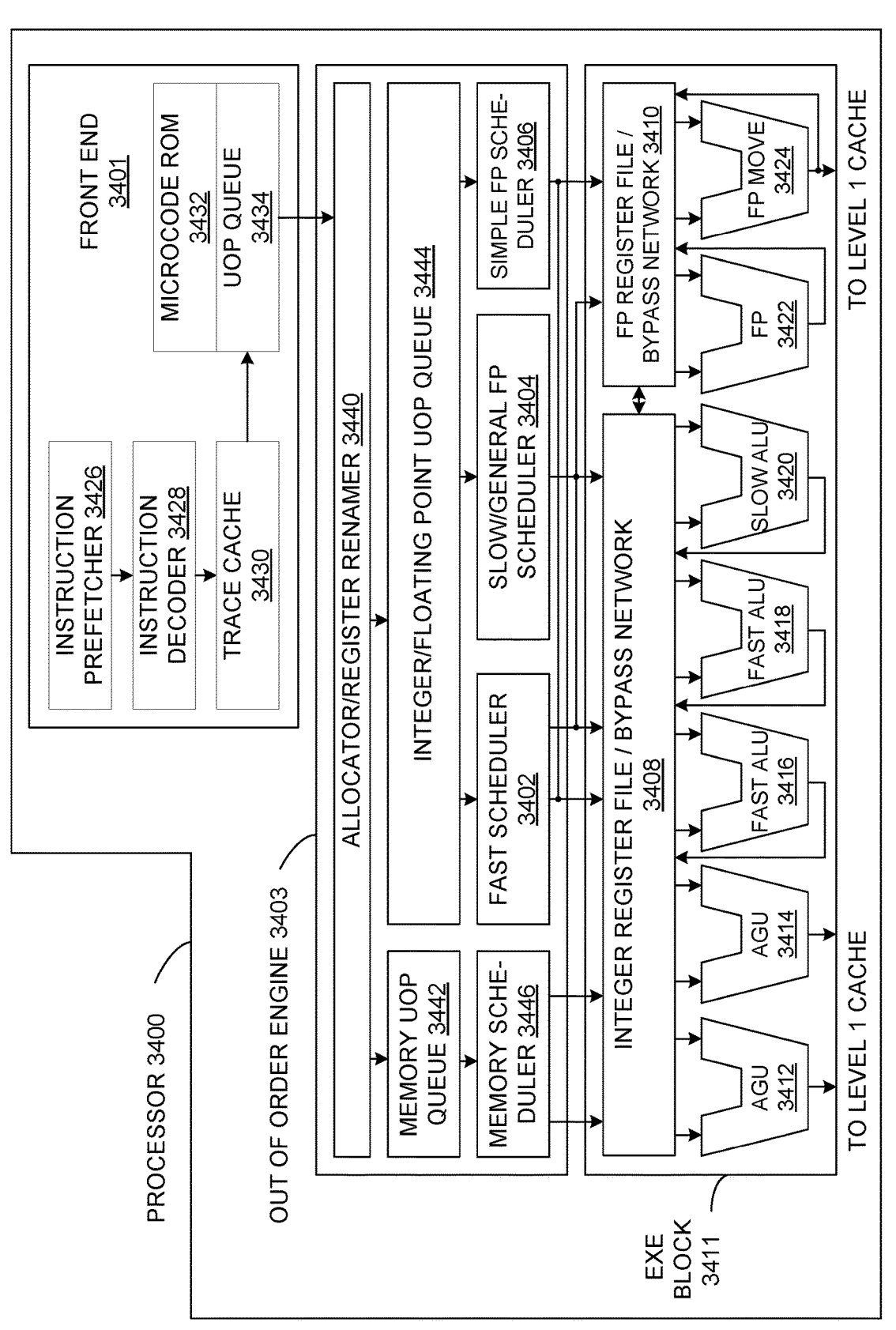
FIG. 34 illustrates a processor, in accordance with at least one embodiment.

FIG. 34 illustrates a processor 3400, in accordance with at least one embodiment. In at least one embodiment, processor 3400 may include, without limitation, logic circuits to perform instructions. In at least one embodiment, processor 3400 may perform instructions, including x86 instructions, ARM instructions, specialized instructions for ASICs, etc. In at least one embodiment, processor 3410 may include registers to store packed data, such as 64-bit wide MMXTM registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3410 may perform instructions to accelerate CUDA programs.

In at least one embodiment, processor 3400 includes an in-order front end ("front end") 3401 to fetch instructions to be executed and prepare instructions to be used later in processor pipeline. In at least one embodiment, front end 3401 may include several units. In at least one embodiment, an instruction prefetcher 3426 fetches instructions from memory and feeds instructions to an instruction decoder 3428 which in turn decodes or interprets instructions. For example, in at least one embodiment, instruction decoder 3428 decodes a received instruction into one or more operations called "micro-instructions" or "micro-operations" (also called "micro ops" or "uops") for execution. In at least one embodiment, instruction decoder 3428 parses instruction into an opcode and corresponding data and control fields that may be used by micro-architecture to perform operations. In at least one embodiment, a trace cache 3430 may assemble decoded uops into program ordered sequences or traces in a uop queue 3434 for execution. In at least one embodiment, when trace cache 3430 encounters a complex instruction, a microcode ROM 3432 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 3428 may access microcode ROM 3432 to perform instruction. In at least one embodiment, an instruction may be decoded into a small number of micro-ops for processing at instruction decoder 3428. In at least one embodiment, an instruction may be stored within microcode ROM 3432 should a number of micro-ops be needed to accomplish operation. In at least one embodiment, trace cache 3430 refers to an entry point programmable logic array ("PLA") to determine a correct micro-instruction pointer for reading microcode sequences to complete one or more instructions from microcode ROM 3432. In at least one embodiment, after microcode ROM 3432 finishes sequencing micro-ops for an instruction, front end 3401 of machine may resume fetching micro-ops from trace cache 3430.

In at least one embodiment, out-of-order execution engine ("out of order engine") 3403 may prepare instructions for execution. In at least one embodiment, out-of-order execution logic has a number of buffers to smooth out and re-order the flow of instructions to optimize performance as they go down a pipeline and get scheduled for execution. Out-of-order execution engine 3403 includes, without limitation, an allocator/register renamer 3440, a memory uop queue 3442, an integer/floating point uop queue 3444, a memory scheduler 3446, a fast scheduler 3402, a slow/general floating point scheduler ("slow/general FP scheduler") 3404, and a simple floating point scheduler ("simple FP scheduler") 3406. In at least one embodiment, fast schedule 3402, slow/general floating point scheduler 3404, and simple floating point scheduler 3406 are also collectively referred to herein as "uop schedulers 3402, 3404, 3406." Allocator/register renamer 3440 allocates machine buffers and resources that each uop needs in order to execute. In at least one embodiment, allocator/register renamer 3440 renames logic registers onto entries in a register file. In at least one embodiment, allocator/register renamer 3440 also allocates an entry for each uop in one of two uop queues, memory uop queue 3442 for memory operations and integer/floating point uop queue 3444 for non-memory operations, in front of memory scheduler 3446 and uop schedulers 3402, 3404, 3406. In at least one embodiment, uop schedulers 3402, 3404, 3406, determine when a uop is ready to execute based on readiness of their dependent input register operand sources and availability of execution resources uops need to complete their operation. In at least one embodiment, fast scheduler 3402 of at least one embodiment may schedule on each half of main clock cycle while slow/general floating point scheduler 3404 and simple floating point scheduler 3406 may schedule once per main processor clock cycle. In at least one embodiment, uop schedulers 3402, 3404, 3406 arbitrate for dispatch ports to schedule uops for execution.

In at least one embodiment, execution block 3411 includes, without limitation, an integer register file/bypass network 3408, a floating point register file/bypass network ("FP register file/bypass network") 3410, address generation units ("AGUs") 3412 and 3414, fast ALUs 3416 and 3418, a slow ALU 3420, a floating point ALU ("FP") 3422, and a floating point move unit ("FP move") 3424. In at least one embodiment, integer register file/bypass network 3408 and floating point register file/bypass network 3410 are also referred to herein as "register files 3408, 3410." In at least one embodiment, AGUSs 3412 and 3414, fast ALUs 3416 and 3418, slow ALU 3420, floating point ALU 3422, and floating point move unit 3424 are also referred to herein as "execution units 3412, 3414, 3416, 3418, 3420, 3422, and 3424." In at least one embodiment, an execution block may include, without limitation, any number (including zero) and type of register files, bypass networks, address generation units, and execution units, in any combination.

In at least one embodiment, register files 3408, 3410 may be arranged between uop schedulers 3402, 3404, 3406, and execution units 3412, 3414, 3416, 3418, 3420, 3422, and 3424. In at least one embodiment, integer register file/bypass network 3408 performs integer operations. In at least one embodiment, floating point register file/bypass network 3410 performs floating point operations. In at least one embodiment, each of register files 3408, 3410 may include, without limitation, a bypass network that may bypass or forward just completed results that have not yet been written into register file to new dependent uops. In at least one embodiment, register files 3408, 3410 may communicate data with each other. In at least one embodiment, integer register file/bypass network 3408 may include, without limitation, two separate register files, one register file for low-order thirty-two bits of data and a second register file for high order thirty-two bits of data. In at least one embodiment, floating point register file/bypass network 3410 may include, without limitation, 128-bit wide entries because floating point instructions typically have operands from 64 to 128 bits in width.

In at least one embodiment, execution units 3412, 3414, 3416, 3418, 3420, 3422, 3424 may execute instructions. In at least one embodiment, register files 3408, 3410 store integer and floating point data operand values that micro-instructions need to execute. In at least one embodiment, processor 3400 may include, without limitation, any number and combination of execution units 3412, 3414, 3416, 3418, 3420, 3422, 3424. In at least one embodiment, floating point ALU 3422 and floating point move unit 3424 may execute floating point, MMX, SIMD, AVX and SSE, or other operations. In at least one embodiment, floating point ALU 3422 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3416, 3418. In at least one embodiment, fast ALUS 3416, 3418 may execute fast operations with an effective latency of half a clock cycle. In at least one embodiment, most complex integer operations go to slow ALU 3420 as slow ALU 3420 may include, without limitation, integer execution hardware for long-latency type of operations, such as a multiplier, shifts, flag logic, and branch processing. In at least one embodiment, memory load/store operations may be executed by AGUs 3412, 3414. In at least one embodiment, fast ALU 3416, fast ALU 3418, and slow ALU 3420 may perform integer operations on 64-bit data operands. In at least one embodiment, fast ALU 3416, fast ALU 3418, and slow ALU 3420 may be implemented to support a variety of data bit sizes including sixteen, thirty-two, 128, 256, etc. In at least one embodiment, floating point ALU 3422 and floating point move unit 3424 may be implemented to support a range of operands having bits of various widths. In at least one embodiment, floating point ALU 3422 and floating point move unit 3424 may operate on 128-bit wide packed data operands in conjunction with SIMD and multimedia instructions.

In at least one embodiment, uop schedulers 3402, 3404, 3406 dispatch dependent operations before parent load has finished executing. In at least one embodiment, as uops may be speculatively scheduled and executed in processor 3400, processor 3400 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 34 is used to implement techniques and/or functions described in connection with FIGS. 1-20. In at least one embodiment, processor 3400 is used to perform an API to cause shared virtual memory to be allocated for use by a plurality of processors. In at least one embodiment, processor 3400 is used to perform an API to cause physical memory corresponding to shared virtual memory to be designated for use by a plurality of processors. In at least one embodiment, processor 3400 is used to perform an API to enable access to shared virtual memory by a plurality of processors. In at least one embodiment, processor 3400 is used to perform an API to cause physical memory corresponding to shared virtual memory to be undesignated for use by a plurality of processors. In at least one embodiment, processor 3400 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 35:
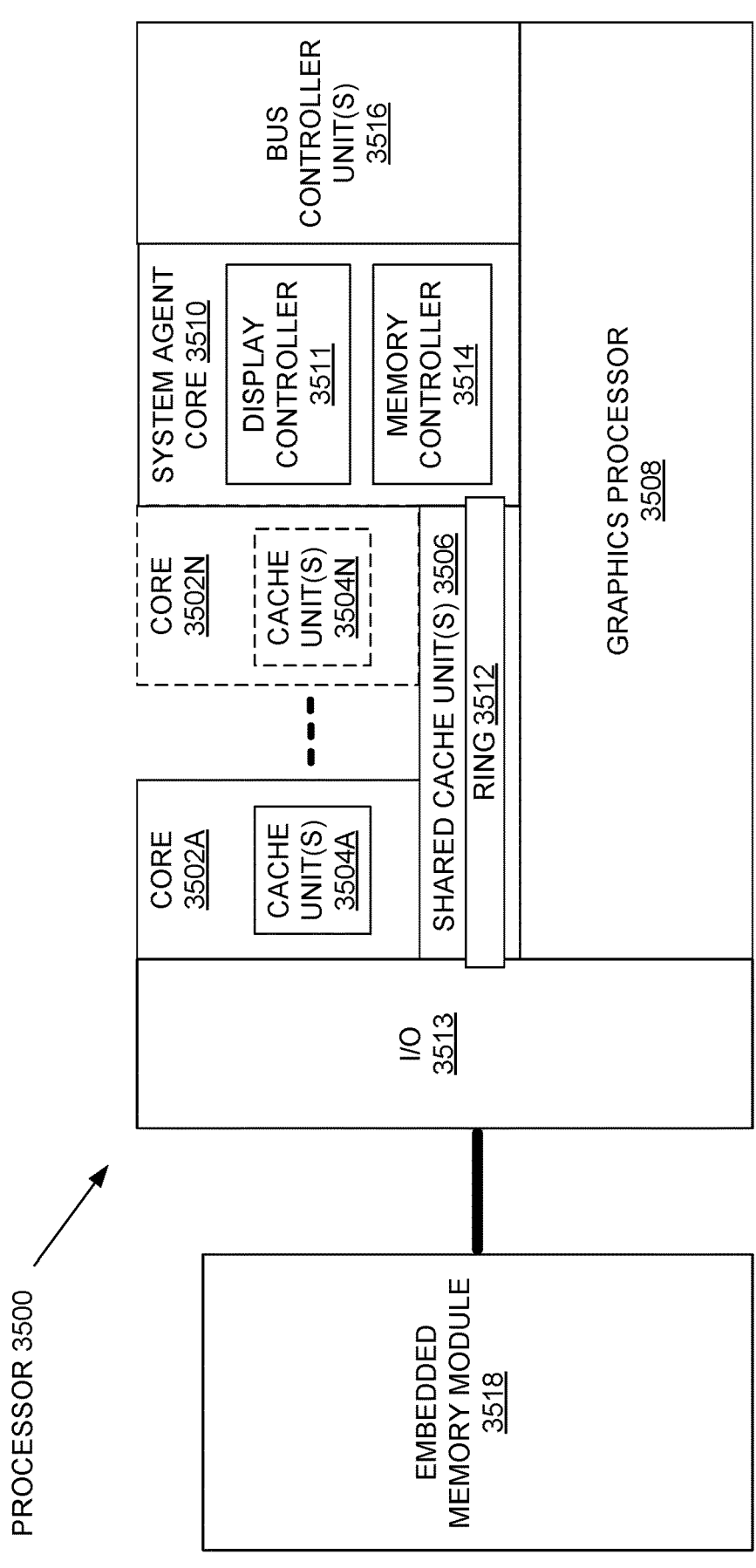
FIG. 35 illustrates a processor, in accordance with at least one embodiment.

FIG. 35 illustrates a processor 3500, in accordance with at least one embodiment. In at least one embodiment, processor 3500 includes, without limitation, one or more processor cores ("cores") 3502A-3502N, an integrated memory controller 3514, and an integrated graphics processor 3508. In at least one embodiment, processor 3500 can include additional cores up to and including additional processor core 3502N represented by dashed lined boxes. In at least one embodiment, each of processor cores 3502A-3502N includes one or more internal cache units 3504A-3504N. In at least one embodiment, each processor core also has access to one or more shared cached units 3506.

In at least one embodiment, internal cache units 3504A-3504N and shared cache units 3506 represent a cache memory hierarchy within processor 3500. In at least one embodiment, cache memory units 3504A-3504N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 3506 and 3504A-3504N.

In at least one embodiment, processor 3500 may also include a set of one or more bus controller units 3516 and a system agent core 3510. In at least one embodiment, one or more bus controller units 3516 manage a set of peripheral buses, such as one or more PCI or PCI express buses. In at least one embodiment, system agent core 3510 provides management functionality for various processor components. In at least one embodiment, system agent core 3510 includes one or more integrated memory controllers 3514 to manage access to various external memory devices (not shown).

In at least one embodiment, one or more of processor cores 3502A-3502N include support for simultaneous multi-threading. In at least one embodiment, system agent core 3510 includes components for coordinating and operating processor cores 3502A-3502N during multi-threaded processing. In at least one embodiment, system agent core 3510 may additionally include a power control unit ("PCU"), which includes logic and components to regulate one or more power states of processor cores 3502A-3502N and graphics processor 3508.

In at least one embodiment, processor 3500 additionally includes graphics processor 3508 to execute graphics processing operations. In at least one embodiment, graphics processor 3508 couples with shared cache units 3506, and system agent core 3510, including one or more integrated memory controllers 3514. In at least one embodiment, system agent core 3510 also includes a display controller 3511 to drive graphics processor output to one or more coupled displays. In at least one embodiment, display controller 3511 may also be a separate module coupled with graphics processor 3508 via at least one interconnect, or may be integrated within graphics processor 3508.

In at least one embodiment, a ring based interconnect unit 3512 is used to couple internal components of processor 3500. In at least one embodiment, an alternative interconnect unit may be used, such as a point-to-point interconnect, a switched interconnect, or other techniques. In at least one embodiment, graphics processor 3508 couples with ring interconnect 3512 via an I/O link 3513.

In at least one embodiment, I/O link 3513 represents at least one of multiple varieties of I/O interconnects, including an on package I/O interconnect which facilitates communication between various processor components and a high-performance embedded memory module 3518, such as an eDRAM module. In at least one embodiment, each of processor cores 3502A-3502N and graphics processor 3508 use embedded memory modules 3518 as a shared LLC.

In at least one embodiment, processor cores 3502A-3502N are homogeneous cores executing a common instruction set architecture. In at least one embodiment, processor cores 3502A-3502N are heterogeneous in terms of ISA, where one or more of processor cores 3502A-3502N execute a common instruction set, while one or more other cores of processor cores 3502A-35-02N executes a subset of a common instruction set or a different instruction set. In at least one embodiment, processor cores 3502A-3502N are heterogeneous in terms of microarchitecture, where one or more cores having a relatively higher power consumption couple with one or more cores having a lower power consumption. In at least one embodiment, processor 3500 can be implemented on one or more chips or as an SoC integrated circuit.

In at least one embodiment, at least one component shown or described with respect to FIG. 35 is used to implement techniques and/or functions described in connection with FIGS. 1-20. In at least one embodiment, at least one of processor 3500 or graphics processor 3508 is used to perform an API to cause shared virtual memory to be allocated for use by a plurality of processors. In at least one embodiment, at least one of processor 3500 or graphics processor 3508 is used to perform an API to cause physical memory corresponding to shared virtual memory to be designated for use by a plurality of processors. In at least one embodiment, at least one of processor 3500 or graphics processor 3508 is used to perform an API to enable access to shared virtual memory by a plurality of processors. In at least one embodiment, at least one of processor 3500 or graphics processor 3508 is used to perform an API to cause physical memory corresponding to shared virtual memory to be undesignated for use by a plurality of processors. In at least one embodiment, at least one of processor 3500 or graphics processor 3508 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 36:
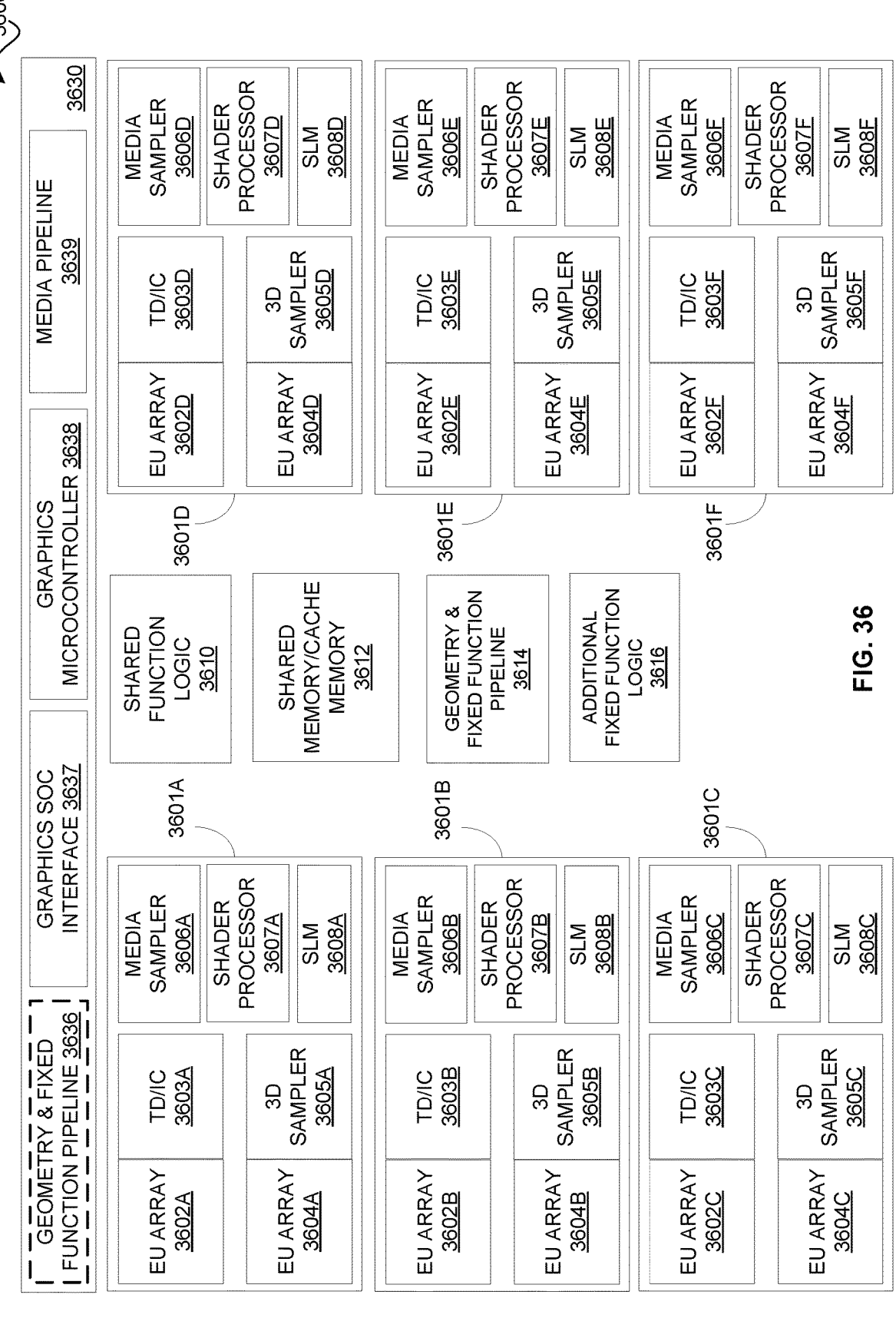
FIG. 36 illustrates a graphics processor core, in accordance with at least one embodiment.

FIG. 36 illustrates a graphics processor core 3600, in accordance with at least one embodiment described. In at least one embodiment, graphics processor core 3600 is included within a graphics core array. In at least one embodiment, graphics processor core 3600, sometimes referred to as a core slice, can be one or multiple graphics cores within a modular graphics processor. In at least one embodiment, graphics processor core 3600 is exemplary of one graphics core slice, and a graphics processor as described herein may include multiple graphics core slices based on target power and performance envelopes. In at least one embodiment, each graphics core 3600 can include a fixed function block 3630 coupled with multiple sub-cores 3601A-3601F, also referred to as sub-slices, that include modular blocks of general-purpose and fixed function logic.

In at least one embodiment, fixed function block 3630 includes a geometry/fixed function pipeline 3636 that can be shared by all sub-cores in graphics processor 3600, for example, in lower performance and/or lower power graphics processor implementations. In at least one embodiment, geometry/fixed function pipeline 3636 includes a 3D fixed function pipeline, a video front-end unit, a thread spawner and thread dispatcher, and a unified return buffer manager, which manages unified return buffers.

In at least one embodiment, fixed function block 3630 also includes a graphics SoC interface 3637, a graphics microcontroller 3638, and a media pipeline 3639. Graphics SoC interface 3637 provides an interface between graphics core 3600 and other processor cores within an SoC integrated circuit. In at least one embodiment, graphics microcontroller 3638 is a programmable sub-processor that is configurable to manage various functions of graphics processor 3600, including thread dispatch, scheduling, and pre-emption. In at least one embodiment, media pipeline 3639 includes logic to facilitate decoding, encoding, pre-processing, and/or post-processing of multimedia data, including image and video data. In at least one embodiment, media pipeline 3639 implements media operations via requests to compute or sampling logic within sub-cores 3601-3601F.

In at least one embodiment, SoC interface 3637 enables graphics core 3600 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3637 can also enable communication with fixed function devices within an SoC, such as camera imaging pipelines, and enables use of and/or implements global memory atomics that may be shared between graphics core 3600 and CPUs within an SoC. In at least one embodiment, SoC interface 3637 can also implement power management controls for graphics core 3600 and enable an interface between a clock domain of graphic core 3600 and other clock domains within an SoC. In at least one embodiment, SoC interface 3637 enables receipt of command buffers from a command streamer and global thread dispatcher that are configured to provide commands and instructions to each of one or more graphics cores within a graphics processor. In at least one embodiment, commands and instructions can be dispatched to media pipeline 3639, when media operations are to be performed, or a geometry and fixed function pipeline (e.g., geometry and fixed function pipeline 3636, geometry and fixed function pipeline 3614) when graphics processing operations are to be performed.

In at least one embodiment, graphics microcontroller 3638 can be configured to perform various scheduling and management tasks for graphics core 3600. In at least one embodiment, graphics microcontroller 3638 can perform graphics and/or compute workload scheduling on various graphics parallel engines within execution unit (EU) arrays 3602A-3602F, 3604A-3604F within sub-cores 3601A-3601F. In at least one embodiment, host software executing on a CPU core of an SoC including graphics core 3600 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3638 can also facilitate low-power or idle states for graphics core 3600, providing graphics core 3600 with an ability to save and restore registers within graphics core 3600 across low-power state transitions independently from an operating system and/or graphics driver software on a system.

In at least one embodiment, graphics core 3600 may have greater than or fewer than illustrated sub-cores 3601A-3601F, up to N modular sub-cores. For each set of N sub-cores, in at least one embodiment, graphics core 3600 can also include shared function logic 3610, shared and/or cache memory 3612, a geometry/fixed function pipeline 3614, as well as additional fixed function logic 3616 to accelerate various graphics and compute processing operations. In at least one embodiment, shared function logic 3610 can include logic units (e.g., sampler, math, and/or inter-thread communication logic) that can be shared by each N sub-cores within graphics core 3600. Shared and/or cache memory 3612 can be an LLC for N sub-cores 3601A-3601F within graphics core 3600 and can also serve as shared memory that is accessible by multiple sub-cores. In at least one embodiment, geometry/fixed function pipeline 3614 can be included instead of geometry/fixed function pipeline 3636 within fixed function block 3630 and can include same or similar logic units.

In at least one embodiment, graphics core 3600 includes additional fixed function logic 3616 that can include various fixed function acceleration logic for use by graphics core 3600. In at least one embodiment, additional fixed function logic 3616 includes an additional geometry pipeline for use in position only shading. In position-only shading, at least two geometry pipelines exist, whereas in a full geometry pipeline within geometry/fixed function pipeline 3616, 3636, and a cull pipeline, which is an additional geometry pipeline which may be included within additional fixed function logic 3616. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3616 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3616 can also include general purpose processing acceleration logic, such as fixed function matrix multiplication logic, for accelerating CUDA programs.

In at least one embodiment, each graphics sub-core 3601A-3601F includes a set of execution resources that may be used to perform graphics, media, and compute operations in response to requests by graphics pipeline, media pipeline, or shader programs. In at least one embodiment, graphics sub-cores 3601A-3601F include multiple EU arrays 3602A-3602F, 3604A-3604F, thread dispatch and inter-thread communication ("TD/IC") logic 3603A-3603F, a 3D (e.g., texture) sampler 3605A-3605F, a media sampler 3606A-3606F, a shader processor 3607A-3607F, and shared local memory ("SLM") 3608A-3608F. EU arrays 3602A-3602F, 3604A-3604F each include multiple execution units, which are GPGPUs capable of performing floating-point and integer/fixed-point logic operations in service of a graphics, media, or compute operation, including graphics, media, or compute shader programs. In at least one embodiment, TD/IC logic 3603A-3603F performs local thread dispatch and thread control operations for execution units within a sub-core and facilitate communication between threads executing on execution units of a sub-core. In at least one embodiment, 3D sampler 3605A-3605F can read texture or other 3D graphics related data into memory. In at least one embodiment, 3D sampler can read texture data differently based on a configured sample state and texture format associated with a given texture. In at least one embodiment, media sampler 3606A-3606F can perform similar read operations based on a type and format associated with media data. In at least one embodiment, each graphics sub-core 3601A-3601F can alternately include a unified 3D and media sampler. In at least one embodiment, threads executing on execution units within each of sub-cores 3601A-3601F can make use of shared local memory 3608A-3608F within each sub-core, to enable threads executing within a thread group to execute using a common pool of on-chip memory.

In at least one embodiment, at least one component shown or described with respect to FIG. 36 is used to implement techniques and/or functions described in connection with FIGS. 1-20. In at least one embodiment, graphics processor core 3600 is used to perform an API to cause shared virtual memory to be allocated for use by a plurality of processors. In at least one embodiment, graphics processor core 3600 is used to perform an API to cause physical memory corresponding to shared virtual memory to be designated for use by a plurality of processors. In at least one embodiment, graphics processor core 3600 is used to perform an API to enable access to shared virtual memory by a plurality of processors. In at least one embodiment, graphics processor core 3600 is used to perform an API to cause physical memory corresponding to shared virtual memory to be undesignated for use by a plurality of processors. In at least one embodiment, graphics processor core 3600 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 37:
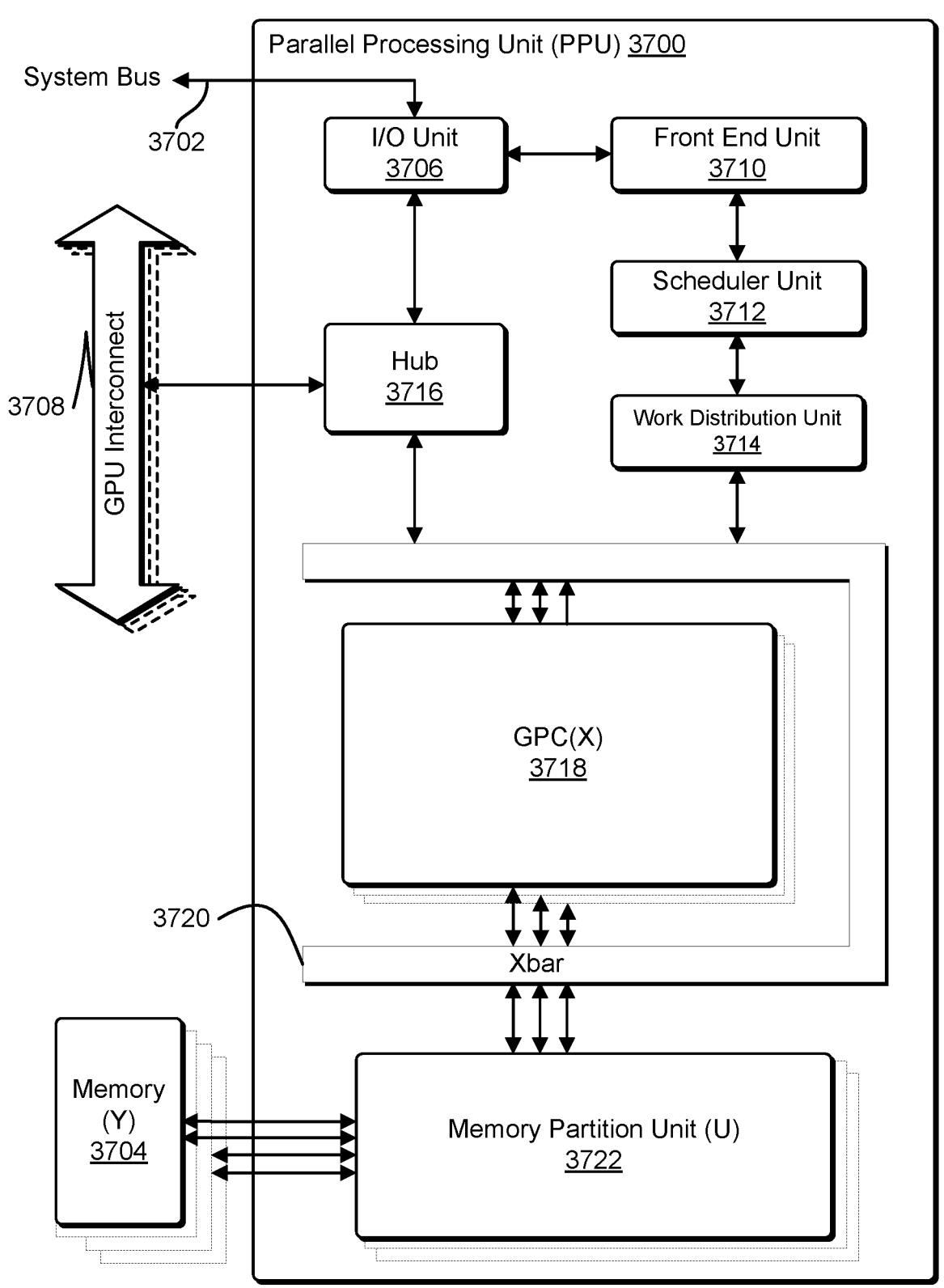
FIG. 37 illustrates a PPU, in accordance with at least one embodiment.

FIG. 37 illustrates a parallel processing unit ("PPU") 3700, in accordance with at least one embodiment. In at least one embodiment, PPU 3700 is configured with machine-readable code that, if executed by PPU 3700, causes PPU 3700 to perform some or all of processes and techniques described herein. In at least one embodiment, PPU 3700 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3700. In at least one embodiment, PPU 3700 is a GPU configured to implement a graphics rendering pipeline for processing three-dimensional ("3D") graphics data in order to generate two-dimensional ("2D") image data for display on a display device such as an LCD device. In at least one embodiment, PPU 3700 is utilized to perform computations such as linear algebra operations and machine-learning operations. FIG. 37 illustrates an example parallel processor for illustrative purposes only and should be construed as a non-limiting example of a processor architecture that may be implemented in at least one embodiment.

In at least one embodiment, one or more PPUs 3700 are configured to accelerate High Performance Computing ("HPC"), data center, and machine learning applications. In at least one embodiment, one or more PPUs 3700 are configured to accelerate CUDA programs. In at least one embodiment, PPU 3700 includes, without limitation, an I/O unit 3706, a front-end unit 3710, a scheduler unit 3712, a work distribution unit 3714, a hub 3716, a crossbar ("Xbar") 3720, one or more general processing clusters ("GPCs") 3718, and one or more partition units ("memory partition units") 3722. In at least one embodiment, PPU 3700 is connected to a host processor or other PPUs 3700 via one or more high-speed GPU interconnects ("GPU interconnects") 3708. In at least one embodiment, PPU 3700 is connected to a host processor or other peripheral devices via a system bus or interconnect 3702. In at least one embodiment, PPU 3700 is connected to a local memory comprising one or more memory devices ("memory") 3704. In at least one embodiment, memory devices 3704 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3708 may refer to a wire-based multi-lane communications link that is used by systems to scale and include one or more PPUs 3700 combined with one or more CPUs, supports cache coherence between PPUs 3700 and CPUs, and CPU mastering. In at least one embodiment, data and/or commands are transmitted by high-speed GPU interconnect 3708 through hub 3716 to/from other units of PPU 3700 such as one or more copy engines, video encoders, video decoders, power management units, and other components which may not be explicitly illustrated in FIG. 37.

In at least one embodiment, I/O unit 3706 is configured to transmit and receive communications (e.g., commands, data) from a host processor (not illustrated in FIG. 37) over system bus 3702. In at least one embodiment, I/O unit 3706 communicates with host processor directly via system bus 3702 or through one or more intermediate devices such as a memory bridge. In at least one embodiment, I/O unit 3706 may communicate with one or more other processors, such as one or more of PPUs 3700 via system bus 3702. In at least one embodiment, I/O unit 3706 implements a PCIe interface for communications over a PCIe bus. In at least one embodiment, I/O unit 3706 implements interfaces for communicating with external devices.

In at least one embodiment, I/O unit 3706 decodes packets received via system bus 3702. In at least one embodiment, at least some packets represent commands configured to cause PPU 3700 to perform various operations. In at least one embodiment, I/O unit 3706 transmits decoded commands to various other units of PPU 3700 as specified by commands. In at least one embodiment, commands are transmitted to front-end unit 3710 and/or transmitted to hub

3716 or other units of PPU 3700 such as one or more copy engines, a video encoder, a video decoder, a power management unit, etc. (not explicitly illustrated in FIG. 37). In at least one embodiment, I/O unit 3706 is configured to route communications between and among various logical units of PPU 3700.

In at least one embodiment, a program executed by host processor encodes a command stream in a buffer that provides workloads to PPU 3700 for processing. In at least one embodiment, a workload comprises instructions and data to be processed by those instructions. In at least one embodiment, buffer is a region in a memory that is accessible (e.g., read/write) by both a host processor and PPU 3700—a host interface unit may be configured to access buffer in a system memory connected to system bus 3702 via memory requests transmitted over system bus 3702 by I/O unit 3706. In at least one embodiment, a host processor writes a command stream to a buffer and then transmits a pointer to the start of the command stream to PPU 3700 such that front-end unit 3710 receives pointers to one or more command streams and manages one or more command streams, reading commands from command streams and forwarding commands to various units of PPU 3700.

In at least one embodiment, front-end unit 3710 is coupled to scheduler unit 3712 that configures various GPCs 3718 to process tasks defined by one or more command streams. In at least one embodiment, scheduler unit 3712 is configured to track state information related to various tasks managed by scheduler unit 3712 where state information may indicate which of GPCs 3718 a task is assigned to, whether task is active or inactive, a priority level associated with task, and so forth. In at least one embodiment, scheduler unit 3712 manages execution of a plurality of tasks on one or more of GPCs 3718.

In at least one embodiment, scheduler unit 3712 is coupled to work distribution unit 3714 that is configured to dispatch tasks for execution on GPCs 3718. In at least one embodiment, work distribution unit 3714 tracks a number of scheduled tasks received from scheduler unit 3712 and work distribution unit 3714 manages a pending task pool and an active task pool for each of GPCs 3718. In at least one embodiment, pending task pool comprises a number of slots (e.g., 32 slots) that contain tasks assigned to be processed by a particular GPC 3718; active task pool may comprise a number of slots (e.g., 4 slots) for tasks that are actively being processed by GPCs 3718 such that as one of GPCs 3718 completes execution of a task, that task is evicted from active task pool for GPC 3718 and one of other tasks from pending task pool is selected and scheduled for execution on GPC 3718. In at least one embodiment, if an active task is idle on GPC 3718, such as while waiting for a data dependency to be resolved, then the active task is evicted from GPC 3718 and returned to a pending task pool while another task in the pending task pool is selected and scheduled for execution on GPC 3718.

In at least one embodiment, work distribution unit 3714 communicates with one or more GPCs 3718 via XBar 3720. In at least one embodiment, XBar 3720 is an interconnect network that couples many units of PPU 3700 to other units of PPU 3700 and can be configured to couple work distribution unit 3714 to a particular GPC 3718. In at least one embodiment, one or more other units of PPU 3700 may also be connected to XBar 3720 via hub 3716.

In at least one embodiment, tasks are managed by scheduler unit 3712 and dispatched to one of GPCs 3718 by work distribution unit 3714. GPC 3718 is configured to process task and generate results. In at least one embodiment, results may be consumed by other tasks within GPC 3718, routed to a different GPC 3718 via XBar 3720, or stored in memory 3704. In at least one embodiment, results can be written to memory 3704 via partition units 3722, which implement a memory interface for reading and writing data to/from memory 3704. In at least one embodiment, results can be transmitted to another PPU 3704 or CPU via high-speed GPU interconnect 3708. In at least one embodiment, PPU 3700 includes, without limitation, a number U of partition units 3722 that is equal to number of separate and distinct memory devices 3704 coupled to PPU 3700.

In at least one embodiment, a host processor executes a driver kernel that implements an application programming interface ("API") that enables one or more applications executing on host processor to schedule operations for execution on PPU 3700. In at least one embodiment, multiple compute applications are simultaneously executed by PPU 3700 and PPU 3700 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3700 and the driver kernel outputs tasks to one or more streams being processed by PPU 3700. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, at least one component shown or described with respect to FIG. 37 is used to implement techniques and/or functions described in connection with FIGS. 1-20. In at least one embodiment, parallel processing unit 3700 is used to perform an API to cause shared virtual memory to be allocated for use by a plurality of processors. In at least one embodiment, parallel processing unit 3700 is used to perform an API to cause physical memory corresponding to shared virtual memory to be designated for use by a plurality of processors. In at least one embodiment, parallel processing unit 3700 is used to perform an API to enable access to shared virtual memory by a plurality of processors. In at least one embodiment, parallel processing unit 3700 is used to perform an API to cause physical memory corresponding to shared virtual memory to be undesignated for use by a plurality of processors. In at least one embodiment, parallel processing unit 3700 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 38:
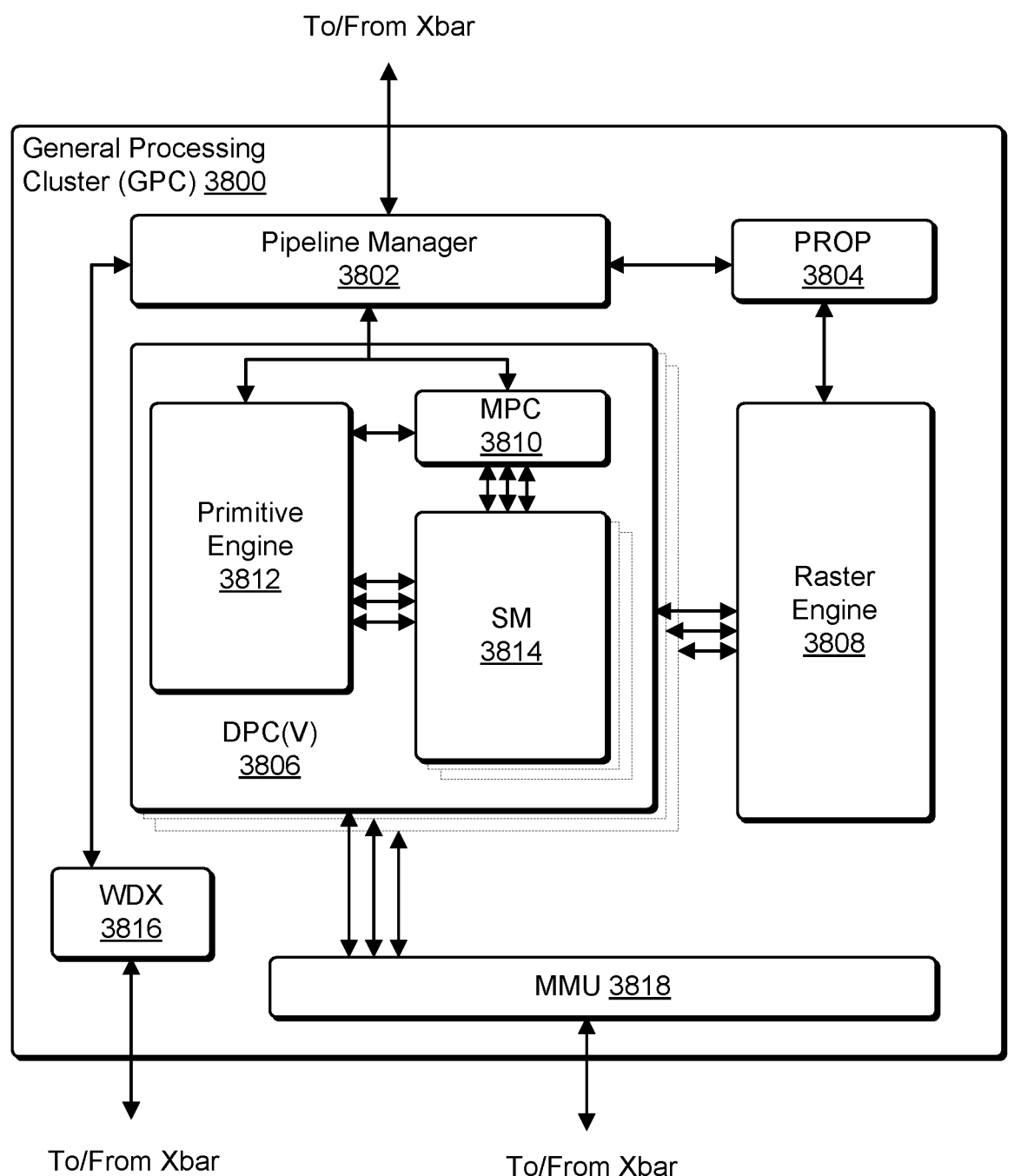
FIG. 38 illustrates a GPC, in accordance with at least one embodiment.

FIG. 38 illustrates a GPC 3800, in accordance with at least one embodiment. In at least one embodiment, GPC 3800 is GPC 3718 of FIG. 37. In at least one embodiment, each GPC 3800 includes, without limitation, a number of hardware units for processing tasks and each GPC 3800 includes, without limitation, a pipeline manager 3802, a pre-raster operations unit ("PROP") 3804, a raster engine 3808, a work distribution crossbar ("WDX") 3816, an MMU 3818, one or more Data Processing Clusters ("DPCs") 3806, and any suitable combination of parts.

In at least one embodiment, operation of GPC 3800 is controlled by pipeline manager 3802. In at least one embodiment, pipeline manager 3802 manages configuration of one or more DPCs 3806 for processing tasks allocated to GPC 3800. In at least one embodiment, pipeline manager 3802 configures at least one of one or more DPCs 3806 to implement at least a portion of a graphics rendering pipeline. In at least one embodiment, DPC 3806 is configured to execute a vertex shader program on a programmable streaming multiprocessor ("SM") 3814. In at least one embodiment, pipeline manager 3802 is configured to route packets received from a work distribution unit to appropriate logical units within GPC 3800 and, in at least one embodiment, some packets may be routed to fixed function hardware units in PROP 3804 and/or raster engine 3808 while other packets may be routed to DPCs 3806 for processing by a primitive engine 3812 or SM 3814. In at least one embodiment, pipeline manager 3802 configures at least one of DPCs 3806 to implement a computing pipeline. In at least one embodiment, pipeline manager 3802 configures at least one of DPCs 3806 to execute at least a portion of a CUDA program.

In at least one embodiment, PROP unit 3804 is configured to route data generated by raster engine 3808 and DPCs 3806 to a Raster Operations ("ROP") unit in a partition unit, such as memory partition unit 3722 described in more detail above in conjunction with FIG. 37. In at least one embodiment, PROP unit 3804 is configured to perform optimizations for color blending, organize pixel data, perform address translations, and more. In at least one embodiment, raster engine 3808 includes, without limitation, a number of fixed function hardware units configured to perform various raster operations and, in at least one embodiment, raster engine 3808 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3808 comprises fragments to be processed by any suitable entity such as by a fragment shader implemented within DPC 3806.

In at least one embodiment, each DPC 3806 included in GPC 3800 comprise, without limitation, an M-Pipe Controller ("MPC") 3810; primitive engine 3812; one or more SMs 3814; and any suitable combination thereof. In at least one embodiment, MPC 3810 controls operation of DPC 3806, routing packets received from pipeline manager 3802 to appropriate units in DPC 3806. In at least one embodiment, packets associated with a vertex are routed to primitive engine 3812, which is configured to fetch vertex attributes associated with vertex from memory; in contrast, packets associated with a shader program may be transmitted to SM 3814.

In at least one embodiment, SM 3814 comprises, without limitation, a programmable streaming processor that is configured to process tasks represented by a number of threads. In at least one embodiment, SM 3814 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 3814 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3814 is described in more detail in conjunction with FIG. 39.

In at least one embodiment, MMU 3818 provides an interface between GPC 3800 and a memory partition unit (e.g., partition unit 3722 of FIG. 37) and MMU 3818 provides translation of virtual addresses into physical addresses, memory protection, and arbitration of memory requests. In at least one embodiment, MMU 3818 provides one or more translation lookaside buffers (TLBs) for performing translation of virtual addresses into physical addresses in memory.

In at least one embodiment, at least one component shown or described with respect to FIG. 38 is used to implement techniques and/or functions described in connection with FIGS. 1-20. In at least one embodiment, general processing cluster 3800 is used to perform an API to cause shared virtual memory to be allocated for use by a plurality of processors. In at least one embodiment, general processing cluster 3800 is used to perform an API to cause physical memory corresponding to shared virtual memory to be designated for use by a plurality of processors. In at least one embodiment, general processing cluster 3800 is used to perform an API to enable access to shared virtual memory by a plurality of processors. In at least one embodiment, general processing cluster 3800 is used to perform an API to cause physical memory corresponding to shared virtual memory to be undesignated for use by a plurality of processors. In at least one embodiment, general processing cluster 3800 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 39:
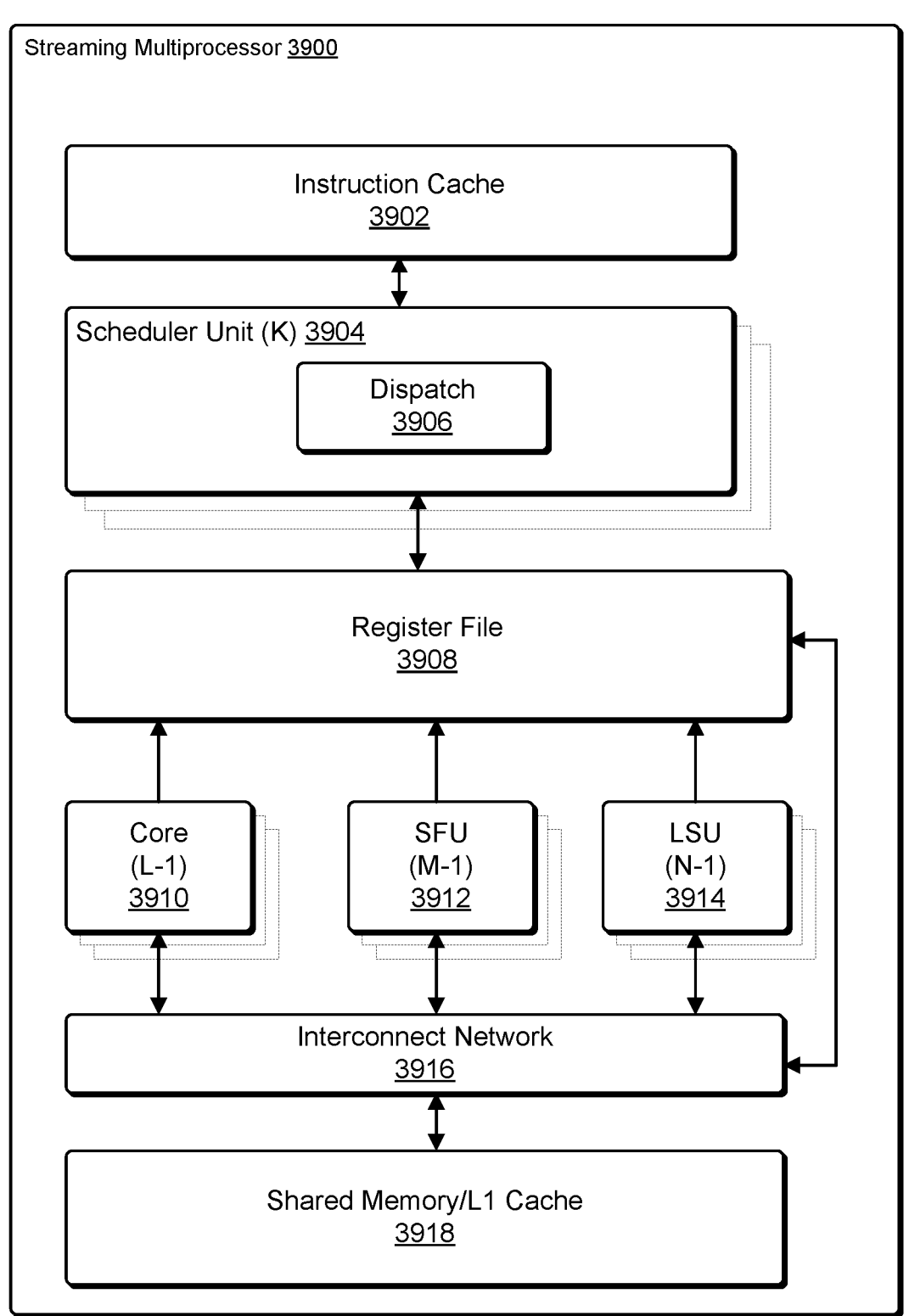
FIG. 39 illustrates a streaming multiprocessor, in accordance with at least one embodiment.

FIG. 39 illustrates a streaming multiprocessor ("SM") 3900, in accordance with at least one embodiment. In at least one embodiment, SM 3900 is SM 3814 of FIG. 38. In at least one embodiment, SM 3900 includes, without limitation, an instruction cache 3902; one or more scheduler units 3904; a register file 3908; one or more processing cores ("cores") 3910; one or more special function units ("SFUs") 3912; one or more LSUs 3914; an interconnect network 3916; a shared memory/L1 cache 3918; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3900. In at least one embodiment, scheduler unit 3904 receives tasks from a work distribution unit and manages instruction scheduling for one or more thread blocks assigned to SM 3900. In at least one embodiment, scheduler unit 3904 schedules thread blocks for execution as warps of parallel threads, wherein each thread block is allocated at least one warp. In at least one embodiment, each warp executes threads. In at least one embodiment, scheduler unit 3904 manages a plurality of different thread blocks, allocating warps to different thread blocks and then dispatching instructions from a plurality of different cooperative groups to various functional units (e.g., processing cores 3910, SFUs 3912, and LSUs 3914) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads ( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3906 is configured to transmit instructions to one or more of functional units and scheduler unit 3904 includes, without limitation, two dispatch units 3906 that enable two different instructions from same warp to be dispatched during each clock cycle. In at least one embodiment, each scheduler unit 3904 includes a single dispatch unit 3906 or additional dispatch units 3906.

In at least one embodiment, each SM 3900, in at least one embodiment, includes, without limitation, register file 3908 that provides a set of registers for functional units of SM 3900. In at least one embodiment, register file 3908 is divided between each of the functional units such that each functional unit is allocated a dedicated portion of register file 3908. In at least one embodiment, register file 3908 is divided between different warps being executed by SM 3900 and register file 3908 provides temporary storage for operands connected to data paths of functional units. In at least one embodiment, each SM 3900 comprises, without limitation, a plurality of L processing cores 3910. In at least one embodiment, SM 3900 includes, without limitation, a large number (e.g., 128 or more) of distinct processing cores 3910. In at least one embodiment, each processing core 3910 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3910 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3900 comprises, without limitation, M SFUs 3912 that perform special functions (e.g., attribute evaluation, reciprocal square root, and like). In at least one embodiment, SFUs 3912 include, without limitation, a tree traversal unit configured to traverse a hierarchical tree data structure. In at least one embodiment, SFUs 3912 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3900. In at least one embodiment, texture maps are stored in shared memory/L1 cache 3918. In at least one embodiment, texture units implement texture operations such as filtering operations using mip-maps (e.g., texture maps of varying levels of detail). In at least one embodiment, each SM 3900 includes, without limitation, two texture units.

In at least one embodiment, each SM 3900 comprises, without limitation, N LSUs 3914 that implement load and store operations between shared memory/L1 cache 3918 and register file 3908. In at least one embodiment, each SM 3900 includes, without limitation, interconnect network 3916 that connects each of the functional units to register file 3908 and LSU 3914 to register file 3908 and shared memory/L1 cache 3918. In at least one embodiment, interconnect network 3916 is a crossbar that can be configured to connect any of the functional units to any of the registers in register file 3908 and connect LSUs 3914 to register file 3908 and memory locations in shared memory/L1 cache 3918.

In at least one embodiment, shared memory/L1 cache 3918 is an array of on-chip memory that allows for data storage and communication between SM 3900 and a primitive engine and between threads in SM 3900. In at least one embodiment, shared memory/L1 cache 3918 comprises, without limitation, 128 KB of storage capacity and is in a path from SM 3900 to a partition unit. In at least one embodiment, shared memory/L1 cache 3918 is used to cache reads and writes. In at least one embodiment, one or more of shared memory/L1 cache 3918, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3918 enables shared memory/L1 cache 3918 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3900 to execute a program and perform calculations, shared memory/L1 cache 3918 to communicate between threads, and LSU 3914 to read and write global memory through shared memory/L1 cache 3918 and a memory partition unit. In at least one embodiment, when configured for general purpose parallel computation, SM 3900 writes commands that scheduler unit 3904 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, at least one component shown or described with respect to FIG. 39 is used to implement techniques and/or functions described in connection with FIGS. 1-20. In at least one embodiment, streaming multiprocessor 3900 is used to perform an API to cause shared virtual memory to be allocated for use by a plurality of processors. In at least one embodiment, streaming multiprocessor 3900 is used to perform an API to cause physical memory corresponding to shared virtual memory to be designated for use by a plurality of processors. In at least one embodiment, streaming multiprocessor 3900 is used to perform an API to enable access to shared virtual memory by a plurality of processors. In at least one embodiment, streaming multiprocessor 3900 is used to perform an API to cause physical memory corresponding to shared virtual memory to be undesignated for use by a plurality of processors. In at least one embodiment, streaming multiprocessor 3900 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Software Constructs for General-Purpose Computing

The following figures set forth, without limitation, exemplary software constructs for implementing at least one embodiment.

Figure 40:
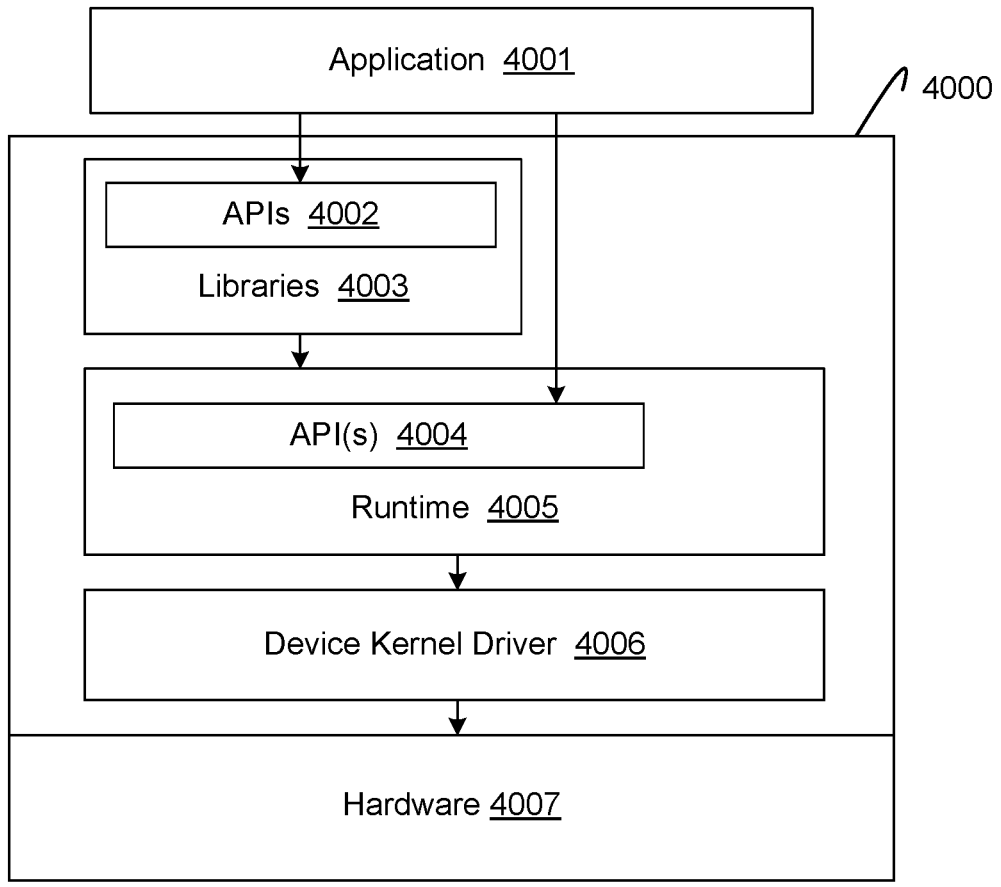
FIG. 40 illustrates a software stack of a programming platform, in accordance with at least one embodiment.

FIG. 40 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 4000 of a programming platform provides an execution environment for an application 4001. In at least one embodiment, application 4001 may include any computer software capable of being launched on software stack 4000. In at least one embodiment, application 4001 may include, but is not limited to, an artificial intelligence ("AI")/machine learning ("ML") application, a high performance computing ("HPC") application, a virtual desktop infrastructure ("VDI"), or a data center workload.

In at least one embodiment, application 4001 and software stack 4000 run on hardware 4007. Hardware 4007 may include one or more GPUs, CPUs, FPGAs, AI engines, and/or other types of compute devices that support a programming platform, in at least one embodiment. In at least one embodiment, such as with CUDA, software stack 4000 may be vendor specific and compatible with only devices from particular vendor(s). In at least one embodiment, such as in with OpenCL, software stack 4000 may be used with devices from different vendors. In at least one embodiment, hardware 4007 includes a host connected to one more devices that can be accessed to perform computational tasks via application programming interface ("API") calls. A device within hardware 4007 may include, but is not limited to, a GPU, FPGA, AI engine, or other compute device (but may also include a CPU) and its memory, as opposed to a host within hardware 4007 that may include, but is not limited to, a CPU (but may also include a compute device) and its memory, in at least one embodiment.

In at least one embodiment, software stack 4000 of a programming platform includes, without limitation, a number of libraries 4003, a runtime 4005, and a device kernel driver 4006. Each of libraries 4003 may include data and programming code that can be used by computer programs and leveraged during software development, in at least one embodiment. In at least one embodiment, libraries 4003 may include, but are not limited to, pre-written code and subroutines, classes, values, type specifications, configuration data, documentation, help data, and/or message templates. In at least one embodiment, libraries 4003 include functions that are optimized for execution on one or more types of devices. In at least one embodiment, libraries 4003 may include, but are not limited to, functions for performing mathematical, deep learning, and/or other types of operations on devices. In at least one embodiment, libraries 4003 are associated with corresponding APIs 4002, which may include one or more APIs, that expose functions implemented in libraries 4003.

In at least one embodiment, application 4001 is written as source code that is compiled into executable code, as discussed in greater detail below in conjunction with FIGS. 45-47. Executable code of application 4001 may run, at least in part, on an execution environment provided by software stack 4000, in at least one embodiment. In at least one embodiment, during execution of application 4001, code may be reached that needs to run on a device, as opposed to a host. In such a case, runtime 4005 may be called to load and launch requisite code on the device, in at least one embodiment. In at least one embodiment, runtime 4005 may include any technically feasible runtime system that is able to support execution of application S01.

In at least one embodiment, runtime 4005 is implemented as one or more runtime libraries associated with corresponding APIs, which are shown as API(s) 4004. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory, in at least one embodiment. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 4004 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-indepen-dent runtime API.

In at least one embodiment, device kernel driver 4006 is configured to facilitate communication with an underlying device. In at least one embodiment, device kernel driver 4006 may provide low-level functionalities upon which APIs, such as API(s) 4004, and/or other software relies. In at least one embodiment, device kernel driver 4006 may be configured to compile intermediate representation ("IR") code into binary code at runtime. For CUDA, device kernel driver 4006 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 4006 to compile IR code at runtime.

In at least one embodiment, at least one component shown or described with respect to FIG. 40 is used to implement techniques and/or functions described in connection with FIGS. 1-20. In at least one embodiment, at least one element of software stack 4000 of a programming platform is used to perform an API to cause shared virtual memory to be allocated for use by a plurality of processors. In at least one embodiment, at least one element of software stack 4000 of a programming platform is used to perform an API to cause physical memory corresponding to shared virtual memory to be designated for use by a plurality of processors. In at least one embodiment, at least one element of software stack 4000 of a programming platform is used to perform an API to enable access to shared virtual memory by a plurality of processors. In at least one embodiment, at least one element of software stack 4000 of a programming platform is used to perform an API to cause physical memory corresponding to shared virtual memory to be undesignated for use by a plurality of processors. In at least one embodiment, at least one element of software stack 4000 of a programming platform is used to perform at least one aspect described with respect to example computer system 100, example computer system 200, example computer system 300, example computer system 400, example computer system 500, example computer system 600, example computer system 700, example computer system 800, example com-puter system 900, example computer system 1000, example process 1100, example process 1200, example process 1300, example computer system 1400, example computer system 1500, example API 1600, example API 1700, example API 1800, example API 1900, and/or example software stack 2000.

Figure 41:
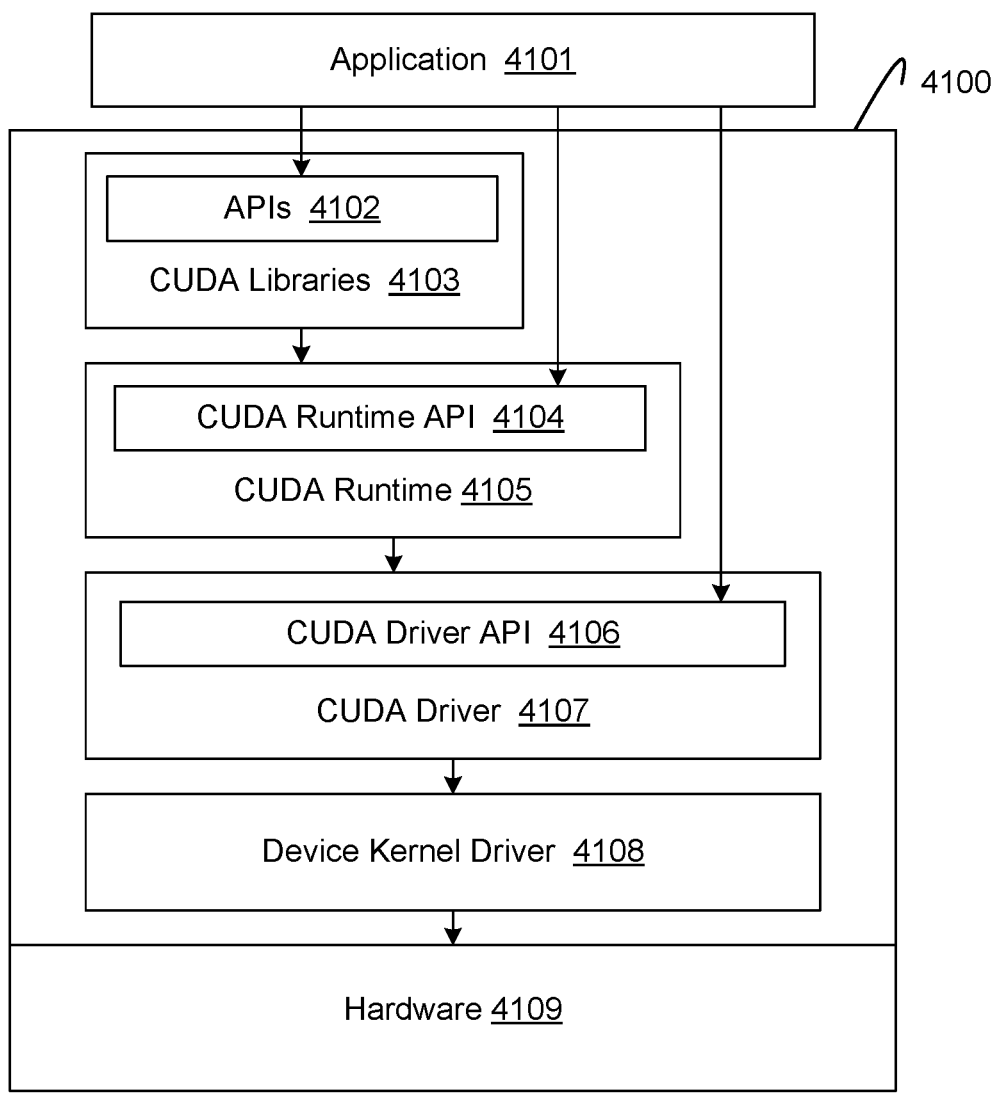
FIG. 41 illustrates a CUDA implementation of a software stack of FIG. 40, in accordance with at least one embodiment.

FIG. 41 illustrates a CUDA implementation of software stack 4000 of FIG. 40, in accordance with at least one embodiment. In at least one embodiment, a CUDA software stack 4100, on which an application 4101 may be launched, includes CUDA libraries 4103, a CUDA runtime 4105, a CUDA driver 4107, and a device kernel driver 4108. In at least one embodiment, CUDA software stack 4100 executes on hardware 4109, which may include a GPU that supports CUDA and is developed by NVIDIA Corporation of Santa Clara, CA.

In at least one embodiment, application 4101, CUDA runtime 4105, and device kernel driver 4108 may perform similar functionalities as application 4001, runtime 4005, and device kernel driver 4006, respectively, which are described above in conjunction with FIG. 40. In at least one embodiment, CUDA driver 4107 includes a library (libcu-da.so) that implements a CUDA driver API 4106. Similar to a CUDA runtime API 4104 implemented by a CUDA runtime library (cudart), CUDA driver API 4106 may, without limitation, expose functions for memory manage-ment, execution control, device management, error han-dling, synchronization, and/or graphics interoperability, among other things, in at least one embodiment. In at least one embodiment, CUDA driver API 4106 differs from CUDA runtime API 4104 in that CUDA runtime API 4104 simplifies device code management by providing implicit initialization, context (analogous to a process) management, and module (analogous to dynamically loaded libraries) management. In contrast to high-level CUDA runtime API 4104, CUDA driver API 4106 is a low-level API providing more fine-grained control of the device, particularly with respect to contexts and module loading, in at least one embodiment. In at least one embodiment, CUDA driver API 4106 may expose functions for context management that are not exposed by CUDA runtime API 4104. In at least one embodiment, CUDA driver API 4106 is also language-independent and supports, e.g., OpenCL in addition to CUDA runtime API 4104. Further, in at least one embodi-ment, development libraries, including CUDA runtime 4105, may be considered as separate from driver compo-nents, including user-mode CUDA driver 4107 and kernel-mode device driver 4108 (also sometimes referred to as a "display" driver).

In at least one embodiment, CUDA libraries 4103 may include, but are not limited to, mathematical libraries, deep learning libraries, parallel algorithm libraries, and/or signal/image/video processing libraries, which parallel computing applications such as application 4101 may utilize. In at least one embodiment, CUDA libraries 4103 may include math-ematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4103 may include deep learning libraries such as a cuDNN library of primitives for deep neural networks and a TensorRT platform for high-performance deep learning inference, among others.

In at least one embodiment, at least one component shown or described with respect to FIG. 41 is used to implement techniques and/or functions described in connection with FIGS. 1-20. In at least one embodiment, at least one element of CUDA software stack 4100 is used to perform an API to cause shared virtual memory to be allocated for use by a plurality of processors. In at least one embodiment, at least one element of CUDA software stack 4100 is used to perform an API to cause physical memory corresponding to shared virtual memory to be designated for use by a plurality of processors. In at least one embodiment, at least one element of CUDA software stack 4100 is used to perform an API to enable access to shared virtual memory by a plurality of processors. In at least one embodiment, at least one element of CUDA software stack 4100 is used to perform an API to cause physical memory corresponding to shared virtual memory to be undesignated for use by a plurality of processors. In at least one embodiment, at least one element of CUDA software stack 4100 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 42:
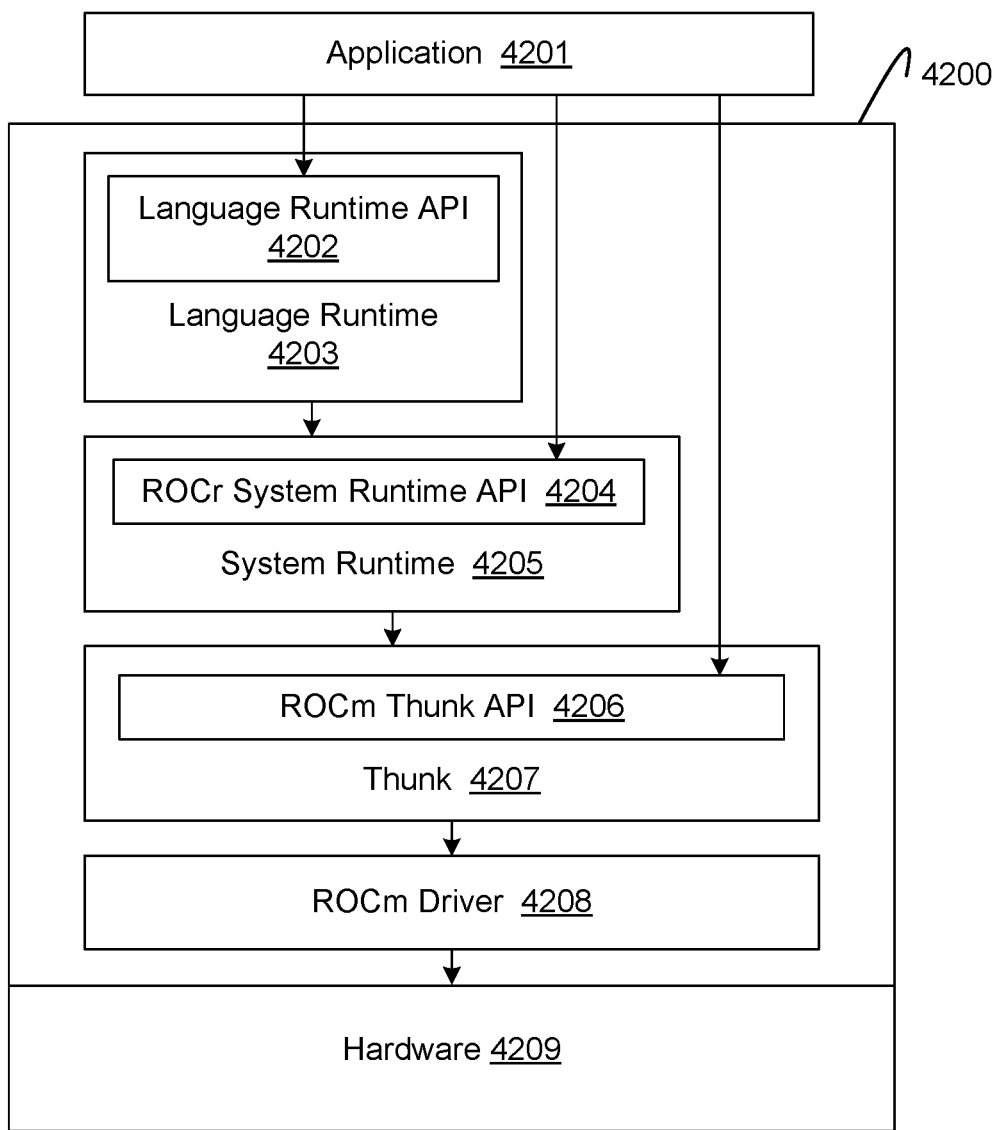
FIG. 42 illustrates a ROCm implementation of a software stack of FIG. 40, in accordance with at least one embodiment.

FIG. 42 illustrates a ROCm implementation of software stack 4000 of FIG. 40, in accordance with at least one embodiment. In at least one embodiment, a ROCm software stack 4200, on which an application 4201 may be launched, includes a language runtime 4203, a system runtime 4205, a thunk 4207, and a ROCm kernel driver 4208. In at least one embodiment, ROCm software stack 4200 executes on hardware 4209, which may include a GPU that supports ROCm and is developed by AMD Corporation of Santa Clara, CA.

In at least one embodiment, application 4201 may perform similar functionalities as application 4001 discussed above in conjunction with FIG. 40. In addition, language runtime 4203 and system runtime 4205 may perform similar functionalities as runtime 4005 discussed above in conjunction with FIG. 40, in at least one embodiment. In at least one embodiment, language runtime 4203 and system runtime 4205 differ in that system runtime 4205 is a language-independent runtime that implements a ROCr system runtime API 4204 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4205, language runtime 4203 is an implementation of a language-specific runtime API 4202 layered on top of ROCr system runtime API 4204, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4104 discussed above in conjunction with FIG. 41, such as functions for memory management, execution control, device management, error handling, and synchronization, among other things.

In at least one embodiment, thunk (ROCt) 4207 is an interface 4206 that can be used to interact with underlying ROCm driver 4208. In at least one embodiment, ROCm driver 4208 is a ROCK driver, which is a combination of an AMDGPU driver and a HSA kernel driver (amdkfd). In at least one embodiment, AMDGPU driver is a device kernel driver for GPUs developed by AMD that performs similar functionalities as device kernel driver 4006 discussed above in conjunction with FIG. 40. In at least one embodiment, HSA kernel driver is a driver permitting different types of processors to share system resources more effectively via hardware features.

In at least one embodiment, various libraries (not shown) may be included in ROCm software stack 4200 above language runtime 4203 and provide functionality similarity to CUDA libraries 4103, discussed above in conjunction with FIG. 41. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 42 is used to implement techniques and/or functions described in connection with FIGS. 1-20. In at least one embodiment, at least one element of ROCm software stack 4200 is used to perform an API to cause shared virtual memory to be allocated for use by a plurality of processors. In at least one embodiment, t least one element of ROCm software stack 4200 is used to perform an API to cause physical memory corresponding to shared virtual memory to be designated for use by a plurality of processors. In at least one embodiment, t least one element of ROCm software stack 4200 is used to perform an API to enable access to shared virtual memory by a plurality of processors. In at least one embodiment, t least one element of ROCm software stack 4200 is used to perform an API to cause physical memory corresponding to shared virtual memory to be undesignated for use by a plurality of processors. In at least one embodiment, at least one element of ROCm software stack 4200 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 43:
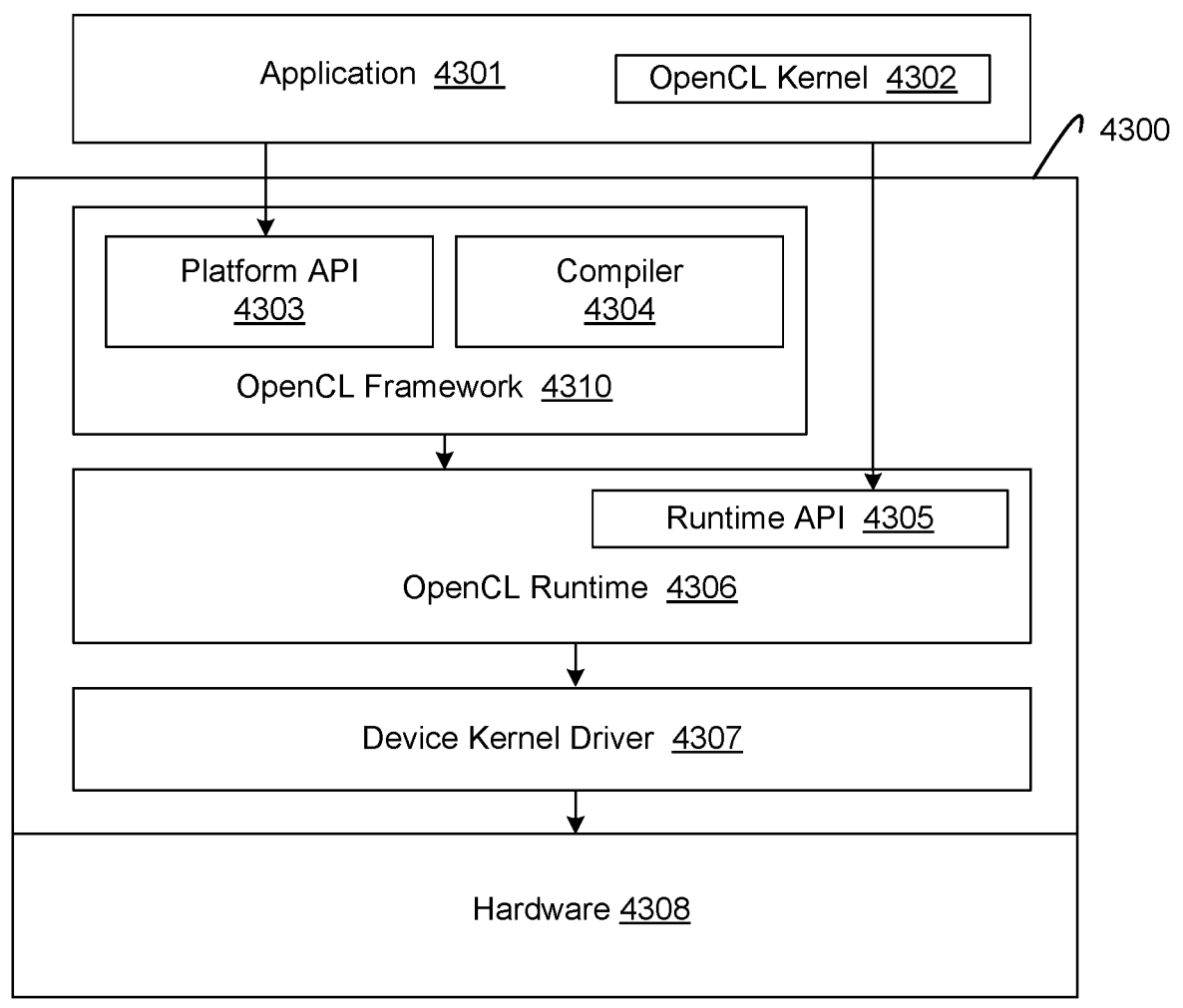
FIG. 43 illustrates an OpenCL implementation of a software stack of FIG. 40, in accordance with at least one embodiment.

FIG. 43 illustrates an OpenCL implementation of software stack 4000 of FIG. 40, in accordance with at least one embodiment. In at least one embodiment, an OpenCL software stack 4300, on which an application 4301 may be launched, includes an OpenCL framework 4310, an OpenCL runtime 4306, and a driver 4307. In at least one embodiment, OpenCL software stack 4300 executes on hardware 4109 that is not vendor-specific. As OpenCL is supported by devices developed by different vendors, specific OpenCL drivers may be required to interoperate with hardware from such vendors, in at least one embodiment.

In at least one embodiment, application 4301, OpenCL runtime 4306, device kernel driver 4307, and hardware 4308 may perform similar functionalities as application 4001, runtime 4005, device kernel driver 4006, and hardware 4007, respectively, that are discussed above in conjunction with FIG. 40. In at least one embodiment, application 4301 further includes an OpenCL kernel 4302 with code that is to be executed on a device.

In at least one embodiment, OpenCL defines a "platform" that allows a host to control devices connected to the host. In at least one embodiment, an OpenCL framework provides a platform layer API and a runtime API, shown as platform API 4303 and runtime API 4305. In at least one embodiment, runtime API 4305 uses contexts to manage execution of kernels on devices. In at least one embodiment, each identified device may be associated with a respective context, which runtime API 4305 may use to manage command queues, program objects, and kernel objects, share memory objects, among other things, for that device. In at least one embodiment, platform API 4303 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4304 is also included in OpenCL frame-work 4310. Source code may be compiled offline prior to executing an application or online during execution of an application, in at least one embodiment. In contrast to CUDA and ROCm, OpenCL applications in at least one embodiment may be compiled online by compiler 4304, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

In at least one embodiment, at least one component shown or described with respect to FIG. 43 is used to implement techniques and/or functions described in connection with FIGS. 1-20. In at least one embodiment, at least one element of OpenCL software stack 4300 is used to perform an API to cause shared virtual memory to be allocated for use by a plurality of processors. In at least one embodiment at least one element of OpenCL software stack 4300 is used to perform an API to cause physical memory corresponding to shared virtual memory to be designated for use by a plurality of processors. In at least one embodiment, at least one element of OpenCL software stack 4300 is used to perform an API to enable access to shared virtual memory by a plurality of processors. In at least one embodiment, at least one element of OpenCL software stack 4300 is used to perform an API to cause physical memory corresponding to shared virtual memory to be undesignated for use by a plurality of processors. In at least one embodiment, at least one element of OpenCL software stack 4300 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 44:
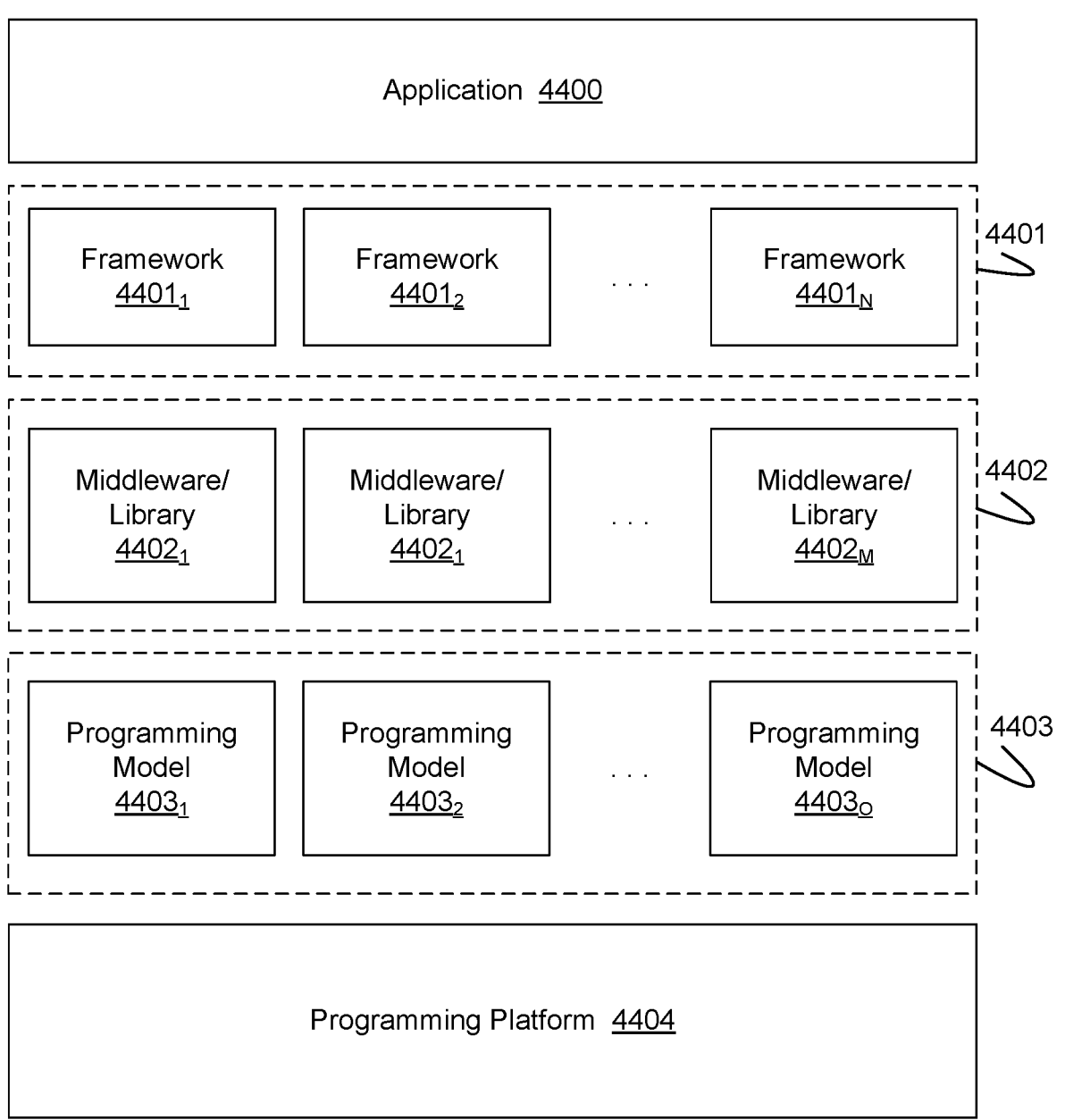
FIG. 44 illustrates software that is supported by a programming platform, in accordance with at least one embodiment.

FIG. 44 illustrates software that is supported by a pro-gramming platform, in accordance with at least one embodiment. In at least one embodiment, a programming platform 4404 is configured to support various programming models 4403, middlewares and/or libraries 4402, and frameworks 4401 that an application 4400 may rely upon. In at least one embodiment, application 4400 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accel-erated computing on underlying hardware.

In at least one embodiment, programming platform 4404 may be one of a CUDA, ROCm, or OpenCL platform described above in conjunction with FIG. 41, FIG. 42, and FIG. 43, respectively. In at least one embodiment, program-ming platform 4404 supports multiple programming models 4403, which are abstractions of an underlying computing system permitting expressions of algorithms and data struc-tures. Programming models 4403 may expose features of underlying hardware in order to improve performance, in at least one embodiment. In at least one embodiment, program-ming models 4403 may include, but are not limited to, CUDA, HIP, OpenCL, C++ Accelerated Massive Parallel-ism ("C++ AMP"), Open Multi-Processing ("OpenMP"), Open Accelerators ("OpenACC"), and/or Vulcan Compute.

In at least one embodiment, libraries and/or middlewares 4402 provide implementations of abstractions of program-ming models 4404. In at least one embodiment, such librar-ies include data and programming code that may be used by computer programs and leveraged during software develop-ment. In at least one embodiment, such middlewares include software that provides services to applications beyond those available from programming platform 4404. In at least one embodiment, libraries and/or middlewares 4402 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4402 may include NCCL and ROCm Communication Collectives Library ("RCCL") libraries providing communication rou-tines for GPUs, a MIOpen library for deep learning accel-eration, and/or an Eigen library for linear algebra, matrix and vector operations, geometrical transformations, numeri-cal solvers, and related algorithms.

In at least one embodiment, application frameworks 4401 depend on libraries and/or middlewares 4402. In at least one embodiment, each of application frameworks 4401 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 44 is used to implement techniques and/or functions described in connection with FIGS. 1-20. In at least one embodiment, application 4400 is used to perform an API to cause shared virtual memory to be allocated for use by a plurality of processors. In at least one embodiment, application 4400 is used to perform an API to cause physical memory corresponding to shared virtual memory to be designated for use by a plurality of processors. In at least one embodiment, application 4400 is used to perform an API to enable access to shared virtual memory by a plurality of processors. In at least one embodiment, application 4400 is used to perform an API to cause physical memory corresponding to shared virtual memory to be undesignated for use by a plurality of processors. In at least one embodiment, application 4400 is used to perform at least one aspect described with respect to example computer system 100, example computer system 200, example com-puter system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 45:
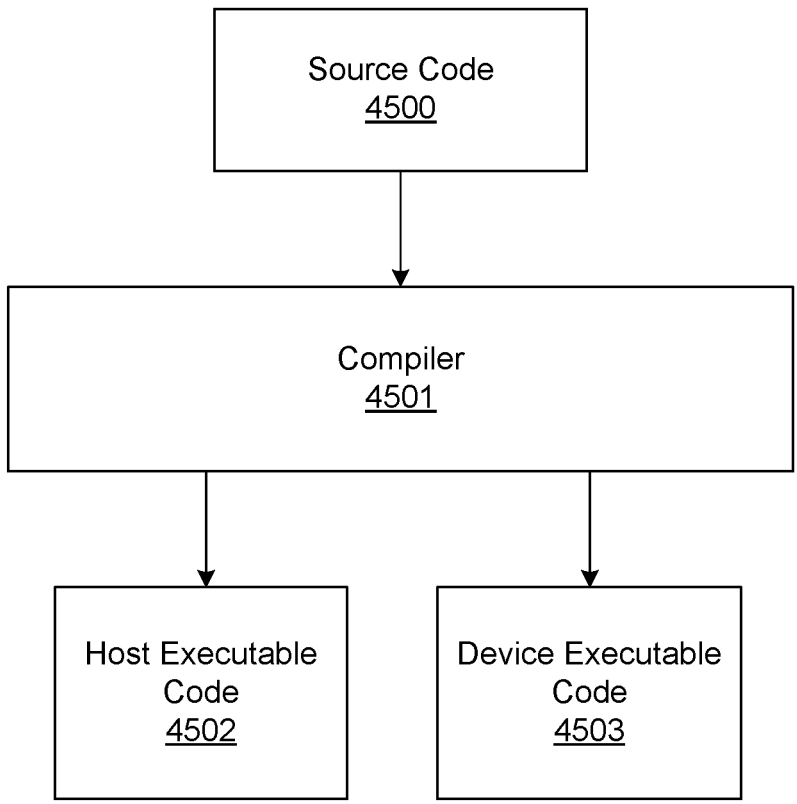
FIG. 45 illustrates compiling code to execute on programming platforms of FIGS. 40-43, in accordance with at least one embodiment.

FIG. 45 illustrates compiling code to execute on one of programming platforms of FIGS. 40-43, in accordance with at least one embodiment. In at least one embodiment, a compiler 4501 receives source code 4500 that includes both host code as well as device code. In at least one embodiment, complier 4501 is configured to convert source code 4500 into host executable code 4502 for execution on a host and device executable code 4503 for execution on a device. In at least one embodiment, source code 4500 may either be compiled offline prior to execution of an application, or online during execution of an application.

In at least one embodiment, source code 4500 may include code in any programming language supported by compiler 4501, such as C++, C, Fortran, etc. In at least one embodiment, source code 4500 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4500 may include multiple source code files, rather than a single-source file, into which host code and device code are separated.

In at least one embodiment, compiler 4501 is configured to compile source code 4500 into host executable code 4502 for execution on a host and device executable code 4503 for execution on a device. In at least one embodiment, compiler 4501 performs operations including parsing source code 4500 into an abstract system tree (AST), performing optimizations, and generating executable code. In at least one embodiment in which source code 4500 includes a single-source file, compiler 4501 may separate device code from host code in such a single-source file, compile device code and host code into device executable code 4503 and host executable code 4502, respectively, and link device executable code 4503 and host executable code 4502 together in a single file, as discussed in greater detail below with respect to FIG. 46.

In at least one embodiment, host executable code 4502 and device executable code 4503 may be in any suitable format, such as binary code and/or IR code. In the case of CUDA, host executable code 4502 may include native object code and device executable code 4503 may include code in PTX intermediate representation, in at least one embodiment. In the case of ROCm, both host executable code 4502 and device executable code 4503 may include target binary code, in at least one embodiment.

In at least one embodiment, at least one component shown or described with respect to FIG. 45 is used to implement techniques and/or functions described in connection with FIGS. 1-20. In at least one embodiment, at least one of host executable code 4502 or device executable code 4503 specified in source code 4500 is used to perform an API to cause shared virtual memory to be allocated for use by a plurality of processors. In at least one embodiment, at least one of host executable code 4502 or device executable code 4503 specified in source code 4500 is used to perform an API to cause physical memory corresponding to shared virtual memory to be designated for use by a plurality of processors. In at least one embodiment, at least one of host executable code 4502 or device executable code 4503 specified in source code 4500 is used to perform an API to enable access to shared virtual memory by a plurality of processors. In at least one embodiment, at least one of host executable code 4502 or device executable code 4503 specified in source code 4500 is used to perform an API to cause physical memory corresponding to shared virtual memory to be undesignated for use by a plurality of processors. In at least one embodiment, at least one of host executable code 4502 or device executable code 4503 specified in source code 4500 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 46:
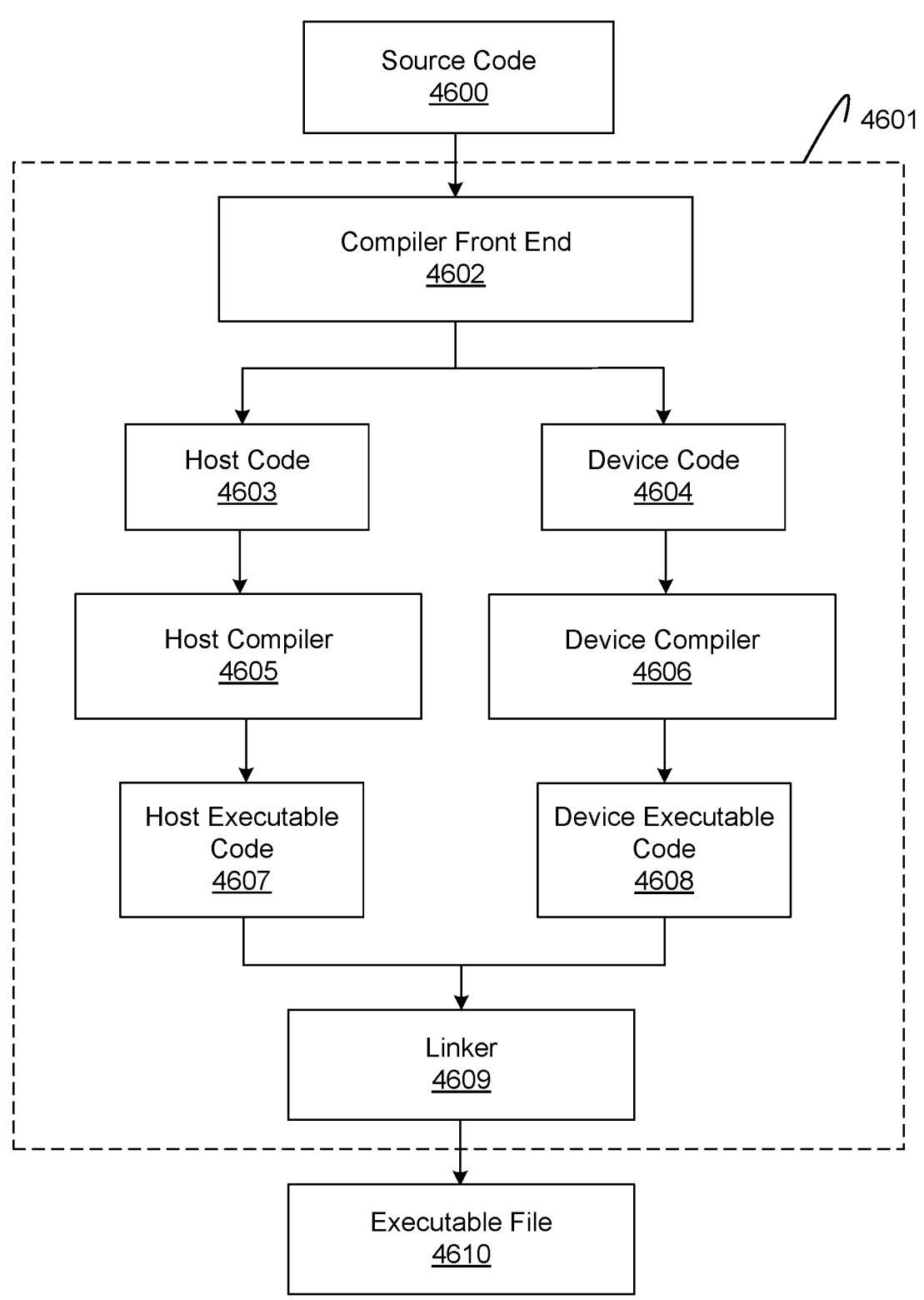
FIG. 46 illustrates in greater detail compiling code to execute on programming platforms of FIGS. 40-43, in accordance with at least one embodiment.

FIG. 46 is a more detailed illustration of compiling code to execute on one of programming platforms of FIGS. 40-43, in accordance with at least one embodiment. In at least one embodiment, a compiler 4601 is configured to receive source code 4600, compile source code 4600, and output an executable file 4610. In at least one embodiment, source code 4600 is a single-source file, such as a .cu file, a .hip.cpp file, or a file in another format, that includes both host and device code. In at least one embodiment, compiler 4601 may be, but is not limited to, an NVIDIA CUDA compiler ("NVCC") for compiling CUDA code in .cu files, or a HCC compiler for compiling HIP code in .hip.cpp files.

In at least one embodiment, compiler 4601 includes a compiler front end 4602, a host compiler 4605, a device compiler 4606, and a linker 4609. In at least one embodiment, compiler front end 4602 is configured to separate device code 4604 from host code 4603 in source code 4600. Device code 4604 is compiled by device compiler 4606 into device executable code 4608, which as described may include binary code or IR code, in at least one embodiment. Separately, host code 4603 is compiled by host compiler 4605 into host executable code 4607, in at least one embodiment. For NVCC, host compiler 4605 may be, but is not limited to, a general purpose C/C++ compiler that outputs native object code, while device compiler 4606 may be, but is not limited to, a Low Level Virtual Machine ("LLVM")-based compiler that forks a LLVM compiler infrastructure and outputs PTX code or binary code, in at least one embodiment. For HCC, both host compiler 4605 and device compiler 4606 may be, but are not limited to, LLVM-based compilers that output target binary code, in at least one embodiment.

Subsequent to compiling source code 4600 into host executable code 4607 and device executable code 4608, linker 4609 links host and device executable code 4607 and 4608 together in executable file 4610, in at least one embodiment. In at least one embodiment, native object code for a host and PTX or binary code for a device may be linked together in an Executable and Linkable Format ("ELF") file, which is a container format used to store object code.

In at least one embodiment, at least one component shown or described with respect to FIG. 46 is used to implement techniques and/or functions described in connection with FIGS. 1-20. In at least one embodiment, executable file 4610 implemented using source code 4600 is used to perform an API to cause shared virtual memory to be allocated for use by a plurality of processors. In at least one embodiment, executable file 4610 implemented using source code 4600 is used to perform an API to cause physical memory corresponding to shared virtual memory to be designated for use by a plurality of processors. In at least one embodiment, executable file 4610 implemented using source code 4600 is used to perform an API to enable access to shared virtual memory by a plurality of processors. In at least one embodiment, executable file 4610 implemented using source code 4600 is used to perform an API to cause physical memory corresponding to shared virtual memory to be undesignated for use by a plurality of processors. In at least one embodiment, executable file 4610 implemented using source code 4600 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 47:
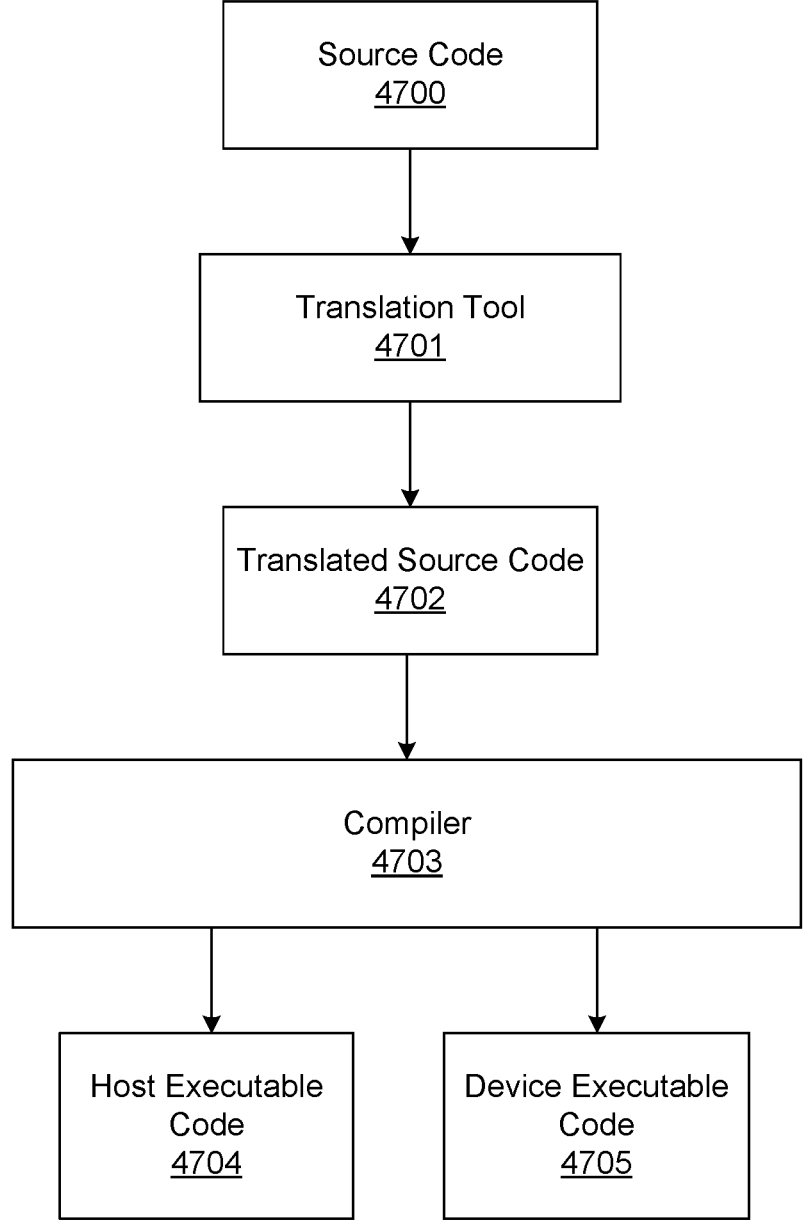
FIG. 47 illustrates translating source code prior to compiling source code, in accordance with at least one embodiment.

FIG. 47 illustrates translating source code prior to compiling source code, in accordance with at least one embodiment. In at least one embodiment, source code 4700 is passed through a translation tool 4701, which translates source code 4700 into translated source code 4702. In at least one embodiment, a compiler 4703 is used to compile translated source code 4702 into host executable code 4704 and device executable code 4705 in a process that is similar to compilation of source code 4500 by compiler 4501 into host executable code 4502 and device executable code 4503, as discussed above in conjunction with FIG. 45.

In at least one embodiment, a translation performed by translation tool 4701 is used to port source 4700 for execution in a different environment than that in which it was originally intended to run. In at least one embodiment, translation tool 4701 may include, but is not limited to, a HIP translator that is used to "hipify" CUDA code intended for a CUDA platform into HIP code that can be compiled and executed on a ROCm platform. In at least one embodiment, translation of source code 4700 may include parsing source code 4700 and converting calls to API(s) provided by one programming model (e.g., CUDA) into corresponding calls to API(s) provided by another programming model (e.g., HIP), as discussed in greater detail below in conjunction with FIGS. 48A-49. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4701 may sometimes be incomplete, requiring additional, manual effort to fully port source code 4700.

In at least one embodiment, at least one component shown or described with respect to FIG. 47 is used to implement techniques and/or functions described in connection with FIGS. 1-20. In at least one embodiment, at least one of host executable code 4704 or device executable code 4705 specified in source code 4700 is used to perform an API to cause shared virtual memory to be allocated for use by a plurality of processors. In at least one embodiment, at least one of host executable code 4704 or device executable code 4705 specified in source code 4700 is used to perform an API to cause physical memory corresponding to shared virtual memory to be designated for use by a plurality of processors. In at least one embodiment, at least one of host executable code 4704 or device executable code 4705 specified in source code 4700 is used to perform an API to enable access to shared virtual memory by a plurality of processors. In at least one embodiment, at least one of host executable code 4704 or device executable code 4705 specified in source code 4700 is used to perform an API to cause physical memory corresponding to shared virtual memory to be undesignated for use by a plurality of processors. In at least one embodiment, at least one of host executable code 4704 or device executable code 4705 specified in source code 4700 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Configuring GPUs for General-Purpose Computing

The following figures set forth, without limitation, exemplary architectures for compiling and executing compute source code, in accordance with at least one embodiment.

Figure 48A:
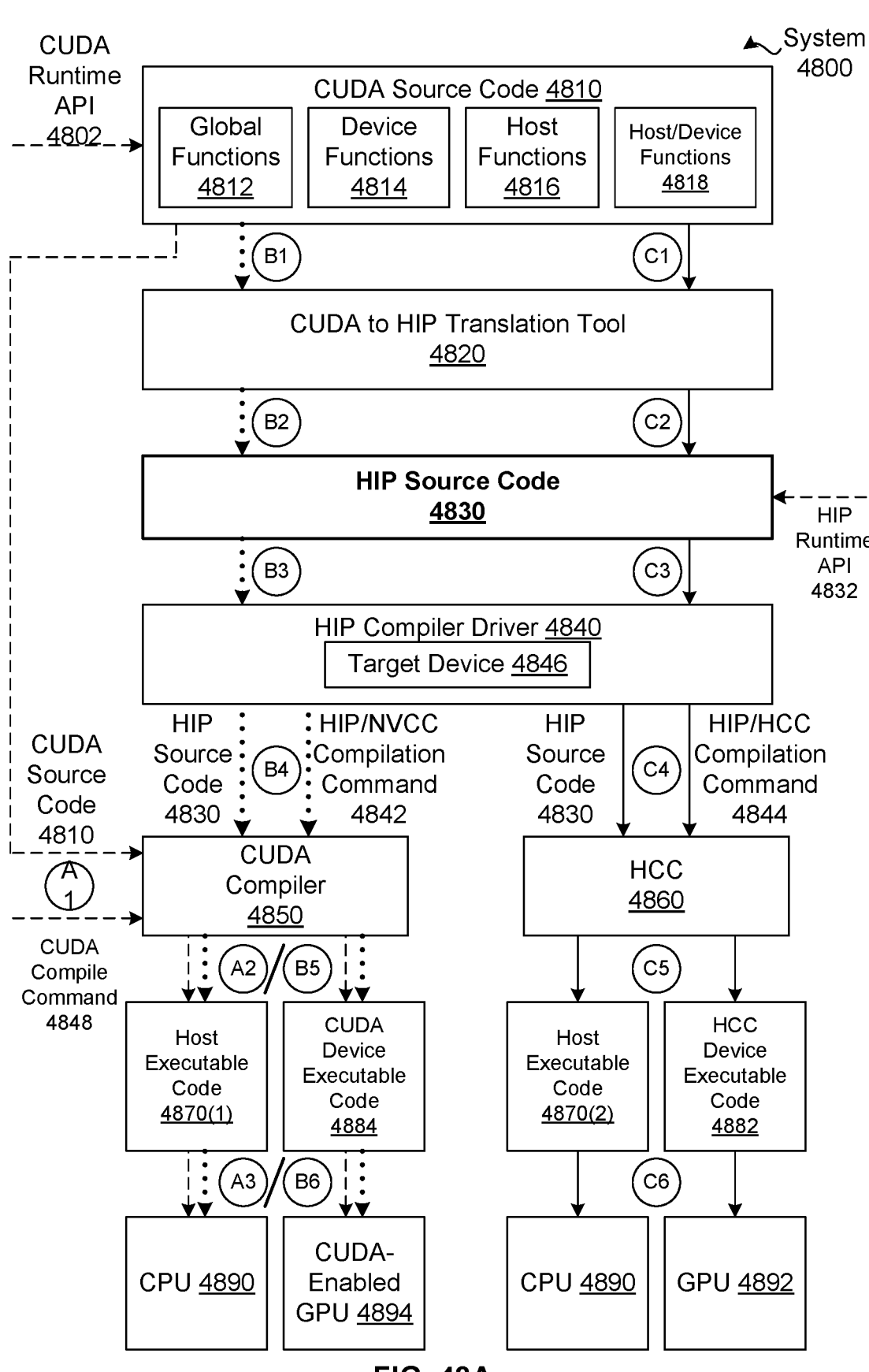
FIG. 48A illustrates a system configured to compile and execute CUDA source code using different types of processing units, in accordance with at least one embodiment.

FIG. 48A illustrates a system 48A00 configured to compile and execute CUDA source code 4810 using different types of processing units, in accordance with at least one embodiment. In at least one embodiment, system 48A00 includes, without limitation, CUDA source code 4810, a CUDA compiler 4850, host executable code 4870(1), host executable code 4870(2), CUDA device executable code 4884, a CPU 4890, a CUDA-enabled GPU 4894, a GPU 4892, a CUDA to HIP translation tool 4820, HIP source code 4830, a HIP compiler driver 4840, an HCC 4860, and HCC device executable code 4882.

In at least one embodiment, CUDA source code 4810 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4890, GPU 48192, or another GPGPU, etc. In at least one embodiment, host code is source code that, after compilation, is executable on a host. In at least one embodiment, a host is a processor that is optimized for sequential instruction processing, such as CPU 4890.

In at least one embodiment, CUDA source code 4810 includes, without limitation, any number (including zero) of global functions 4812, any number (including zero) of device functions 4814, any number (including zero) of host functions 4816, and any number (including zero) of host/device functions 4818. In at least one embodiment, global functions 4812, device functions 4814, host functions 4816, and host/device functions 4818 may be mixed in CUDA source code 4810. In at least one embodiment, each of global functions 4812 is executable on a device and callable from a host. In at least one embodiment, one or more of global functions 4812 may therefore act as entry points to a device. In at least one embodiment, each of global functions 4812 is a kernel. In at least one embodiment and in a technique known as dynamic parallelism, one or more of global functions 4812 defines a kernel that is executable on a device and callable from such a device. In at least one embodiment, a kernel is executed N (where N is any positive integer) times in parallel by N different threads on a device during execution.

In at least one embodiment, each of device functions 4814 is executed on a device and callable from such a device only. In at least one embodiment, each of host functions 4816 is executed on a host and callable from such a host only. In at least one embodiment, each of host/device functions 4816 defines both a host version of a function that is executable on a host and callable from such a host only and a device version of the function that is executable on a device and callable from such a device only.

In at least one embodiment, CUDA source code 4810 may also include, without limitation, any number of calls to any number of functions that are defined via a CUDA runtime API 4802. In at least one embodiment, CUDA runtime API 4802 may include, without limitation, any number of functions that execute on a host to allocate and deallocate device memory, transfer data between host memory and device memory, manage systems with multiple devices, etc. In at least one embodiment, CUDA source code 4810 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4802, a CUDA driver API, APIs for any number of CUDA libraries, etc. In at least one embodiment and relative to CUDA runtime API 4802, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4850 compiles input CUDA code (e.g., CUDA source code 4810) to generate host executable code 4870(1) and CUDA device executable code 4884. In at least one embodiment, CUDA compiler 4850 is NVCC. In at least one embodiment, host executable code 4870(1) is a compiled version of host code included in input source code that is executable on CPU 4890. In at least one embodiment, CPU 4890 may be any processor that is optimized for sequential instruction processing.

In at least one embodiment, CUDA device executable code 4884 is a compiled version of device code included in input source code that is executable on CUDA-enabled GPU 4894. In at least one embodiment, CUDA device executable code 4884 includes, without limitation, binary code. In at least one embodiment, CUDA device executable code 4884 includes, without limitation, IR code, such as PTX code, that is further compiled at runtime into binary code for a specific target device (e.g., CUDA-enabled GPU 4894) by a device driver. In at least one embodiment, CUDA-enabled GPU 4894 may be any processor that is optimized for parallel instruction processing and that supports CUDA. In at least one embodiment, CUDA-enabled GPU 4894 is developed by NVIDIA Corporation of Santa Clara, CA.

In at least one embodiment, CUDA to HIP translation tool 4820 is configured to translate CUDA source code 4810 to functionally similar HIP source code 4830. In a least one embodiment, HIP source code 4830 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4812, but such a HIP programming language may lack support for dynamic parallelism and therefore global functions 4812 defined in HIP code may be callable from a host only.

In at least one embodiment, HIP source code 4830 includes, without limitation, any number (including zero) of global functions 4812, any number (including zero) of device functions 4814, any number (including zero) of host functions 4816, and any number (including zero) of host/device functions 4818. In at least one embodiment, HIP source code 4830 may also include any number of calls to any number of functions that are specified in a HIP runtime API 4832. In at least one embodiment, HIP runtime API 4832 includes, without limitation, functionally similar versions of a subset of functions included in CUDA runtime API 4802. In at least one embodiment, HIP source code 4830 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4832, a HIP driver API, APIs for any number of HIP libraries, APIs for any number of ROCm libraries, etc.

In at least one embodiment, CUDA to HIP translation tool 4820 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4820 converts any number of calls to functions specified in CUDA runtime API 4802 to any number of calls to functions specified in HIP runtime API 4832.

In at least one embodiment, CUDA to HIP translation tool 4820 is a tool known as hipify-perl that executes a text-based translation process. In at least one embodiment, CUDA to HIP translation tool 4820 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4820.

In at least one embodiment, HIP compiler driver 4840 is a front end that determines a target device 4846 and then configures a compiler that is compatible with target device 4846 to compile HIP source code 4830. In at least one embodiment, target device 4846 is a processor that is optimized for parallel instruction processing. In at least one embodiment, HIP compiler driver 4840 may determine target device 4846 in any technically feasible fashion.

In at least one embodiment, if target device 4846 is compatible with CUDA (e.g., CUDA-enabled GPU 4894), then HIP compiler driver 4840 generates a HIP/NVCC compilation command 4842. In at least one embodiment and as described in greater detail in conjunction with FIG. 48B, HIP/NVCC compilation command 4842 configures CUDA compiler 4850 to compile HIP source code 4830 using, without limitation, a HIP to CUDA translation header and a CUDA runtime library. In at least one embodiment and in response to HIP/NVCC compilation command 4842, CUDA compiler 4850 generates host executable code 4870(1) and CUDA device executable code 4884.

In at least one embodiment, if target device 4846 is not compatible with CUDA, then HIP compiler driver 4840 generates a HIP/HCC compilation command 4844. In at least one embodiment and as described in greater detail in conjunction with FIG. 48C, HIP/HCC compilation command 4844 configures HCC 4860 to compile HIP source code 4830 using, without limitation, an HCC header and a HIP/HCC runtime library. In at least one embodiment and in response to HIP/HCC compilation command 4844, HCC 4860 generates host executable code 4870(2) and HCC device executable code 4882. In at least one embodiment, HCC device executable code 4882 is a compiled version of device code included in HIP source code 4830 that is executable on GPU 4892. In at least one embodiment, GPU 4892 may be any processor that is optimized for parallel instruction processing, is not compatible with CUDA, and is compatible with HCC. In at least one embodiment, GPU 4892 is developed by AMD Corporation of Santa Clara, CA. In at least one embodiment GPU, 4892 is a non-CUDA-enabled GPU 4892.

For explanatory purposes only, three different flows that may be implemented in at least one embodiment to compile CUDA source code 4810 for execution on CPU 4890 and different devices are depicted in FIG. 48A. In at least one embodiment, a direct CUDA flow compiles CUDA source code 4810 for execution on CPU 4890 and CUDA-enabled GPU 4894 without translating CUDA source code 4810 to HIP source code 4830. In at least one embodiment, an indirect CUDA flow translates CUDA source code 4810 to HIP source code 4830 and then compiles HIP source code 4830 for execution on CPU 4890 and CUDA-enabled GPU 4894. In at least one embodiment, a CUDA/HCC flow translates CUDA source code 4810 to HIP source code 4830 and then compiles HIP source code 4830 for execution on CPU 4890 and GPU 4892.

A direct CUDA flow that may be implemented in at least one embodiment is depicted via dashed lines and a series of bubbles annotated A1-A3. In at least one embodiment and as depicted with bubble annotated A1, CUDA compiler 4850 receives CUDA source code 4810 and a CUDA compile command 4848 that configures CUDA compiler 4850 to compile CUDA source code 4810. In at least one embodiment, CUDA source code 4810 used in a direct CUDA flow is written in a CUDA programming language that is based on a programming language other than C++ (e.g., C, Fortran, Python, Java, etc.). In at least one embodiment and in response to CUDA compile command 4848, CUDA compiler 4850 generates host executable code 4870(1) and CUDA device executable code 4884 (depicted with bubble annotated A2). In at least one embodiment and as depicted with bubble annotated A3, host executable code 4870(1) and CUDA device executable code 4884 may be executed on, respectively, CPU 4890 and CUDA-enabled GPU 4894. In at least one embodiment, CUDA device executable code 4884 includes, without limitation, binary code. In at least one embodiment, CUDA device executable code 4884 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4820 receives CUDA source code 4810. In at least one embodiment and as depicted with bubble annotated B2, CUDA to HIP translation tool 4820 translates CUDA source code 4810 to HIP source code 4830. In at least one embodiment and as depicted with bubble annotated B3, HIP compiler driver 4840 receives HIP source code 4830 and determines that target device 4846 is CUDA-enabled.

In at least one embodiment and as depicted with bubble annotated B4, HIP compiler driver 4840 generates HIP/NVCC compilation command 4842 and transmits both HIP/NVCC compilation command 4842 and HIP source code 4830 to CUDA compiler 4850. In at least one embodiment and as described in greater detail in conjunction with FIG. 48B, HIP/NVCC compilation command 4842 configures CUDA compiler 4850 to compile HIP source code 4830 using, without limitation, a HIP to CUDA translation header and a CUDA runtime library. In at least one embodiment and in response to HIP/NVCC compilation command 4842, CUDA compiler 4850 generates host executable code 4870 (1) and CUDA device executable code 4884 (depicted with bubble annotated B5). In at least one embodiment and as depicted with bubble annotated B6, host executable code 4870(1) and CUDA device executable code 4884 may be executed on, respectively, CPU 4890 and CUDA-enabled GPU 4894. In at least one embodiment, CUDA device executable code 4884 includes, without limitation, binary code. In at least one embodiment, CUDA device executable code 4884 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4820 receives CUDA source code 4810. In at least one embodiment and as depicted with bubble annotated C2, CUDA to HIP translation tool 4820 translates CUDA source code 4810 to HIP source code 4830. In at least one embodiment and as depicted with bubble annotated C3, HIP compiler driver 4840 receives HIP source code 4830 and determines that target device 4846 is not CUDA-enabled.

In at least one embodiment, HIP compiler driver 4840 generates HIP/HCC compilation command 4844 and transmits both HIP/HCC compilation command 4844 and HIP source code 4830 to HCC 4860 (depicted with bubble annotated C4). In at least one embodiment and as described in greater detail in conjunction with FIG. 48C, HIP/HCC compilation command 4844 configures HCC 4860 to compile HIP source code 4830 using, without limitation, an HCC header and a HIP/HCC runtime library. In at least one embodiment and in response to HIP/HCC compilation command 4844, HCC 4860 generates host executable code 4870(2) and HCC device executable code 4882 (depicted with bubble annotated C5). In at least one embodiment and as depicted with bubble annotated C6, host executable code 4870(2) and HCC device executable code 4882 may be executed on, respectively, CPU 4890 and GPU 4892.

In at least one embodiment, after CUDA source code 4810 is translated to HIP source code 4830, HIP compiler driver 4840 may subsequently be used to generate executable code for either CUDA-enabled GPU 4894 or GPU 4892 without re-executing CUDA to HIP translation tool 4820. In at least one embodiment, CUDA to HIP translation tool 4820 translates CUDA source code 4810 to HIP source code 4830 that is then stored in memory. In at least one embodiment, HIP compiler driver 4840 then configures HCC 4860 to generate host executable code 4870(2) and HCC device executable code 4882 based on HIP source code 4830. In at least one embodiment, HIP compiler driver 4840 subsequently configures CUDA compiler 4850 to generate host executable code 4870(1) and CUDA device executable code 4884 based on stored HIP source code 4830.

In at least one embodiment, at least one component shown or described with respect to FIG. 48A is used to implement techniques and/or functions described in connection with FIGS. 1-20. In at least one embodiment, at least one element of system 4800 is used to perform an API to cause shared virtual memory to be allocated for use by a plurality of processors. In at least one embodiment, at least one element of system 4800 is used to perform an API to cause physical memory corresponding to shared virtual memory to be designated for use by a plurality of processors. In at least one embodiment, at least one element of system 4800 is used to perform an API to enable access to shared virtual memory by a plurality of processors. In at least one embodiment, at least one element of system 4800 is used to perform an API to cause physical memory corresponding to shared virtual memory to be undesignated for use by a plurality of processors. In at least one embodiment, at least one element of system 4800 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 48B:
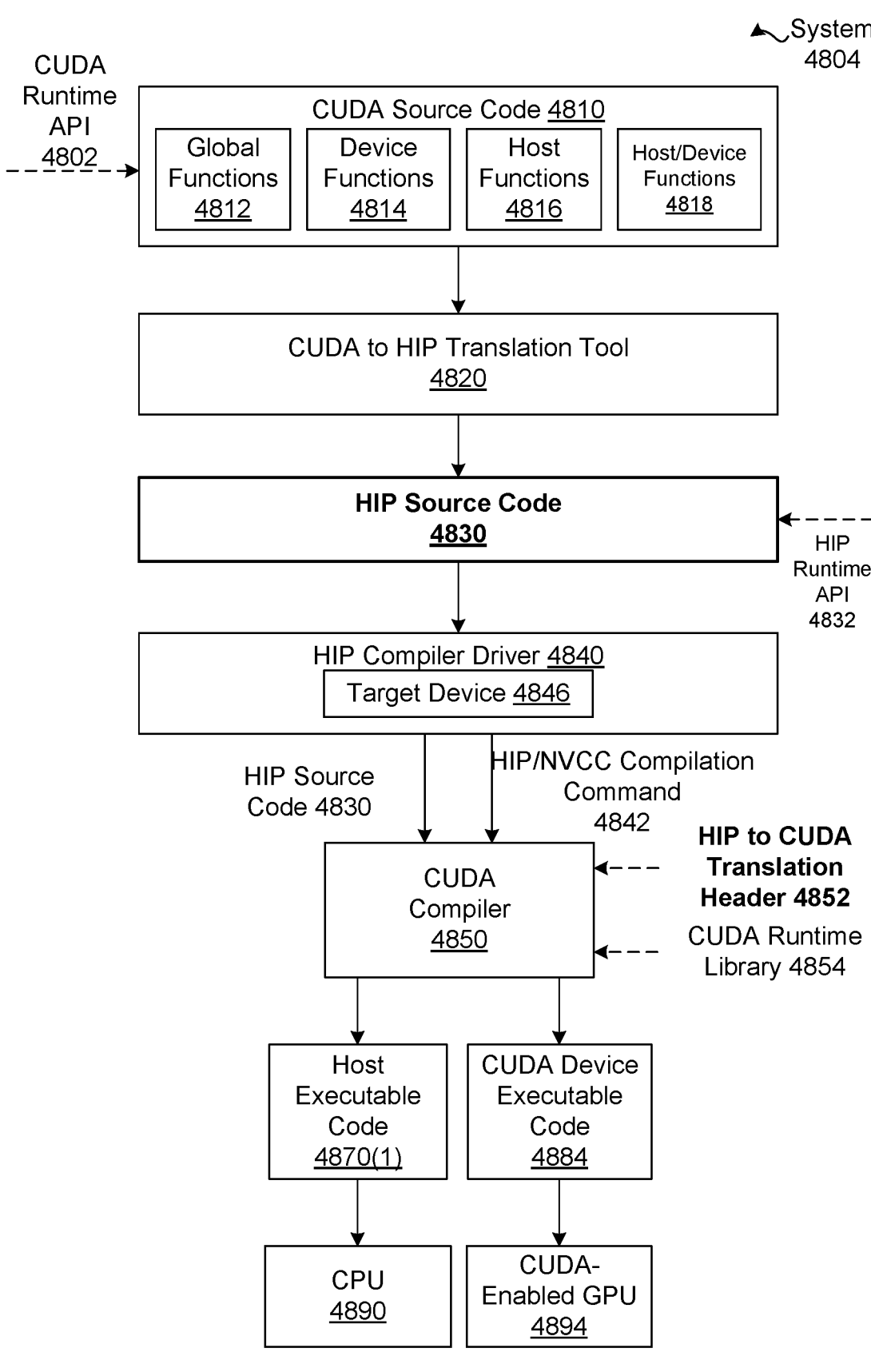
FIG. 48B illustrates a system configured to compile and execute CUDA source code of FIG. 48A using a CPU and a CUDA-enabled GPU, in accordance with at least one embodiment.

FIG. 48B illustrates a system 4804 configured to compile and execute CUDA source code 4810 of FIG. 48A using CPU 4890 and CUDA-enabled GPU 4894, in accordance with at least one embodiment. In at least one embodiment, system 4804 includes, without limitation, CUDA source code 4810, CUDA to HIP translation tool 4820, HIP source code 4830, HIP compiler driver 4840, CUDA compiler 4850, host executable code 4870(1), CUDA device executable code 4884, CPU 4890, and CUDA-enabled GPU 4894.

In at least one embodiment and as described previously herein in conjunction with FIG. 48A, CUDA source code 4810 includes, without limitation, any number (including zero) of global functions 4812, any number (including zero) of device functions 4814, any number (including zero) of host functions 4816, and any number (including zero) of host/device functions 4818. In at least one embodiment, CUDA source code 4810 also includes, without limitation, any number of calls to any number of functions that are specified in any number of CUDA APIs.

In at least one embodiment, CUDA to HIP translation tool 4820 translates CUDA source code 4810 to HIP source code 4830. In at least one embodiment, CUDA to HIP translation tool 4820 converts each kernel call in CUDA source code 4810 from a CUDA syntax to a HIP syntax and converts any number of other CUDA calls in CUDA source code 4810 to any number of other functionally similar HIP calls.

In at least one embodiment, HIP compiler driver 4840 determines that target device 4846 is CUDA-enabled and generates HIP/NVCC compilation command 4842. In at least one embodiment, HIP compiler driver 4840 then configures CUDA compiler 4850 via HIP/NVCC compilation command 4842 to compile HIP source code 4830. In at least one embodiment, HIP compiler driver 4840 provides access to a HIP to CUDA translation header 4852 as part of configuring CUDA compiler 4850. In at least one embodiment, HIP to CUDA translation header 4852 translates any number of mechanisms (e.g., functions) specified in any number of HIP APIs to any number of mechanisms specified in any number of CUDA APIs. In at least one embodiment, CUDA compiler 4850 uses HIP to CUDA translation header 4852 in conjunction with a CUDA runtime library 4854 corresponding to CUDA runtime API 4802 to generate host executable code 4870(1) and CUDA device executable code 4884. In at least one embodiment, host executable code 4870(1) and CUDA device executable code 4884 may then be executed on, respectively, CPU 4890 and CUDA-enabled GPU 4894. In at least one embodiment, CUDA device executable code 4884 includes, without limitation, binary code. In at least one embodiment, CUDA device executable code 4884 includes, without limitation, PTX code and is further compiled into binary code for a specific target device at runtime.

In at least one embodiment, at least one component shown or described with respect to FIG. 48B is used to implement techniques and/or functions described in connection with FIGS. 1-20. In at least one embodiment, at least one element of system 4804 is used to perform an API to cause shared virtual memory to be allocated for use by a plurality of processors. In at least one embodiment, at least one element of system 4804 is used to perform an API to cause physical memory corresponding to shared virtual memory to be designated for use by a plurality of processors. In at least one embodiment, at least one element of system 4804 is used to perform an API to enable access to shared virtual memory by a plurality of processors. In at least one embodiment, at least one element of system 4804 is used to perform an API to cause physical memory corresponding to shared virtual memory to be undesignated for use by a plurality of processors. In at least one embodiment, at least one element of system 4804 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 48C:
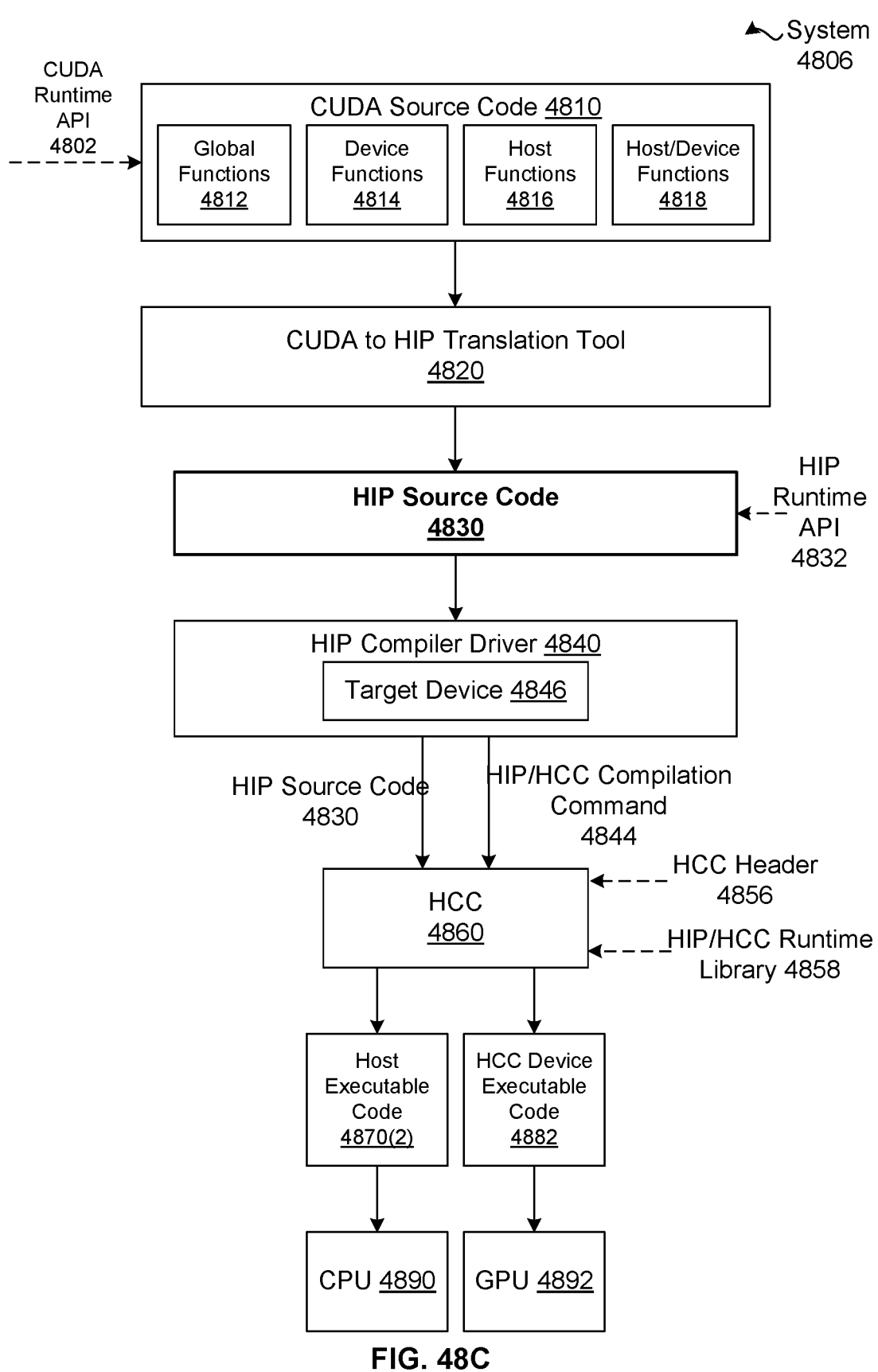
FIG. 48C illustrates a system configured to compile and execute CUDA source code of FIG. 48A using a CPU and a non-CUDA-enabled GPU, in accordance with at least one embodiment.

FIG. 48C illustrates a system 4806 configured to compile and execute CUDA source code 4810 of FIG. 48A using CPU 4890 and non-CUDA-enabled GPU 4892, in accordance with at least one embodiment. In at least one embodiment, system 4806 includes, without limitation, CUDA source code 4810, CUDA to HIP translation tool 4820, HIP source code 4830, HIP compiler driver 4840, HCC 4860, host executable code 4870(2), HCC device executable code 4882, CPU 4890, and GPU 4892.

In at least one embodiment and as described previously herein in conjunction with FIG. 48A, CUDA source code 4810 includes, without limitation, any number (including zero) of global functions 4812, any number (including zero) of device functions 4814, any number (including zero) of host functions 4816, and any number (including zero) of host/device functions 4818. In at least one embodiment, CUDA source code 4810 also includes, without limitation, any number of calls to any number of functions that are specified in any number of CUDA APIs.

In at least one embodiment, CUDA to HIP translation tool 4820 translates CUDA source code 4810 to HIP source code 4830. In at least one embodiment, CUDA to HIP translation tool 4820 converts each kernel call in CUDA source code 4810 from a CUDA syntax to a HIP syntax and converts any number of other CUDA calls in source code 4810 to any number of other functionally similar HIP calls.

In at least one embodiment, HIP compiler driver 4840 subsequently determines that target device 4846 is not CUDA-enabled and generates HIP/HCC compilation command 4844. In at least one embodiment, HIP compiler driver 4840 then configures HCC 4860 to execute HIP/HCC compilation command 4844 to compile HIP source code 4830. In at least one embodiment, HIP/HCC compilation command 4844 configures HCC 4860 to use, without limitation, a HIP/HCC runtime library 4858 and an HCC header 4856 to generate host executable code 4870(2) and HCC device executable code 4882. In at least one embodiment, HIP/HCC runtime library 4858 corresponds to HIP runtime API 4832. In at least one embodiment, HCC header 4856 includes, without limitation, any number and type of interoperability mechanisms for HIP and HCC. In at least one embodiment, host executable code 4870(2) and HCC device executable code 4882 may be executed on, respectively, CPU 4890 and GPU 4892.

In at least one embodiment, at least one component shown or described with respect to FIG. 48C is used to implement techniques and/or functions described in connection with FIGS. 1-20. In at least one embodiment, at least one element of system 4806 is used to perform an API to cause shared virtual memory to be allocated for use by a plurality of processors. In at least one embodiment, at least one element of system 4806 is used to perform an API to cause physical memory corresponding to shared virtual memory to be designated for use by a plurality of processors. In at least one embodiment, at least one element of system 4806 is used to perform an API to enable access to shared virtual memory by a plurality of processors. In at least one embodiment, at least one element of system 4806 is used to perform an API to cause physical memory corresponding to shared virtual memory to be undesignated for use by a plurality of processors. In at least one embodiment, at least one element of system 4806 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

FIG. 49 illustrates an exemplary kernel translated by CUDA-to-HIP translation tool 4820 of FIG. 48C, in accordance with at least one embodiment. In at least one embodiment, CUDA source code 4810 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4810 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "_global_" declaration specifier. In at least one embodiment, the dimension of a grid that executes a kernel for a given kernel call and associated streams are specified using a CUDA kernel launch syntax 4910. In at least one embodiment, CUDA kernel launch syntax 4910 is specified as "KernelName<<<GridSize, BlockSize, SharedMemorySize, Stream>>> (KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4910 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4910, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4910, SharedMemorySize defaults to zero. In at least one embodiment and with respect to CUDA kernel launch syntax 4910, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4810 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4910, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4810 to HIP source code 4830, CUDA to HIP translation tool 4820 translates each kernel call in CUDA source code 4810 from CUDA kernel launch syntax 4910 to a HIP kernel launch syntax 4920 and converts any number of other CUDA calls in source code 4810 to any number of other functionally similar HIP calls. In at least one embodiment, HIP kernel launch syntax 4920 is specified as "hipLaunchKernelGGL (KernelName, GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4920 as in CUDA kernel launch syntax 4910 (described previously herein). In at least one embodiment, arguments SharedMemorySize and Stream are required in HIP kernel launch syntax 4920 and are optional in CUDA kernel launch syntax 4910.

In at least one embodiment, a portion of HIP source code 4830 depicted in FIG. 49 is identical to a portion of CUDA source code 4810 depicted in FIG. 49 except for a kernel call that causes kernel MatAdd to execute on a device. In at least one embodiment, kernel MatAdd is defined in HIP source code 4830 with the same "_global" declaration specifier with which kernel MatAdd is defined in CUDA source code 4810. In at least one embodiment, a kernel call in HIP source code 4830 is "hipLaunchKernelGGL (MatAdd, numBlocks, threadsPerBlock, 0, 0, A, B, C);", while a corresponding kernel call in CUDA source code 4810 is "MatAdd<<<numBlocks, threadsPerBlock>>>(A, B, C);".

In at least one embodiment, at least one component shown or described with respect to FIG. 49 is used to implement techniques and/or functions described in connection with FIGS. 1-20. In at least one embodiment, at least one of CUDA Source Code 4910, CUDA to HIP Translation Tool 4920, or HIP Source Code 4930 is used to perform an API to cause shared virtual memory to be allocated for use by a plurality of processors. In at least one embodiment, at least one of CUDA Source Code 4910, CUDA to HIP Translation Tool 4920, or HIP Source Code 4930 is used to perform an API to cause physical memory corresponding to shared virtual memory to be designated for use by a plurality of processors. In at least one embodiment, at least one of CUDA Source Code 4910, CUDA to HIP Translation Tool 4920, or HIP Source Code 4930 is used to perform an API to enable access to shared virtual memory by a plurality of processors. In at least one embodiment, at least one of CUDA Source Code 4910, CUDA to HIP Translation Tool 4920, or HIP Source Code 4930 is used to perform an API to cause physical memory corresponding to shared virtual memory to be undesignated for use by a plurality of processors. In at least one embodiment, at least one of CUDA Source Code 4910, CUDA to HIP Translation Tool 4920, or HIP Source Code 4930 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 50:
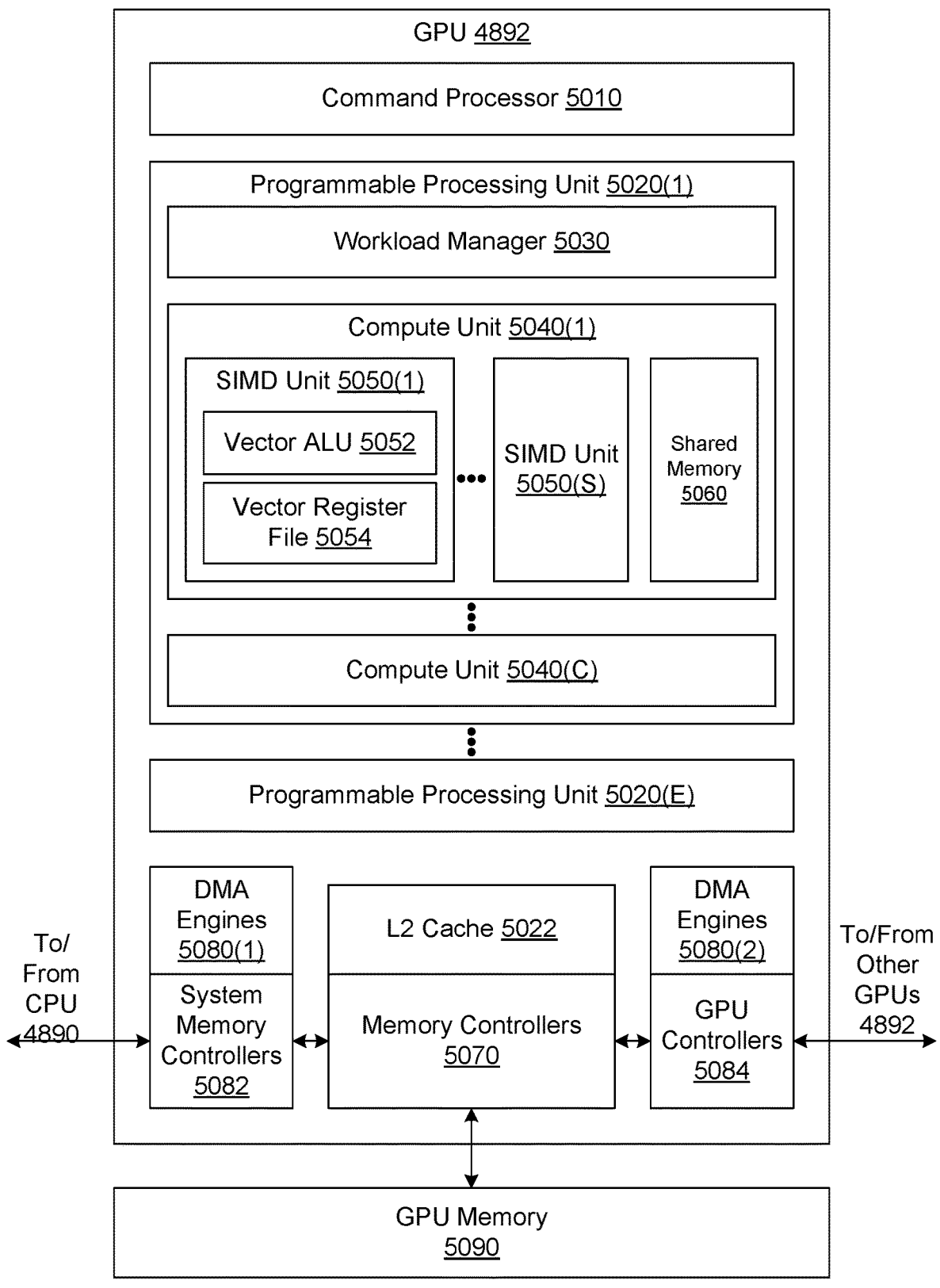
FIG. 50 illustrates non-CUDA-enabled GPU of FIG. 48C in greater detail, in accordance with at least one embodiment.

FIG. 50 illustrates non-CUDA-enabled GPU 4892 of FIG. 48C in greater detail, in accordance with at least one embodiment. In at least one embodiment, GPU 4892 is developed by AMD corporation of Santa Clara. In at least one embodiment, GPU 4892 can be configured to perform compute operations in a highly-parallel fashion. In at least one embodiment, GPU 4892 is configured to execute graphics pipeline operations such as draw commands, pixel operations, geometric computations, and other operations associated with rendering an image to a display. In at least one embodiment, GPU 4892 is configured to execute operations unrelated to graphics. In at least one embodiment, GPU 4892 is configured to execute both operations related to graphics and operations unrelated to graphics. In at least one embodiment, GPU 4892 can be configured to execute device code included in HIP source code 4830.

In at least one embodiment, GPU 4892 includes, without limitation, any number of programmable processing units 5020, a command processor 5010, an L2 cache 5022, memory controllers 5070, DMA engines 5080(1), system memory controllers 5082, DMA engines 5080(2), and GPU controllers 5084. In at least one embodiment, each programmable processing unit 5020 includes, without limitation, a workload manager 5030 and any number of compute units 5040. In at least one embodiment, command processor 5010 reads commands from one or more command queues (not shown) and distributes commands to workload managers 5030. In at least one embodiment, for each programmable processing unit 5020, associated workload manager 5030 distributes work to compute units 5040 included in programmable processing unit 5020. In at least one embodiment, each compute unit 5040 may execute any number of thread blocks, but each thread block executes on a single compute unit 5040. In at least one embodiment, a workgroup is a thread block.

In at least one embodiment, each compute unit 5040 includes, without limitation, any number of SIMD units 5050 and a shared memory 5060. In at least one embodiment, each SIMD unit 5050 implements a SIMD architecture and is configured to perform operations in parallel. In at least one embodiment, each SIMD unit 5050 includes, without limitation, a vector ALU 5052 and a vector register file 5054. In at least one embodiment, each SIMD unit 5050 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 5060.

In at least one embodiment, programmable processing units 5020 are referred to as "shader engines." In at least one embodiment, each programmable processing unit 5020 includes, without limitation, any amount of dedicated graphics hardware in addition to compute units 5040. In at least one embodiment, each programmable processing unit 5020 includes, without limitation, any number (including zero) of geometry processors, any number (including zero) of rasterizers, any number (including zero) of render back ends, workload manager 5030, and any number of compute units 5040.

In at least one embodiment, compute units 5040 share L2 cache 5022. In at least one embodiment, L2 cache 5022 is partitioned. In at least one embodiment, a GPU memory 5090 is accessible by all compute units 5040 in GPU 4892. In at least one embodiment, memory controllers 5070 and system memory controllers 5082 facilitate data transfers between GPU 4892 and a host, and DMA engines 5080(1) enable asynchronous memory transfers between GPU 4892 and such a host. In at least one embodiment, memory controllers 5070 and GPU controllers 5084 facilitate data transfers between GPU 4892 and other GPUs 4892, and DMA engines 5080(2) enable asynchronous memory transfers between GPU 4892 and other GPUs 4892.

In at least one embodiment, GPU 4892 includes, without limitation, any amount and type of system interconnect that facilitates data and control transmissions across any number and type of directly or indirectly linked components that may be internal or external to GPU 4892. In at least one embodiment, GPU 4892 includes, without limitation, any number and type of I/O interfaces (e.g., PCIe) that are coupled to any number and type of peripheral devices. In at least one embodiment, GPU 4892 may include, without limitation, any number (including zero) of display engines and any number (including zero) of multimedia engines. In at least one embodiment, GPU 4892 implements a memory subsystem that includes, without limitation, any amount and type of memory controllers (e.g., memory controllers 5070 and system memory controllers 5082) and memory devices (e.g., shared memories 5060) that may be dedicated to one component or shared among multiple components. In at least one embodiment, GPU 4892 implements a cache subsystem that includes, without limitation, one or more cache memories (e.g., L2 cache 5022) that may each be private to or shared between any number of components (e.g., SIMD units 5050, compute units 5040, and programmable processing units 5020).

In at least one embodiment, at least one component shown or described with respect to FIG. 50 is used to implement techniques and/or functions described in connection with FIGS. 1-20. In at least one embodiment, at least one component shown or described with respect to FIG. 50 is used to perform an API to cause shared virtual memory to be allocated for use by a plurality of processors. In at least one embodiment, at least one component shown or described with respect to FIG. 50 is used to perform an API to cause physical memory corresponding to shared virtual memory to be designated for use by a plurality of processors. In at least one embodiment, at least one component shown or described with respect to FIG. 50 is used to perform an API to enable access to shared virtual memory by a plurality of processors. In at least one embodiment, at least one component shown or described with respect to FIG. 50 is used to perform an API to cause physical memory corresponding to shared virtual memory to be undesignated for use by a plurality of processors. In at least one embodiment, at least one component shown or described with respect to FIG. 50 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 51:
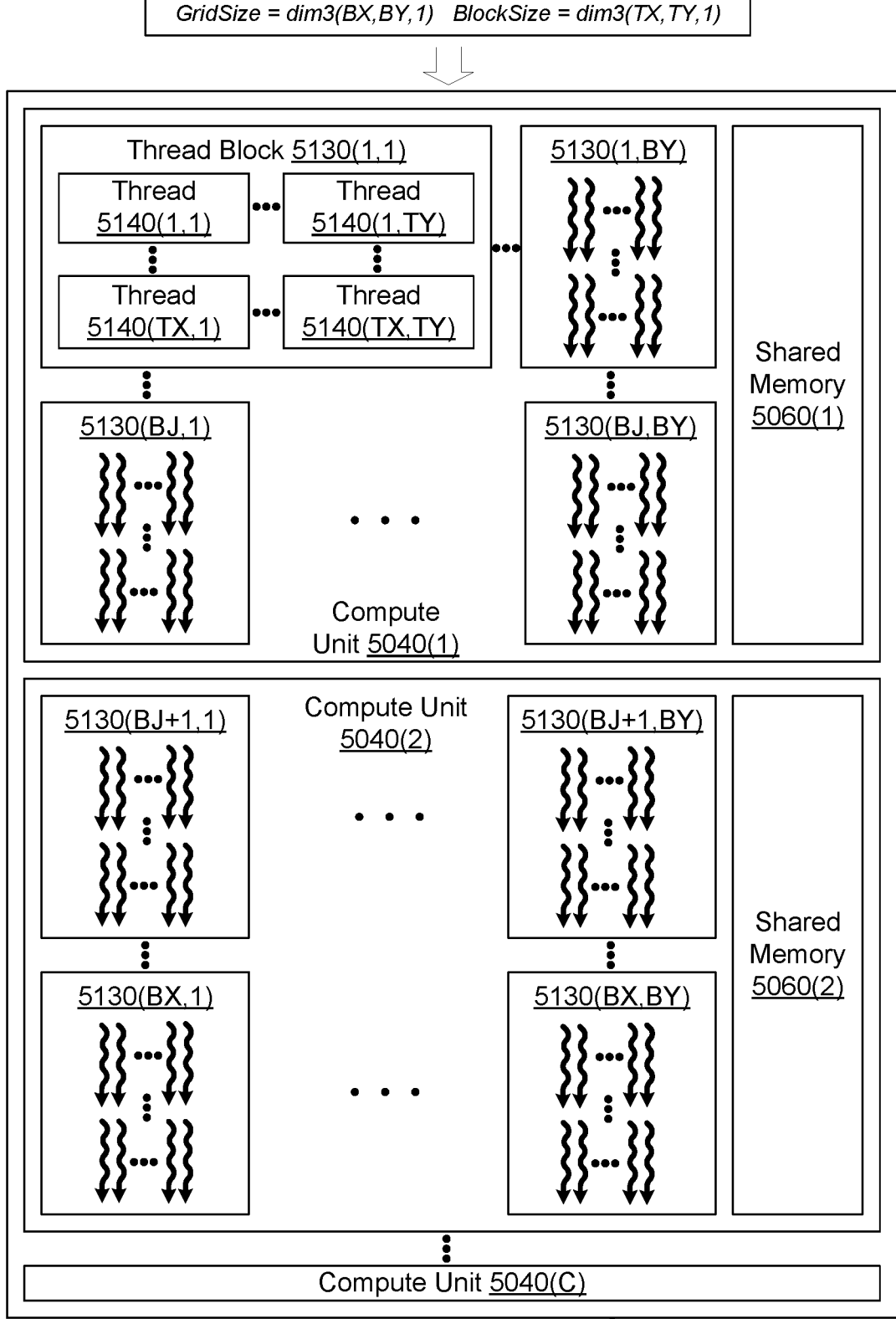
FIG. 51 illustrates how threads of an exemplary CUDA grid are mapped to different compute units of FIG. 50, in accordance with at least one embodiment.

FIG. 51 illustrates how threads of an exemplary CUDA grid 5120 are mapped to different compute units 5040 of FIG. 50, in accordance with at least one embodiment. In at least one embodiment and for explanatory purposes only, grid 5120 has a GridSize of BX by BY by 1 and a BlockSize of TX by TY by 1. In at least one embodiment, grid 5120 therefore includes, without limitation, (BX*BY) thread blocks 5130 and each thread block 5130 includes, without limitation, (TX*TY) threads 5140. Threads 5140 are depicted in FIG. 51 as squiggly arrows.

In at least one embodiment, grid 5120 is mapped to programmable processing unit 5020(1) that includes, without limitation, compute units 5040(1)-5040(C). In at least one embodiment and as shown, (BJ*BY) thread blocks 5130 are mapped to compute unit 5040(1), and the remaining thread blocks 5130 are mapped to compute unit 5040(2). In at least one embodiment, each thread block 5130 may include, without limitation, any number of warps, and each warp is mapped to a different SIMD unit 5050 of FIG. 50.

In at least one embodiment, warps in a given thread block 5130 may synchronize together and communicate through shared memory 5060 included in associated compute unit 5040. For example and in at least one embodiment, warps in thread block 5130(BJ,1) can synchronize together and communicate through shared memory 5060(1). For example and in at least one embodiment, warps in thread block 5130(BJ+1,1) can synchronize together and communicate through shared memory 5060(2).

In at least one embodiment, at least one component shown or described with respect to FIG. 51 is used to implement techniques and/or functions described in connection with FIGS. 1-20. In at least one embodiment, at least one thread of exemplary CUDA grid 5120 is used to perform an API to cause shared virtual memory to be allocated for use by a plurality of processors. In at least one embodiment, at least one thread of exemplary CUDA grid 5120 is used to perform an API to cause physical memory corresponding to shared virtual memory to be designated for use by a plurality of processors. In at least one embodiment, at least one thread of exemplary CUDA grid 5120 is used to perform an API to enable access to shared virtual memory by a plurality of processors. In at least one embodiment, at least one thread of exemplary CUDA grid 5120 is used to perform an API to cause physical memory corresponding to shared virtual memory to be undesignated for use by a plurality of processors. In at least one embodiment, at least one thread of exemplary CUDA grid 5120 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

Figure 52:
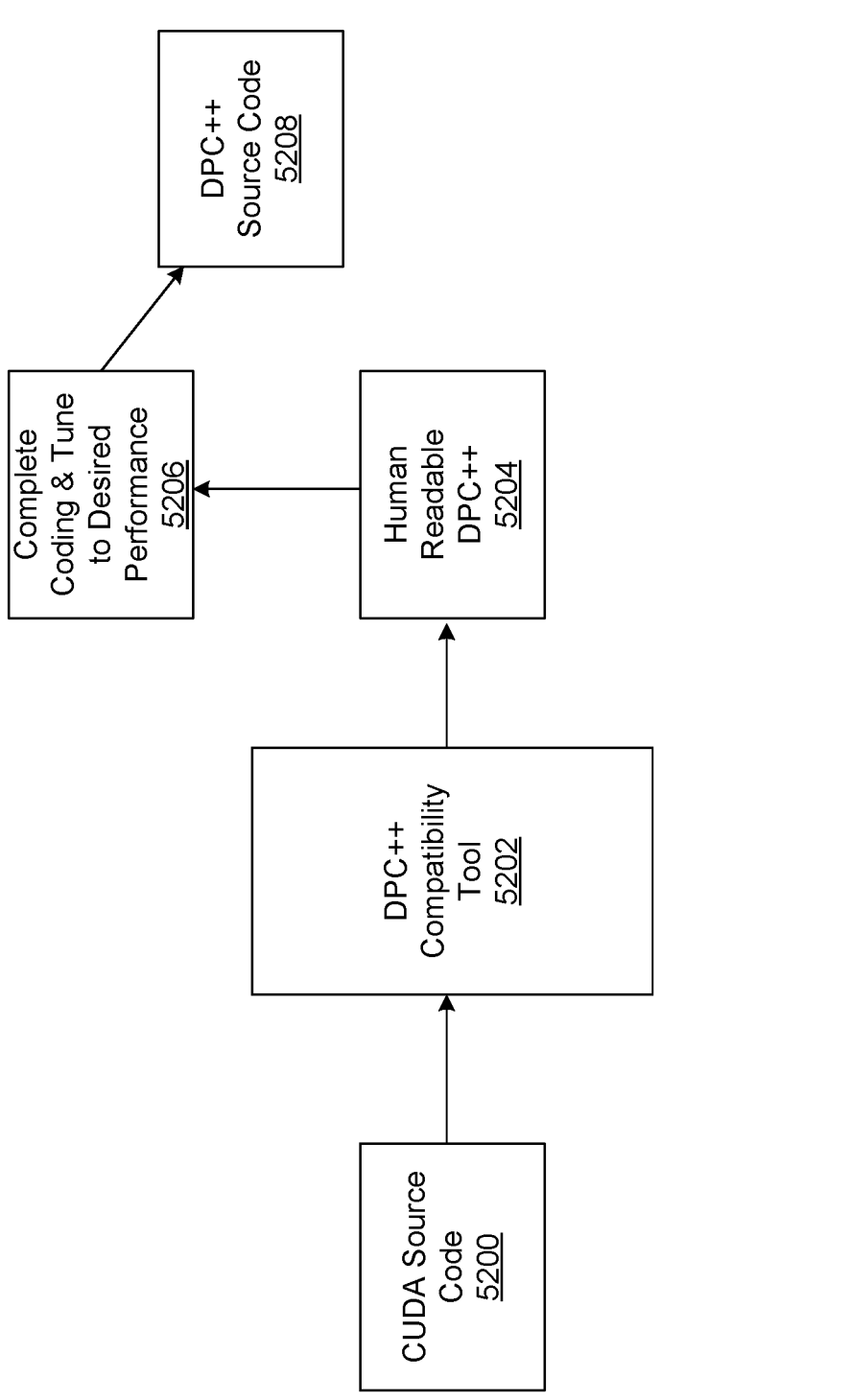
FIG. 52 illustrates how to migrate existing CUDA code to Data Parallel C++ code, in accordance with at least one embodiment.

FIG. 52 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 5200 is provided as an input to a DPC++ compatibility tool 5202 to generate human readable DPC++ 5204. In at least one embodiment, human readable DPC++ 5204 includes inline comments generated by DPC++ compatibility tool 5202 that guides a developer on how and/or where to modify DPC++ code to complete coding and tuning to desired performance 5206, thereby generating DPC++ source code 5208.

In at least one embodiment, CUDA source code 5200 is or includes a collection of human-readable source code in a CUDA programming language. In at least one embodiment, CUDA source code 5200 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 5200 described in connection with FIG. 52 may be in accordance with those discussed elsewhere in this document.

In at least one embodiment, DPC++ compatibility tool 5202 refers to an executable tool, program, application, or any other suitable type of tool that is used to facilitate migration of CUDA source code 5200 to DPC++ source code 5208. In at least one embodiment, DPC++ compatibility tool 5202 is a command-line-based code migration tool available as part of a DPC++ tool kit that is used to port existing CUDA sources to DPC++. In at least one embodiment, DPC++ compatibility tool 5202 converts some or all source code of a CUDA application from CUDA to DPC++ and generates a resulting file that is written at least partially in DPC++, referred to as human readable DPC++ 5204. In at least one embodiment, human readable DPC++ 5204 includes comments that are generated by DPC++ compatibility tool 5202 to indicate where user intervention may be necessary. In at least one embodiment, user intervention is necessary when CUDA source code 5200 calls a CUDA API that has no analogous DPC++ API; other examples where user intervention is required are discussed later in greater detail.

In at least one embodiment, a workflow for migrating CUDA source code 5200 (e.g., application or portion thereof) includes creating one or more compilation database files; migrating CUDA to DPC++ using a DPC++ compatibility tool 5202; completing migration and verifying correctness, thereby generating DPC++ source code 5208; and compiling DPC++ source code 5208 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 5202 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 5202 migrates CUDA code (e.g., applications) written in CUDA to DPC++ by generating DPC++ wherever possible.

In at least one embodiment, DPC++ compatibility tool 5202 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 5202 to migrate CUDA code to DPC++. In at least one embodiment, non-CUDA C++ code and files are migrated as is. In at least one embodiment, DPC++ compatibility tool 5202 generates human readable DPC++ 5204 which may be DPC++ code that, as generated by DPC++ compatibility tool 5202, cannot be compiled by DPC++ compiler and requires additional plumbing for verifying portions of code that were not migrated correctly, and may involve manual intervention, such as by a developer. In at least one embodiment, DPC++ compatibility tool 5202 provides hints or tools embedded in code to help developers manually migrate additional code that could not be migrated automatically. In at least one embodiment, migration is a one-time activity for a source file, project, or application.

In at least one embodiment, DPC++ compatibility tool 52002 is able to successfully migrate all portions of CUDA code to DPC++ and there may simply be an optional step for manually verifying and tuning performance of DPC++ source code that was generated. In at least one embodiment, DPC++ compatibility tool 5202 directly generates DPC++ source code 5208 which is compiled by a DPC++ compiler without requiring or utilizing human intervention to modify DPC++ code generated by DPC++ compatibility tool 5202. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 5202. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR SIZE 256
[ ] global_void VectorAddKernel(float* A, float* B, float* C)
{
   A[threadIdx.x] = threadIdx.x + 1.0f;
   B[threadIdx.x] = threadIdx.x + 1.0f;
   C[threadIdx.x] = A[threadIdx.x] + B[threadIdx.x];
}
int main( )
{
   float *d_A, *d_B, *d_C;
   cudaMalloc(&d_A, VECTOR_SIZE*sizeof(float));
   cudaMalloc(&d_B, VECTOR_SIZE*sizeof(float));
   cudaMalloc(&d_C, VECTOR_SIZE*sizeof(float));
   VectorAddKernel <<< 1, VECTOR_SIZE>>>(d_A, d_B, d_C);
   float Result[VECTOR_SIZE] = { };
   cudaMemcpy(Result, d_C, VECTOR_SIZE*sizeof(float),
cudaMemcpy DeviceToHost);
   cudaFree(d_A);
   cudaFree(d_B);
   cudaFree(d_C);
   for (int i=0; i<VECTOR_SIZE; i++ {
```

-continued

```
   if (i % 16 == 0) {
      printf("\n");
   }
   printf("%f ", Result[i]);
   }
   return 0;
}
```

In at least one embodiment and in connection with CUDA source file presented above, DPC++ compatibility tool 5202 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 5202 converts CUDA thread IDs used to index work elements to SYCL standard addressing for work elements via a local ID as part of migrating CUDA code to DPC++ code. In at least one embodiment, DPC++ code generated by DPC++ compatibility tool 5202 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 5202. In at least one embodiment, DPC++ compatibility tool 5202 modify CUDA APIs for memory setup and/or host calls to execute kernel on the acceleration device. In at least one embodiment and in connection with CUDA source file presented above, a corresponding human readable DPC++ 5204 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
                            sycl :: nd_item<3> item_ct1)
{
    A[item_ct1.get_local_id(2)]=item_ct1.get_local_id(2)+1.0f;
    B[item_ct1.get_local_id(2)] =item_ct1.get_local_id(2)+1.0f;
    C[item_ct1.get_local_id(2)] =
        A[item_ct1.get_local_id(2)] + B[item_ct1.get_local_id(2)];
}
int main( )
{
    float *d_A, *d_B, *d_C;
    d_A = (float *)sycl :: malloc_device(VECTOR_SIZE * sizeof(float),
        dpct :: get_current_device( ),
        dpct :: get_default_context( ));
    d_B = (float *)sycl :: malloc_device(VECTOR_SIZE * sizeof(float),
        dpct :: get_current_device( ),
        dpct :: get_default_context( ));
    d_C= (float *)sycl :: malloc_device(VECTOR_SIZE * sizeof(float),
        dpct :: get_current_device( ),
        dpct :: get_default_context( ));
    dpct :: get_default_queue_wait( ).submit([&](sycl :: handler &cgh) {
        cgh.parallel_for(
            sycl :: nd_range<3>(sycl :: range<3>(1, 1, 1) *
                                sycl :: range<3>(1, 1, VECTOR_SIZE) *
                                sycl :: range<3>(1, 1, VECTOR_SIZE)),
            [=](sycl :: nd_items<3> item_ct1) {
                VectorAddKernel(d_A, d_B, d_C, item_ct1);
            });
    });
    float Result[VECTOR_SIZE] = { };
    dpct :: get_default_queue_wait( )
        .memcpy(Result, d_C, VECTOR_SIZE * sizeof(float))
        .wait( );
    sycl: : free(d_A, dpct :: get_default_context( ));
    sycl :: free(d_B, dpct :: get_default_context( ));
    sycl :: free(d_C, dpct :: get_default_context( ));
    for (int i=0; i<VECTOR_SIZE; i++ {
        if (i % 16 == 0) {
            printf("\n");
        }
        printf("%f ", Result[i]);
    }
    return 0;
}
```

In at least one embodiment, human readable DPC++ 5204 refers to output generated by DPC++ compatibility tool 5202 and may be optimized in one manner or another. In at least one embodiment, human readable DPC++ 5204 generated by DPC++ compatibility tool 5202 can be manually edited by a developer after migration to make it more maintainable, performance, or other considerations. In at least one embodiment, DPC++ code generated by DPC++ compatibility tool 52002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 5202 replace uses of unified shared memory with accessors. In at least one embodiment, DPC++ compatibility tool 5202 has an option to change how it migrates CUDA code to DPC++ code. In at least one embodiment, DPC++ compatibility tool 5202 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 5202; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( ); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, one VPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, at least one component shown or described with respect to FIG. 52 is used to implement techniques and/or functions described in connection with FIGS. 1-20. In at least one embodiment, at least one component shown or described with respect to FIG. 52 is used to perform an API to cause shared virtual memory to be allocated for use by a plurality of processors. In at least one embodiment, at least one component shown or described with respect to FIG. 52 is used to perform an API to cause physical memory corresponding to shared virtual memory to be designated for use by a plurality of processors. In at least one embodiment, at least one component shown or described with respect to FIG. 52 is used to perform an API to enable access to shared virtual memory by a plurality of processors. In at least one embodiment, at least one component shown or described with respect to FIG. 52 is used to perform an API to cause physical memory corresponding to shared virtual memory to be undesignated for use by a plurality of processors. In at least one embodiment at least one component shown or described with respect to FIG. 52 is used to perform at least one aspect described with respect to example computer system 100, example computer system 200, example computer system 300, example computer system 400, example computer system 500, example computer system 600, example computer system 700, example computer system 800, example computer system 900, example computer system 1000, example process 1100, example process 1200, example process 1300, example computer system 1400, example computer system 1500, example API 1600, example API 1700, example API 1800, example API 1900, and/or example software stack 2000.

It should be noted that, while example embodiments described herein may relate to a CUDA programming model, techniques described herein can be utilized with any suitable programming model, such HIP, oneAPI, and/or variations thereof.

At least one embodiment of the disclosure can be described in view of the following clauses:

1. A processor comprising:
   one or more circuits to perform an application programming interface (API) to cause physical memory corresponding to shared virtual memory to be designated for use by a plurality of processors.

2. The processor of clause 1, wherein the shared virtual memory is multicast memory.

3. The processor of clause 1 or 2, wherein:
   a first processor of the plurality of processors is to be on a first device; and
   a second processor of the plurality of processors is to be on a second device.

4. The processor of any of clauses 1-3, wherein a location of the shared virtual memory is to be shared between the plurality of processors.

5. The processor of any of clauses 1-4, wherein the one or more circuits are to perform a memory manager to coordinate the shared virtual memory between the plurality of processors.

6. The processor of any of clauses 1-5, a location of the shared virtual memory is to be provided to the API as a memory handle.

7. The processor of any of clauses 1-6, the shared virtual memory is to be allocated by a second API that causes the shared virtual memory to be allocated for use by a plurality of processors.

8. The processor of any of clauses 1-7, wherein the one or more circuits comprise a switch to route a location of the shared virtual memory to different physical memory locations located on different processors.

9. The processor of any of clauses 1-8, wherein at least one processor of the plurality of processors is a graphics processing unit (GPU).

10. The processor of any of clauses 1-9, wherein:
   a first processor of the plurality of processors is of a first node of a compute cluster;
   a second processor of the plurality of processors is of a second node of the compute cluster; and
   the first processor is to access memory of the second processor using the shared virtual memory.

11. The processor of any of clauses 1-10, wherein the one or more circuits are to further cause at least one processor of the plurality of processors to designate physical memory to a shared virtual memory address of the shared virtual memory.

12. A computer-implemented method comprising:
   performing an application programming interface (API) to cause physical memory corresponding to shared virtual memory to be designated for use by a plurality of processors.

13. The computer-implemented method of clause 12, wherein the shared virtual memory is multicast memory.

14. The computer-implemented method of clause 12 or 13, wherein:
   a first processor of the plurality of processors is on a first node of a compute cluster; and
   a second processor of the plurality of processors is on a second node of the compute cluster.

15 The computer-implemented method of any of clauses 12-14, further comprising:
   sharing a location of the shared virtual memory between the plurality of processors using a memory handle.

16. The computer-implemented method of any of clauses 12-15, further comprising:
   performing a memory manager to coordinate the shared virtual memory between the plurality of processors.

17 The computer-implemented method of any of clauses 12-16, wherein performing the API comprises:
   selecting a processor of the plurality of processors;
   allocating a physical memory location in memory of the processor; and
   mapping the physical memory location to a location of the shared virtual memory.

18. The computer-implemented method of any of clauses 12-17, wherein at least one processor of the plurality of processors is a graphics processing unit (GPU).

19. The computer-implemented method of any of clauses 12-18, further comprising:
   routing a location of the shared virtual memory to different physical memory locations located on different devices.

20. The computer-implemented method of any of clauses 12-19, further comprising:
   performing one or more compute operations using the shared virtual memory.

21. The computer-implemented method of any of clauses 12-20, wherein a set processors of the plurality of processors are to share a first memory handle corresponding to the shared virtual memory.

22. The computer-implemented method of any of clauses 12-21, wherein:
   a set processors of the plurality of processors are to share a first memory handle corresponding to the shared virtual memory; and
   a subset of the set of processors are to share a second memory handle corresponding to a second virtual memory.

23. A computer system comprising:
   one or more processors and memory storing executable instructions that, as a result of being executed by the one or more processors, cause the one or more processors to perform an application programming interface (API) to cause physical memory corresponding to shared virtual memory to be designated for use by a plurality of processors.

24 The computer system of clause 23, wherein the shared virtual memory is multicast memory.

25 The computer system of clause 23 or 24, wherein:
   a first processor of the plurality of processors is to be on a first device; and
   a second processor of the plurality of processors is to be on a second device.

26 The computer system of any of clauses 23-25, wherein a location of the shared virtual memory is to be shared between the plurality of processors.

27. The computer system of any of clauses 23-26, wherein the one or more processors are to perform a load operation using the shared virtual memory.

28. The computer system of any of clauses 23-27, wherein the one or more processors are to perform a store operation using the shared virtual memory.

29. The computer system of any of clauses 23-28, wherein the one or more processors are to perform an atomic operation using the shared virtual memory.

30. The computer system of any of clauses 23-29, wherein the one or more processors are to perform a load operation with reduction using the shared virtual memory.

31. The computer system of any of clauses 23-30, wherein the one or more processors are to perform an atomic operation with reduction using the shared virtual memory.

32. A machine-readable medium having stored thereon a set of instructions, which if performed by one or more processors, cause the one or more processors to perform an application programming interface (API) to cause physical memory corresponding to shared virtual memory to be designated for use by a plurality of processors.

33. The machine-readable medium of clause 32, wherein the shared virtual memory is multicast memory.

34 The machine-readable medium of clause 32 or 33, wherein the shared virtual memory is unicast memory.

35 The machine-readable medium of any of clauses 32-34, wherein:

a first processor of the plurality of processors is to be on a first node of a compute cluster; and a second processor of the plurality of processors is to be on a second node of the compute cluster.

36. The machine-readable medium of any of clauses 32-35, wherein a location of the shared virtual memory is to be shared between the plurality of processors.

37 The machine-readable medium of any of clauses 32-36, wherein the API is to receive a memory handle that at least indicates a location of the shared virtual memory.

38. The machine-readable medium of any of clauses 32-37, wherein the API is to receive a location of the physical memory.

39. The machine-readable medium of any of clauses 32-38, wherein the API is to receive a set of flags that indicate one or more properties of the shared virtual memory.

40. The machine-readable medium of any of clauses 32-39, wherein the API is to return a success indicator to a calling process executing on a processor of the one or more processors.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
   one or more circuits to perform an application programming interface (API) to receive a location of one or more physical memory addresses and cause the one or more physical memory addresses to be assigned to one or more shared virtual memory addresses to be used by a plurality of processors.

2. The processor of claim 1, wherein the one or more shared virtual memory addresses correspond to an address of multicast memory.

3. The processor of claim 1, wherein:
   a first processor of the plurality of processors is to be on a first device; and a second processor of the plurality of processors is to be on a second device.

4. The processor of claim 1, wherein the one or more shared virtual memory-addresses are to be shared between the plurality of processors.

5. The processor of claim 1, wherein the one or more circuits are to perform a memory manager to coordinate the one or more shared virtual memory addresses between the plurality of processors.

6. The processor of claim 1, wherein the one or more shared virtual memory-addresses are to be provided to the API as a memory handle.

7. The processor of claim 1, wherein the one or more shared virtual memory addresses are to be allocated by a second API that causes the one or more shared virtual memory-addresses to be allocated for use by the plurality of processors.

8. The processor of claim 1, wherein the one or more circuits comprise a switch to route the one or more shared virtual memory addresses to one or more different physical memory addresses located on different processors.

9. The processor of claim 1, wherein at least one processor of the plurality of processors is a graphics processing unit (GPU).

10. The processor of claim 1, wherein:
a first processor of the plurality of processors is of a first node of a compute cluster;
a second processor of the plurality of processors is of a second node of the compute cluster; and
the first processor is to access memory of the second processor using the one or more shared virtual memory addresses.

11. The processor of claim 1, wherein the one or more circuits are to further cause at least one processor of the plurality of processors to designate the one or more physical memory addresses to the one or more shared virtual memory addresses of a shared virtual memory.

12. A computer-implemented method comprising: performing an application programming interface (API) to receive a location of one or more physical memory addresses and cause the one or more physical memory addresses to be assigned to one or more shared virtual memory addresses to be used by the plurality of processors.

13. The computer-implemented method of claim 12, wherein the one or more physical memory addresses comprise an address of multicast memory.

14. The computer-implemented method of claim 12, wherein:
a first processor of the plurality of processors is on a first node of a compute cluster; and
a second processor of the plurality of processors is on a second node of the compute cluster.

15. The computer-implemented method of claim 12, further comprising:
sharing the one or more shared virtual memory addresses between the plurality of processors using a memory handle.

16. The computer-implemented method of claim 12, further comprising:
performing a memory manager to coordinate the one or more shared virtual memory addresses between the plurality of processors.

17. The computer-implemented method of claim 12, wherein performing the API comprises:
selecting a processor of the plurality of processors;
allocating a physical memory location in memory of the processor; and mapping the physical memory location to the one or more shared virtual memory addresses.

18. The computer-implemented method of claim 12, wherein at least one processor of the plurality of processors is a graphics processing unit (GPU).

19. The computer-implemented method of claim 12, further comprising:
routing the one or more shared virtual memory addresses to one or more different physical memory addresses located on a different device.

20. The computer-implemented method of claim 12, further comprising:
performing one or more compute operations using the one or more shared virtual memory addresses.

21. The computer-implemented method of claim 12, wherein a set processors of the plurality of processors are to share a first memory handle corresponding to the one or more shared virtual memory addresses.

22. The computer-implemented method of claim 12, wherein:
a set of processors of the plurality of processors are to share a first memory handle corresponding to a first virtual memory address of the one or more shared virtual memory addresses; and
a subset of the set of processors are to share a second memory handle corresponding to a second virtual memory address.

23. A computer system comprising:
one or more processors and memory storing executable instructions that, as a result of being executed by the one or more processors, cause the one or more processors to perform an application programming interface (API) to receive a location of one or more physical memory addresses and cause the one or more physical memory addresses to be assigned to one or more shared virtual memory addresses to be used by a plurality of processors.

24. The computer system of claim 23, wherein the one or more shared virtual memory addresses correspond to an address of multicast memory.

25. The computer system of claim 23, wherein:
a first processor of the plurality of processors is to be on a first device; and
a second processor of the plurality of processors is to be on a second device.

26. The computer system of claim 23, wherein the one or more shared virtual memory addresses are to be shared between the plurality of processors.

27. The computer system of claim 23, wherein the one or more processors are to perform a load operation using the one or more shared virtual memory addresses.

28. The computer system of claim 23, wherein the one or more processors are to perform a store operation using the one or more shared virtual memory addresses.

29. The computer system of claim 23, wherein the one or more processors are to perform an atomic operation using the one or more shared virtual memory addresses.

30. The computer system of claim 23, wherein the one or more processors are to perform a load operation with reduction using the one or more shared virtual memory addresses.

31. The computer system of claim 23, wherein the one or more processors are to perform an atomic operation with reduction using the one or more shared virtual memory addresses.

32. A machine-readable medium having stored thereon a set of instructions, which if performed by one or more processors, cause the one or more processors to perform an application programming interface (API) to receive a location of one or more physical memory addresses and cause the one or more physical memory addresses to be assigned to one or more shared virtual memory addresses to be used by a plurality of processors.

33. The machine-readable medium of claim 32, wherein the one or more shared virtual memory addresses comprise an address of multicast memory.

34. The machine-readable medium of claim 32, wherein the one or more shared virtual memory addresses comprise an address of unicast memory.

35. The machine-readable medium of claim 32, wherein:

a first processor of the plurality of processors is to be on a first node of a compute cluster; and a second processor of the plurality of processors is to be on a second node of the compute cluster.

36. The machine-readable medium of claim 32, wherein the one or more shared virtual memory addresses are to be shared between the plurality of processors.

37. The machine-readable medium of claim 32, wherein the API is to receive a memory handle that at least indicates the one or more shared virtual memory addresses.

38. The machine-readable medium of claim 35, wherein the first processor is to access memory of the second processor using the one or more shared virtual memory addresses.

39. The machine-readable medium of claim 32, wherein the API is to receive a set of flags that indicate one or more properties of the one or more shared virtual memory addresses.

40. The machine-readable medium of claim 32, wherein the API is to return a success indicator to a calling process executing on a processor of the one or more processors.

41. A processor comprising:

one or more circuits to perform an application programming interface (API) to cause one or more physical memory addresses to be assigned to one or more shared virtual memory addresses to be used by a plurality of processors, wherein a first processor of the plurality of processors is of a first node of a compute cluster, a second processor of the plurality of processors is of a second node of the compute cluster, and the first processor is to access memory of the second processor using the one or more shared virtual memory addresses.

* * * * *